(12) United States Patent
Ryoo et al.

(10) Patent No.: US 10,986,655 B2
(45) Date of Patent: Apr. 20, 2021

(54) METHOD AND APPARATUS FOR TRANSMITTING DATA IN RRC DEACTIVATED OR ACTIVATED STATE

(71) Applicant: Samsung Electronics Co., Ltd., Suwon-si (KR)

(72) Inventors: Sunheui Ryoo, Yongin-si (KR); Jungmin Moon, Suwon-si (KR); Seunghoon Park, Seoul (KR); Rayeon Ahn, Seoul (KR); Jiwon Hwang, Suwon-si (KR); Byounghoon Jung, Suwon-si (KR); Jungsoo Jung, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/337,351

(22) PCT Filed: Sep. 29, 2017

(86) PCT No.: PCT/KR2017/011010
§ 371 (c)(1),
(2) Date: Mar. 27, 2019

(87) PCT Pub. No.: WO2018/062957
PCT Pub. Date: Apr. 5, 2018

(65) Prior Publication Data
US 2020/0037345 A1  Jan. 30, 2020

(30) Foreign Application Priority Data

Sep. 29, 2016 (KR) .................. 10-2016-0125950
Nov. 3, 2016 (KR) .................. 10-2016-0146069
(Continued)

(51) Int. Cl.
*H04W 72/12* (2009.01)
*H04W 76/27* (2018.01)
(Continued)

(52) U.S. Cl.
CPC ... *H04W 72/1268* (2013.01); *H04W 72/1284* (2013.01); *H04W 74/0833* (2013.01); *H04W 76/10* (2018.02); *H04W 76/27* (2018.02)

(58) Field of Classification Search
CPC ......... H04W 72/1268; H04W 72/1284; H04W 74/0833; H04W 76/10; H04W 76/27;
(Continued)

(56) References Cited

U.S. PATENT DOCUMENTS

2009/0135769 A1  5/2009  Sambhwani et al.
2013/0170453 A1  7/2013  Kim et al.
(Continued)

FOREIGN PATENT DOCUMENTS

KR  10-2014-0115923 A  10/2014
WO  2014148746 A1  9/2014

OTHER PUBLICATIONS

ISA/KR, "International Search Report and Written Opinion of the International Searching Authority," International Application No. PCT/KR2017/011010, dated Jan. 17, 2018, 10 pages.
(Continued)

*Primary Examiner* — Curtis A Alia

(57) ABSTRACT

The present disclosure relates to a communication technique for combining a 5G communication system for supporting a higher data transmission rate than a 4G system with an IoT technology, and a system therefor. The present disclosure can be applied to 5G communication and IoT related technology-based intelligent services (e.g., smart homes, smart buildings, smart cities, smart cars or connected cars, health care, digital education, retail business, security and safety
(Continued)

related services, etc.). Disclosed is a technology for adding uplink data to a radio resource control (RRC) connection request message corresponding to an RA response message and transmitting the same to a base station when the terminal is in an RRC deactivated state in a method for transmitting, by a terminal, uplink data in a wireless communication system.

8 Claims, 65 Drawing Sheets

(30) Foreign Application Priority Data

| Jan. 4, 2017 | (KR) | ........................ 10-2017-0001481 |
| Mar. 23, 2017 | (KR) | ........................ 10-2017-0037158 |

(51) Int. Cl.
*H04W 76/10* (2018.01)
*H04W 74/08* (2009.01)

(58) Field of Classification Search
CPC ... H04W 56/0045; Y02D 70/12; Y02D 70/10; Y02D 70/126; Y02D 70/00
See application file for complete search history.

(56) References Cited

U.S. PATENT DOCUMENTS

| 2014/0177557 A1* | 6/2014 | Charbit ................ H04W 24/10 370/329 |
| 2014/0198640 A1* | 7/2014 | Suzuki .................. H04L 47/76 370/230 |
| 2014/0211673 A1 | 7/2014 | Lu et al. |
| 2015/0003375 A1 | 1/2015 | Liu et al. |
| 2015/0078349 A1 | 3/2015 | He et al. |
| 2015/0312856 A1 | 10/2015 | Womack et al. |
| 2016/0057797 A1 | 2/2016 | Bangolae et al. |
| 2017/0202003 A1* | 7/2017 | Johansson ............. H04W 72/10 |

OTHER PUBLICATIONS

CMCC, "Discussion on Beam Sweeping for Initial Access," R1-167115, 3GPP TSG RAN WG1 #85, Gothenburg, Sweden, Aug. 22-26, 2016, 4 pages.
NTT Docomo, Inc., "Design for RACH Procedure for NR," R1-167378, 3GPP TSG RAN WG1 Meeting #86, Gothenburg, Sweden, Aug. 22-26, 2016, 4 pages.
Ericsson, "State transition and small data transmissions for inactive UEs", 3GPP TSG-RAN WG2 #95, Aug. 22-26, 2016, Tdoc R2-165538, 5 pages.
Sequans Communications", Autonomous RRC Connection Release", 3GPP TSG-RAN WG2 #93bis, Apr. 11-15, 2016, R2-162829, 4 pages.
Supplementary European Search Report dated Jul. 23, 2019 in connection with European Patent Application No. 17 85 6843, 10 pages.
Communication pursuant to Article 94(3) EPC dated Jan. 20, 2021 in connection with European Application No. 17856843.2, Jan. 20, 2021, 8 pages.
Ericsson, "RRC Connection Suspend and Resume," R2-156395, 3GPP TSG-RAN WG2 #92, Anaheim, USA, Nov. 16-20, 2015, 11 pages.
Ericsson (Rapporteur), "CR to capture C-IoT optimizations for non-NB-1°T UEs," R2-164519, 3GPP TSG-RAN WG2 Meeting #94, Nanjing, China, May 23-27, 2016, 51 pages.

* cited by examiner

FIG. 59

METHOD AND APPARATUS FOR TRANSMITTING DATA IN RRC DEACTIVATED OR ACTIVATED STATE

CROSS-REFERENCE TO RELATED APPLICATIONS

This application is a 371 National Stage of International Application No. PCT/KR2017/011010, filed Sep. 29, 2017, which claims priority to Korean Patent Application No. 10-2016-0125950, filed on Sep. 29, 2016, Korean Patent Application No. 10-2016-0146069, filed on Nov. 3, 2016, Korean Patent Application No. 10-2017-0001481, filed on Jan. 4, 2017, and Korean Patent Application No. 10-2017-0037158, filed on Mar. 23, 2017, the disclosures of which are herein incorporated by reference in their entirety.

BACKGROUND

1. Field

The disclosure relates to a technology for a method of operating a eNB and a UE to achieve an energy efficiency KPI discussed by 3GPP RAN 5G SI.

2. Description of Related Art

In order to meet wireless data traffic demands, which have increased since the commercialization of a 4G communication system, efforts to develop an improved 5G communication system or a pre-5G communication system have been made. For this reason, the 5G communication system or the pre-5G communication system is called a beyond-4G-network communication system or a post-LTE system. In order to achieve a high data transmission rate, implementation of the 5G communication system in an mmWave band (for example, 60 GHz band) is being considered. In the 5G communication system, technologies such as beamforming, massive MIMO, Full Dimensional MIMO (FD-MIMO), array antenna, analog beam-forming, and large scale antenna are discussed to mitigate a propagation pathloss and increase a propagation transmission distance in the mm Wave band. Further, in the 5G communication system, technologies such as an evolved small cell, an advanced small cell, a cloud Radio Access Network (RAN), an ultra-dense network, Device-to-Device communication (D2D), a wireless backhaul, a moving network, cooperative communication, Coordinated Multi-Points (CoMP), and received interference cancellation have been developed in order to improve the system network. In addition, in the 5G system, advanced coding modulation (ACM) schemes such as hybrid FSK and QAM modulation (FQAM) and sliding window superposition coding (SWSC), and advanced access technologies, such as filter bank multi carrier (FBMC), non-orthogonal multiple access (NOMA), and sparse code multiple access (SCMA) have been developed.

Meanwhile, the Internet has been evolved to an Internet-of-Things (IoT) network in which distributed components such as objects exchange and process information from a human-oriented connection network in which humans generate and consume information. Internet-of-Everything (IoE) technology, in which big-data processing technology is combined with IoT technology through a connection with a cloud server or the like, has emerged. In order to implement IoT, technical factors such as a sensing technique, wired/wireless communication, network infrastructure, service-interface technology, and secure technology are required, and research on technologies such as a sensor network, machine-to-machine (M2M) communication, machine-type communication (MTC), and the like for connection between objects has recently been conducted. In an IoT environment, through collection and analysis of data generated in connected objects, an intelligent Internet Technology (IT) service that creates new value in peoples' lives may be provided. The IoT may be applied to fields such as those of a smart home, a smart building, a smart city, a smart car, a connected car, a smart grid, health care, a smart home appliance, or high-tech medical services through the convergence of the conventional information technology (IT) and various industries.

Accordingly, various attempts to apply the 5G communication to the IoT network are being made. For example, 5G communication technologies such as a sensor network, machine-to-machine (M2M), and machine-type communication (MTC) are implemented using beamforming, MIMO, and array-antenna schemes. The application of a cloud RAN as big-data processing technology may be an example of convergence of 5G technology and IoT technology.

Particularly, the corresponding standard defines an efficient energy operation mainly aiming at improvement of power efficiency [bit/J] of the UE and the eNB network up to 1000 times or more in the next ten years. To this end, discussion on controlling an active operation time of the UE is started to remove the possibility of additional power consumption according to a necessary beamforming transmission scheme in the mmW operation on a high frequency band.

SUMMARY

In the conventional LTE system, resources having only one type TTI exist and thus the system operates without any problem if allocated UL resources are used in consideration of priorities between logical channels in an LCP process. However, in a future system such as a $5^{th}$ generation mobile communication system, it is expected that a plurality of services having different capability requirements will be served using resources having various types of TTIs. Data transmission and reception using resources having different TTIs have different capabilities. Accordingly, it is required to use UL resources allocated to the UE in consideration of not only the priorities between logical channels but also attributes of the TTI in the LCP process. The disclosure proposes an LCP process considering attributes of the TTI in this vein.

Further, an RRC state in which a wireless communication UE transmits and receives data has been excessively conservatively designed through design philosophy of previous generation which is voice call-oriented. For example, the UE maintains a standby time (such as connected DRX) in an RRC-connected state even though there is no traffic arrival for a predetermined timer after traffic reception, which causes serious power consumption. Further, a user of a smart phone may frequently receive a keep-alive message generated as data regardless of user QoS, and when an RRC connection therefor is designed on the basis of a voice call service, UE power consumption may be more serious. Accordingly, another aspect of the disclosure is to provide a method of determining an RRC state (inactive and (or) active state) for transmitting data and to improve spectral efficiency and a channel access method to allow the UE to efficiently transmit traffic in the RRC inactive state.

In the conventional LTE system, numerology of a physical layer configured to receive a signal by the UE from the eNB is the same except for a random access procedure, the numerology including values related to a structure of the physical layer, such as subcarrier spacing, subframe length, symbol length, and the like. However, as a mobile communication system that dynamically changes a plurality of numerologies has introduced, the UE is required to receive configuration of numerology information required for an initial access procedure and transmission/reception in a connected state from the eNB. Accordingly, the disclosure provide information which the eNB transmits the UE and a time point at which the information is transmitted and proposes an operation and a procedure required when the UE receives numerology information from the eNB.

In accordance with an aspect of the disclosure, a method of transmitting uplink data by a User Equipment (UE) in a wireless communication system is provided. The method includes: receiving logical channel configuration information for uplink scheduling from an evolved Node B (eNB); transmitting a scheduling request message to the eNB; receiving an uplink resource allocation message (uplink grant) configured on the basis of the logical channel configuration information from the eNB in response to the scheduling request message; and transmitting uplink data to the eNB according to the uplink resource allocation message.

The logical channel configuration information may include correspondence information between uplink resources and logical channels which can be transmitted through the uplink resources, and the uplink resources may be separated on the basis of at least one of a transmission time interval (TTI) and subcarrier spacing.

The logical channel configuration information may further include priority information of the logical channels which can be transmitted through the uplink resources.

The uplink data may be transmitted to the eNB through the priority information of the logical channels included in the logical channel configuration information and resource allocation information included in an uplink resource allocation message.

A scheduling request message may be included in information on the logical channels which can be transmitted and is preferred by the UE.

In accordance with an aspect of the disclosure, a method of receiving uplink data by an eNB in a wireless communication system is provided. The method includes: transmitting logical channel configuration information for uplink scheduling to a User Equipment (UE); receiving a scheduling request message from the UE; transmitting an uplink resource allocation message (uplink grant) configured on the basis of the logical channel configuration information to the UE in response to the scheduling request message; and receiving uplink data from the UE according to the uplink resource allocation message.

The logical channel configuration information may include correspondence information between uplink resources and logical channels which can be transmitted through the uplink resources, and the uplink resources may be separated on the basis of at least one of a transmission time interval (TTI) and subcarrier spacing.

The logical channel configuration information may further include priority information of the logical channels which can be transmitted through the uplink resources.

The uplink data may be received from the UE through the priority information of the logical channels included in the logical channel configuration information and resource allocation information included in an uplink resource allocation message.

A scheduling request message may be included in information on the logical channels which can be transmitted and is preferred by the UE.

In accordance with another aspect of the disclosure, a User Equipment (UE) for transmitting uplink data in a wireless communication system is provided. The UE includes: transceiver configured to transmit and receive a signal; and a controller connected to the transceiver and configured to control the transceiver. The controller may control the transceiver to receive logical channel configuration information for uplink scheduling from an evolved Node B (eNB), transmit a scheduling request message to the eNB, receive an uplink resource allocation message (uplink grant) configured on the basis of the logical channel configuration information from the eNB in response to the scheduling request message, and transmit uplink data to the eNB according to the uplink resource allocation message.

In accordance with another aspect of the disclosure, an evolved Node B (eNB) for receiving uplink data in a wireless communication is provided. The eNB includes: a transceiver configured to transmit and receive a signal; and a controller connected to the transceiver and configured to control the transceiver. The controller may control the transceiver to transmit logical channel configuration information for uplink scheduling to a User Equipment (UE), receive a scheduling request message from the UE, transmit an uplink resource allocation message (uplink grant) configured on the basis of the logical channel configuration information to the UE in response to the scheduling request message, and receive uplink data from the UE according to the uplink resource allocation message.

In accordance with another aspect of the disclosure, a method of transmitting uplink data by a User Equipment (UE) in a wireless communication system is provided. The method includes: transmitting a Random Access (RA) preamble to an evolved Node B (eNB) when the UE is in a Radio Resource Control (RRC) inactive state; receiving an RA response message corresponding to the RA preamble from the eNB; and adding uplink data to an RRC connection request message corresponding to the RA response message and transmitting the RRC connection request message to the eNB.

The method of transmitting the uplink data by the UE may further include, if the transmission of the uplink data is not completed when an RRC connection request message is transmitted, further adding a buffer state report to the RRC connection request message and transmitting the same to the eNB.

The method of transmitting the uplink data by the UE may further include, if it is determined to transition of a state of the UE to an RRC connected state on the basis of the buffer state report, receiving an RRC connection resume message corresponding to the RRC connection request message from the eNB.

The method of transmitting the uplink data by the UE may further include, if it is determined to maintain the state of the UE in the RRC inactive state on the basis of the buffer state report, receiving an RRC connection suspend message corresponding to the RRC connection request message from the eNB.

The method of transmitting the uplink data by the UE may further include adding uplink data to an RRC connection resume complete message corresponding to the RRC connection resume message and transmitting the RRC connection resume complete message to the eNB.

The method of transmitting the uplink data by the UE may further include, if the UE transitions to the RRC connected state according to the RRC connection resume message, transmitting uplink data to the eNB in the RRC connected state.

According to an embodiment, the RRC connection request message and the uplink data are multiplexed and transmitted through one transport block.

In accordance with another aspect of the disclosure, a method of receiving uplink data by a User Equipment (UE) in a wireless communication system is provided. The method includes: receiving a Random Access (RA) preamble from a UE when the UE is in a Radio Resource Control (RRC) inactive state from the UE; transmitting an RA response message corresponding to the RA preamble to the UE; and receiving an RRC connection request message corresponding to the RA response message and uplink data added to the RRC connection request message from the UE.

The method of receiving the uplink data by the eNB may further include, if the transmission of the uplink data is not completed when an RRC connection request message is transmitted, receiving a buffer state report added to the RRC connection request message from the UE.

The method of receiving the uplink data by the eNB may further include determining to transition a state of the UE to an RRC-connected state on the basis of the buffer state report; and transmitting an RRC connection resume message corresponding to the RRC connection request message to the UE according to a result of the determination.

The method of receiving the uplink data by the eNB may further include determining to maintain a state of the UE in the RRC inactive state, based on the buffer state report; and transmitting an RRC connection suspend message corresponding to the RRC connection request message to the UE according to a result of the determination.

In the method of receiving the uplink data by the eNB, an RRC connection resume complete message corresponding to the RRC connection resume message and uplink data added to the RRC connection resume complete message may be received from the UE.

The method of receiving the uplink data by the eNB may further include, if the UE transitions to the RRC connected state according to the RRC connection resume message, receiving uplink data from the UE in the RRC connected state.

According to an embodiment, the RRC connection request message and the uplink data are multiplexed and received through one transport block.

In accordance with another aspect of the disclosure, a User Equipment (UE) for transmitting uplink data in a wireless communication is provided. The UE includes: a transceiver configured to transmit and receive a signal; and a controller connected to the transceiver and configured to control the transceiver. The controller may control the transceiver to transmit a Radio Access (RA) preamble to an eNB when the UE in a RRC inactive state, receive an RA response message corresponding to the RA preamble from the eNB, and add uplink data to an RRC connection request message corresponding to the RA response message and transmit the RRC connection request message to the eNB.

In accordance with another aspect of the disclosure, an evolved Node B (eNB) for receiving uplink data in a wireless communication system is provided. The eNB includes: a transceiver configured to transmit and receive a signal; and a controller connected to the transceiver and configured to control the transceiver The controller may receive a Random Access (RA) preamble from a User Equipment (UE) when the UE is a Radio Resource Control (RRC) inactive state, transmit an RA response message corresponding to the RA preamble to the UE, and receive an RRC connection request message corresponding to the RA response message and uplink data added to the RRC connection request message from the UE.

According to an embodiment of the disclosure, through an LCP operation considering TTI attributes, the UE can accurately know a TTI of resources through which data belonging to a particular logical channel is transmitted at the time at which the UE receives uplink resources. Particularly, data having low-latency requirements is transmitted early through first allocated resources, but late retransmission can be prevented due to a relatively long HARQ timeline.

Further, according to another embodiment of the disclosure, a communication system of the UE and the eNB selects an RRC state for transmitting data, and if directly transmitting data in an inactive state while performing a procedure therefor, does not perform transition to an RRC_Connected_Active (or RRC_CONNECTED) state, thereby maintaining a standby time (C-DRX, Radio tail) in an active state in a minimized value and thus reducing power consumption of the UE. There is an effect of, if data is transmitted in an inactive (idle) state, non-switching of the RRC state to a Connected_active (or RRC_CONNECTED) state through transmission of data without an RRC release message for RRC state transition, thus removing latency spent on relevant control signaling and reducing data transmission latency. Reduction in RRC release messages for RRC state transition causes an increase in cost efficiency through a decrease in power consumption of a 5G eNB (RU/TRP) and an increase in radio resource usage efficiency through a decrease in inter-cell interference.

According to another embodiment of the disclosure, it is possible to transmit numerology information efficiently using radio resources according to UE density or service required by the UE. In order to help the UE in selecting a signal transmission method to be provided to the eNB, the eNB may inform of service/slice/numerology/UE information provided by a network. The information may be used in a paging procedure for waking up the UE.

BRIEF DESCRIPTION OF THE DRAWINGS

FIG. 59 illustrates an example of overlapping between tone-based signals from a plurality of UEs according to the third embodiment of the disclosure;

DETAILED DESCRIPTION

Figure 1:
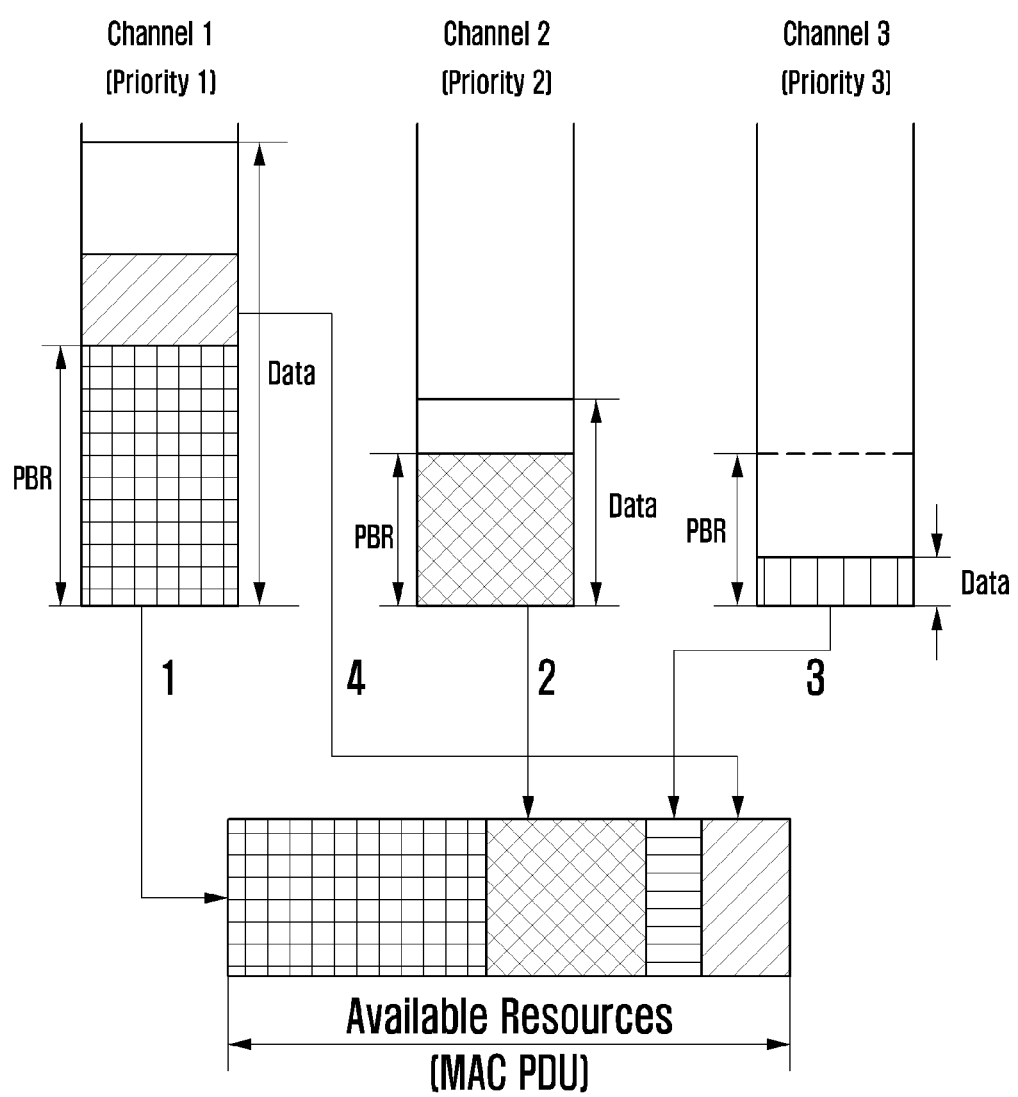
FIG. 1 illustrates how the UE uses uplink resources on the basis of LCP in LTE.

Hereinafter, embodiments of the disclosure will be described in detail with reference to the accompanying drawings. In a description of the disclosure, if a detailed description of relevant known functions or configurations makes the main subject of the disclosure unclear, the detailed description is omitted. The terms which will be described below are terms defined in consideration of the functions in the disclosure, and may be different according to users, intentions of the users, or customs. Therefore, the definitions of the terms should be made based on the contents throughout the specification.

Advantages and features of the disclosure, and a method of achieving the same become more clear with reference to the accompanying drawings and embodiments described below in detail. However, the disclosure is not limited to the following embodiments and may be implemented in various different forms, and the embodiments are provided to make the disclosure perfect and completely inform those skilled in the art of the scope of the disclosure and the disclosure is only defined by the scope of the claims. Through the specification, the same reference numeral refers to the same element.

First Embodiment

The disclosure proposes a UL scheduling method in a 5G mobile communication system. In the 5G mobile communication system, it is expected that various services (or slices) such as enhanced Mobile BroadBand (eMBB), Ultra Reliable and Low Latency Communication (URLLC), enhanced Machine Type Communication (eMTC) are supported. It may be understood in the same vein that a Voice over Internet Protocol (VoIP) which is a voice-specialized service and a Best Effort (BE) service in LTE corresponding to a 4G mobile communication system are supported. Further, it is expected that various numerologies are supported in the 5G mobile communication system. This specifically means Subcarrier Spacing (SCS) or a Transmission Time Interval (TTI).

Accordingly, it is expected that TTIs or SCS having various lengths are supported in the 5G mobile communication system. This is one of the characteristics of the 5G mobile communication system, which is very different from a characteristic that only one type TTI (1 ms) and only one type SCS (15 kHz) are supported in LTE standardized up to now. When a TTI (for example, 0.1 ms) which is significantly shorter than the TTI of LTE corresponding to 1 ms is supported in the 5G mobile communication system, it is expected that the shorter TTI really helps in supporting URLLC requiring a short delay time.

The disclosure proposes a UL scheduling method considering supporting of characteristics of the 5G mobile communication system, that is, various services and various numerologies (TTIs and SCS). The conventional UL scheduling method defined in LTE is a scheduling method supporting various services but the scheduling method according to the disclosure supports various services through various numerologies, which is a difference therebetween. In this document, the terms "TTI" and "subcarrier spacing" are used to play the same role. That is, a method considering the TTI in examples of the disclosure may extend to a method considering SCS in the same principle.

Prior to description of the disclosure, the conventional method is described. The disclosure focuses on Logical Channel Prioritization (LCP) during UL scheduling. 36.321 which is one of the LTE standards defines an LCP operation for UL scheduling. In the case of UL scheduling, a subject to generate and transmit DL traffic is an eNB and a subject to perform DL scheduling is also the eNB. That is, the eNB performs DL scheduling and transmits generated DL traffic. However, in the case of UL scheduling, a subject to generate and transmit UL traffic is a UE but a subject to perform UL scheduling is an eNB. Accordingly, the eNB allocates a predetermined amount of resources to the UE through UL scheduling and the UE carries UL traffic on the allocated resources to transmit the UL traffic. Here, a method by which "the UE carries the UL traffic, which the UE generates, on the allocated resources" is referred to as LCP.

FIG. 1 illustrates how a User Equipment (UE) uses uplink resources on the basis of LCP in LTE.

Uplink (UL) traffic generated by the UE corresponds to a logical channel according to a service type. For example, each logical channel or a set of logical channels may correspond to each service. Each logical channel has a priority according to settings of an evolved Node B (eNB).

Referring to FIG. 1, logical channels 1, 2, and 3 have priorities 1, 2, and 3, respectively. When receiving resources from the eNB, the UE carries UL traffic, which the UE has, that is, data satisfying a Prioritized Bit Rate (PBR) condition on the allocated resources (basically) in an order of the logical channel having the highest priority. Here, the PBR of each logical channel may be configured by the eNB through RRC signaling. Thereafter, the UE carries the data on the allocated resources according to the priority until the allocated resources are all consumed. A detailed operation thereof is defined in LTE standards below.

5.4.3 Multiplexing and Assembly
5.4.3.1 Logical Channel Prioritization
The Logical Channel Prioritization procedure is applied when a new transmission is performed.

RRC controls the scheduling of uplink data by signaling for each logical channel: priority where an increasing priority value indicates a lower priority level, prioritisedBitRatewhich sets the Prioritized Bit Rate (PBR), bucketSizeDuration which sets the Bucket Size Duration (BSD).

The MAC entity shall maintain a variable Bj for each logical channel j. Bj shall be initialized to zero when the related logical channel is established, and incremented by the product PBR X TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR X BSD, where PBR and BSD are configured by upper layers.

The MAC entity shall perform the following Logical Channel Prioritization procedure when a new transmission is performed:
The MAC entity shall allocate resources to the logical channels in the following steps:
Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);
Step 2: the MAC entity shall decrement Bj by the total size of MAC SDUs served to logical channel j in Step 1
NOTE: The value of Bj can be negative.
Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

FIG. 1 illustrates how LCP is operated in LTE in which the LCP considering a plurality of services is already supported in LTE if one logical channel or a set of a plurality of logical channels corresponds to one service.

Figure 2:
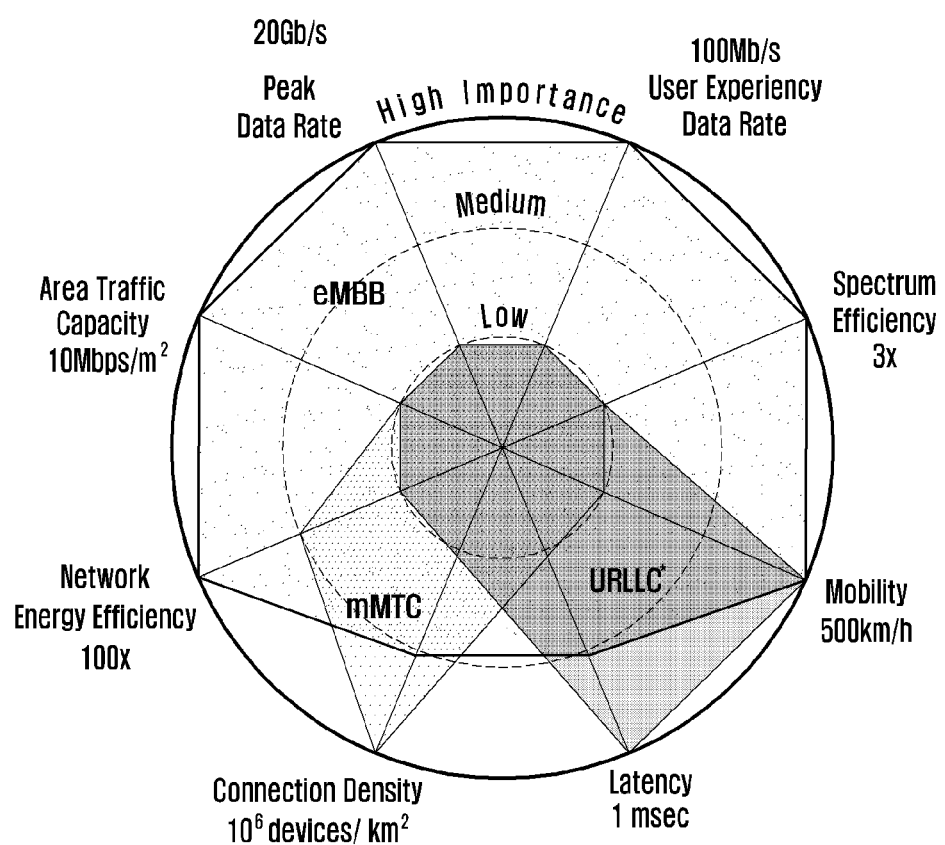
FIG. 2 illustrates performance requirements for a plurality of services and each service provided by a $5^{th}$ mobile communication system according to a first embodiment of the disclosure.

FIG. 2 illustrates capability requirements for a plurality of services and each service provided in a 5G mobile communication system.

The first embodiment proposes a method of improving LCP when not only a plurality of services but also a plurality of TTIs or SCS is introduced in the 5G mobile communication system. Referring to FIG. 2, in the 5G mobile communication system, eMBB, URLLC, and eMTC require different capabilities. Particularly, it is noted that they require different capabilities from a viewpoint of latency.

From a viewpoint of TTI, transmission/reception performed through resources having different TTIs has different HARQ timelines (initial data transmission, ACK or NACK transmission, and data retransmission). This is because a time spent for data encoding and decoding is mostly proportional to the TTI.

Figure 3:
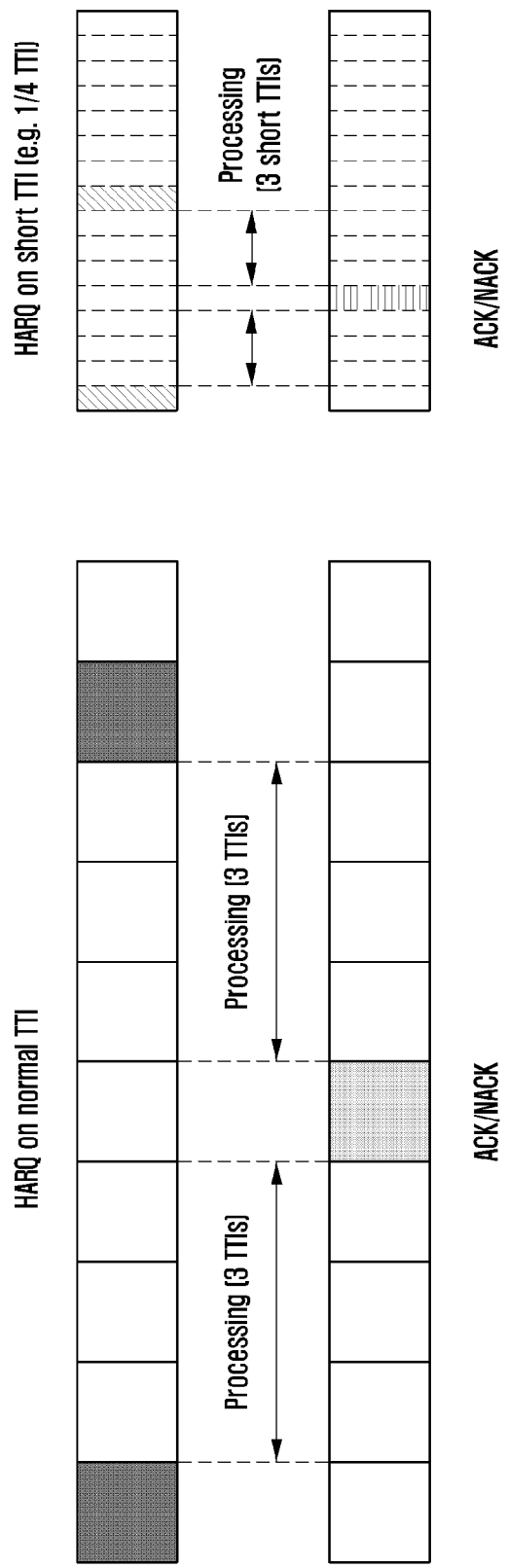
FIG. 3 illustrates a temporal relation between initial transmission, NACK/NACK feedback, and retransmission when HARQ-based transmission/reception is performed on resources having different TTIs according to the first embodiment of the disclosure.

FIG. 3 illustrates a temporal relation between initial transmission, NACK/NACK feedback, and retransmission when HARQ-based transmission/reception is performed on resources having different TTIs. Referring to FIG. 3, HARQ timeline having different TTIs is illustrated.

As described above, since every service has different latency requirements in the 5G mobile communication system, a service requiring short latency should be transmitted/received through a short TTI and a service requiring relatively long latency may be transmitted/received through a long TTI in general. While LCP of LTE does not reflect such a characteristic of the TTI, LCP of the 5G mobile communication system should be designed to reflect the characteristic.

The following description is assumed for convenience of discussion. This is only for convenience and the content of the disclosure is not limited to the following assumption.

1) The UE simultaneously uses services S1 and S2.

A. UL traffic of services S1 and S2 all currently exists in a UL buffer of the UE.

2) Services S1 and S2 are optimized for transmission and reception through TTI1 and TTI2, respectively.

A. Although services S1 and S2 are optimized for TTI1 and TTI2, respectively, S1 may be transmitted through TTI2 and S2 may be transmitted through TTI1.

Further, each service may perform transmission and reception through only the TTI optimized therefor. For example, service S1 may be perform transmission and reception using only TTI1 and service S2 may perform transmission and reception using only TTI2.

Further, a particular service performs transmission and reception using only the TTI optimized therefor and another particular service may perform transmission and reception using all TTIs. For example, service S1 may perform transmission and reception using only TTI1 and service S2 may perform transmission and reception using both TTI1 and TTI2.

3) Services S1 and S2 share and use time/frequency radio resources.

4) TTI2 is shorter than TTI1.

5) Service S2 requires shorter latency than S1.

Figure 4:
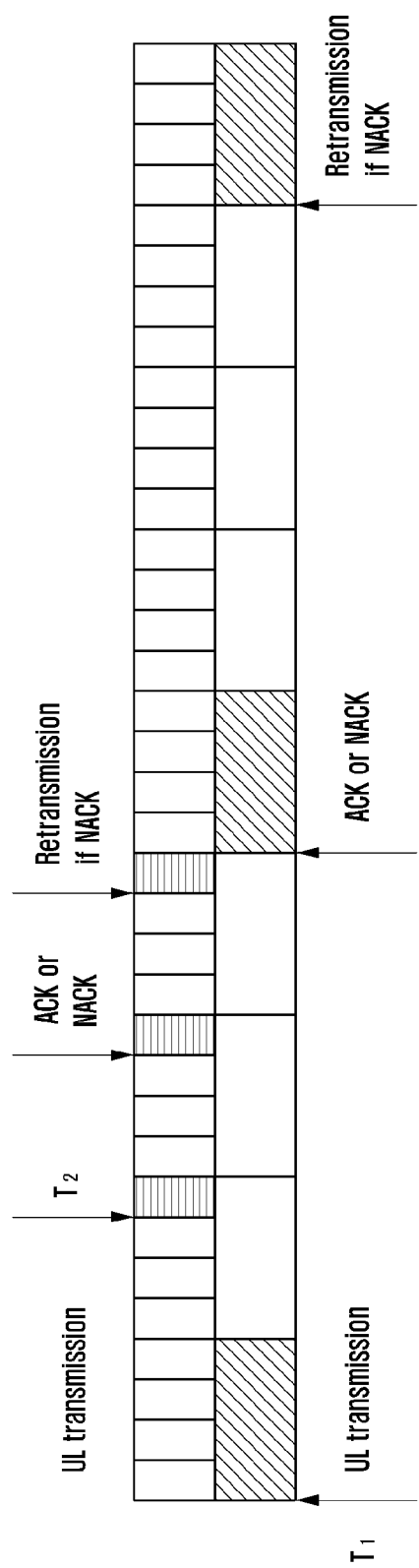
FIG. 4 illustrates the case in which resources having a long TTI are allocated to the UE in preference to resources having a short TTI according to the first embodiment of the disclosure.

FIG. 4 illustrates in detail what should be considered in an LCP design in the 5G mobile communication system when the assumption is applied.

FIG. 4 illustrates the case in which resources having a long TTI are allocated to the UE earlier than resources having a short TTI according to the disclosure.

<Condition 1>

Referring to FIG. 4 the UE may receive resource TTI1 from the eNB at time point T1. The UE inserts both UL traffic for service S1 and UL traffic for service S2, currently existing in its own UL buffer into corresponding resources and transmits the resources. Here, it is assumed that the size of the corresponding resources is sufficient. Condition 1 corresponds to a condition in which services S1 and S2 use the same time/frequency radio resources. The disclosure includes the resource use method described in <condition 1>. That is, the resource use method is configured such that both services S1 and S2 use resource TTI1. The condition in which services S1 and S2 use the same time/frequency radio resources more specifically refers to a condition in which services S1 and S2 use time/frequency radio resources having the same TTI.

<Condition 2>

Referring to FIG. 4 the UE may receive resource TTI1 from the eNB at time point T1. The UE inserts UL traffic for service S1 currently existing in its own UL buffer into corresponding resources and transmits the resources, but may not transmit UL traffic for service S2. The UE may receive resource TTI2 from the eNB at time point T2. The UE inserts UL traffic for service S2 currently existing in its own UL buffer into corresponding resources and transmits the resources. Condition 2 corresponds to a condition in which services S1 and S2 use different time/frequency radio resources. The disclosure includes the resource use method described in <condition 2>. That is, the resource use method is configured such that services S1 and S2 use time/frequency radio resources having different TTIs. In other words, service S1 uses radio resources having TTI1 and service S2 uses radio resources having TTI2 in the method.

Conditions 1 and 2 correspond to the case in which the eNB first allocates longer resources TTI1 to the UE in the state in which the UE has UL traffic of both service S1 optimized for TTI1 and service S2 optimized for TTI2. In this case, the UE should meet latency requirements of services S1 and S2 (particularly, service S2 having short latency requirements).

If the UE does not know that resources TTI2 through which faster transmission and reception are possible from a viewpoint of HARQ timeline will be allocated within a predetermined time, transmitting all UL traffic at time point T1 which is the earliest time point at present is the best option. This corresponds to condition 1. However, if the UE knows that resources TTI2 through which faster transmission and reception are possible from a viewpoint of HARQ timeline will be allocated within a predetermined time, transmitting UL traffic of service S1 optimized for TTI1 at time point T1 and transmitting UL traffic of service S2 optimized for TTI2 at time point T2 at which resources TTI2 are allocated after a preset time passes are the best option rather than transmitting all UL traffic at the earliest time point T1. This corresponds to condition 2.

However, in general, it is difficult for the UE to know when the eNB allocates resources TTI2 to the UE itself at time point T1. Accordingly, if a rule considering the TTI type is made and applied to LCP, the UE may properly handle the conditions. An operation of LCP considering the TTI type will be described.

<Operation 1>

(1) The eNB provides a default priority for each logical channel to the UE. This may be performed through a LogicalChannelConfig Information Element (IE) of RRC signaling.

LogicalChannelConfig

The IE LogicalChannelConfig is used to configure the logical channel parameters.

```
LogicalChannelConfig information element
-- ASN1START
LogicalChannelConfig ::=SEQUENCE {
  ul-SpecificParameters SEQUENCE {
    defaultPriority INTEGER (1..16),
    prioritisedBitRate ENUMERATED {
      kBps0, kBps8, kBps16, kBps32, kBps64, kBps128,
      kBps256, infinity, kBps512-v1020, kBps1024-v1020,
      kBps2048-v1020, spare5, spare4, spare3, spare2,
      spare1 },
    bucketSizeDuration ENUMERATED {
      ms50, ms100, ms150, ms300, ms500, ms1000, spare2,
      spare1 },
    logicalChannelGroup   INTEGER (0..3) OPTIONAL--Need OR
  } OPTIONAL,-- Cond UL
  ...,
  [[    logicalChannelSR-Mask-r9             ENUMERATED
{setup} OPTIONAL -- Cond SRmask
  ]],
  [[    logicalChannelSR-Prohibit-r12 BOOLEAN OPTIONAL--
Need ON
  ]]
}
-- ASN1STOP
```

TABLE 1

LogicalChannelConfig field descriptions bucketSizeDuration
Bucket Size Duration for logical channel prioritization in TS 36.321 [6]. Value in milliseconds. Value ms50 corresponds to 50 ms, ms100 corresponds to 100 ms and so on.
logicalChannelGroup
Mapping of logical channel to logical channel group for BSR reporting in TS 36.321 [6].
logicalChannelSR-Mask
Controlling SR triggering on a logical channel basis when an uplink grant is configured. See TS 36.321 [6].
logicalChannelSR-Prohibit
Value TRUE indicates that the logicalChannelSR-ProhibitTimer is enabled for the logical channel. E-UTRAN only (optionally) configures the field (i.e. indicates value TRUE) if logicalChannelSR-ProhibitTimer is configured. See TS 36.321 [6].
prioritisedBitRate
Prioritized Bit Rate for logical channel prioritization in TS 36.321 [6]. Value in kilobytes/second. Value kBps0 corresponds to 0 kB/second. kBps8 corresponds to 8 kB/second, kBps16 corresponds to 16 kB/second and so on. Infinity is the only applicable value for SRB1 and SRB2
defaultPriority
Default logical channel priority. Value is an integer.

(2) The eNB provides a special priority applied to UL grant when allocating the UL grant to the UE. This may be performed through Downlink Control Information (DCI) transmitted through a PDCCH.

A. The special priority may be set for one logical channel or two or more logical channels. The special priority may not be set for any logical channel.

B. [Table 2] below shows an example in which the eNB informs the UE of a highest priority logical channel applied to UL grant when the eNB allocates the corresponding UL grant to the UE.

TABLE 2

|  | The number of bits |
| --- | --- |
| Format 0/format 1A flag | 1 |
| Hopping flat | 1 |
| Resource block allocation | Variable (5 to 13 bits) |
| MSC and redundancy version | 5 |
| New data indicator | 1 |
| TPC command | 2 |
| Cyclic shift for DM-RS | 3 |
| CQI request | 1 |
| Padding | Variable (1 to 2 bits) |
| Logical channel index with 1$^{st}$ special priority | 4 bits |

(3) The UE receives the default priority and the special priority for the logical channels through processes (1) and (2). Based thereon, the UE operates as follows.

A. The UE carries data on the UL grant received from the eNB in an order of the logical channel having the highest special priority. That is, LCP is applied to the logical channel for which the special priority is configured.

B. The UE carries data of logical channels to which the special priority designated on all UL grants, and then if resources are left in the UL grants, carries data in an order of the logical channel having the highest default priority. That is, data is filled by applying LCP for the logical channel for which the special priority is configured and then LCP is applied for the logical channel for which the default priority is configured.

Figure 5:
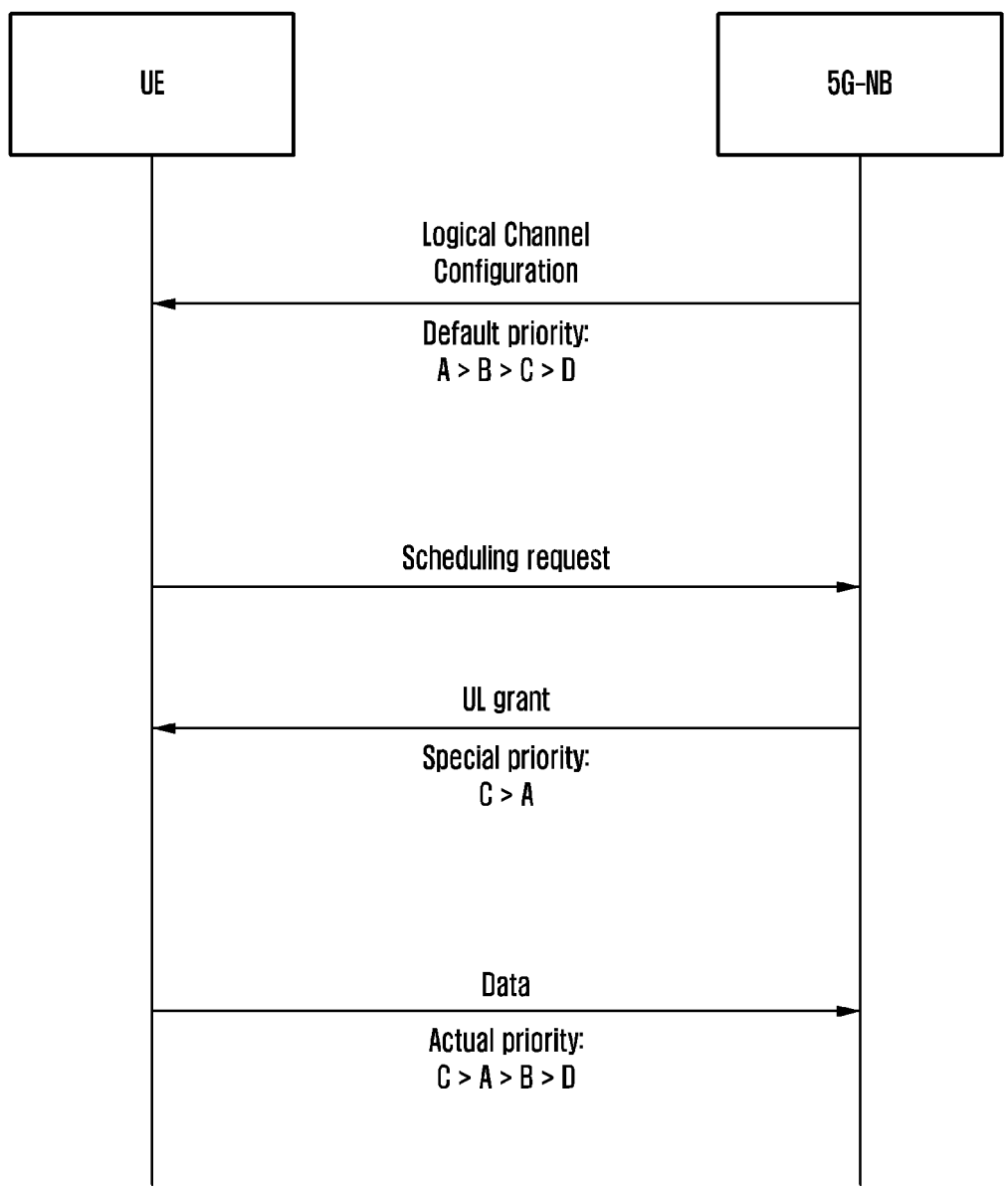
FIG. 5 is a signal flowchart illustrating operation 1 proposed according to the first embodiment of the disclosure.

FIG. 5 is a signal flowchart illustrating operation 1 proposed according to a first embodiment of the disclosure.

(1) The 5G-NB may configure the default priority of logical channels A, B, C, and D in an order of A>B>C>D and provide the configured default priority to the UE. In expression of A>B>C>D, A is priority 1, B is priority 2, C is priority 3, and D is priority 4.

(2) When the 5G-NB allocates the UL grant to the UE, the 5G-NB configures the special priority applied to the corresponding UL grant in an order of C>A and provide the configured special priority.

(3) The UE performs the LCP operation for logical channels A and C to which the special priority is designated in an order of C>A and fills the UL grant.

(4) When the UE performs the LCP operation in an order of the special priority C>A, carries data on the UL grant, and then resources remains in the UL grant, the UE performs the LCP operation in an order of the default priority B>D for the remaining logical channels except for A and C which have been already considered and carries data on the UL grant.

A. If the special priority is not configured in the UL grant, the UE performs the LCP operation in an order of the default priority A>B>C>D and carries data on the UL grant.

<Operation 2>

(1) The eNB provides the logical channel priority for each TTI type to the UE. This may be performed through a LogicalChannelConfig IE during RRC signaling.

A. For example, the eNB provides the priority to the UL grant having the TTI of 1 ms in an order of A>B>C>D and provide the priority to the UL grant having the TTI of 0.2 ms in an order of C>B>A>D. This means that logical channels A, B, C, and D can use the UL grant having the TTI of 1 ms and means that the priority applied during the LCP process when logical channels A, B, C, and D are transmitted through the UL grant having the TTI of 1 ms is A>B>C>D. Similarly, this means that logical channels A, B, C, and D can use the UL grant having the TTI of 0.2 ms and means that the priority applied during the LCP process when logical channels A, B, C, and D are transmitted through the UL grant having the TTI of 0.2 ms is C>B>A>D.

If the priority is provided to the UL grant having the TTI of 1 ms in an order of A>B and the priority is provided to the UL grant having the TTI of 0.2 ms in an order of C>D, it means that logical channels A and B can use the UL grant having the TTI of 1 ms. That is, this means that other logical channels except for logical channels A and B cannot use the UL grant having the TTI of 1 ms. In order to perform the LCP operation, priority information is necessary. Accordingly, the absence of priority information of a particular logical channel means that the logical channel cannot be used. Similarly, this means that logical channels C and D can use the UL grant having the TTI of 0.2 ms. That is, this means that other logical channels except for logical channels C and D cannot use the UL grant having the TTI of 0.2 ms.

(2) Further, the eNB provides the priority for each TTI type to the UE. This may also be performed through the LogicalChannelConfig IE during RRC signaling.

A. For example, the UL grant having the TTI of 0.2 ms may be configured to a higher priority than the UL grant having the TTI of 1 ms. According to the above description, the priority between TTIs is included in the LogicalChannelConfig IE. The LogicalChannelConfig IE includes information on a particular logical channel. Accordingly, if a priority of a TTI of a particular logical channel is configured such that the TTI of 0.2 ms has a higher priority than the TTI of 1 ms, information indicating that the logical channel can use the TTI of 0.2 ms and the TTI of 1 ms may be included.

B. The following LogicalChannelConfig IE show how logical channel priority information for each TTI type (priorityForTTIType1, priorityForTTIType2) and priority information for each TTI type (ulTTI-SpecificParameters, TTIType, priorityAmongTTIType) are configured.

LogicalChannelConfig

The IE LogicalChannelConfig is used to configure the logical channel parameters.

```
LogicalChannelConfig information element
-- ASN1START
LogicalChannelConfig ::= SEQUENCE {
  ul-SpecificParameters SEQUENCE {
    priorityForTTIType1 INTEGER (1..16),
    priorityForTTIType2 INTEGER (1..16),
    prioritisedBitRate ENUMERATED {
      kBps0, kBps8, kBps16, kBps32, kBps64, kBps128,
      kBps256, infinity, kBps512-v1020, kBps1024-v1020,
      kBps2048-v1020, spare5, spare4, spare3, spare2,
      spare1 },
    bucketSizeDuration ENUMERATED {
      ms50, ms100, ms150, ms300, ms500, ms1000, spare2,
      spare1 },
    logicalChannelGroup INTEGER (0..3) OPTIONAL -- Need OR
  } OPTIONAL,-- Cond UL
  ulTTI-SpecificParameters SEQUENCE {
    TTIType INTEGER (1..16),
    priorityAmongTTIType INTEGER (1..16),
  }
  ...,
  [[    logicalChannelSR-Mask-r9 ENUMERATED {setup}
OPTIONAL -- Cond SRmask
  ]],
  [[    logicalChannelSR-Prohibit-r12 BOOLEAN OPTIONAL --
Need ON
  ]]
}
-- ASN1STOP
```

TABLE 3

LogicalChannelConfig field descriptions bucketSizeDuration

Bucket Size Duration for logical channel prioritization in TS 36.321 [6]. Value in milliseconds. Value ms50 corresponds to 50 ms, ms100 corresponds to 100 ms and so on.

logicalChannelGroup

Mapping of logical channel to logical channel group for BSR reporting in TS 36.321 [6].

logicalChannelSR-Mask

Controlling SR triggering on a logical channel basis when an uplink grant is configured. See TS 36.321 [6].

logicalChannelSR-Prohibit

Value TRUE indicates that the logicalChannelSR-ProhibitTimer is enabled for the logical channel. E-UTRAN only (optionally) configures the field (i.e. indicates value TRUE) if logicalChannelSR-ProhibitTimer is configured. See TS 36.321 [6].

prioritisedBitRate

Prioritized Bit Bate for logical channel prioritization in TS 36.321 [6]. Value in kilobytes/second.

Value kBps0 corresponds to 0 kB/second, kBps8 corresponds to 8 kB/second, kBps16 corresponds to 16 kB/second and so on. Infinity is the only applicable value for SRB1 and SRB2 priorityforTTIType1

Logical channel priority that is used when a UE puts UL data to the assigned resource configured on TTI type 1. Value is an integer.

priorityForTTIType2

Logical channel priority that is used when a UE puts UL data to the assigned resource configured on TTI type 2. Value is an integer.

ulTTI-SpecificParameters

Mapping of each TTI type (TTITypethat can be represented by index, length, and so on) and the priority among TTIs (priorityamongTTIType). Here, TTIType indicates the TTI that can be used by this logical channel configured by this LogicalChannelConfig. In addition, priorityAmongTTIType indicates the priority of the TTI.

Figure 6:
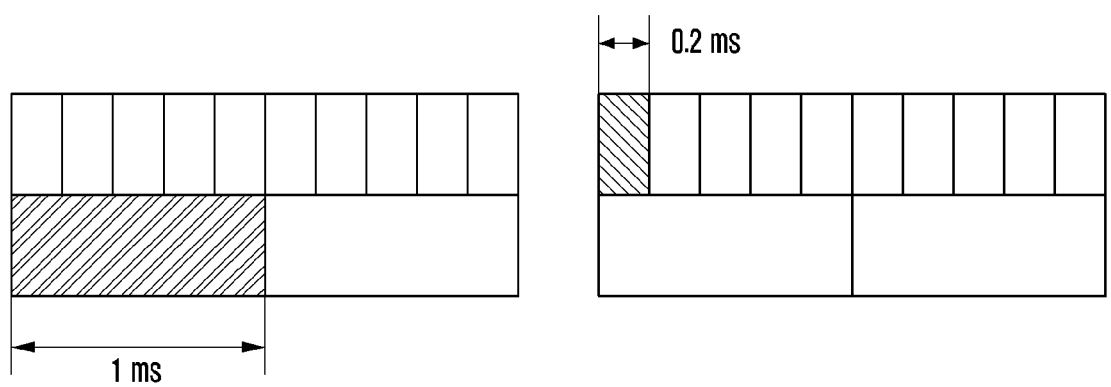
FIG. 6 illustrates the case in which the UE receives resources having one type of TTI from the eNB according to the first embodiment of the disclosure.

FIG. 6 illustrates the case in which the UE receives resources having one type TTI from the eNB at a particular time according to the first embodiment of the disclosure.

(3) The UE operates as follows when receiving a UL grant corresponding to one type TTI from the eNB at a particular time point as illustrated in FIG. 6.

A. If the UE receives UL grant having a TTI of 1 ms from the eNB, the UE carries data on the UL grant through the LCP operation in an order of the priority A>B>C>D given for logical channels A, B, C, and D.

B. If the UE receives UL grant having a TTI of 0.2 ms from the eNB, the UE carries data on the UL grant through the LCP operation in an order of the priority C>B>A>D given for logical channels A, B, C, and D.

Figure 7:
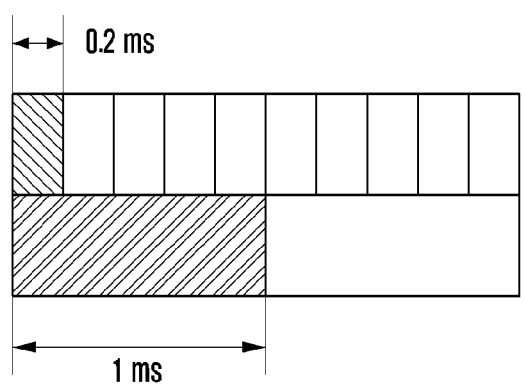
FIG. 7 illustrates the case in which the UE simultaneously receives resources having various types of TTIs from the eNB according to the first embodiment of the disclosure.

FIG. 7 illustrates the case in which the UE simultaneously receives resources having various types of TTIs from the eNB.

(4) The UE operates as follows when simultaneously receiving UL grant corresponding to two or more types of TTIs from the eNB.

A. For example, the case in which the UE receives two UL grants (UL grant having a TTI of 1 ms and UL grant having a TTI of 0.2 ms) indicating the same time point as illustrated in FIG. 7 is included.

B. The UE carries data on the UL grant having a TTI of a higher priority between the TTIs according to priority information for each TTI provided by the eNB in an order of the logical channel priority of the corresponding TTI.

i. In this example, since the UL grant having the TTI of 0.2 ms has a higher priority than the UL grant having the TTI of 1 ms, the UE first carries data on the UL grant having the TTI of 0.2 ms in an order of the logical channel priority C>B>A>D.

ii. If all pieces of data are carried on the UL grant having the TTI of 0.2 ms through the LCP operation, data is carried on the UL grant having the TTI of 1 ms which has the next priority in an order of the logical channel priority A>B>C>D.

Figure 8:
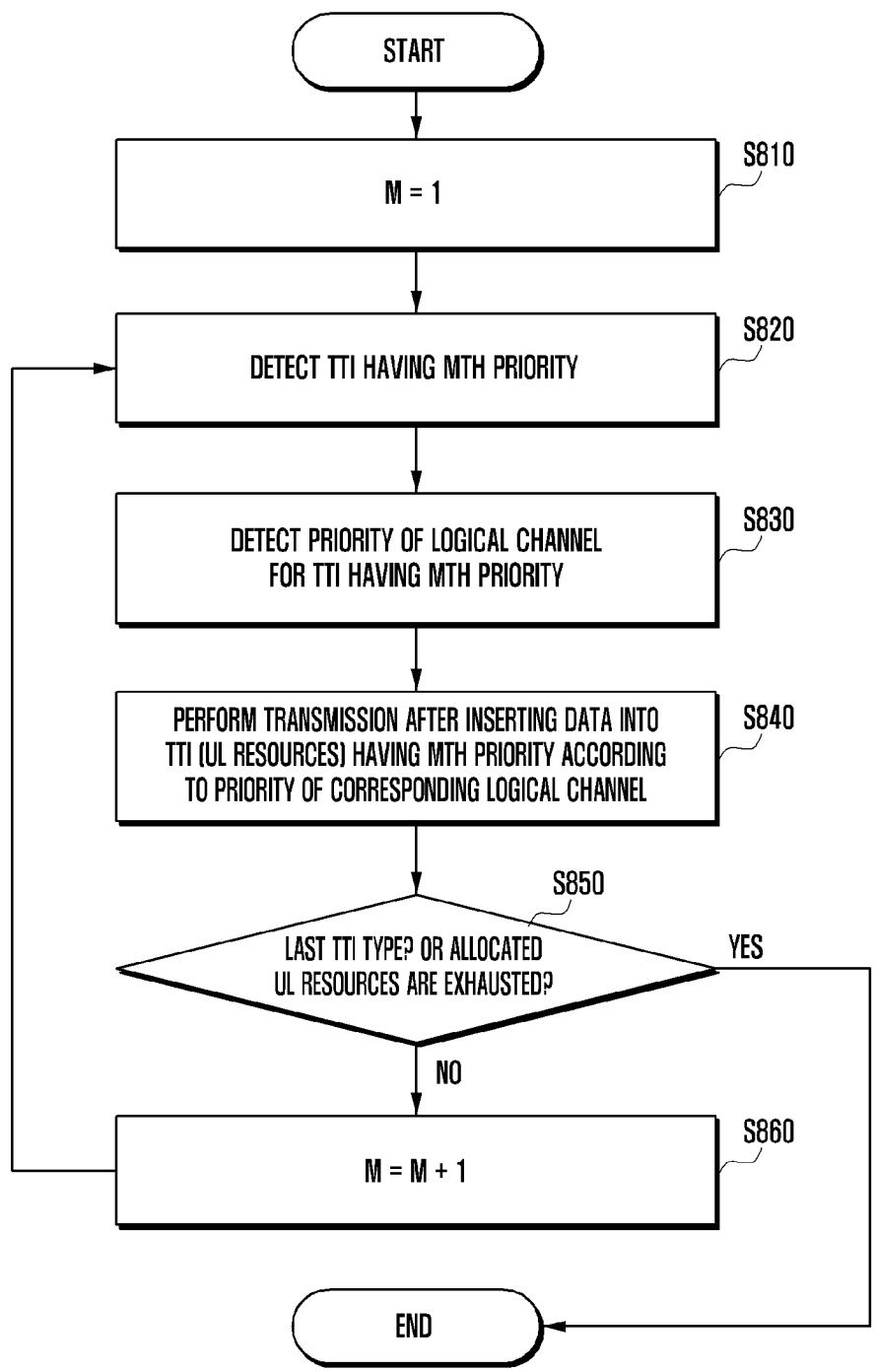
FIG. 8 is a flowchart illustrating operation 2 proposed according to the first embodiment of the disclosure.

FIG. 8 is a flowchart of operation 2 proposed according to the first embodiment of the disclosure.

Referring to FIG. 8, the UE may detect a TTI having an $M^{th}$ priority and detect a logical channel priority for the TTI having the $M^{th}$ priority. Thereafter, the UE may transmit data according to the logical channel priority corresponding to the TTI (UL resources) having the $M^{th}$ priority.

The UE may determine whether the TTI is the last TTI or whether the allocated UL resources are all exhausted. According to an embodiment, if the TTI is the last TTI or the allocated UL resources are all exhausted, the UE may end the LCP operation. According to another embodiment, when the TTI is not the last TTI or not all the allocated UL resources are exhausted, the UE may detect a TTI having the next priority ($M+1^{th}$) and repeat the LCP operation.

The eNB may provide priority information between logical channels for each TTI type to the UE. The disclosure also considers a Prioritized Bit Rate (PBR) and Bucket Size Duration (BSD) information which the eNB can provide to the UE according to each TTI through RRC signaling as well as the priority information between logical channels.

Accordingly, the UE may apply different PBRs (PBRa and PBRb) and different BSD (BSDa and BSDb) when transmitting data belonging to the same logical channel through TTI type a and through TTI type b. Roles of the PBR and the BSD are the same as those in LTE. That is, the following operation is performed.

Transmission of data belonging to a particular logical channel through TTI type a (corresponding to step 1 of the LCP process defined in LTE)

an allocated amount per transmission: PBRa X TTIa a maximum amount of allocation PBRa X BSDa Transmission of data belonging to a particular logical channel through TTI type b (corresponding to step 1 of the LCP process defined in LTE)

an allocated amount per transmission: PBRa X TTIb a maximum amount of allocation PBRb X BSDb <Operation 3>

(1) The eNB provides the logical channel priority to the UE in the same way as LTE. This may be performed through a LogicalChannelConfig IE during RRC signaling.

A. For example, the priority is provided in an order of logical channels A>B>C>D.

(2) Further, the eNB provides the priority for TTI type for each logical channel to the UE. This may also be performed through the LogicalChannelConfig IE during RRC signaling.

A. For example, for logical channel A, the UL grant having the TTI of 1 ms has a higher priority than the UL grant having the TTI of 0.2 ms. This means that logical channel A can use both the UL grant having the TTI of 1 ms and the UL grant having the TTI of 0.2 ms.

B. Further, for logical channel B, the UL grant having the TTI of 0.2 ms has a higher priority than the UL grant having the TTI of 1 ms. This means that logical channel B can use both the UL grant having the TTI of 0.2 ms and the UL grant having the TTI of 1 ms.

C. The following LogicalChannelConfig IE shows how priority information (ulTTI-SpecificParameters, TTIType, priorityAmongTTIType) for each TTI type is configured.

LogicalChannelConfig

The IE LogicalChannelConfig is used to configure the logical channel parameters.

```
LogicalChannelConfig information element
ASN1START
LogicalChannelConfig ::= SEQUENCE {
ul-SpecificParameters SEQUENCE {
priority INTEGER (1..16),
prioritisedBitRate ENUMERATED {
kBps0, kBps8, kBps16, kBps32, kBps64, kBps128,
kBps256, infinity, kBps512-v1020, kBps1024-v1020,
kBps2048-v1020, spare5, spare4, spare3, spare2,
spare1 },
bucketSizeDuration ENUMERATED {
ms50, ms100, ms150, ms300, ms500, ms1000, spare2,
spare1 },
logicalChannelGroup INTEGER (0..3) OPTIONAL -- Need OR
} OPTIONAL, -- Cond UL
ulTTI-SpecificParameters SEQUENCE {
TTIType INTEGER (1..16),
priorityAmongTTIType  INTEGER (1..16),
}

...,
[[    logicalChannelSR-Mask-r9 ENUMERATED {setup}
OPTIONAL -- Cond SRmask
]],
[[    logicalChannelSR-Prohibit-r12 BOOLEAN OPTIONAL
--Need ON
]]
}
-- ASN1STOP
```

TABLE 4

LogicalChannelConfig field descriptions bucketSizeDuration
Bucket Size Duration for logical channel prioritization in TS 36.321 [6]. Value in milliseconds. Value ms50 corresponds to 50 ms, ms100 corresponds to 100 ms and so on.
logicalChannelGroup
Mapping of logical channel to logical channel group for BSR reporting in TS 36.321 [6].
logicalChannelSR-Mask
Controlling SR triggering on a logical channel basis when an uplink grant is configured. See TS 36.321 [6].
logicalChannelSR-Prohibit
Value TRUE indicates that the logicalChannelSR-ProhibitTimer is enabled for the logical channel. E-UTRAN only (optionally) configures the field (i.e. indicates value TRUE) if logicalChannelSR-ProhibitTimer is configured. See TS 36.321 [6].
prioritisedBitRate
Prioritized Bit Rate for logical channel prioritization in TS 36.321 [6]. Value in kilobytes/second. Value kBps0 corresponds to 0 kB/second, kBps8 corresponds to 8 kB/second, kBps16 corresponds to 16 kB/second and so on. Infinity is the only applicable value for SRB1 and SRB2
priority
Logical channel priority. Value is an integer.
uITTI-SpecificParameters
Mapping of each TTI type (TTITypethat can be represented by index, length, and so on) and the priority among TTIs (priorityamongTTIType). Here, TTIType indicates the TTI that can he used by this logical channel configured by this LogicalChannelConfig. In addition, priorityAmongTTIType indicates the priority of the TTI.

(3) The UE operates as follows when receiving UL grant corresponding to one type TTI from the eNB.

A. The UE carries data on the UL grant received from the eNB in an order of priority A>B>C>D (regardless of the TTI type of the corresponding UL grant).

(4) The UE operates as follows when receiving UL grant corresponding to two or more types of TTIs from the eNB.

A. The UE carries data on the allocated UL grant according to the TTI priority of each logical channels in an order of the logical channel having the highest priority.

i. It is assumed that logical channel A has the highest priority in this example. Further, for logical channel A, it is assumed that the UL grant having the TTI of 1 ms has a higher priority than the UL grant having the TTI of 0.2 ms. Accordingly, the UE first carries data corresponding to the logical channel A on the UL grant having the TTI of 1 ms, and then if the corresponding UL grant lacks, carries data on the UL grant having the TTI of 0.2 ms.

ii. The UE repeats the same operation for logical channel B having the next priority after logical channel A. For logical channel B, it is assumed that the UL grant having the TTI of 0.2 ms has a higher priority than the UL grant having the TTI of 1 ms. Accordingly, the UE first carries data corresponding to the logical channel A on the UL grant having the TTI of 0.2 ms, and then if the corresponding UL grant is not sufficient, carries data on the UL grant having the TTI of 1 ms.

1. This describes the case in which the data corresponding to logical channel B is carried on the assumption that the data corresponding to logical channel A is carried on the UL grant having the TTI of 1 ms and 0.2 ms and then resources remains in each UL grant. If all UL grant is exhausted after the data corresponding to logical channel A is carried, then the LCP operation ends. If some of the UL grant is exhausted and resources remain in some of the UL grant after the data corresponding to logical channel A is carried, the same operation as described above is continuously performed on the UL grant in which resources remains.

Figure 9:
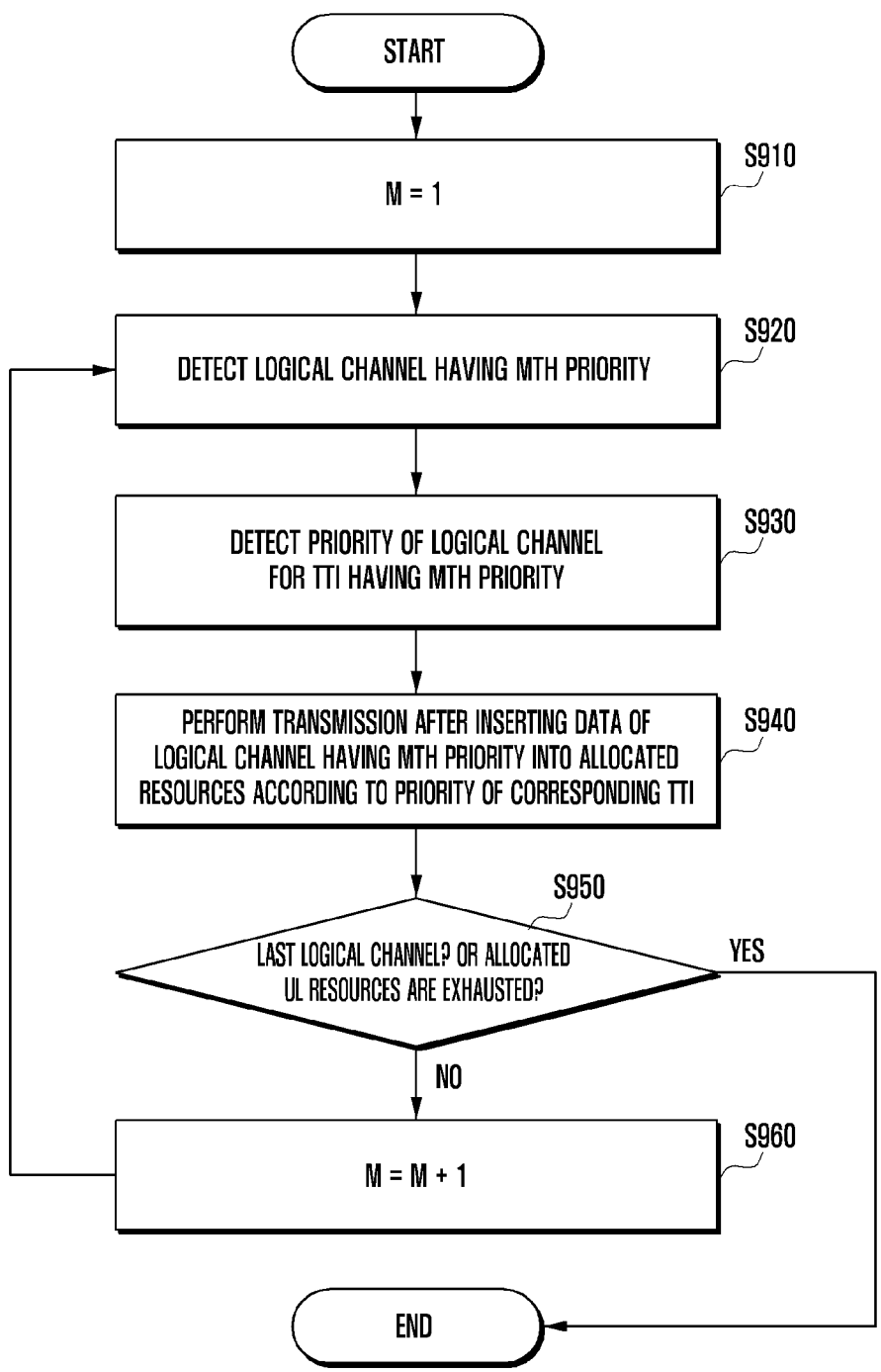
FIG. 9 is a flowchart illustrating operation 3 proposed according to the first embodiment of the disclosure.

FIG. 9 is a flowchart illustrating operation 3 proposed according to the first embodiment of the disclosure.

Referring to FIG. 9, the UE may detect a logical channel having an $M^{th}$ priority and detect a TTI priority for the logical channel having the $M^{th}$ priority. Thereafter, the UE may transmit data of the logical channel having the $M^{th}$ priority through allocated resources according to the corresponding TTI priority.

The UE may determine whether the logical channel is the last logical channel or whether the allocated UL resources are all exhausted. According to an embodiment, when the logical channel is the last logical channel or the allocated UL resources are all exhausted, the UE may end the LCP operation. According to another embodiment, when the logical channel is not the last logical channel or not all the allocated UL resources are exhausted, the UE may detect a logical channel having the next priority ($M+1^{th}$) and repeat the LCP operation.

The eNB may provide logical channel priority information for each TTI type to the UE. The disclosure also considers a Prioritized Bit Rate (PBR) and Bucket Size Duration (BSD) information which the eNB can provide to the UE according to each TTI through RRC signaling as well as the logical channel priority information. The UE may apply different PBRs (PBRa and PBRb) and different BSD (BSDa and BSDb) when transmitting data belonging to the same logical channel through TTI type a and through TTI type b. Roles of the PBR and the BSD are the same as those in LTE. That is, the following operation is performed.

Transmission of data belonging to a particular logical channel through TTI type a (corresponding to step 1 of the LCP process defined in LTE)
an allocated amount per transmission: PBRa X TTIa
a maximum amount of allocation PBRa X BSDa
Transmission of data belonging to a particular logical channel through TTI type b (corresponding to step 1 of the LCP process defined in LTE)
an allocated amount per transmission: PBRa X TTIb
a maximum amount of allocation PBRb X BSDb
<Operation 4>

(1) The eNB provides the logical channel priority to the UE in the same way as LTE. This may be performed through a LogicalChannelConfig IE during RRC signaling.

(2) The eNB assign a right to repeatedly transmit data belonging to a particular logical channel within a predetermined time to the UE. This may also be performed through the LogicalChannelConfig IE.

A. The repetitive transmission means that transmitting data belonging to a particular logical channel when allocating UL grant and then transmitting again data when allocating next UL grant separately from HARQ and ACK/NACK feedback thereof.

B. More specifically, the eNB may provide the following configuration to the UE.

i. Whether to allow repetitive transmission of data belonging to a particular logical channel.

ii. A maximum time interval in which repetitive transmission of data belonging to a particular logical channel is allowed iii. A maximum number of repetitive transmissions of data belonging to a particular logical channel LogicalChannelConfig The IE LogicalChannelConfig is used to configure the logical channel parameters.

LogicalChannelConfig information element
-- ASN1START
LogicalChannelConfig ::= SEQUENCE {

-continued

```
    ul-SpecificParameters SEQUENCE {
    priority INTEGER (1..16),
    allowRepeatedTransmission BOOLEAN OPTIONAL -- Need ON
    allowRepeatedTransmissionTimer ENUMERATED {sf1, sf2, sf4,
sf8, sf16, spare1, spare2}, OPTIONAL -- Need ON
    maxRepeatedTransmission      INTEGER (1..16), OPTIONAL --
Need ON
    prioritisedBitRate ENUMERATED {
    kBps0, kBps8, kBps16, kBps32, kBps64, kBps128,
    kBps256, infinity, kBps512-v1020, kBps1024-v1020,
    kBps2048-v1020, spare5, spare4, spare3, spare2,
    spare1 },
    bucketSizeDuration ENUMERATED {
    ms50, ms100, ms150, ms300, ms500, ms1000, spare2,
    spare1 },
    logicalChannelGroup INTEGER (0..3)    OPTIONAL -- Need OR
    } OPTIONAL, -- Cond UL
    ...,
    [[    logicalChannelSR-Mask-r9            ENUMERATED
{setup}         OPTIONAL          -- Cond SRmask
    ]],
    [[    logicalChannelSR-Prohibit-r12 BOOLEAN OPTIONAL
    -- Need ON]]
    }
-- ASN1STOP
```

TABLE 5

LogicalChannelConfig field descriptions bucketSizeDuration

Bucket Size Duration for logical channel prioritization in TS 36.321 [6]. Value in milliseconds. Value ms50 corresponds to 50 ms, ms100 corresponds to 100 ms and so on.

logicalChannelGroup

Mapping of logical channel to logical channel group for BSR reporting in TS 36.321 [6].

logicalChannelSR-Mask

Controlling SR triggering on a logical channel basis when an uplink grant is configured. See TS 36.321 [6].

logicalChannelSR-Prohibit

Value TRUE indicates that the logicalChannelSR-ProhibitTimer is enabled for the logical channel. E-UTRAN only (optionally) configures the field (i.e. indicates value TRUE) if logicalChannelSR-ProhibitTimer is configured. See TS 36.321 [6].

prioritisedBitRate

Prioritized Bit Rate for logical channel prioritization in TS 36.321 [6]. Value in kilobytes/second. Value kBps0 corresponds to 0 kB/second, kBps8 corresponds to 8 kB/second, kBps16 corresponds to 16 kB/second and so on. Infinity is the only applicable value for SRB1 and SRB2 priority

Logical channel priority. Value is an integer.

allowRepeatedTransmission

Value TRUE indicates that repeated UL transmissions for a specific logical channel are allowed during allowRepeatedTransmissionTimer. Value FALSE indicates that repeated UL transmissions for a specific logical channel are not allowed.

allowRepeatedTransmissionTimer

The time during which repeated UL transmissions for a specific logical channel are allowed when allowRepeatedTransmission is set to TRUE.

maxRepeatedTransmission

The maximum number of repeated UL transmissions for a specific logical channel applied when allowRepeatedTransmission is set to TRUE.

(3) If the eNB allows repetitive transmission of data belonging to a particular logical channel, the UE perform repetitive transmission in consideration of a maximum time interval in which repetitive transmission is allowed and a maximum number of repetitive transmissions.

Figure 10:
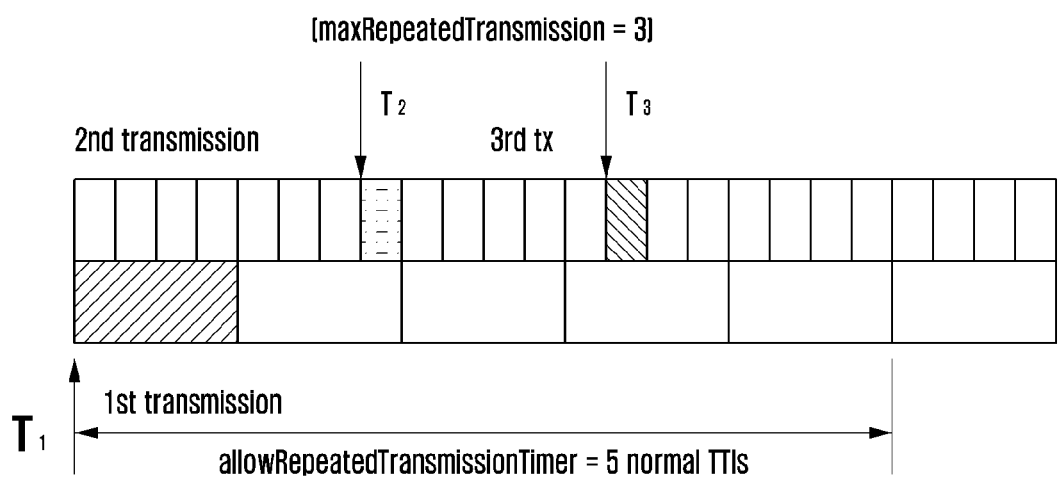
FIG. 10 illustrates an example for operation 4 proposed according to the first embodiment of the disclosure.

FIG. 10 illustrates an example for operation 4 proposed according to the first embodiment of the disclosure.

i. The eNB allows repetitive transmission for logical channel A to the UE. The maximum time interval in which repetitive transmission is allowed is configured as 5 normal TTIs and the maximum number of repetitive transmissions is configured as 3.

Referring to FIG. 10, the terminal carries data of logical channel A on the allocated UL grant and initially transmits the data at time point T1. Thereafter, if the UE receives the UL grant within the 5 normal TTIs which is the maximum time interval in which the repetitive transmission is allowed and the number of transmissions does not exceed 3 which is the maximum number of repetitive transmissions, the UE may carry the data of logical channel A, which has been transmitted at time point T1, on the allocated UL grant again and transmit the data at time point T2. The same operation may be applied to the allocated UL grant at time point T3 in the same principle.

<Relation Between Logical Channel and TTI>

Operations 2 and 3 described above provide information on the priority of logical channels for each TTI type (priorityForTTIType1, priorityForTTIType2) and the priority between different TTI types (TTIType, priorityAmongTTIType) which the eNB provides the UE through the LogicalChannelConfig IE. When transmitting and receiving data belonging to a particular logical channel, the UE may use only the TTI type included in the LogicalChannelConfig IE of the particular logical channel provided by the eNB. In other words, the eNB may designate the TTI type which the UE can use for transmitting and receiving data belonging to the corresponding logical channel through the LogicalChannelConfig IE. This has been described in operations 2 and 3 and will be described in more detail.

Figure 11:
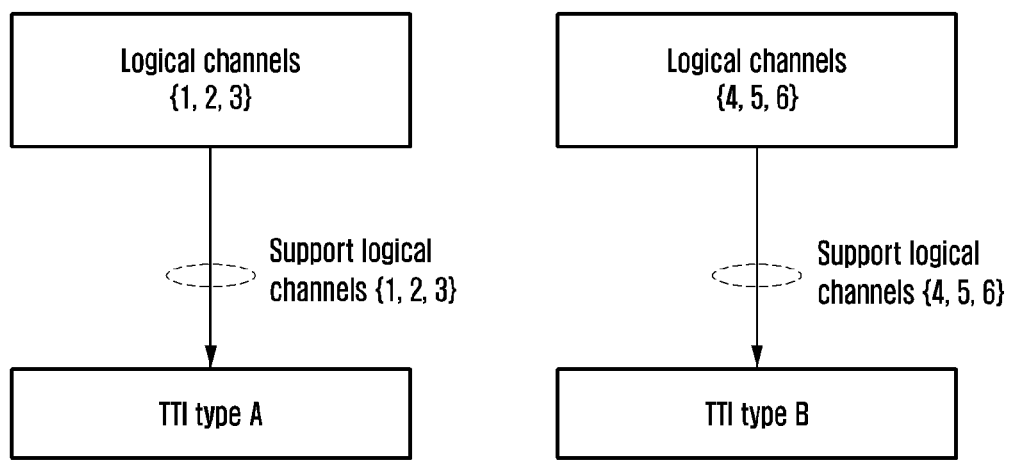
FIG. 11 illustrates hard split between a logical channel and a TTI proposed according to the first embodiment of the disclosure.

FIG. 11 illustrates hard split between a logical channel and a TTI proposed according to the first embodiment of the disclosure.

(1) Hard Split-Based Approach (FIG. 11)

It is assumed that the eNB supports six logical channels {1, 2, 3, 4, 5, 6} and two TTI types {A, B} to the UE.

The UE can use only TTI type A when transmitting data belonging to logical channels {1, 2, 3}. That is, the UE cannot transmit data belonging to logical channels {1, 2, 3} through TTI type B.

The UE can use only TTI type B when transmitting data belonging to logical channels {4, 5, 6}. That is, the UE cannot transmit data belonging to logical channels {4, 5, 6} through TTI type A.

Figure 12:
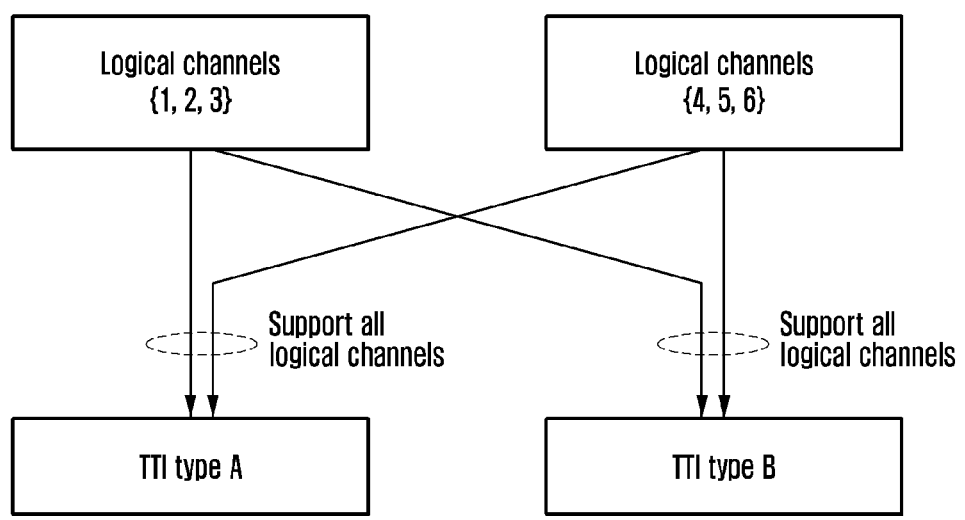
FIG. 12 illustrates soft split between a logical channel and a TTI proposed according to the first embodiment of the disclosure.

FIG. 12 illustrates soft split between a logical channel and a TTI proposed according to the first embodiment of the disclosure.

(2) Soft Split-Based Approach (FIG. 12)

It is assumed that the eNB supports six logical channels {1, 2, 3, 4, 5, 6} and two TTI types {A, B} to the UE.

The UE can use one, some, or all of the TTI types {A, B} when transmitting data belonging to logical channels {1, 2, 3, 4, 5, 6}.

Figure 13:
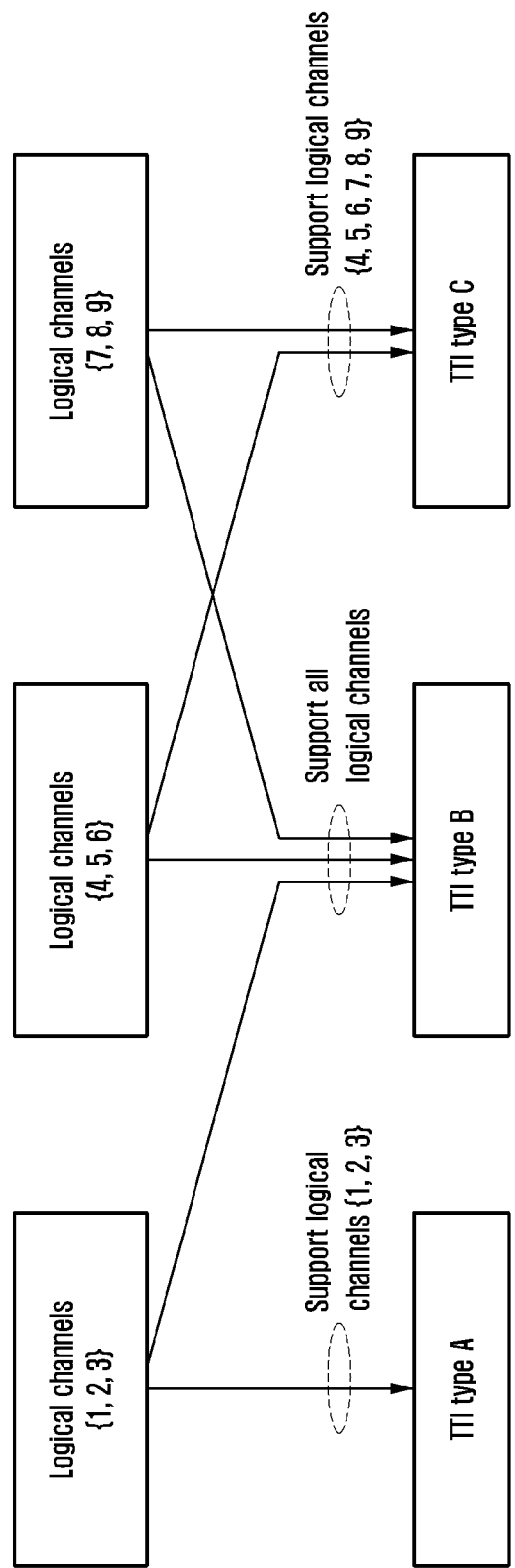
FIG. 13 illustrates hybrid split between a logical channel and a TTI proposed according to the first embodiment of the disclosure from a viewpoint of the logical channel.

FIG. 13 illustrates hybrid split between a logical channel and a TTI proposed according to the first embodiment of the disclosure from a viewpoint of the logical channel.

(3) Hybrid Approach (FIG. 13)

It is assumed that the eNB supports nine logical channels {, 2, 3, 4, 5, 6, 7, 8, 9} and three TTI types {A, B, C} to the UE.

TTI type A can be used when data belonging to logical channels {1, 2, 3} is transmitted.

TTI type B can be used when data belonging to a random logical channel among logical channels {1, 2, 3, 4, 5, 6, 7, 8, 9} is transmitted.

TTI type C can be used when data belonging to logical channels {4, 5, 6, 7, 8, 9} is transmitted.

Figure 14:
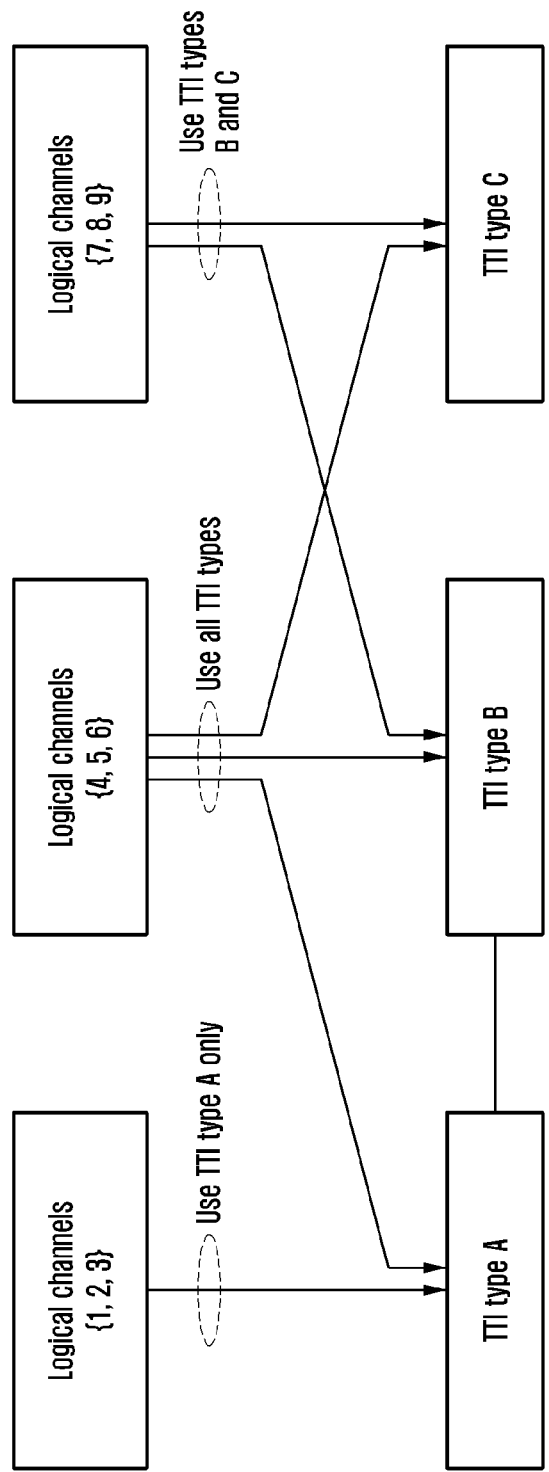
FIG. 14 illustrates hybrid split between a logical channel and a TTI proposed according to the first embodiment of the disclosure from a viewpoint of the TTI.

FIG. 14 illustrates hybrid split between a logical channel and a TTI proposed according to the first embodiment of the disclosure from a viewpoint of the TTI.

Data belonging to logical channels {1, 2, 3} can be transmitted and received by TTI type A.

Data belonging to logical channels {4, 5, 6} can be transmitted and received through all TTI types.

Data belonging to logical channels {7, 8, 9} can be transmitted and received by TTI types {B, C}.

In order to implement the hard split-based approach, the soft split-based approach, and the hybrid approach described above, when informing the UE of information on the configuration of logical channels, the eNB should basically also inform the UE of the TTI type which can be used for transmitting and receiving data belonging thereto. This may be informed through the LogicalChannelConfig IE. The LogicalChannelConfig IE described in operations 2 and 3 may include such information and further include logical channel priority information.

LogicalChannelConfig

The IE LogicalChannelConfig is used to configure the logical channel parameters.

| LogicalChannelConfiginformation element |
|---|

```
-- ASN1START
LogicalChannelConfig ::=        SEQUENCE {
    ul-SpecificParameters           SEQUENCE {
        priority                        INTEGER (1..16),
        prioritisedBitRate              ENUMERATED {
                                            kBps0, kBps8, kBps16, kBps32, kBps64, kBps128,
                                            kBps256, infinity, kBps512-v1020, kBps1024-v1020,
                                            kBps2048-v1020, spare5, spare4, spare3, spare2,
                                            spare1},
        bucketSizeDuration              ENUMERATED {
                                            ms50, ms100, ms150, ms300, ms500, ms1000, spare2,
                                            spare1},
        logicalChannelGroup             INTEGER (0..3)                  OPTIONAL        -- Need
    OR
    }                           OPTIONAL,                                               -- Cond
    UL
```

| LogicalChannelConfiginformation element | |
|---|---|
| ulTTI-SpecificParameters<br>    TTITypeSupported<br>}<br>...,<br>[[   logicalChannelSR-Mask-r9<br>SRmask<br>]],<br>[[   logicalChannelSR-Prohibit-r12<br>]]<br>}<br>-- ASN1STOP | SEQUENCE {<br>    INTEGER (1..16)<br><br><br><br>ENUMERATED {setup}    OPTIONAL    -- Cond<br><br><br>BOOLEAN    OPTIONAL    -- Need ON |

| LogicalChannelConfig field descriptions |
|---|
| bucketSizeDuration<br>Bucket Size Duration for logical channel prioritization in TS 36.321 [6]. Value in milliseconds. Value ms50 corresponds to 50 ms, ms100 corresponds to 100 ms and so on.<br>logicalChannelGroup<br>Mapping of logical channel to logical channel group for BSR reporting in TS 36.321 [6].<br>logicalChannelSR-Mask<br>Controlling SR triggering on a logical channel basis when an uplink grant is configured. See TS 36.321 [6].<br>logicalChannelSR-Prohibit<br>Value TRUE indicates that the logicalChannelSR-ProhibitTimer is enabled for the logical channel. E-UTRAN only (optionally) configures the field (i.e. indicates value TRUE) if logicalChannelSR-ProhibitTimer is configured. See TS 36.321 [6].<br>prioritisedBitRate<br>Prioritized Bit Rate for logical channel prioritization in TS 36.321 [6]. Value in kilobytes/second. Value kBps0 corresponds to 0 kB/second, kBps8 corresponds to 8 kB/second, kBps16 corresponds to 16 kB/second and so on. Infinity is the only applicable value for SRB1 and SRB2<br>priority<br>Logical channel priority in TS 36.321 [6]. Value is an integer.<br>TTITypeSupported<br>A list of TTI types that can be used to transmit data belonging to a specific logical channel. Note that each TTI type can be represented by an integer (i.e. a given identifier), a time duration of TTI (e.g. 0.1, 0.2, 0.5 and 1 ms) and so on. |

Through a method other than the method using the LogicalChannelConfig IE, the eNB may inform the UE of the TTI type through which data belonging to each logical channel can be transmitted.

<Operation 5>

(1) The eNB provides a plurality of logical channel priority sets to the UE. This may be performed through a LogicalChannelConfig IE during RRC signaling.

A. For example, logical channel priority set 1 provides the priority in order of A>B>C>D and logical channel priority set 2 priority in an order of C>D>A>B B. The following LogicalChannelConfig IE shows how a plurality of logical channel priority sets are configured.

LogicalChannelConfig

The IE LogicalChannelConfig is used to configure the logical channel parameters.

| LogicalChannelConfiginformation element | | | |
|---|---|---|---|
| -- ASN1START<br>LogicalChannelConfig ::=<br>    ul-SpecificParameters<br>        priority/Set<br>            prioritySetId<br>ON<br>            priority<br>ON<br>        }<br>        prioritisedBitRate<br><br><br><br><br>        bucketSizeDuration<br><br><br>        logicalChannelGroup | SEQUENCE {<br>    SEQUENCE {<br>        SEQUENCE {<br>            INTEGER (1..16),<br><br>            INTEGER (1..16),<br><br><br>        ENUMERATED {<br>            kBps0, kBps8, kBps16, kBps32, kBps64, kBps128,<br>            kBps256, infinity, kBps512-v1020, kBps1024-v1020,<br>            kBps2048-v1020, spare5, spare4, spare3, spare2,<br>            spare1},<br>        ENUMERATED {<br>            ms50, ms100, ms150, ms300, ms500, ms1000, spare2,<br>            spare1},<br>        INTEGER (0..3) | <br><br><br>OPTIONAL<br><br>OPTIONAL<br><br><br><br><br><br><br><br><br><br><br>OPTIONAL | <br><br><br>-- Need<br><br>-- Need<br><br><br><br><br><br><br><br><br><br><br>-- Need |

| LogicalChannelConfiginformation element | | | | |
|---|---|---|---|---|
| OR<br>    }        OPTIONAL, | | | | -- Cond |
| UL | | | | |
|     ..., | | | | |
|     [[    logicalChannelSR-Mask-r9 | ENUMERATED {setup} | | OPTIONAL | -- Cond |
| SRmask | | | | |
|     ]], | | | | |
|     [[    logicalChannelSR-Prohibit-r12 | BOOLEAN | | OPTIONAL | -- Need ON |
|     ]] | | | | |
| }<br>-- ASN1STOP | | | | |

| LogicalChannelConfig field descriptions |
|---|
| bucketSizeDuration<br>Bucket Size Duration for logical channel prioritization in TS 36.321 [6]. Value in milliseconds. Value ms50 corresponds to 50 ms, ms100 corresponds to 100 ms and so on.<br>logicalChannelGroup<br>Mapping of logical channel to logical channel group for BSR reporting in TS 36.321 [6].<br>logicalChannelSR-Mask<br>Controlling SR triggering on a logical channel basis when an uplink grant is configured. See TS 36.321 [6].<br>logicalChannelSR-Prohibit<br>Value TRUE indicates that the logicalChannelSR-ProhibitTimer is enabled for the logical channel. E-UTRAN only (optionally) configures the field (i.e. indicates value TRUE) if logicalChannelSR-ProhibitTimer is configured. See TS 36.321 [6].<br>prioritisedBitRate<br>Prioritized Bit Rate for logical channel prioritization in TS 36.321 [6]. Value in kilobytes/second. Value kBps0 corresponds to 0 kB/second, kBps8 corresponds to 8 kB/second kBps16 corresponds to 16 kB/second and so on. Infinity is the only applicable value for SRB1 and SRB2<br>prioritySet<br>For a given logical channel, indicating logical channel priority set ID and corresponding logical channel priority. Both logical channel priority set ID and logical channel ID can be represented by an integer (and other representation is also possible). |

(2) The eNB provides a logical channel priority set ID applied to UL grant when allocating the corresponding UL grant to the UE. This may be performed through DCI transmitted through a PDCCH.

A. (2) The following table shows an example in which, when allocating UL grant to the UE, the eNB informs the UE of a logical channel priority set ID applied to the corresponding UL grant.

| | Number of bits |
|---|---|
| Format 0/format 1A flag | 1 |
| Hopping flag | 1 |
| Resource block allocation | Variable (5 to 13 bits) |
| MCS and redundancy version | 5 |
| New data indicator | 1 |
| TPC command | 2 |
| Cyclic shift for DM-RS | 3 |
| CQI request | 1 |
| Padding | Variable (1 to 2 bits) |
| Logical channel priority set ID | 4 bits |

(3) Through processes (1) and (2) above, the UE receives a plurality of logical channel priority sets and the logical channel priority set ID corresponding to the UL grant. Based thereon, the UE operates as follows.

A. The UE identifies a logical channel priority set ID specified in the UL grant and identifies a logical channel priority corresponding thereto.

B. The UE carries data existing in the current buffer on the UL grant according to the identified logical channel priority.

Figure 15:
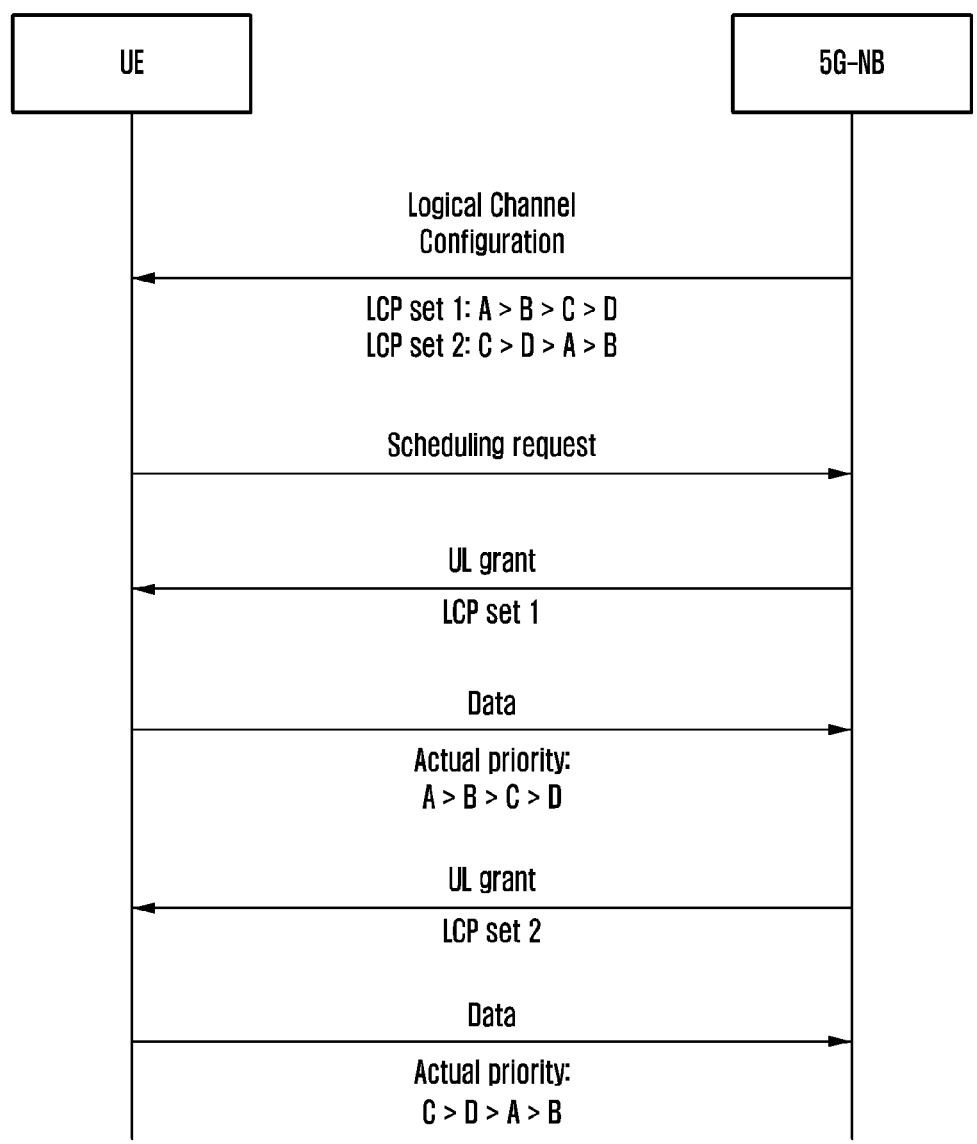
FIG. 15 illustrates a method by which the eNB informs the UE of an LCP set through UL grant according to the first embodiment of the disclosure.

FIG. 15 illustrates a method by which the eNB informs the UE of an LCP set through UL grant according to the first embodiment of the disclosure.

(1) The eNB provides a plurality of logical channel priority (LCP) sets 1 and 2 to the UE. A logical channel priority of logical channel priority set 1 is configured as A>B>C>D and a logical channel priority of logical channel priority set 2 is configured as C>D>A>B.

(2) The eNB provides a logical channel priority set ID applied to UL grant when allocating the corresponding UL grant to the UE.

A. If the logical channel priority set ID applied to the UL grant is 1, allocated resources are carried on the corresponding UL grant in an order of the priority A>B>C>D through the LCP operation.

B. If the logical channel priority set ID applied to the UL grant is 2, allocated resources are carried on the corresponding UL grant in an order of the priority C>D>A>B through the LCP operation.

The eNB may provide logical channel priority information for each TTI type to the UE in operation (1). The disclosure also considers a Prioritized Bit Rate (PBR) and Bucket Size Duration (BSD) information which the eNB can provide to the UE according to each TTI through RRC signaling as well as the logical channel priority information. Accordingly, the UE may apply different PBRs (PBRa and PBRb) and different BSD (BSDa and BSDb) when transmitting data belonging to the same logical channel through TTI type a and through TTI type b. Roles of the PBR and the BSD are the same as those in LTE. That is, the following operation is performed.

transmission of data belonging to a particular logical channel through TTI type a (corresponding to step 1 of the LCP process defined in LTE)
an allocated amount per transmission: PBRa X TTIa
a maximum amount of allocation PBRa X BSDa
transmission of data belonging to a particular logical channel through TTI type b (corresponding to step 1 of the LCP process defined in LTE)
an allocated amount per transmission: PBRa X TTIb
a maximum amount of allocation PBRb X BSDb
<Operation 6>
Operations 1 to 5 described above are operations in which the eNB determines priorities between logical channels used by the UE. In operation 6, an operation in which the UE actively selects LCP to be used by the UE itself will be described.

(1) The eNB provides a plurality of logical channel priorities to the UE. For example, the logical channel priority provided to the UE may be optimized for each TTI type currently operated by the eNB. This may be performed through a LogicalChannelConfig IE during RRC signaling.

A. For example, the eNB configures and provides the UE with one logical channel priority set in an order of the logical channels A>B>C>D and additionally configures and provides the UE with one logical channel priority set in an order of C>D>A>B. For example, the logical channel priority set A>B>C>D may be the priority easily applied to a normal length TTI and the logical channel priority set C>D>A>B may be the priority easily applied to a short length TTI.

B. The following LogicalChannelConfig IE shows an example in which the eNB provides a plurality of logical channel priority sets to the UE.

LogicalChannelConfig
The IE LogicalChannelConfig is used to configure the logical channel parameters.

| LogicalChannelConfiginformation element |
| --- |
| -- ASN1START |
| LogicalChannelConfig ::=     SEQUENCE { |
|     ul-SpecificParameters     SEQUENCE { |
|         prioritySet     SEQUENCE { |
|             prioritySetId     INTEGER (1..16),     OPTIONAL     -- Need ON |
|             priority     INTEGER (1..16),     OPTIONAL     -- Need ON |
|         } |
|         prioritisedBitRate     ENUMERATED { |
|             kBps0, kBps8, kBps16, kBps32, kBps64, kBps128, |
|             kBps256, infinity, kBps512-v1020, kBps1024-v1020, |
|             kBps2048-v1020, spare5, spare4, spare3, spare2, |
|             spare1}, |
|         bucketSizeDuration     ENUMERATED { |
|             ms50, ms100, ms150, ms300, ms500, ms1000, spare2, |
|             spare1}, |
|         logicalChannelGroup     INTEGER (0..3)     OPTIONAL     -- Need OR |
|     }     OPTIONAL,     -- Cond UL |
|     ..., |
|     [[     logicalChannelSR-Mask-r9     ENUMERATED {setup}     OPTIONAL     -- Cond SRmask |
|     ]], |
|     [[     logicalChannelSR-Prohibit-r12     BOOLEAN     OPTIONAL     -- Need ON |
|     ]] |
| } |
| -- ASN1STOP |

| LogicalChannelConfig field descriptions |
| --- |
| bucketSizeDuration |
| Bucket Size Duration for logical channel prioritization in TS 36.321 [6]. Value in milliseconds. Value ms50 corresponds to 50 ms, ms100 corresponds to 100 ms and so on. |
| logicalChannelGroup |
| Mapping of logical channel to logical channel group for BSR reporting in TS 36.321 [6]. |
| logicalChannelSR-Mask |
| Controlling SR triggering on a logical channel basis when an uplink grant is configured. See TS 36.321 [6]. |
| logicalChannelSR-Prohibit |
| Value TRUE indicates that the logicalChannelSR-ProhibitTimer is enabled for the logical channel. E-UTRAN only (optionally) configures the field (i.e. indicates value TRUE) if logicalChannelSR-ProhibitTimer is configured. See TS 36.321 [6]. |
| prioritisedBitRate |
| Prioritized Bit Rate for logical channel prioritization in TS 36.321 [6]. Value in kilobytes/second. Value kBps0 corresponds to 0 kB/second, kBps8 corresponds to 8 kB/second, kBps16 corresponds to 16 kB/second and so on. Infinity is the only applicable value for SRB1 and SRB2 |
| prioritySet |
| For a given logical channel, indicating logical channel set ID and corresponding logical channel priority. Both logical channel priority set ID and logical channel ID can be represented by an integer (and other representation is also possible). |

(2) The UE explicitly or implicitly informs the eNB of a set ID of a logical channel priority to be applied to resources allocated by the eNB in response to a request for UL resources (a scheduling request signal or a buffer status report MAC CE) which the UE transmits to the eNB.

(3) The eNB receiving preferred logical channel priority set ID information from the UE in step (2) selects resources (for example, resources having a short TTI or resources having a long TTI) for easily application of a logical channel priority indicated by the corresponding set ID and then allocates the resources to the UE through UL grant.

(4) The UE receiving the resources from the eNB through UL grant in step (3) performs LCP according to the logical channel priority indicated by the logical channel priority set ID of which the UE informs the eNB, generates data, and then transmits the data.

Figure 16:
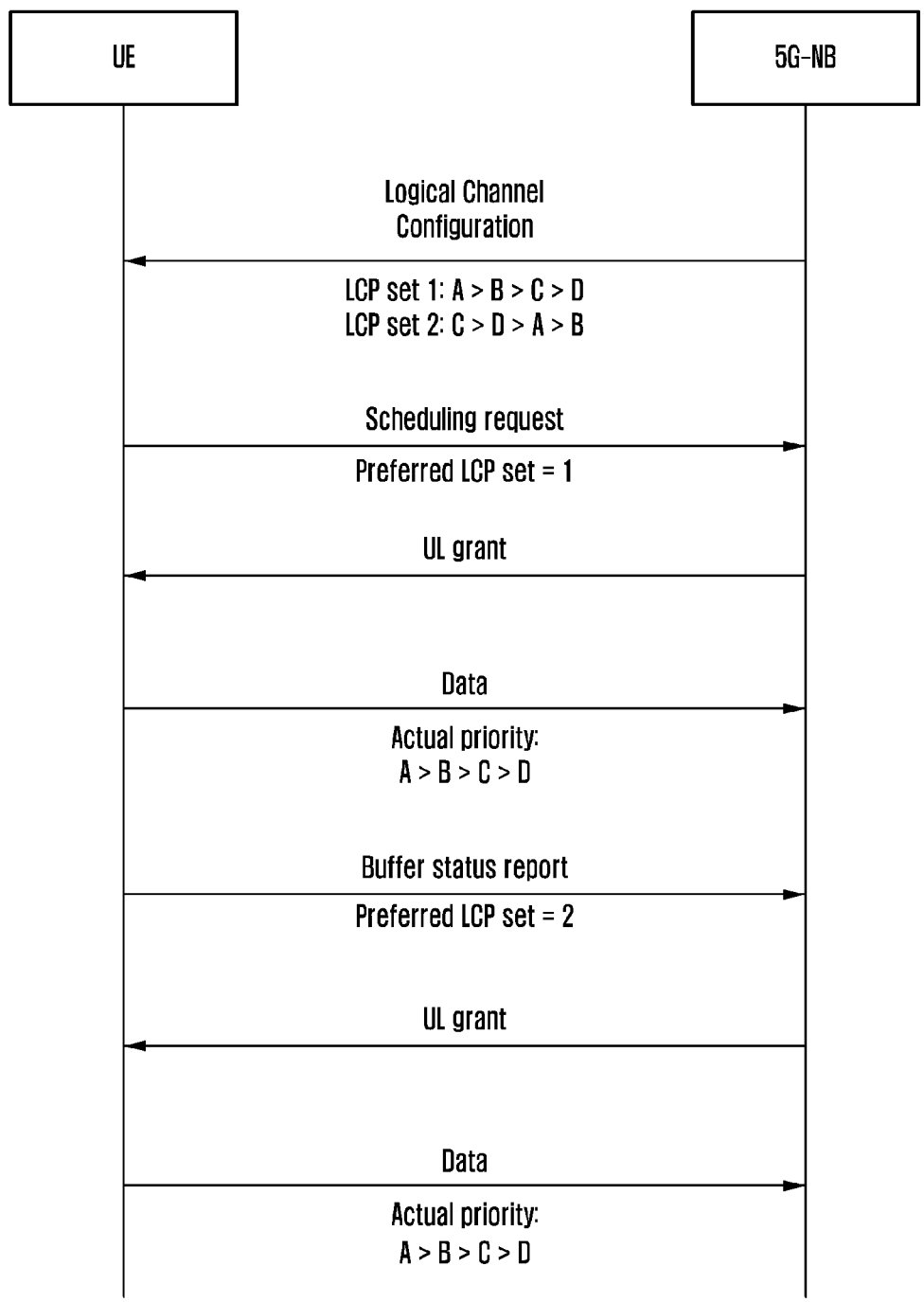
FIG. 16 illustrates a method by which the UE informs the eNB of a preferred LCP set through a scheduling request according to the first embodiment of the disclosure.

FIG. 16 illustrates a method by which the UE informs the eNB of a preferred LCP set through a scheduling request according to the first embodiment of the disclosure. FIG. 16 corresponds to one example of operation 6.

In step (2) above, the UE provides information on the preferred logical channel priority to the eNB in the form of a set ID. Further, the information is provided when the scheduling request signal or the buffer status report MAC CE is transmitted. The disclosure considers various methods by which the UE can provide information on the preferred logical channel priority set ID to the eNB. The following description corresponds to an example thereof.

Insert a preferred logical channel priority set ID into a buffer status report MAC CE.

Newly define a MAC CE including preferred logical channel priority set ID information.

Allocate a plurality of scheduling request signals to the UE and make each scheduling request signal correspond to each preferred logical channel priority set ID. Accordingly, if the eNB receives a particular scheduling request signal, the eNB is able to know a preferred logical channel priority set ID of the UE according to the type of the scheduling request signal.

Allocate one scheduling request signal to the UE, divide time or frequency resources through which the scheduling request signal can be transmitted, and make each time or frequency resource correspond to each preferred logical channel priority set ID. Accordingly, the eNB is able to know a preferred logical channel set ID of the UE according to the time or frequency resource through which the scheduling request signal is received even though the UE always transmits the same scheduling request signal.

In operation (1) above, the eNB provides priority information for each TTI type to the UE. The disclosure also considers a Prioritized Bit Rate (PBR) and Bucket Size Duration (BSD) information which the eNB can provide to the UE according to each TTI through RRC signaling as well as the priority information. Accordingly, the UE may apply different PBRs (PBRa and PBRb) and different BSD (BSDa and BSDb) when transmitting data belonging to the same logical channel through TTI type a and through TTI type b. Roles of the PBR and the BSD are the same as those in LTE. That is, the following operation is performed.

Transmission of data belonging to a particular logical channel through TTI type a (corresponding to step 1 of the LCP process defined in LTE)
an allocated amount per transmission: PBRa X TTIa
a maximum amount of allocation PBRa X BSDa Transmission of data belonging to a particular logical channel through TTI type b (corresponding to step 1 of the LCP process defined in LTE)
an allocated amount per transmission: PBRa X TTIb
a maximum amount of allocation PBRb X BSDb <Operation 7>

In this operation, the overall operation in which, when receiving UL resources through UL grant, the UE inserts data into the allocated UL resources through LCP will be described. Basically, the description is based on the LCP operation of LTE described above. This operation focuses on how to improve the LCP operation of LTE if a plurality of logical channels and a plurality of TTIs exist.

In the case of hard spit, that is, if logical channels {1, 2, 3} are configured to use only TTI type A and logical channels {4, 5, 6} are configured to use only TTI type B as illustrated in FIG. 11, the LCP operation of LTE is directly applied. That is, the LCP operation of LTE is directly applied when data belonging to logical channels {1, 2, 3} is inserted into UL resources corresponding to TTI type A, and the LCP operation of LTE is directly applied when data belonging to logical channels {4, 5, 6} is inserted into UL resources corresponding to TTI type B. More specifically, the following operation is performed.

(1) The UE carriers data belonging to LCH 1 by PBR1*TTIA.
 A. It is assumed that the priority between LCHs {1, 2, 3} is 1>2>3.
 B. Data belonging to LCH 1 may be carried by a maximum of PBR1*BSDA.
(2) If allocated UL resources remain after operation (1), data belonging to LCH2 is carried by PBR2*TTIA.
(3) If allocated UL resources remain after operation (2), data belonging to LCH3 is carried by PBR3*TTIA.
(4) If allocated UL resources remain after operation (3), all pieces of remaining data of LCH 1 are carried on the allocated resources.
(5) If allocated UL resources remain after operation (4), all pieces of remaining data of LCH 2 are carried on the allocated resources.
(6) If allocated UL resources remain after operation (5), all pieces of remaining data of LCH 3 are carried on the allocated resources.
(7) If all the allocated UL resources are exhausted during the above process, the whole operation ends.

The above operation may be equally applied to LCHs {4, 5, 6} and TTI type B.

As illustrated in FIG. 12, in the case of soft split, LCHs {1, 2, 3} and {4, 5, 6} can use both of TTI types A and B, but the case in which LCHs {1, 2, 3} have a higher priority than LCHs {4, 5, 6} for TTI type A and LCHs {4, 5, 6} have a higher priority than LCHs {1, 2 3} for TTI type B will be described. In this case, two operations below are possible.

First, when data which the UE desires to transmit is inserted into UL resources corresponding to TTI type A, the LCH priority is configured and then the LCP operation of LTE is directly applied. More specifically, the following operation is performed.

(1) The UE carriers data belonging to LCH 1 by PBR1,A*TTIA.
 A. It is assumed that the priority between LCHs {1, 2, 3, 4, 5, 6} is 1>2>3>4>5>6.
 B. PBR1,A is a PBR applied when data belonging to LCH 1 is inserted into data belonging to TTI type A.
 C. Data belonging to LCH 1 may be carried by a maximum of PBR1,A*BSDA in LCP step 1.

(2) If allocated UL resources remain after process (1), data belonging to LCH 2 is carried by PBR2,A*TTIA.

(3) If allocated UL resources remain after process (2), data belonging to LCH 3 is carried by PBR3,A*TTIA.

(4) If allocated UL resources remains after process (3), data belonging to LCH 4 is carried by PBR4,A*TTIA.

(5) If allocated UL resources remain after process (4), data belonging to LCH 5 is carried by PBRS,A*TTIA.

(6) If allocated UL resources remain after process (5), data belonging to LCH 6 is carried by PBR6,A*TTIA.

(7) If allocated UL resources remain after operation (6), all pieces of remaining data of each LCH are carried on the allocated resources according to the priority between LCHs.

(8) If all the allocated UL resources are exhausted during the above process, the whole operation ends.

The above operation may be equally applied to LCHs {1, 2, 3, 4, 5, 6} and TTI type B.

Second, when data which the UE desires to transmit is inserted into UL resources corresponding to TTI type A, data belonging to LCHs {4, 5, 6} are inserted only when allocated UL resources remain after all pieces of data belonging to LCHs {1, 2, 3} having a higher priority for TTI type A are inserted. More specifically, the following operation is performed.

(1) The UE carriers data belonging to LCH 1 by PBR1, A*TTIA.

A. It is assumed that the priority between LCHs {1, 2, 3} is 1>2>3.

B. PBR1,A is a PBR applied when data belonging to LCH 1 is inserted into data belonging to TTI type A.

C. Data belonging to LCH 1 may be carried by a maximum of PBR1,A*BSDA in LCP step 1.

(2) If allocated UL resources remain after process (1), data belonging to LCH 2 is carried by PBR2,A*TTIA.

(3) If allocated UL resources remain after process (2), data belonging to LCH 3 is carried by PBR3,A*TTIA.

(4) If allocated UL resources remain after process (3), all pieces of remaining data of each LCH are carried on the allocated resources according to the priority of LCHs {1, 2, 3} corresponding to 1>2>3.

(5) If allocated UL resources remain even after process (4) is performed, that is, even though the data belonging to LCHs {1, 2, 3} are inserted into the allocated UL resources, the data belonging to LCHs {4, 5, 6} starts to be carried. That is, data belonging to LCH 4 is carried by PBR4, A*TTIA.

A. It is assumed that the priority between LCHs {4, 5, 6} is 4>5>6.

(6) If allocated UL resources remain after process (5), data belonging to LCH 5 is carried by PBRS,A*TTIA.

(7) If allocated UL resources remain after process (6), data belonging to LCH 6 is carried by PBR6,A*TTIA.

(8) If allocated UL resources remain after process (7), all pieces of remaining data of each LCH are carried on the allocated UL resources according to the priority of LCHs {4, 5, 6} corresponding to 4>5>6.

(9) If all the allocated UL resources are exhausted during the above process, the whole operation ends.

The above operation may be equally applied to TTI type B.

<Operation 8>

In operation 8, a method by which the eNB efficiently applies the default priority and the special (for example, TTI-specific) priority to the UE is described. The method is performed as follows.

(1) The eNB provides a plurality of logical channel priorities to the UE. For example, the logical channel priority which the eNB provides to the UE may be optimized for each TTI type currently operated by the eNB. This may be performed through a LogicalChannelConfig IE during RRC signaling.

A. For example, the eNB may configure the priority for TTI type 1 in an order of the logical channel B>C>A. Further, the eNB may configure the priority for TTI type 2 in an order of the logical channel C>A>B.

(2) The eNB provides a plurality of default logical channel priorities to the UE. The default logical channel priority is a logical channel priority which can be applied regardless of characteristics of UL resources (for example, TTI length or numerology) which the eNB allocates to the UE. This may be performed through a LogicalChannelConfig IE during RRC signaling.

A. For example, the eNB may configure the default priority in an order of the logical channel A>B>C.

B. The following LogicalChannelConfig IE shows an example in which the eNB provides the UE with, for example, characteristics of the special logical channel priority which can be applied for each TTI and the UL grant, such as the default logical channel priority which can be applied regardless of the TTI length.

LogicalChannelConfig

The IE LogicalChannelConfig is used to configure the logical channel parameters.

| LogicalChannelConfiginformation element | | | | |
|---|---|---|---|---|
| -- ASN1START | | | | |
| LogicalChannelConfig ::= | SEQUENCE { | | | |
| ul-SpecificParameters | SEQUENCE { | | | |
| priority | SEQUENCE { | | | |
| priorityDefault | | INTEGER (1..16), | OPTIONAL | -- Need ON |
| priorityForTTIType1 | | INTEGER (1..16), | OPTIONAL | -- Need ON |
| priorityForTTIType2 | | INTEGER (1..16), | OPTIONAL | -- Need ON |
| } | | | | |
| prioritisedBitRate | | ENUMERATED { kBps0, kBps8, kBps16, kBps32, kBps64, kBps128, kBps256, infinity, kBps512-v1020, kBps1024-v1020, kBps2048-v1020, spare5, spare4, spare3, spare2, spare1}, | | |
| bucketSizeDuration | | ENUMERATED { ms50, ms100, ms150, ms300, ms500, ms1000, spare2, spare1}, | | |

| LogicalChannelConfiginformation element | | | |
|---|---|---|---|
| logicalChannelGroup | INTEGER (0..3) | OPTIONAL | -- Need OR |
| } OPTIONAL, UL | | | -- Cond |
| ..., [[ logicalChannelSR-Mask-r9 SRmask ]], | ENUMERATED {setup} | OPTIONAL | -- Cond |
| [[ logicalChannelSR-Prohibit-r12 ]] } -- ASN1STOP | BOOLEAN | OPTIONAL | -- Need ON |

| LogicalChannelConfig field descriptions |
|---|
| bucketSizeDuration<br>Bucket Size Duration for logical channel prioritization in TS 36.321 [6]. Value in milliseconds. Value ms50 corresponds to 50 ms, ms100 corresponds to 100 ms and so on.<br>logicalChannelGroup<br>Mapping of logical channel to logical channel group for BSR reporting in TS 36.321 [6].<br>logicalChannelSR-Mask<br>Controlling SR triggering on a logical channel basis when an uplink grant is configured. See TS 36.321 [6].<br>logicalChannelSR-Prohibit<br>Value TRUE indicates that the logicalChannelSR-ProhibitTimer is enabled for the logical channel. E-UTRAN only (optionally) configures the field (i.e. indicates value TRUE) if logicalChannelSR-ProhibitTimer is configured. See TS 36.321 [6].<br>prioritisedBitRate<br>Prioritized Bit Rate for logical channel prioritization in TS 36.321 [6]. Value in kilobytes/second. Value kBps0 corresponds to 0 kB/second. kBps8 corresponds to 8 kB/second, kBps16 corresponds to 16 kB/second and so on. Infinity is the only applicable value for SRB1 and SRB2<br>priorityForTTIType<br>For a given logical channel, indicating logical channel priority for each TTI type.<br>priorityDefault<br>For a given logical channel, indicating logical channel priority that can be applied to any UL grant regardless of<br>its TTI or numerology. |

(3) When transmitting UL grant to the UE, the eNB includes a 1-bit indication indicating whether to apply the default logical channel priority.

(4) The UE operates as follows in consideration of RRC configuration for logical channels and whether to apply the default logical channel priority included in the UL grant.

A. If 1 bit indicating whether to apply the default logical channel priority within the UL grant is configured as 1, the UE performs LCP according to the default logical channel priority configured by the eNB when transmitting data through the corresponding UL grant.

B. If 1 bit indicating whether to apply the default logical channel priority within the UL grant is configured as 0, the UE performs LCP according to characteristics of the UL grant (for example, TTI) and the special (or TTI-specific) logical channel priority corresponding thereto when transmitting data through the corresponding UL grant.

Figure 17:
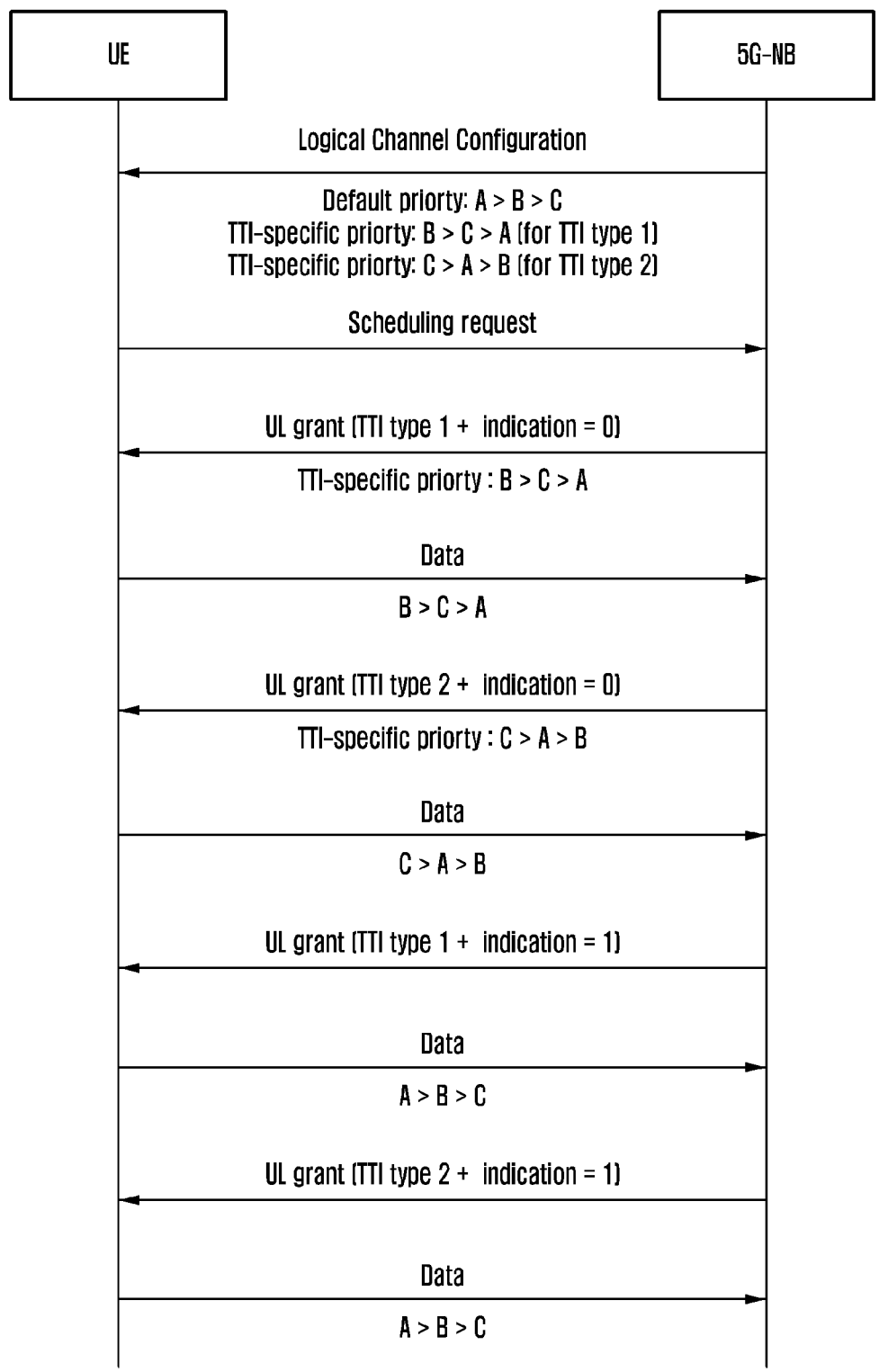
FIG. 17 illustrates a method by which the eNB efficiently applies the default priority and the special priority to the UE according to the first embodiment of the disclosure.

FIG. 17 illustrates a method by which the eNB efficiently applies the default priority and the special priority to the UE according to the first embodiment of the disclosure. FIG. 17 corresponds to one example of operation 8.

1) When configuring logical channels A, B, and C used by the UE, the eNB may determine that the TTI-specific logical channel priority for TTI type 1 is B>C>A and the TTI-specific logical channel priority for TTI type 2 is C>A>B. Further, the eNB configures the default logical channel priority used regardless of characteristics of the UL grant (for example, TTI) as A>B>C.

2) The UE transmits a scheduling request signal to the eNB to transmit UL data, and the eNB transmits UL grant including UL resource allocation information to the UE. At this time, the UE operates as follows according to an indicator indicating whether to apply the default logical channel priority included in the UL grant. Although the specification describes that the default logical channel priority is not applied if the indicator indicating whether to apply the default logical channel priority is 0 and the default logical channel priority is applied if the indicator indicating whether to apply the default logical channel priority is 1 for convenience of description, the indicator indicating whether to apply the default logical channel priority may be differently configured according to the design specification.

A. If the UE receives UL resources corresponding to TTI type 1 and the indicator indicating whether to apply the default logical channel priority is configured as 0, the UE performs LCP according to the logical channel priority B>C>A corresponding to TTI type 1 when transmitting data through the corresponding UL grant.

B. If the UE receives UL resources corresponding to TTI type 2 and the indicator indicating whether to apply the default logical channel priority is configured as 0, the UE performs LCP according to the logical channel priority C>A>B corresponding to TTI type 2 when transmitting data through the corresponding UL grant.

C. If the UE receives UL resources corresponding to TTI type 1 and the indicator indicating whether to apply the default logical channel priority is configured as 1, the UE ignores the logical channel priority B>C>A corresponding to TTI type 1 and performs LCP according to the default logical channel priority A>B>C when transmitting data through the corresponding UL grant.

D. If the UE receives UL resources corresponding to TTI type 2 and the indicator indicating whether to apply the default logical channel priority is configured as 1, the UE ignores the logical channel priority C>A>B corresponding to TTI type 2 and performs LCP according to the default logical channel priority A>B>C when transmitting data through the corresponding UL grant.

<Operation 9>

In operation 9, a method by which the eNB assigns the degree of freedom to selection of the logical channel priority by the UE acceding to circumstances after the eNB allocates the TTI-specific priority to the UE. The method is performed as follows.

(1) The eNB provides a plurality of logical channel priorities to the UE. For example, the logical channel priority which the eNB provides to the UE may be optimized for each TTI type currently operated by the eNB. This may be performed through a LogicalChannelConfig IE during RRC signaling.

A. For example, the eNB may configure the priority for TTI type 1 in an order of the logical channel B>C>A. Further, the eNB may configure the priority for TTI type 2 in an order of the logical channel C>A>B.

(2) Further, the eNB may include a 1-bit indication for assigning a right to select the logical channel priority to the UE without any instruction of the UE when transmitting the UL grant to the UE.

(3) The UE operates as follows in consideration of RRC configuration of logical channels, that is, the TTI-specific logical channel priority and the presence or absence of the right to select the logical channel priority of the UE included in the UL grant.

A. If 1 bit indicating the presence or absence of the right to select the logical channel priority of the UE within the UL grant is configured as 0, the UE performs LCP according to characteristics of the UL grant (for example, TTI) and the special (or TTI-specific) logical channel priority corresponding thereto when transmitting data through the corresponding UL grant.

B. If 1 bit indicating the presence or absence of the right to select the logical channel priority of the UE within the UL grant is configured as 1, the UE performs LCP according to the logical channel priority configured by the UE itself when transmitting data through the corresponding UL grant.

Figure 18:
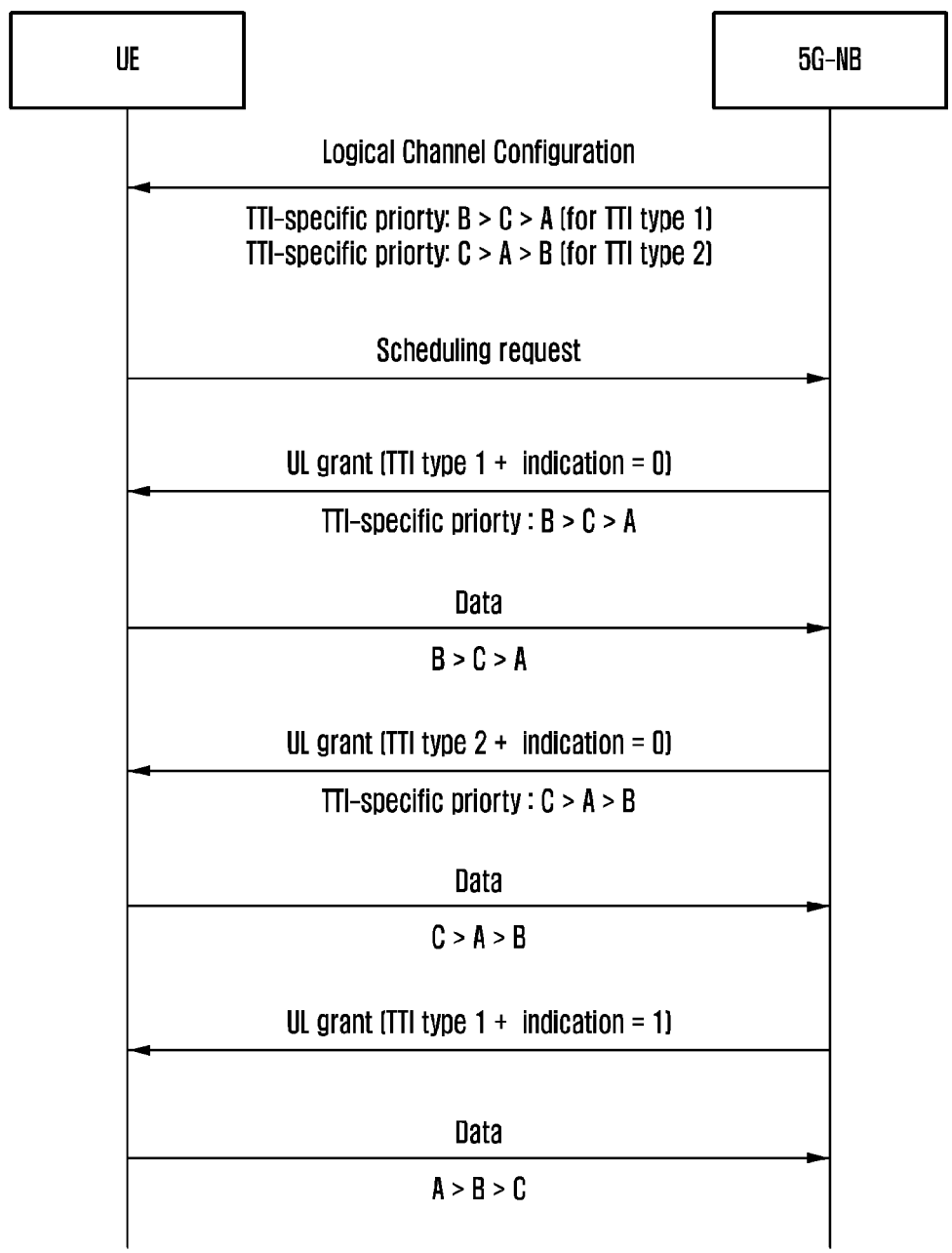
FIG. 18 illustrates a method by which the eNB assigns the degree of freedom to selection of the logical channel priority of the UE after the eNB allocates the TTI-specific priority according to the first embodiment of the disclosure.

FIG. 18 illustrates a method by which the eNB assigns the degree of freedom to selection of the logical channel priority of the UE after the eNB allocates the TTI-specific priority according to the first embodiment of the disclosure. FIG. 18 corresponds to one example of operation 9.

1) When configuring logical channels A, B, and C used by the UE, the eNB may determine that the TTI-specific logical channel priority for TTI type 1 is B>C>A and the TTI-specific logical channel priority for TTI type 2 is C>A>B.

2) The UE transmits a scheduling request signal to the eNB to transmit UL data, and the eNB transmits UL grant including UL resource allocation information to the UE. At this time, the UE operates as follows according to an indicator indicating the presence or absence of the right to configure the logical channel priority of the UE included in the UL grant. Although the UE is configured to have a right to configure the logical channel priority if the indicator indicating the presence or absence of the right to configure the logical channel priority is 0, and the UE is configured to have the right to configure the logical channel priority if the indicator indicating the presence or absence of the right to configure the logical channel priority is 1 in this specification for convenience of description, the indicator indicating the presence or absence of the right to configure the logical channel priority may be variously configured according to the design specification.

A. If the UE receives UL resources corresponding to TTI type 1 and the indicator indicating the presence or absence of the right to configure the logical channel priority is configured as 0, the UE performs LCP according to the logical channel priority B>C>A corresponding to TTI type 1 when transmitting data through the corresponding UL grant.

B. If the UE receives UL resources corresponding to TTI type 2 and the indicator indicating the presence or absence of the right to configure the logical channel priority is configured as 0, the UE performs LCP according to the logical channel priority C>A>B corresponding to TTI type 2 when transmitting data through the corresponding UL grant.

C. If the UE receives UL resources corresponding to TTI type 1 and the indicator indicating the presence or absence of the right to configure the logical channel priority is configured as 1, the UE ignores the logical channel priority B>C>A corresponding to TTI type 1 and performs LCP according to the logical channel priority A>B>C configured by the UE itself when transmitting data through the corresponding UL grant.

<Operation 10>

The disclosure proposes various methods by which the UE performs the LCP operation after applying different logical channel priorities to UL resources having different TTIs. The TTI is one of physical attributes of UL resources which the eNB allocates to the UE through UL grant. Accordingly, the UL resources which the eNB allocates to the UE may be separated by the TTI of the corresponding resources or by another attribute other than the TTI. Further, the UL resources may be separated by a combination of the TTI and other attributes. In operation 10, various examples for separating UL resources are described.

(1) UL resources may be separated by the TTI.

A TTI length may be a transmission period of a control channel such as a subframe length, a slot length, a mini-slot length, or an LTE PDCCH. For example, the TTI length may be part of values expressed through various methods such as ½m ms, that is, 1 ms (m=0), 0.5 ms (m=1), 0.25 ms (m=2), and 0.125 ms (m=3).

(2) UL resources may be separated by subcarrier spacing.

For example, subcarrier spacing may be part of various expressed through various methods such as 15*2 m kHz, that is, 15 kHz (m=0), 30 kHz (m=1), 60 kHz (m=2), and 120 kHz (m=3) or 15*n kHz, that is, 15 kHz (n=1), 30 kHz (n=2), 45 kHz (n=3), and 60 kHz (n=4).

(3) UL resources may be separated by a Cyclic Prefix (CP) length.

The CP length is determined in consideration of aspects such as capability and overhead and may be part of various values, for example, 4.7 us, 0.9 us, and 0.1 us.

(4) UL resources may be separated by a modulation/coding method to be applied to the corresponding resources and a coding rate.

The eNB informs the UE of the modulation/coding method applied to the corresponding resources through UL grant when allocating UL resources to the UE and the UE may separate UL resources allocated to the UE itself on the basis thereof.

(5) UL resources may be separated by the number of OFDM symbols included in a predetermined unit (for example, 1 ms, subframe, slot, mini-slot, or TTI).

The number of OFDM symbols included in the predetermined unit may be 14, 70, or 560 according to circumstances.

An additional example of the predetermined unit (for example, 1 ms, subframe, slot, mini-slot, or TTI) may include a time spent on transmitting allocated resources. The time spent on transmitting the allocated resources is a total number of symbols from a first OFMD symbol to a last OFDM symbol allocated to the UE when the eNB allocates data channels, that is, PUSCHs or PDSCHs to the UE.

(6) UL resources may be separated by an OFDM symbol length.

(7) UL resources may be separated by a bandwidth which the corresponding resources occupy.

(8) UL resources may be separated into (i) UL grant-based resources which are allocated by transmitting UL resource allocation information, that is, UL grant through a control channel such as a PDCCH to the UE by the eNB in every resource allocation and (ii) UL grant-free-based resources which are resources allocated in advance by periodically allocating UL resources through RRC signaling regardless of the generation of data of the UE rather than the method by which the eNB allocates UL resources by transmitting the UL grant to the UE in every resource allocation. Accordingly, the eNB may configure the UE to transmit and receive data generated in a particular logical channel through UL grant-based resources and to transmit and receive data generated in another logical channel through UL grant-free-based resources.

(9) UL resources may be separated according to cases in which there is no possibility of collision which may occur when a plurality of UEs simultaneously performs UL transmission through the same resources since the resources are allocated only to one UE and in which there is a possibility of collision which may occur when a plurality of UEs simultaneously performs transmission through the same resources since the resources are allocated to the plurality of UEs in common. Accordingly, the eNB may configure the UE to transmit and receive data generated in particular logical channel 1 through UL resources having no possibility of collision since the resources are allocated only to the UE and configure the UE to transmit and receive data generated in another logical channel through UL resources having a possibility of collision since the resources are allocated to a plurality of UEs.

(10) UL resources may be separated by a transmission period of a control channel to which the resources are allocated. The transmission period of the control channel to which UL resources are allocated includes a PDCCH transmission period of the eNB, a PDCCH monitoring period (monitoring periodicity) of the UE, and a control resource set (CORESET) monitoring period which the eNB configures in the UE. The transmission period may be expressed in units of symbols, mini-slots, slots, or subframes.

(11) UL resources may be separated by collectively considering the transmission period of the control channel to which the resources are allocated and a time length of the allocated UL resources. As the method of separating UL resources by collectively considering the transmission period of the control channel to which UL resources are allocated and the time length of the allocated UL lengths, the disclosure proposes a method of separating UL resources on the basis of a larger value between the transmission period of the control channel to which UL resources are allocated and the time length of the allocated UL resources. For example, if the transmission period of the control channel to which UL resources are allocated is 7 symbols and the time length of the allocated UL resources is 2 symbols, the corresponding UL resources are separated according to 7 symbols which correspond to the transmission period of the control channel to which the UL resources are allocated. In another example, if the transmission period of the control channel to which UL resources are allocated is 3 symbols and the time length of the allocated UL resources is 14 symbols, the corresponding UL resources are separated according to 14 symbols which correspond to the time length of the allocated UL resources. A table below shows an example of the method of separating UL resources proposed by the disclosure.

| Example | Transmission period of control channel to which UL resources are allocated | Time length of allocated UL resources | Reference value for UL resource separation | UL resource separation | Transmittable LCH |
|---|---|---|---|---|---|
| 1 | 2 symbols | 2 symbols | 2 symbols | Type A | LCH 1, LCH 2, LCH 3 |
| 2 | 7 symbols | 4 symbols | 7 symbols | Type B | LCH 2, LCH 3 |
| 3 | 7 symbols | 10 symbols | 10 symbols | Type B | LCH 2, LCH 3 |
| 4 | 28 symbols | 14 symbols | 28 symbols | Type C | LCH 3 |

In the above example, type A UL resources are resources in which the reference value for UL resource separation, that is, a larger value between the transmission period of the control channel to which UL resources are allocated and the time length of the allocated UL resources is 1 symbol or 2 symbols. Type B UL resources are resources in which the reference value for UL resource separation is 3 to 14 symbols. Type C UL resources are resources in which the reference value for UL resource separation is larger than 15 symbols. The above description corresponds to only one example. The disclosure includes a method by which the eNB provides the UE with an index of the logical channel which can be transmitted according to the type of UL resources, that is, type A, type B, or type C. In this example, data generated in LCH 1, LCH 2, and LCH 3 may be transmitted through type A UL resources, data generated in LCH 2 and LCH 3 may be transmitted through type B UL resources, and data generated in LCH 3 may be transmitted through type C resources. The UL resource separation and a correlation with the LCH may prevent as much as possible data generated in a particular LCH from being transmitted through UL resources which are not suitable for transmission thereof.

All operations proposed by the disclosure can be performed such as an operation of assigning the ID to each UL resource type separated by the criterion and applying different logical channel priorities to respective IDs to perform the LCP operation. Accordingly, although this document is described mainly on the basis of performance of the LCP operation through the application of different logical channel priorities to respective UL resources separated by the TTI criterion, the LCP operation may be performed through the application of different logical channels to respective UL resources separated by criteria such as subcarrier spacing, a CP a length, modulation/coding method and a coding rate, a number of OFDM symbols, an OFDM symbol length, and a bandwidth of allocated resource blocks. The disclosure has described the operation of assigning IDs to UL resources and applying different logical channel priorities to respective IDs, but the disclosure includes the case in which not only different logical channel priorities but also the same logical channel priority is applied to the respective IDs. The case in which the same logical channel priority is applied to each ID may be included in a special example in which different logical channel priorities are applied to respective IDs.

Further, all operations proposed by the disclosure can be performed such as an operation of assigning IDs to UL resource types separated by two or more criteria among the attributes of the UL resources and applying different logical channel priorities to respective IDs to perform the LCP operation.

For example, the eNB separates UL resources on the basis of the TTI and the subcarrier spacing among various attributes of the UL resources and assigns IDs to respective resource types.

TTI type used by current eNB: 1 ms, 0.5 ms, 0.25 ms
Subcarrier spacing used by current eNB: 15 kHz, 30 kHz, 60 kHz
Separation of UL resources according to TTI and subcarrier spacing

| ID | TTI length | Subcarrier spacing |
|----|------------|--------------------|
| 1  | 1 ms       | 15 kHz             |
| 2  | 1 ms       | 30 kHz             |
| 3  | 1 ms       | 60 kHz             |
| 4  | 0.5 ms     | 15 kHz             |
| 5  | 0.5 ms     | 30 kHz             |
| 6  | 0.5 ms     | 60 kHz             |
| 7  | 0.25 ms    | 15 kHz             |
| 8  | 0.25 ms    | 30 kHz             |
| 9  | 0.25 ms    | 60 kHz             |

As described above, the eNB separates UL resources on the basis of the TTI and the subcarrier spacing and then assigns IDs to respective UL resource types. On the basis thereof, the eNB may configure a correlation between UL resources corresponding to each ID and the logical channel which can be transmitted therethrough. Further, the eNB may configure priorities of the logical channels which can be transmitted through UL resources corresponding to respective IDs. Examples thereof are described below.

TTI type used by current eNB 1 ms, 0.5 ms, 0.25 ms
Subcarrier spacing used by current eNB: 15 kHz, 30 kHz, 60 kHz
Logical channel type allocated to current UE: LCH A, B, C, D
Example of correlation between ID and logical channel and priority of logical channel

| ID | TTI length | Subcarrier spacing | Transmittable LCH type | Priority between transmittable LCHs |
|----|------------|--------------------|------------------------|-------------------------------------|
| 1  | 1 ms       | 15 kHz             | A, B, C                | A > B > C                           |
| 2  | 1 ms       | 30 kHz             |                        |                                     |
| 3  | 1 ms       | 60 kHz             |                        |                                     |
| 4  | 0.5 ms     | 15 kHz             |                        |                                     |
| 5  | 0.5 ms     | 30 kHz             |                        |                                     |
| 6  | 0.5 ms     | 60 kHz             | B, C, D                | D > C > B                           |
| 7  | 0.25 ms    | 15 kHz             |                        |                                     |
| 8  | 0.25 ms    | 30 kHz             |                        |                                     |
| 9  | 0.25 ms    | 60 kHz             |                        |                                     |

According to the above table, logical channels A, B, and C may be transmitted through UL resources having the TTI length of 1 ms and the subcarrier spacing of 15 kHz, 30 kHz, or 60 kHz in which case the priority between the logical channels is A>B>C. Logical channels A, B, and C may be transmitted through UL resources having the TTI length of 0.5 ms and the subcarrier spacing of 15 kHz or 30 kHz in which case the priority between the logical channels is A>B>C. Logical channels B, C, and D may be transmitted through UL resources having the TTI length of 0.5 ms and the subcarrier spacing of 60 kHz in which case the priority between the logical channels is D>C>B. Logical channels B, C, and D may be transmitted through UL resources having the TTI length of 0.25 ms and the subcarrier spacing of 15 kHz, 30 kHz, or 60 kHz in which case the priority between the logical channels is D>C>B.

Another example is described below.

TTI type used by current eNB 1 ms, 0.5 ms, 0.25 ms
Subcarrier spacing used by current eNB 15 kHz, 30 kHz, 60 kHz
Logical channel type allocated to current UE LCH A, B, C, D
Correlation between ID and logical channel and example of priority

| ID | TTI length | Subcarrier spacing | Transmittable LCH type | Priority between transmittable LCHs |
|----|------------|--------------------|------------------------|-------------------------------------|
| 1  | 1 ms       | 15 kHz             | A, B                   | Priority between all LCHs is A > B > C > D → priority between transmittable LCHs is A > B since only A and B can be transmitted |
| 2  | 1 ms       | 30 kHz             |                        | |
| 3  | 1 ms       | 60 kHz             |                        | |
| 4  | 0.5 ms     | 15 kHz             |                        | |
| 5  | 0.5 ms     | 30 kHz             |                        | |
| 6  | 0.5 ms     | 60 kHz             | C, D                   | Priority between all LCHs is A > B > C > D → priority between transmittable LCHs is C > D since only C and D can be transmitted |
| 7  | 0.25 ms    | 15 kHz             |                        | |
| 8  | 0.25 ms    | 30 kHz             |                        | |
| 9  | 0.25 ms    | 60 kHz             |                        | |

According to the above table, logical channels A and B may be transmitted through UL resources having the TTI length of 1 and the subcarrier spacing of 15 kHz, 30 kHz, or 60 kHz in which case the priority between the logical channels is A>B. Logical channels A and B may be transmitted through UL resources having the TTI length of 0.5 ms and the subcarrier spacing of 15 kHz or 30 kHz in which case the priority between the logical channels is A>B. Logical channels C and D may be transmitted through UL resources having the TTI length of 0.5 ms and the subcarrier spacing of 60 kHz in which case the priority between the logical channels is C>D. Logical channels C and D may be transmitted through UL resources having the TTI length of 0.25 ms and the subcarrier spacing of 15 kHz, 30 kHz, or 60 kHz in which case the priority between the logical channels is C>D.

In this example, it is assumed that the priority between all logical channels is configured as A>B>C>D. Accordingly, when logical channels A and B can be transmitted, the priority is configured as A>B on the basis of the priority between all logical channels. When logical channels C and D can be transmitted, the priority is configured as C>D on the basis of the priority between all logical channels.

In the above example, separation of UL resources according to the TTI and the subcarrier spacing, the correlation between UL resources and logical channels, and the priority between logical channels have been described. The disclosure is not limited thereto and includes an operation for separating UL resources according to a random combination of {TTI, subcarrier spacing, CP length, modulation/coding method and coding rate, number of OFDM symbols, OFDM symbol length, bandwidth}, configuring the correlation between UL resources and logical channels, and configuring the priority between logical channels. The content proposed by the disclosure, that is, information required for separation of UL resources according to the TTI, the subcarrier spacing, the CP length, the modulation/coding method and coding rate, the number of OFDM symbols, the OFDM symbol length, and the bandwidth is provided to the UE by the eNB through RRC signaling. More specifically, the information may be transmitted through a LogicalChannelConfig Information Element (IE) providing a parameter related to a particular logical channel and configuration information. For convenience, the type of UL resources through which data generated in a particular logical channel can be transmitted is named a "profile". For example, it is assumed that the type of UL resources through which the corresponding logical channel can be transmitted is identified according to subcarrier spacing, a time length, a cell or a component carrier to which UL resources belong, or whether the UL resources are UL grant-free resources or UL grant-based resources. The time length may be one of the TTI or the number of OFDM symbols included in a predetermined unit, proposed by the disclosure.

Hereinafter, LogicalChannelConfig for a particular logical channel is shown. Here, UL resources through which the particular logical channel can be transmitted and received are specified among the UL resources separated by the subcarrier spacing, the time length, the UL resource allocation scheme, and the cell to which the UL resources belong.

In this example, subcarrier spacing is expressed as "subcarrierSpacing". In this example, the subcarrier spacing may be one of 15 kHz, 30 kHz, 60 kHz, and 120 kHz, but is only one example and may have another value in the disclosure.

In this example, the time length is expressed as "timeParameter". In this example, the time length may be one of 0.125 ms, 0.25 ms, 0.5 ms, and 1 ms, but is only one example and may have another value in the disclosure. The meaning of the time length is described below.

If UL resources having the TTI smaller than "timeParameter" are allocated, the corresponding logical channel may be transmitted and received through the corresponding UL resources.

If UL resources in which the time corresponding to the number of OFDM symbols included in a predetermined unit (for example, allocated UL resources) is shorter than "timeParameter" are allocated, the corresponding logical channel may be transmitted and received through the corresponding UL resources.

Refers to time of a particular TTI

Refers to a particular value of time corresponding to the number of OFDM symbols included in a predetermined unit (for example, allocated UL resources)

In this example, the UL resource allocation scheme is expressed as "ulGrantMode". In this example, the UL resource allocation scheme may be one of "ulGrantBased", "ulGrantFree", and "both". The term "ulGrantBased" means that the corresponding logical channel can be transmitted and received through UL resources allocated through the UL grant-based scheme. "ulGrantFree" means that the corresponding logical channel can be transmitted and received through UL resources allocated through the UL grant-free scheme. "both" means that the corresponding logical channel can be transmitted and received through UL resources allocated through the UL grant-based scheme and the UL grant-free scheme.

In this example, the cell to which UL resources belong is expressed as "allowedCellList". "allowedCellList" corresponds to a list of indexes of serving cells which can be used for transmitting and receiving the corresponding logical channel among the currently used serving cells.

Example 1 below shows the type of resources (the type of UL resources is named a "profile" in this document) through a combination of subcarrier spacing, timeParameter, ulGrantMode, and allowedCellList. Example 2 shows the type of resources through a combination of subcarrier spacing, timeParameter, and ulGrantMode and allowedCellList configured separately therefrom. Example 3 shows the type of resources through a combination of subcarrier spacing and timeParameter, and ulGrantMode and allowedCellList configured separately therefrom. The disclosure allows other types of UL resource type expression methods as well as the examples.

LogicalChannelConfig (Example)

The IE LogicalChannelConfig is used to configure the logical channel parameters.

| LogicalChannelConfig information element |
| --- |
| ```
-- ASN1START
LogicalChannelConfig ::=      SEQUENCE {
    ul-SpecificParameters         SEQUENCE {
        priority                      INTEGER (1..16),
        applicableProfileList         ApplicableProfileList,
        prioritisedBitRate            ENUMERATED {
                                          kBps0, kBps8, kBps16, kBps32, kBps64, kBps128,
                                          kBps256, infinity, kBps512-v1020, kBps1024-v1020,
                                          kBps2048-v1020, spare5, spare4, spare3, spare2,
                                          spare1},
``` |

| LogicalChannelConfig information element |
|---|
| ```
            bucketSizeDuration      ENUMERATED {
                                        ms50, ms100, ms150, ms300, ms500, ms1000, spare2,
                                        spare1},
            logicalChannelGroup     INTEGER (0..3)          OPTIONAL            -- Need
OR
        }   OPTIONAL,                                                           -- Cond
UL
        ...,
    }
ApplicableProfileList ::=   SEQUENCE (SIZE (1..maxApplicableProfile)) OF ApplicableProfile
ApplicableProfile ::=   SEQUENCE {
    subcarrierSpacing       ENUMERATED {khz15, khz30, khz60, khz120, spare1}
    timeParameter           ENUMERATED {ms0dot125, ms0dot25, ms0dot5, ms1, spare1},
    ulGrantMode             ENUMERATED (ulGrantBased, ulGrantFree, both, spare1),
    allowedCellList         AllowedCellList
}
AllowedCellList ::=     SEQUENCE (SIZE(1..maxAllowedCell)) OF ServCellIndex
-- ASN1STOP
``` |

20

LogicalChannelConfig (Example 2)
The IE LogicalChannelConfig is used to configure the logical channel parameters.

| LogicalChannelConfig information element |
|---|
| ```
-- ASN1START
LogicalChannelConfig ::=    SEQUENCE {
    ul-SpecificParameters       SEQUENCE {
        priority                INTEGER (1..16),
        applicableProfileList   ApplicableProfileList,
        allowedCellList         AllowedCellList,
        prioritisedBitRate      ENUMERATED {
                                    kBps0, kBps8, kBps16, kBps32, kBps64, kBps128,
                                    kBps256, infinity, kBps512-v1020, kBps1024-v1020,
                                    kBps2048-v1020, spare5, spare4, spare3, spare2,
                                    spare1},
        bucketSizeDuration      ENUMERATED {
                                    ms50, ms100, ms150, ms300, ms500, ms1000, spare2,
                                    spare1},
        logicalChannelGroup     INTEGER (0..3)          OPTIONAL            -- Need
OR
        }   OPTIONAL,                                                       -- Cond
UL
        ...,
    }
ApplicableProfileList ::=   SEQUENCE (SIZE (1..maxApplicableProfile)) OF ApplicableProfile
ApplicableProfile ::=   SEQUENCE {
    subcarrierSpacing       ENUMERATED {khz15, khz30, khz60, khz120, spare1},
    timeParameter           ENUMERATED {ms0dot125, ms0dot25, ms0dot5, ms1, spare1},
    ulGrantMode             ENUMERATED {ulGrantBased, ulGrantFree, both, spare1}
}
AllowedCellList :=  SEQUENCE (SIZE(1..maxAllowedCell)) OF ServCellIndex
-- ASN1STOP
``` |

LogicalChannelConfig (Example 3)
The IE LogicalChannelConfig is used to configure the logical channel parameters.

| LogicalChannelConfig information element |
|---|
| ```
-- ASN1START
LogicalChannelConfig ::=    SEQUENCE {
    ul-SpecificParameters       SEQUENCE {
        priority                INTEGER (1..16),
        applicableProfileList   ApplicableProfileList,
        ulGrantMode             UlGrantMode,
        allowedCellLisr         AllowedCellList,
        prioritisedBitRate      ENUMERATED {
                                    kBps0, kBps8, kBps16, kBps32, kBps64, kBps128,
                                    kBps256, infinity, kBps512-v1020, kBps1024-v1020,
``` |

| LogicalChannelConfig information element |
| --- |

```
                                            kBps2048-v1020, spare5, spare4, spare3, spare2,
                                            spare1},
            bucketSizeDuration              ENUMRATED {
                                            ms50, ms100, ms150, ms300, ms500, ms1000, spare2,
                                            spare1},
            logicalChannelGroup             INTEGER (0..3)          OPTIONAL          -- Need
OR
       }                 OPTIONAL,                                                    -- Cond
UL
       ...,
}
ApplicableProfileList ::=    SEQUENCE (SIZE (1..maxApplicableProfile)) OF ApplicableProfile
ApplicableProfile ::=        SEQUENCE {
    subcarrierSpacing            ENUMERATED {khz15, khz30, khz60, khz120, spare1},
    timeParameter                ENUMERATED {ms0dot125, ms0dot25, ms0dot5, ms1, spare1}
}
ulGrantMode ::=          ENUMERATED {ulGrantBased, ulGrantFree, both, spare1},
AllowedCellList ::=      SEQUENCE (SIZE(1..maxAllowedCell)) OF ServCellIndex
-- ASN1STOP
```

The above described examples show the case in which characteristics of UL resources through which data generated in a particular logical channel can be transmitted are all included in the LogicalChannelConfig IE. In another example, the LogicalChannelConfig IE may include an identifier of UL resources through which the data generated in the particular logical channel can be transmitted, and attributes of the corresponding UL resources having the corresponding identifier may be written in a separate IE. A more detailed ID form is as follows.

—(a) If the LogicalChannelConfig IE includes only an ID of a profile (including subcarrierSpacing, timeParameter, ulGrantMode, and allowedCellList) and a parameter for configuring the profile ID is transmitted through a separate IE—.

LogicalChannelConfig
The IE LogicalChannelConfig is used to configure the logical channel parameters.

| LogicalChannelConfig information element |
| --- |

```
-- ASN1START
LogicalChannelConfig ::=            SEQUENCE {
    u1-SpecificParameters               SEQUENCE {
        priority                            INTEGER (1..16),
        applicableProfileIdList             ApplicableProfileIdList,
        prioritisedBitRate                  ENUMERATED {
                                                kBps0, kBps8, kBps16, kBps32, kBps64, kBps128,
                                                kBps256, infinity, kBps512-v1020, kBps1024-v1020,
                                                kBps2048-v1020, spare5, spare4, spare3, spare2,
                                                spare1},
        bucketSizeDuration                  ENUMERATED {
                                                ms50, ms100, ms150, ms300, ms500, ms1000, spare2,
                                                spare1},
        logicalChannelGroup                 INTEGER (0..3)          OPTIONAL          -- Need
OR
       }                 OPTIONAL,                                                    -- Cond
UL
       ...,
}
ApplicableProfileIdList ::=     SEQUENCE (SIZE (1...maxApplicableProfile)) OF ApplicableProfileId
-- ASN1STOP
```

| ApplicableProfileId information element |
| --- |
| -- ASN1START<br>ApplicablePrfileId ::=     INTEGER (1..maxApplicableProfileId)<br>-- ASN1STOP |

In the above IE, applicableProfileIdList is a list of applicableProfileIds. The applicableProfileId is simply an integer and a detailed description indicated by the integer is written in an ApplicableProfile IE. In this example, the ApplicableProfile IE includes subcarrierSpacing, timeParameter, ulGrantMode, and allowedCellList.

| ApplicableProfile information element |
| --- |
| ApplicationProfile ::=        SEQUENCE {<br>   applicableProfileId            ApplicableProfileId,<br>   subcarrierSpacing             ENUMERATED {khz15, khz30,<br>                               khz60, khz120, spare1},<br>   timeParameter                 ENUMERATED {ms0dot125,<br>                                 ms0dot25, ms0dot5, ms1, spare1},<br>   ulGrantMode                   ENUMERATED {ulGrantBased,<br>                                 ulGrantFree, both, spare1},<br>   allowedCellList               AllowedCellList<br>}<br>AllowedCellList ::=           SEQUENCE (SIZE (1..maxAllowedCell))<br>                              OF ServCellIndex |

—If the LogicalChannelConfig IE includes an ID of a profile (including subcarrierSpacing, timeParameter, and ulGrantMode) and separate allowedCellList, and a parameter for configuring the profile ID is transmitted through a separate ID—.

LogicalChannelConfig

The IE LogicalChannelConfig is used to configure the logical channel parameters.

| LogicalChannelConfig information element |
| --- |
| -- ASN1START<br>LogicalChannelConfig ::=      SEQUENCE {<br>   ul-SpecificParameters         SEQUENCE {<br>      priority                      INTEGER (1..16),<br>      applicableProfileIdList       ApplicableProfileIdList,<br>      allowedCellList               AllowedCellList,<br>      prioritisedBitRate            ENUMERATED {<br>           kBps0, kBps8, kBps16, kBps32, kBps64, kBps128,<br>           kBps256, infinity, kBps512-v1020, kBps1024-v1020,<br>           kBps2048-v1020, spare5, spare4, spare3, spare2,<br>           spare1},<br>      bucketSizeDuration            ENUMERATED {<br>           ms50, ms100, ms150, ms300, ms500, ms1000, spare2,<br>           spare1},<br>      logicalChannelGroup           INTEGER (0..3)        OPTIONAL        -- Need OR<br>   }        OPTIONAL,                                                    -- Cond UL<br>   ...,<br>}<br>ApplicableProfileIdList ::= SEQUENCE (SIZE (1...maxApplicableProfileId)) OF ApplicableProfileId<br>AllowedCellList ::=     SEQUENCE (SIZE(1..maxAllowedCell)) OF ServCellIndex<br>-- ASN1STOP |

| ApplicableProfileId information element |
| --- |
| -- ASN1START<br>ApplicableProfileId ::=     INTEGER (1..maxApplicableProfileId)<br>-- ASN1STOP |

In the above IE, applicableProfileIdList is a list of applicableProfileIds. The applicableProfileId is simply an integer and a detailed description indicated by the integer is written in an ApplicableProfile IE. In this example, the ApplicableProfile IE includes subcarrierSpacing, timeParameter, and ulGrantMode. AllowedCellList information is included in LogicalChanneConfig separately from ApplicableProfile.

| ApplicableProfile information element |
| --- |
| ApplicationProfile ::= SEQUENCE { <br>    applicableProfileId    ApplicableProfileId, <br>    subcarrierSpacing    ENUMERATED {khz15, khz30, khz60, <br>                                    khz120, spare1}, <br>    timeParameter    ENUMERATED {ms0dot125, ms0dot25, <br>                                    ms0dot5, ms1, spare1}, <br>    ulGrantMode    ENUMERATED {ulGrantBased, ulGrantFree, <br>                                    both, spare1}, <br> } |

—If the LogicalChannelConfig IE includes an ID of a profile (including subcarrierSpacing and timeParameter) and separate ulGrantMode and allowedCellList, and a parameter for configuring the profile ID is transmitted through a separate ID—.

LogicalChannelConfig

The IE LogicalChannelConfig is used to configure the logical channel parameters.

| ApplicableProfile information element |
| --- |
| ApplicationProfile ::= SEQUENCE { <br>    applicalbeProfileId    ApplicableProfileId, <br>    subcarrierSpacing    ENUMERATED {khz15, khz30, khz60, <br>                                    khz120, spare1}, <br>    timeParameter    ENUMERATED {ms0dot125, <br>                                  ms0dot25, ms0dot5, ms1, spare1}, <br> } |

<Operation 11>

In operation 11, a modified method by which the eNB efficiently applies the default priority and the special (for example, TTI-specific) priority to the UE is described. The method is performed as follows.

(1) The eNB provides a plurality of logical channel priorities to the UE. For example, the logical channel priority which the eNB provides to the UE may be optimized for each TTI type currently operated by the eNB. This may be performed through a LogicalChannelConfig IE during RRC signaling.

A. For example, the eNB may configure the priority for TTI type 3 in an order of the logical channel B>C>A.

(2) The eNB provides a plurality of default logical channel priorities to the UE. The default logical channel priority may be a logical channel priority used unless the eNB

| LogicalChannelConfig information element |
| --- |
| ```
-- ASN1START
LogicalChannelConfig ::=      SEQUENCE {
    ul-SpecificParameters     SEQUENCE {
        priority                  INTEGER (1..16),
        applicableProfileIdList   ApplicableProfileIdList,
        ulGrantMode               UlGrantMode,
        allowedCellLiST           AllowedCellList,
        prioritisedBitRate        ENUMERATED {
                                    kBps0, kBps8, kBps16, kBps32, kBps64, kBps128,
                                    kBps256, infinity, kBps512-v1020, kBps1024-v1020,
                                    kBps2048-v1020, spare5, spare4, spare3, spare2,
                                    spare1},
        bucketSizeDuration        ENUMERATED {
                                    ms50, ms100, ms150, ms300, ms500, ms1000, spare2,
                                    spare1},
        logicalChannelGroup       INTEGER (0..3)         OPTIONAL       -- Need
OR
    }                         OPTIONAL,                                 -- Cond
UL
    ...,
}
ApplicableProfileIdList ::= SEQUENCE (SIZE (1...maxApplicableProfileId)) OF ApplicableProfileId
UlGrantMode ::=             ENUMERATED {ulGrantBased, ulGrantFree, both, spare1},
AllowedCellList ::=         SEQUENCE (SIZE(1..maxAllowedCell)) OF ServCellIndex
-- ASN1STOP
``` |

| ApplicableProfileId information element |
| --- |
| ```
-- ASN1START
ApplicableProfileId ::=     INTEGER (1..maxApplicableProfileId)
-- ASN1STOP
``` |

In the above IE, applicableProfileIdList is a list of applicableProfileIds. The applicableProfileId is simply an integer and a detailed description indicated by the integer is written in an ApplicableProfile IE. In this example, the ApplicableProfile IE includes subcarrierSpacing and timeParameter. ulGrantMode information and allowedCellList information are included in LogicalChanneConfig separately from ApplicableProfile.

assigns the special logical channel priority. This may be performed through a LogicalChannelConfig IE during RRC signaling.

A. For example, the eNB may configure the default priority in an order of the logical channel A>B>C.

B. The following LogicalChannelConfig IE shows an example in which the eNB provides the special (TTI-specific) logical channel priority and the default logical channel priority to the UE.

LogicalChannelConfig

The IE LogicalChannelConfig is used to configure the logical channel parameters.

| LogicalChannelConfiginformation element |
| --- |
| ```
-- ASN1START
LogicalChannelConfig ::=        SEQUENCE {
    ul-SpecificParameters       SEQUENCE {
        priority                    SEQUENCE {
            priorityDefault             INTEGER (1..16),    OPTIONAL    -- Need ON
            priorityForTTIType3         INTEGER (1..16),    OPTIONAL    -- Need ON
        }
        prioritisedBitRate          ENUMERATED {
                                        kBps0, kBps8, kBps16, kBps32, kBps64, kBps128,
                                        kBps256, infinity, kBps512-v1020, kBps1024-v1020,
                                        kBps2048-v1020, spare5, spare4, spare3, spare2,
                                        spare1},
        bucketSizeDuration          ENUMERATED {
                                        ms50, ms100, ms150, ms300, ms500, ms1000, spare2,
                                        spare1},
        logicalChannelGroup         INTEGER (0..3)      OPTIONAL    -- Need OR
    }                           OPTIONAL,                           -- Cond UL
    ...,
    [[  logicalChannelSR-Mask-r9    ENUMERATED (setup)  OPTIONAL    -- Cond SRmask
    ]],
    [[  logicalChannelSR-Prohibit-r12   BOOLEAN         OPTIONAL    -- Need ON
    ]]
}
-- ASN1STOP
``` |

| LogicalChannelConfig field descriptions |
| --- |
| bucketSizeDuration
Bucket Size Duration for logical channel prioritization in TS 36.321 [6]. Value in milliseconds. Value ms50 corresponds to 50 ms, ms100 corresponds to 100 ms and so on.
logicalChannelGroup
Mapping of logical channel to logical channel group for BSR reporting in TS 36.321 [6].
logicalChannelSR-Mask
Controlling SR triggering on a logical channel basis when an uplink grant is configured. See TS 36.321 [6].
logicalChannelSR-Prohibit
Value TRUE indicates that the logicalChannelSR-ProhibitTimer is enabled for the logical channel. E-UTRAN only (optionally) configures the field (i.e. indicates value TRUE) if logicalChannelSR-ProhibitTimer is configured. See TS 36.321 [6]
prioritisedBitRate
Prioritized Bit Rate for logical channel prioritization in TS 36.321 [6]. Value in kilobytes/second. Value kBps0 corresponds to 0 kB/second, kBps8 corresponds to 8 kB/second, kBps16 corresponds to 16 kB/second and so on. Infinity is the only applicable value for SRB1 and SRB2
priorityForTTIType
For a given logical channel, indicating logical channel priority for each TTI type.
priorityDefault
For a given logical channel, indicating logical channel priority that can be applied to any UL grant regardless of its TTI or numerology. |

(3) The UE operates as follows in consideration of RRC configuration for logical channels and characteristics (for example, TTI) of UL resources allocated through UL grant.

A. If the UE receives UL resources having the TTI in which the special logical channel priority is configured, the UE performs LCP according to the special logical channel priority configured by the eNB when transmitting data through the corresponding UL grant.

B. If the UE receives UL resources having the TTI in which the special logical channel priority is not configured, the UE performs LCP according to the default logical channel priority configured by the eNB when transmitting data through the corresponding UL grant.

Figure 19:
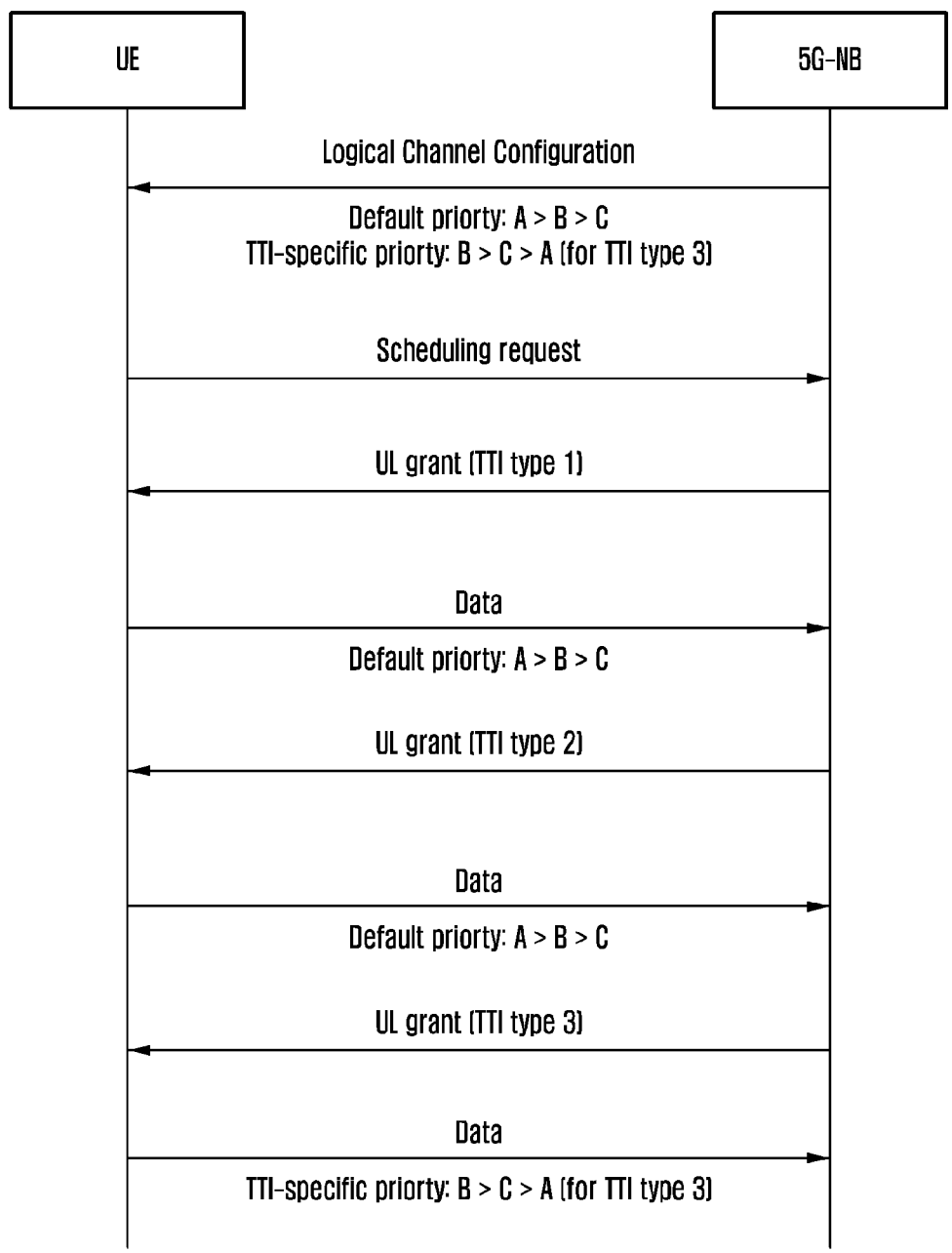
FIG. 19 illustrates a modified method by which the eNB efficiently applies the default priority and the special priority to the UE according to the first embodiment of the disclosure.

FIG. 19 illustrates a modified method by which the eNB efficiently applies the default priority and the special priority to the UE according to the first embodiment of the disclosure. FIG. 19 corresponds to an example of operation 11.

1) The eNB determines that the TTI-specific logical channel priority for TTI type 3 is B>C>A when configuring logical channels A, B, and C used by the UE. The default logical channel priority is configured as A>B>C.

2) The UE transmits a scheduling request signal to the eNB to transmit UL data, and the eNB transmits UL grant including UL resource allocation information to the UE. At this time, the UE operates as follows according to characteristics of UL resources allocated through UL grant, for example, the TTI.

A. If the UE receives UL resources corresponding to TTI type 1, the UE perform LCP according to the default logical channel priority A>B>C when transmitting data through the corresponding UL grant.

B. If the UE receives UL resources corresponding to TTI type 2, the UE perform LCP according to the default logical channel priority A>B>C when transmitting data through the corresponding UL grant.

C. If the UE receives UL resources corresponding to TTI type 3, the UE perform LCP according to the special logical channel priority B>A>C when transmitting data through the corresponding UL grant.

Second Embodiment

The disclosure describes a method of operating the eNB and the UE to achieve Energy Efficiency KPI [1] discussed by 3GPP RAN 5G SI. The corresponding standard defines an efficient energy operation mainly aiming at improvement of power efficiency [bit/J] of the UE and the eNB network up to 1000 times or more in the next ten years. To this end, discussion on controlling an active operation time of the UE starts to remove possibility of additional power consumption according to a necessary beamforming transmission scheme in the mmW operation on a high frequency band.

The technology proposed by the disclosure is a technology related to a method of controlling and maintaining an RRC connection based on three RRC states such as Connected_Active (RRC CONNECTED), Connected_Inactive (RRC INACTIVE), and Idle (RRC IDLE) to be applied to a mobile communication system (5G or NR). The term "Connected_Active" referring to the RRC state means RRC-connected state. The term "Connected_Inactive" means an RRC inactive state, and the term "Idle" means an RRC idle state, and the following description will be made on the basis thereof.

Particularly, a method of determining an RRC state (inactivate and/or active) for transmitting data and a method of supporting a function for improving spectral efficiency and a channel access method by which the UE efficiently transmits traffic in the RRC inactive state will be described.

The RRC state in which a wireless communication UE transmits and receives data has been excessively conservatively designed through design philosophy of previous generation. For example, the UE maintains a standby time (such as connected DRX) in an RRC-connected state even though there is no traffic arrival for a predetermined timer after traffic reception, which causes serious power consumption. Further, a user of a smart phone may frequently receive a keep-alive message generated as data regardless of user QoS, and when an RRC connection therefor is designed on the basis of a voice call service, UE power consumption may be more serious.

Figure 20:
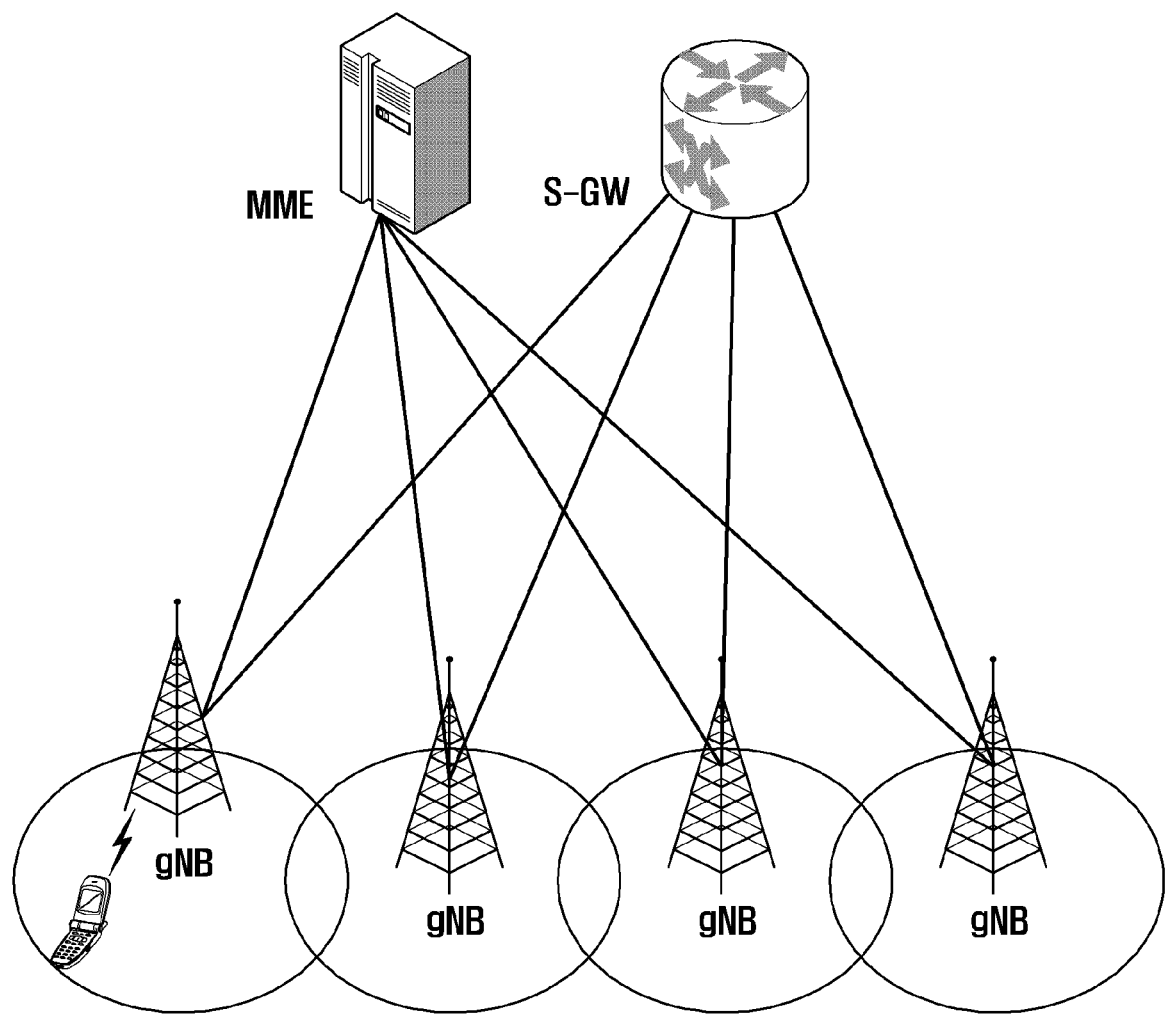
FIG. 20 schematically illustrates the structure of a 5G or NR communication system according to a second embodiment of the disclosure.

Accordingly, a main aspect of the disclosure is to improve the method of determining the RRC state (inactive and/or active state) for transmitting data and improve spectral efficiency and the channel access method to allow the UE to efficiently transmit traffic in the RRC inactive state. FIG. 20 schematically illustrates a structure of a 5G (or NR) communication system according to the second embodiment of the disclosure.

Referring to FIG. 20, the 5G (or NR) communication system may include a gNB, a mobility management entity (MME), and a serving gateway (S-GW).

The gNB is a 5G (or NR) communication system eNB, is connected to the UE through a wireless channel, and may play a more complex role than the conventional (UMTS) NodeB and eNodeB in LTE.

The gNB may collectively schedule status information such as buffer statuses, available transmission power statuses, and channel statuses of UEs when all user traffic including a real-time service such as a voice over IP (VoIP) through an Internet protocol is served through a shared channel in a mobile communication system. One gNB generally controls a plurality of cells.

The S-GW is a device for providing a data bearer, and generates or removes the data bearer under a control of the MME. The MME is a device for performing not only a function of managing mobility of the UE but also various control functions and is connected to a plurality of eNBs.

Figure 21:
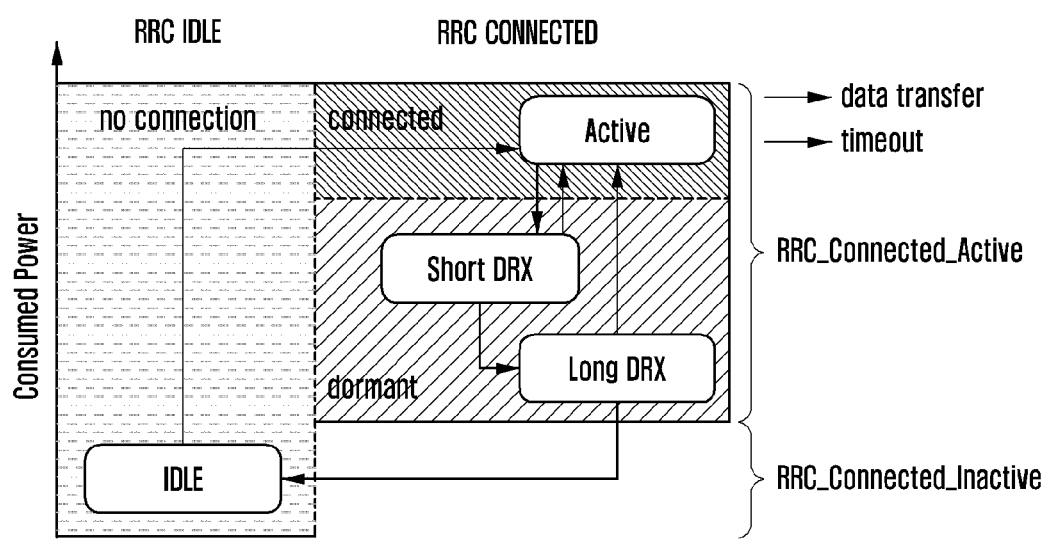
FIG. 21 illustrates an operation example of Connected_Active (RRC_CONNECTED), Connected_Inactive, and Idle which are three RRC states applied to the 5G or NR communication system according to a second embodiment of the disclosure.

FIG. 21 illustrates operations of Connected_Active (RRC_CONNECTED), Connected_Inactive, and (RRC_INACTIVE), Idle(RRC_IDLE) which are three RRC states applied to the 5G or NR communication system according to the second embodiment of the disclosure.

As illustrated in FIG. 21, 3GPP NR adds the inactive state to the two conventional RRC states to operate three RRC states, and the UE determines to operate in one RRC state at one time.

Figure 22:
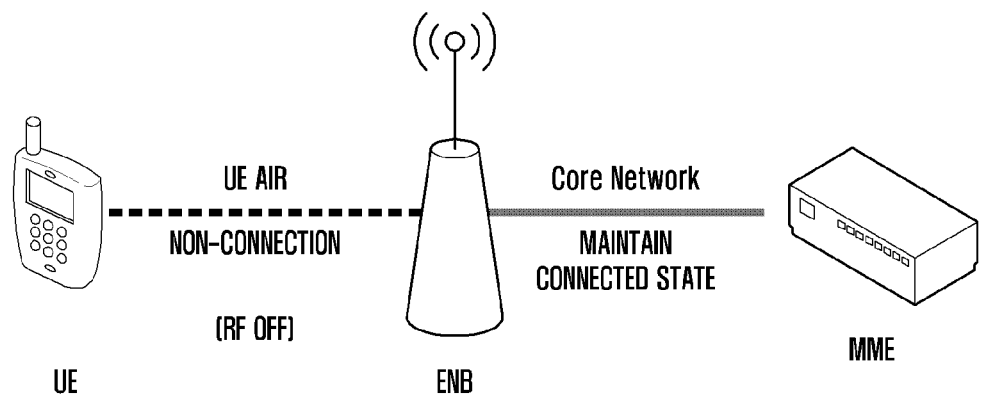
FIG. 22 illustrates an example of states of a UE in an inactive state, an eNB, and an MME in a 5G or NR communication system according the second embodiment of the disclosure.

FIG. 22 illustrates an example of states of a UE in an inactive state, an eNB, and an MME in a 5G or NR communication system according the second embodiment of the disclosure.

The inactive state which is a new RRC state in which it is assumed that an air interface between the UE and the eNB is a non-connected state but the eNB and a core network of the MME maintain a connected state, and the eNB and the MME is in an ECM-connected state and store UE context even though the UE releases an RRC_Connected_Active (RRC_CONNECTED) state with the eNB.

Figure 23:
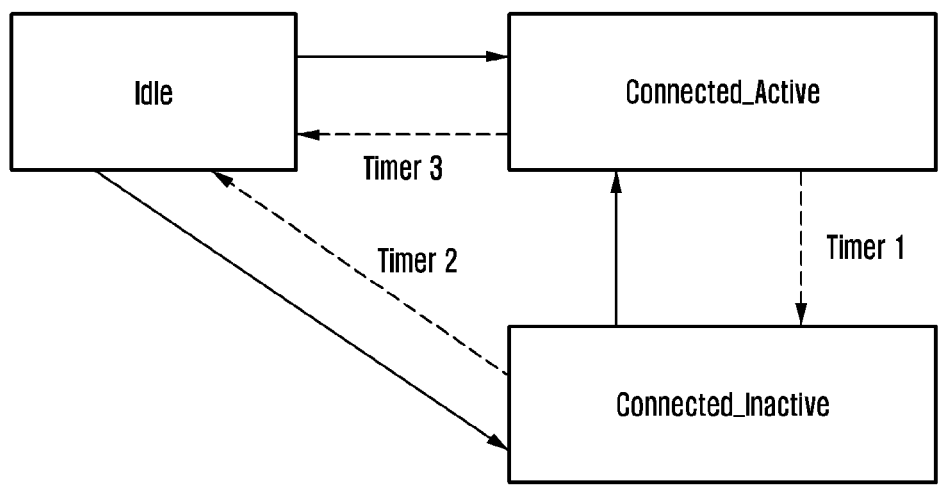
FIG. 23 illustrates an example in which state transition between the RRC states (idle, Connected_Active (or RRC_CONNECTED) and Connected_Inactive (or RRC_INACTIVE)) according to the second embodiment of the disclosure.

FIG. 23 illustrates an example in which state transition between the RRC states (idle, Connected_Active (RRC_CONNECTED) and Connected_Inactive(RRC_INACTIVE)) according to the second embodiment of the disclosure.

Compared to the transition operation between the two conventional RRC states in LTE, such as Idle⇔Connected_Active (RRC_CONNECTED), the transition operation between three RRC states in 5G NR is performed through option 1) Idle(RRC_IDLE)⇔Connected_Inactive (RRC_INACTIVE)⇔Connected_Active (RRC_CONNECTED) and an embodiment of the operation may be implemented according to the occurrence of a corresponding event below.

① Initial connection: Idle→Connected_Active (RRC_CONNECTED),

② Traffic timer expiration: Connected_Active (RRC_CONNECTED)→Connected_Inactive(RRC_INACTIVE), ③ Traffic arrival: Connected_Inactive(RRC_INACTIVE)→Connected_Active(RRC_CONNECTED), ④ UE power off: no coverage: Connected_Inactive (RRC_INACTIVE) or Connected_Active (RRC_CONNECTED)→Idle The case in which the state transition between RRC_Connected and RRC_Inactive, the state transition between RRC_Connected and RRC_Idle, and the state transition between RRC_Inactive and RRC_Idle are all supported is illustrated as an example of the transition operation between three RRC states.

When all of the state transition between RRC_Connected and RRC_Inactive, the state transition between RRC_Connected and RRC_Idle, and the state transition between RRC_Inactive and RRC_Idle are supported, an event-based operation for the RRC state transition will be described below according to an embodiment.

① operation in which the UE transitions from the RRC_Idle state to the RRC_Connected state in initial connection, ② operation in which the UE transitions from the RRC_Connected state to the RRC_Inactive state if an event corresponding to expiration of a reference timer (UE inactivity timer inactive) based on the last arriving traffic is generated, ③ when new traffic arrives, operation in which the UE transitions from the RRC_Inactive state to the RRC_Connected state if the state of the UE is RRC_Inactive at the time point and from the RRC_Idle state to the RRC_Connected state if the state of the UE is RRC_Idle at the time point, ④ when the UE is turned off or is not included in eNB cell coverage of the corresponding service, operation in which the UE transitions from the RRC_Connected state to the RRC_Idle state if the state of the UE is RRC_Connected at the time point or from the RRC_Inactive state to the RRC_Idle state if the state of the UE is RRC_Inactive state at the time point.

The transition operation between RRC states may be performed through option 2) Idle⇔Connected_Active and Connected_Inactive⇔Connected_Active without Idle⇔Connected_Inactive, and an embodiment of the operation may be implemented according to occurrence of a corresponding event.

① Initial connection: Idle→Connected_Active,
② Traffic timer expiration: Connected_Active→Connected_Inactive,
③ Traffic arrival: Connected_Inactive→Connected_Active,
④ UE power off: no coverage: Connected_Active→Idle, Connected_Inactive→Connected Active→Idle In other words, the case in which the state transition between RRC_Connected and RRC_Inactive and the state transition between RRC_Connected and RRC_Idle are supported but the direct state transition between RRC_Inactive and RRC_Idle is not supported and is supported via RRC_Connected is described as an example of the transition operation between three RRC states.

① operation in which the UE transitions from the RRC_Idle state to the RRC_Connected state in initial connection, ② operation in which the UE transitions from the RRC_Connected state to the RRC_Inactive state if an event corresponding to expiration of a reference timer (UE inactivity timer inactive) based on the last arriving traffic, ③ when new traffic arrives, operation in which the UE transitions from the RRC_Inactive state to the RRC_Connected state if the state of the UE is RRC_Inactive at the time point and from the RRC_Idle state to the RRC_Connected state if the state of the UE is RRC_Idle at the time point, ④ when the UE is turned off or is not included in eNB cell coverage of the corresponding service, operation in which the UE transitions from the RRC_Connected state to the RRC_Idle state if the state of the UE is RRC_Connected at the time point or transitions from the RRC_Inactive state to the RRC_Connected state and then to the RRC_Idle state if the UE is RRC_Inactive state at the time point.

The transition operation between RRC states may be performed through option 3) transition between only two states such as Connected_Inactive⇔Connected_Active and an embodiment of the operation may be implemented according to occurrence of a corresponding event.

(1) Initial connection: Connected_Inactive→Connected_Active
(2) Traffic timer expiration: Connected_Active→Connected_Inactive
(3) Traffic arrival: Connected_Inactive→Connected_Active (4) UE power off: no coverage: Connected_Active→Connected_Inactive The case in which only the state transition between RRC_Connected and RRC_Inactive is supported but the state transition between RRC_Connected and RRC_Idle and the state transition between RRC_Inactive and RRC_Idle are restrictively supported since there is no transition to RRC_Idle is illustrated as an example of the transition operation between three RRC states.

① operation in which the UE transitions from the RRC_Inactive state to the RRC_Connected state in initial connection, and at this time stored UE context is not UE-specific information but is commonly configured as shared information by a network supporting the corresponding service, ② operation in which the UE transitions from the RRC_Connected state to the RRC_Inactive state if an event corresponding to expiration of a reference timer (UE inactivity timer inactive) based on the last arriving traffic, ③ operation in which the UE transitions from the RRC_Inactive state to the RRC_Connected state or from the RRC_Idle state to the RRC_Connected state when new traffic arrives, ④ when the UE is turned off or is not included in eNB cell coverage of the corresponding service, operation in which the UE transitions from the RRC_Connected state to the RRC_Inactive state if the state of the UE is RRC_Connected at the time point and transitions from the RRC_Inactive state (in which UE-specific UE context is stored) to the RRC_Inactive state (network common UE context is stored) if the state is RRC_Inactive.

Modes in which the UE transmits data in the operation for the state transition between the RRC states (idle, Connected_Active, and Connected_Inactive) illustrated in FIG. 23 include three modes described below.

Mode 1) transmit data in the inactive state (FIGS. 24 to 26 and FIG. 30)
Mode 2) transmit data after the state transition from inactive to active (FIG. 28)
Mode 3) start data transmission in the inactive state and additionally transmit data after transition to the active state (FIGS. 27, 29, 31, and 32)

An embodiment below in which the eNB configures/transmits RRC state types to be applied to each UE and a transition (event trigger) method determined by the eNB to each UE is included.

1) a method of performing configuration through an RRC configuration message when initially configuring a UE link (in link setup or transition to RRC_Connected (configuring RRC states to be applied to the corresponding UE and a transition event rule), 2) a method of performing configuration through an RRC reconfiguration message when detecting a change in a reference for applying RRC states at a predetermined time point (configuring RRC states to be applied to the corresponding UE and a transition event rule), 3) a method of performing configuration through an RRC release message when releasing the RRC connection (configuring RRC states to be applied to the corresponding UE and a transition event rule).

FIGS. 24 to 26 and FIG. 30 schematically illustrate a data transmission operation in the inactive state corresponding to mode 1) in an NR system according to embodiments of the disclosure.

An operation in which the UE transmits data directly in the inactive state has advantages in that there is no delay due to transition from the inactive state to the RRC active state, no control signaling is required, and there is no standby time in the active state, but has disadvantages in that channel access efficiency decreases due to grant-free transmission and transmission spectral efficiency decreases due to absence of information such as CQI and BSR.

The conventional data transmission in the idle state has disadvantages in that channel access efficiency decreases due to grant-free transmission and transmission spectral efficiency decreases due to absence of information such as CQI and BSR, but a method of designing the UE operation in the inactive state newly defined additionally proposes a method of improving spectral efficiency and channel access to allow the UE to efficiently transmit traffic in the RRC inactive state with reference to FIGS. 31 to 34.

Figure 24:
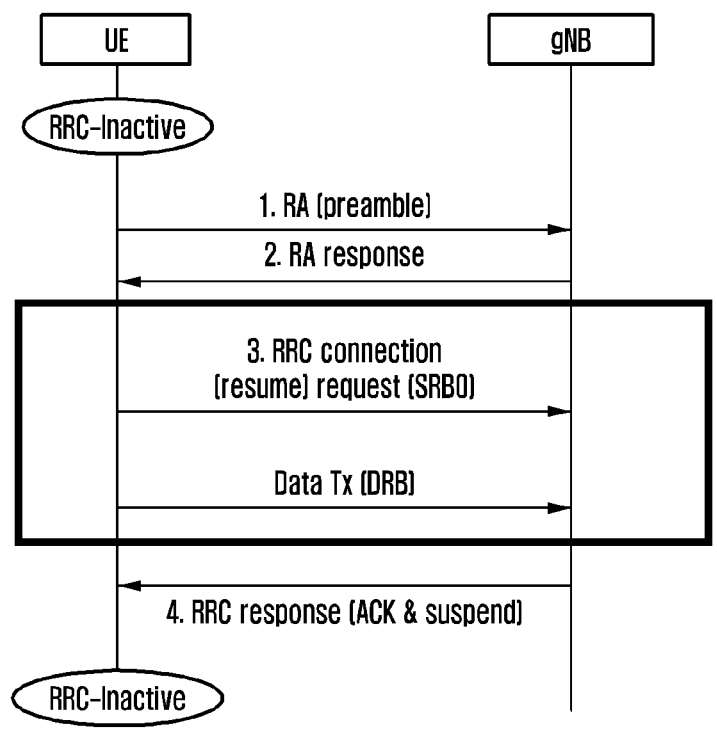
FIG. 24 schematically illustrates a data transmission operation in the inactive state in the NR system according to the second embodiment of the disclosure and is an operation for adding data into a Message3 RRC connection (resume) request and transmitting the Message3 RRC connection (resume) request during the RACH procedure.

FIGS. 24 to 26 and FIG. 30 illustrate a method of transmitting data through piggyback on RACH signaling which is a control message during an RACH procedure of the UE in the inactive state in the data transmission operation performed in the inactive state corresponding to "mode 1)" in the NR system according to the second embodiment of the disclosure. FIG. 24 schematically illustrates a data transmission operation in the inactive state in the NR system according to the second embodiment of the disclosure and is an example in which the UE inserts data into Message3 RRC connection (resume) request to transmit the data during the RACH procedure.

Figure 25:
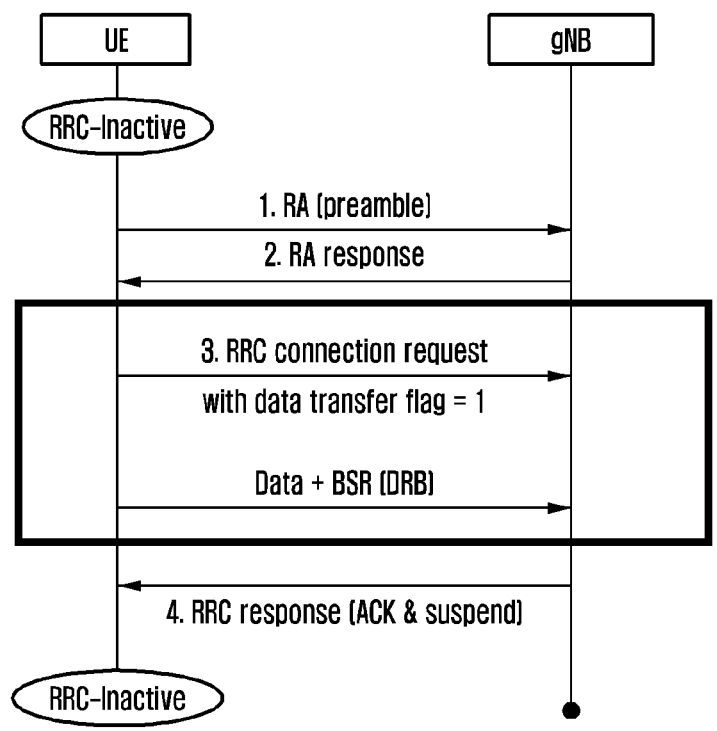
FIG. 25 schematically illustrates a data transmission operation in the inactive state in the NR system according to the second embodiment of the disclosure.

FIG. 25 schematically illustrates a data transmission operation in the inactive state in the NR system according to the second embodiment of the disclosure and is an example in which the UE inserts data and BSR information into Message3 RRC connection (resume) request to transmit the data and the BSR information during the RACH procedure.

At this time, information transmitted along with MSG3 is as follows.
   AS ID, that is, UE identity (or UE context identity)
   Establishment (or resume) cause information
   UE's security information (e.g. authentication token)
   Further, a method of inserting the following information into an RRC connection request of MSG3 to transmit the information is described.
   NAS message
   5G CN node selection,
   UE capability of supporting high frequency,
   Method of transmitting, through MSG3, some or all of information including the access category indicating a type of services which can be transmitted through MSG5 is described.

Referring to FIG. 25, the RRC connection (resume) request transmitted by RACH Message3 is transmitted through an SRB and uplink data is transmitted through a DRB, but both of them may be transmitted by one transport block in one transmission through MAC multiplexing. At this time, when data transmission is not completed through MSG3, information required for future transmission may be transmitted to the eNB by transmitting buffer status information (BSR) through MSG3.

Figure 26:
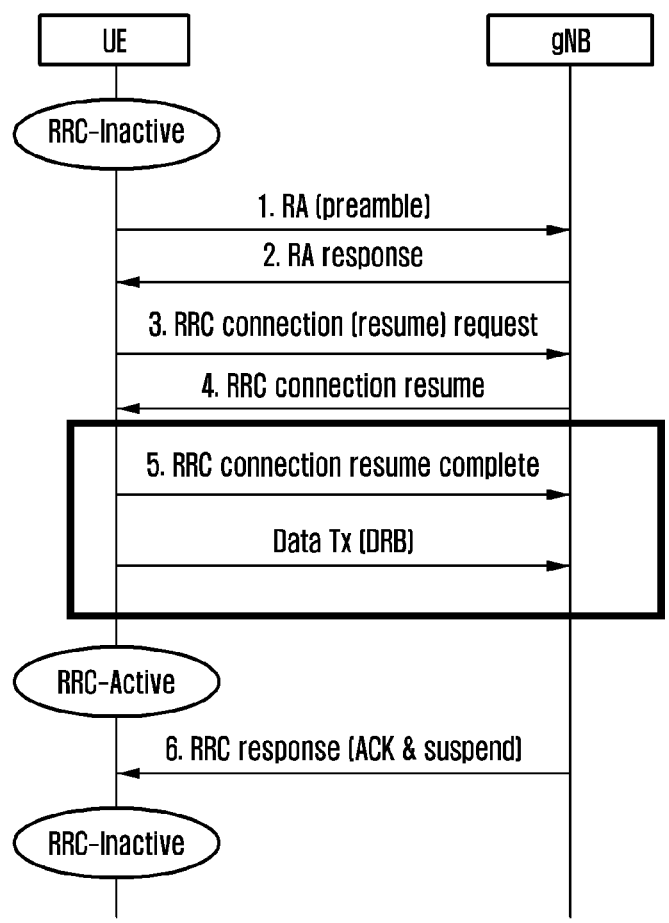
FIG. 26 schematically illustrates a data transmission operation in the inactive state in the NR system according to the second embodiment of the disclosure.

FIG. 26 illustrates an example in which data is inserted into RRC connection (resume) complete and transmitted through Message5 during the RACH procedure.

Figure 27:
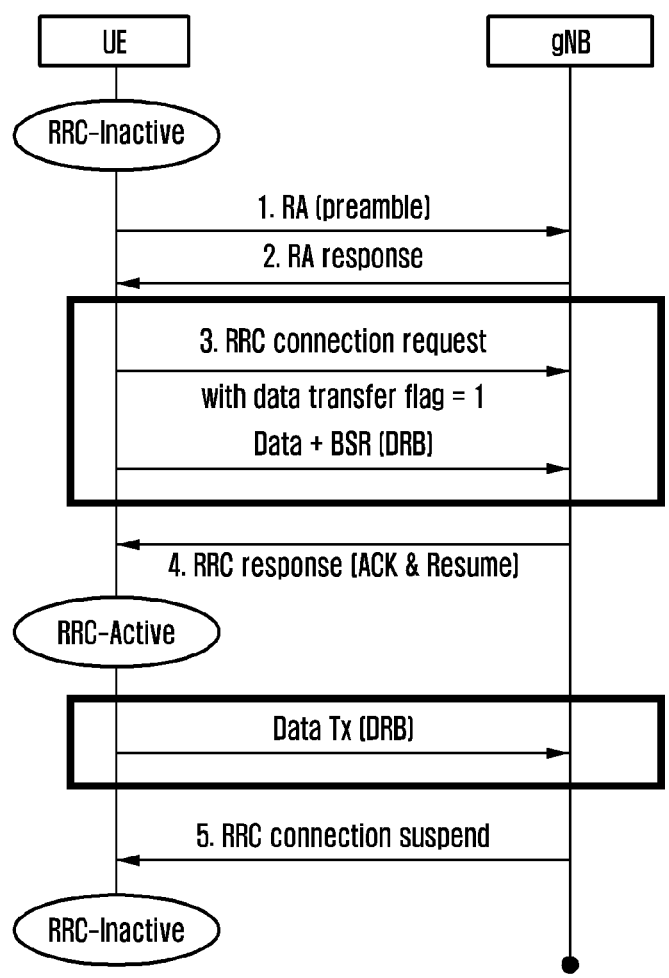
FIG. 27 schematically illustrates a data transmission operation in the inactive state in the NR system according to the second embodiment of the disclosure.

FIG. 27 illustrates a method by which, when data transmission is not completed through MSG3, the UE transmits information required for future transmission to the eNB by transmitting buffer status information (BSR) through MSG3 and the eNB transmits an RRC resume response including ACK information for MSG3 to the UE and transmits the reaming data in the active state after transition to the active state.

Figure 30:
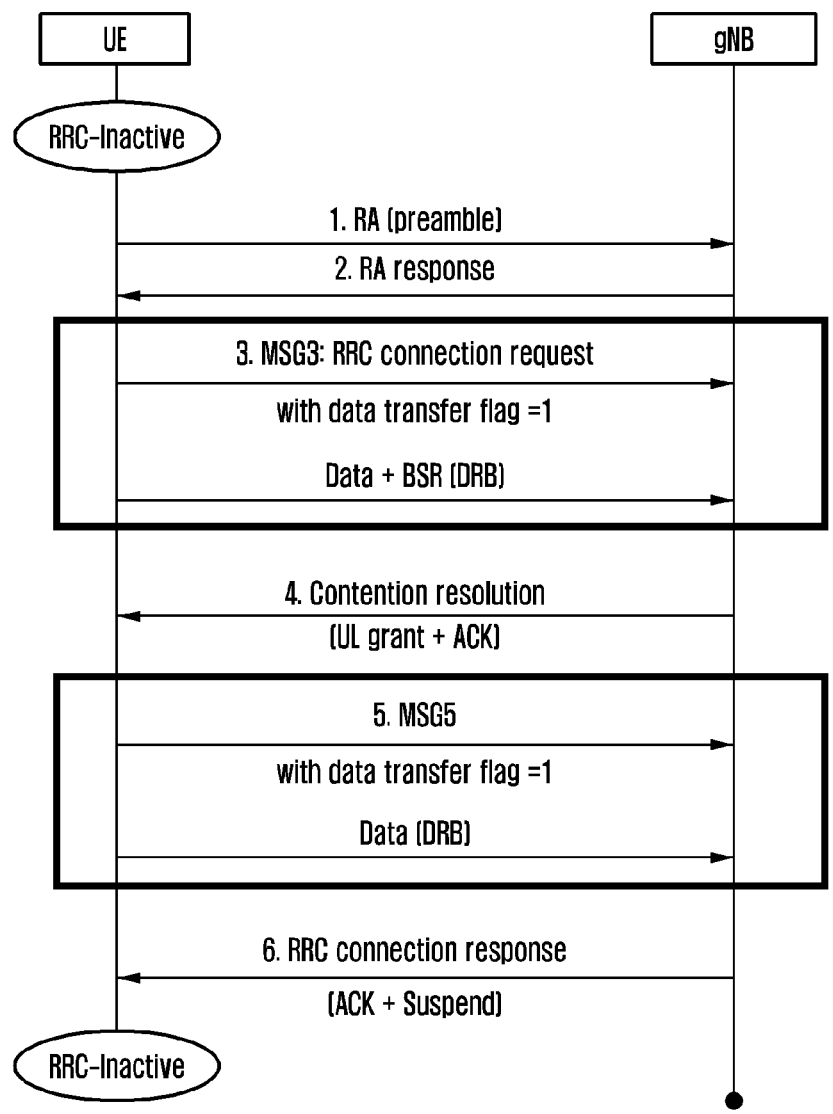
FIG. 30 illustrates an operation for starting data transmission through MSG3 in the inactive state, additionally transmitting data through Message5 RRC connection (resume) complete, and when data transmission is completed, transmitting an RRC connection response (ACK and suspend) to maintain the inactive state in the NR system according to the second embodiment of the disclosure.
Figure 32:
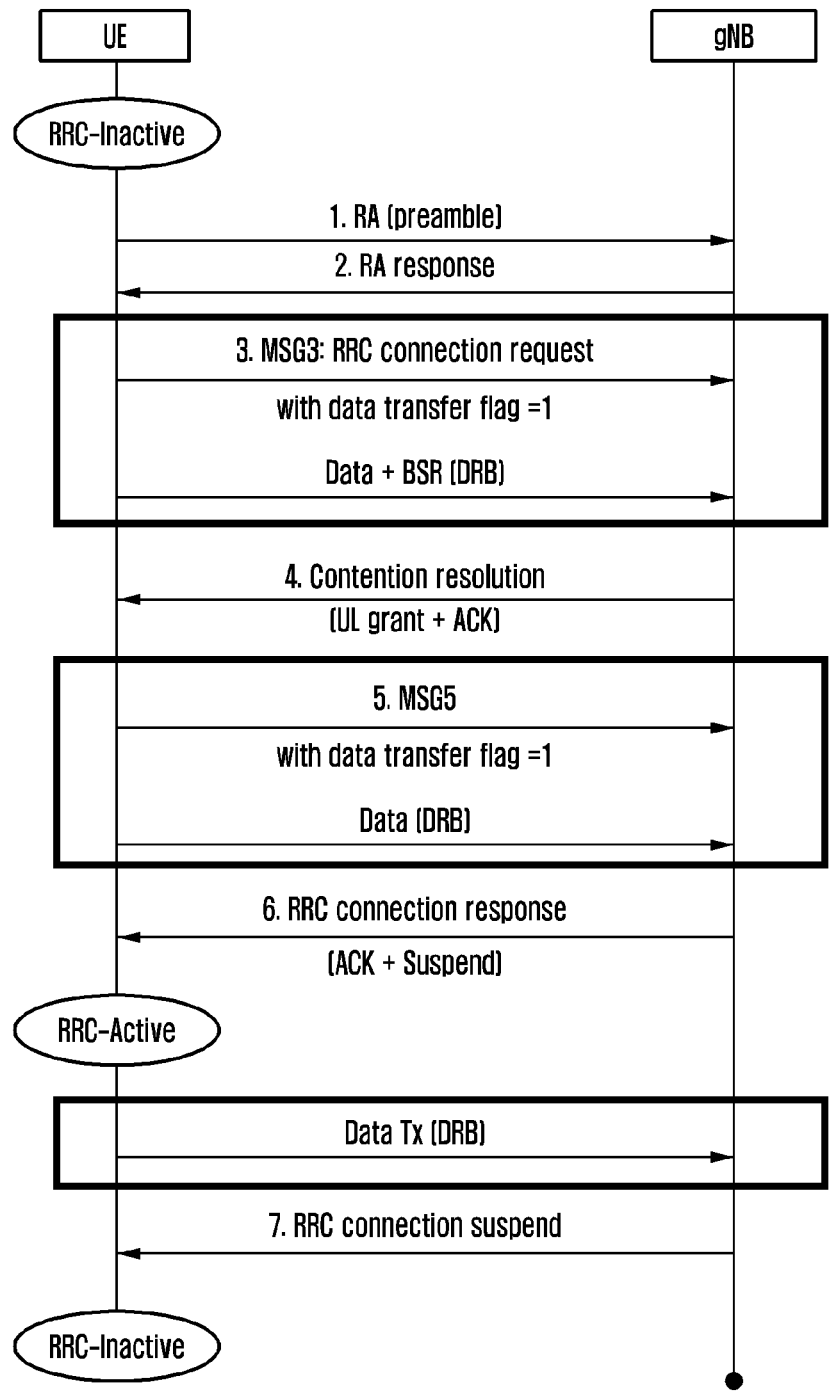
FIG. 32 illustrates an operation of starting data transmission through MSG3 in the inactive state, additionally transmitting data through Message5 RRC connection (resume) complete, transmitting an RRC connection response (ACK and resume) to perform transition to the active state if data transmission is further required, and when data transmission is completed, transmitting an RRC connection suspend message to perform transition to the inactive state in the NR system according to the second embodiment of the disclosure.

As illustrated in FIG. 30, the remaining data after data transmission through MSG3 may be additionally transmitted in the inactive state through MSG5. FIG. 32 illustrates a method by which, if data transmission is not completed through MSG5 and it is determined that transition to the active state is more advantageous (a relevant determination criterion is additionally described in FIG. 35), the eNB transmits an RRC resume response including ACK information for MSG5 to the UE and transmits the remaining data in the active state after transition to the active state.

Compared to the method of inserting data into RACH Message5 to transmit the data in FIG. 26, the method of inserting data into RACH Message3 to transmit the data in FIG. 26 has an effect of decreases in network control burden and delay due to a smaller number of control signaling but also concern of decreases in transmission SE since information which can be used as the RA preamble and the RA response before RACH Message3 is limited.

The UE may provides an indication indicating whether to transmit UL data through corresponding RACH Message 3 while transmitting an RACH preamble which is RACH Message1. At this time, RACH Message1 includes an operation of providing an indication indicating whether to transmit UL data through separated pool of PRACH resources.

For example, there are a method by which the eNB provides configuration to the UE by separating RACH Message 1 preamble according to whether to transmit UL data and the UE operate on the basis thereof, a method by which the eNB provides configuration to the UE by separating RACH Message 1 time according to whether to transmit UL data and the UE operate on the basis thereof, a method by which the eNB provides configuration to the UE by separating RACH Message 1 transmission frequency (for example, a frequency band based on ARFCN) according to whether to transmit UL data and the UE operate on the basis thereof, a method by which the eNB provides configuration to the UE by separating a carrier domain (for example, a subcarrier or a bandwidth part (BWP) from the reference frequency band) of a PRACH frequency transmitting RACH Message 1 according to whether to transmit UL data and the UE operates on the basis thereof, or a method performed on the basis of each or a plurality of combinations thereof.

At this time, a method by which the eNB transmits reference information for partitioning PRACH resources according to whether to transmit UL data to the UE may include each of a combination of a method of configuring reference information for partitioning corresponding PRACH resources through an RRC connection suspend message or an RRC connection release message when releasing the RRC connection and (a method of) broadcasting reference information through system information (SI) transmitted by each target eNB.

In the method by which the eNB transmits reference information for partitioning PRACH resources to the UE according to whether to transmit corresponding UL data, a UL carrier frequency related to uplink information, a UL bandwidth, and IE RadioResourceConfigCommon are broadcasted through SIB2. IE RadioResourceConfigCommon includes a PUSCH including RACH configuration and information for configuring a sounding RS (RSR) transmitted through a PUCCH and uplink. At this time, in order to transmit reference information for portioning PRACH resources according to whether to transmit UL data, an operation for transmitting the reference information by separating PARCH parameters into two sets.

More specifically, for example, when the PRACH preamble is partitioned according to whether to transmit UL data (Early Data Transmission: EDT), the configuration may be performed as shown in a table below.

Further, an operation for partitioning PRACH pool partitioning including timing for PRACH transmission, frequency band, and carrier domain is configured as a separate set (two parameter groups) in the PRACH configuration parameter of SI.

(a method of) broadcasting reference information through system information (SI) transmitted by each target eNB.

Particularly, in the case of NR, due to the generation of high pathloss in the higher frequency band, beamforming is performed. System information is broadcast information which should be transmitted in all beam directions, the payload size lacks if the system information is transmitted through a PBCH. In order to solve the problem, the remaining SI information which has not been carried on the PBCH is broadcasted through a PDCCH or a PDSCH, which refers to Remaining System Information (RMSI).

| RACH-ConfigCommon information element |
|---|
| -- ASN1START |
| RACH-ConfigCommon ::=    SEQUENCE { |
|     preambleInfo                          SEQUENCE { |
|         numberOfRA-Preambles              ENUMERATED { |
|                                               n4, n8, n12, n16, n20, n24, n28, |
|                                               n32, n36, n40, n44, n48, n52, n56, |
|                                               n60, n64}, |
|         PreamblesGroupAConfig             SEQUENCE { |
|             sizeOfRA-PreamblesGroupA      ENUMERATED { |
|                                               n4, n8, n12, n16, n20, n24, n28, |
|                                               n32, n36, n40, n44, n48, n52, n56, |
|                                               n60}, |
|             messageSizeGroupA             ENUMERATED {b56, b144, b208, b256}, |
|             meseagePowerOffsetGroupB      ENUMERATED { |
|                                               minusinfinity, dB0, dB6, dB8, dB10, dB12, |
|                                               dB15, dB18}, |
|             ... |
|         }    OPTIONAL                                                       -- Need OP |
|     }, |
|     EDT indication group                  SEQUENCE { |
|         Preamble Partitioning             ENUMERATED { |
|             EDT enable preamble =(n4, n8, n12, n16, n20, n24, n28) |
|             EDT disable preamble = n32, n36, n40, n44, n48, n52, n56} |
|     } |
| Timing partitioning ENUMERATED { |
|         EDT enable timeing =(t4, t8, t12, t16, t20, t24, t28) |
|         EDT disable timeing = {t32, t36, t40, t44, t48, t52, t56} |
| } |
| Frequency partitioning ENUMERATED { |
|         EDT enable Frequency =(f4, f8, f12, f16, f20, f24, f28) |
|         EDT disable Frequency = {f32, f36, f40, f44, f48, f52, f56} |
| } |
| Carrier domain partitioning ENUMERATED { |
|         EDT enable Carrier domain =(c4, c8, c12, c16, c20, c24, c28) |
|         EDT disable Carrier domain = {c32, c36, c40, c44, c48, c52, c56} |
| } |

According to another embodiment, transmission of system information in the case in which a supplemental uplink frequency (SUL) is supported is described. The SUL technology is a technology additionally supporting UL in a lower frequency band in order to support UL coverage of a higher frequency band of NR in an extended manner. In the case of downlink, a beam gain may be acquired through a larger number of antennas due to higher spatial and power capacity of the eNB and expansion of downlink coverage is possible with higher transmission power. On the other hand, in the case of uplink, since it is difficult to secure wide coverage in a higher frequency band due to a limit on spatial and physical power of the UE, a complement operation is performed with a lower frequency.

When performing initial access, the UE requires a criterion for determining whether to perform the RACH through an SUL band or an NR uplink (UL).

The corresponding information include each or a combination of a method of configuring reference information for partitioning corresponding PRACH resources through an RRC connection suspend message or an RRC connection release message when releasing the RRC connection and That is, uplink configuration information of the RACH for performing initial access by the UE includes an operation for carrying a relevant parameter on the RMSI and broadcasting the RMSI to the eNB (cell).

Particularly, an operation in which the eNB broadcasts, through system information (for example, RMSI), a threshold which is the criterion for determining whether to perform the RACH through the SUL band (lower frequency band) or through NR uplink (UL) within the eNB cell.

The corresponding threshold includes a threshold at a received signal level, and A threshold which is another criterion operates on the basis of congestion of the corresponding uplink path (SUL or NR UL). For example, an operation method based on the number of occurrences of timing backoff or frequencies of occurrences of timing backoff due to the generation of contention during the RACH procedure is included.

A reference of the generation of the contention may be applied to the following situation. When the UE transmits the RACH preamble which is message 1, the UE transmits the RACH preamble with initial transmission power until successfully receiving an RACH response (RAR) from the eNB and transmit the RACH preamble which is RACH message 1 again with increased power transmission on the basis of powerRampingParameters after a predetermined time (pre-configured RAR waiting time).

Further, the reference for selecting the uplink transmission path as SUL transmission or NR UL on the basis of the generation of the contention may be applied to the following situation.

A method of changing the previous uplink transmission path (for example, SUL) to another uplink transmission path (for example, NR UL) through RACH message 4 and applying the changed uplink transmission path to transmit RACH message 5 (RRC connection complete) is included when channel collision is generated by congestion of the uplink transmission path (for example, SUL) in which the RACH preamble is transmitted through RACH message 1 when the RACH response (RAR) is successfully received from the eNB.

An operation of performing the RACH through NR UL if each or a combination of RSRP, RSRQ, and RSSI of the UE is larger than or equal to the threshold which is the corresponding reference, and perform the RACH through the SUL frequency band if the same is equal to or smaller than the threshold.

| SystemInformationBlockType2 information element |
| --- |
| -- ASN1START |
| SystemInformationBlockType2 ::=    SEQUENCE { |
|     ac-BarringInfo                    SEQUENCE { |
|         ac-BarringForEmergency             BOOLEAN, |
|         ac-BarringForMO-Signalling         AC-BarringConfig             OPTIONAL,  -- Need OP |
|         ac-BarringForMO-Data               AC-BarringConfig             OPTIONAL   -- Need OP |
|     }                                                                                OPTIONAL,  -- Need OP |
|     radioResourceConfigCommon         RedioResourceConfigCommonSIB, |
|     ue-TimersAndConstants             UE-TimersAndConstants, |
|     freqInfo                          SEQUENCE { |
|         ul-CarrierFreq                     ARFCN-ValueEUTRA             OPTIONAL,  -- Need OP |
|         ul-Bandwidth                       ENUMERATED {n6, n15, n25, n50, n75, n100}     OPTIONAL,  -- Need OP |
|         additionalSpectrumEmission         AdditionalSpectrumEmission |
|     }, |
| SUL threshold           ENUMERATED { |
|     metric =(RSRP, RSRQ, RSSI, Reserved) |
|     threshold value = {v0, v1, v2, v3, v4, v5, v6, v7} |
| } |

An operation for partitioning separate PRACH parameters for supporting NR UL and SUL into two sets and transmitting the same is included due to difference in frequency band and distance between operating transmitting side and receiving side.

More specifically, for example, the PRACH parameters may be configured according to whether to perform the RACH through the SUL band (lower frequency band) or NR uplink (UL) as shown in a table below.

| RadioResourceConfigCommon information element |
| --- |
| RedioResourceConfigCommenSIB ::=   SEQUENCE { |
|     rach-ConfigCommon                 RACH-ConfigCommon, |
|     bcch-Config                       BCCH-Config, |
|     pcch-Config                       PCCH-Config, |
|     prach-Config                      PRACH-ConfigSIB, |

| RadioResourceConfigCommon information element | | | |
|---|---|---|---|
| pdsch-ConfigCommon | PDSCH-ConfigCommon, | | |
| Pusch-ConfigCommon | PUSCH-ConfigCommon, | | |
| Pucch-ConfigCommon | PUCCH-ConfigCommon, | | |
| soundingRS-UL-ConfigCommon | SoundingRS-UL-ConfigCommon, | | |
| uplinkPowerControlCommon | UplinkPowerControlCommon, | | |
| ul-CyclicPrefixLength | UL-CyclicPrefixLength, | | |
| ..., | | | |
| PRACH parameter set      ENUMERATED { | | | |
|     SUL set =(r1, r8, r12, r16, r20, r24, r28) | | | |
|     NR UL set = {r32, r36, r40, r44, r48, r52, r56} | | | |
| } | | | |
| [[   uplinkPowerControlCommon-v1020 | UplinkPowerControlCommon-v1020 | OPTIONAL | -- Need OR |
| ]], | | | |
| [[   rach-ConfigCommon-v1250 | RACH-ConfigCommon-v1250 | OPTIONAL | -- Need OR |
| ]], | | | |
| [[   Pusch-ConfigCommon-v1270 | PUSCH-ConfigCommon-v1270 | OPTIONAL | -- Need OR |
| ]], | | | |
| [[   bcch-Config-v1310 | BCCH-Config-v1310 | OPTIONAL, | -- Need OR |
|     pcch-Config-v1310 | PCCH-Config-v1310 | OPTIONAL, | -- Need OR |
|     freqHoppingParameters-r13 | FreqHoppingParameters-r13 | OPTIONAL, | -- Need OR |
|     Pdsch-ConfigCommon-v1310 | PDSCH-ConfigCommon-v1310 | OPTIONAL, | -- Need OR |
|     Pusch-ConfigCommon-v1310 | PUSCN-ConfigCommon-v1310 | OPTIONAL, | -- Need OR |
|     prach-ConfigCommon-v1310 | PRACH-ConfigSIB-v1310 | OPTIONAL, | -- Need OR |
|     pucch-ConfigCommon-v1310 | PUCCH-ConfigCommon-v1310 | OPTIONAL | -- Need OR |
| ]], | | | |
| [[   highSpeedConfig-r14 | HighSpeedConfig-r14 | OPTIONAL, | -- Need OR |
|     Prach-Config-v14xy | PRACN-Config-v14xy | OPTIONAL | -- Need OR |
| ]] | | | |
| } | | | |

| RACH-ConfigCommon information element | |
|---|---|
| powerRampingParameters | PowerRampingParameters, |
| ra-SupervisionInfo | SEQUENCE { |
|   preambleTransMax |   PreambleTransMax, |
|   ra-ResponseWindowSize |   ENUMERATED { |
| |     sf2, sf3, sf4, sf5, |
| |     sf6, sf7, sf8, |
| |     sf10}, |
|   mac-ContentionResolutionTimer |   ENUMERATED { |
| |     sf8, sf16, sf24, sf32, |
| |     sf40, sf48, sf56, |
| |     sf64} |
| }, | |
| powerRampingParameters | ENUMERATED { |
|   SUL set =(p4, p8, p12, p16, p20, p24, p28) | |
|   NR UL set = {p32, p36, p40, p44, p48, p52, p56} | |
| } | |

As described above, unlike the method of configuring two independent RACH-ConfigCommon parameter sets for SUL transmission and NR UL transmission, a method of configuring one common RACH-Config-Common parameter set and expanding and designing the parameter with a larger value for compensating for a difference in the pathloss between the SUL frequency band and the NR frequency band is included.

For example, the method of configuring powerRampingParameters includes a method of configuring and applying two independent powerRampingParameters parameter sets for SUL transmission and NR UL transmission, and a method of configuring a common powerRampingParameters parameter set for both the SUL transmission and the NR UL transmission and expanding and configuring the power ramping up value with a larger value for compensating for the difference in the pathloss between the SUL frequency band and the NR frequency band.

When the UE transmits the RACH preamble which is message 1, the UE transmits the RACH preamble with initial transmission power until successfully receiving an RACH response (RAR) from the eNB and transmit the RACH preamble which is RACH message 1 again with increased power transmission on the basis of powerRampingParameters after a predetermined time (pre-configured RAR waiting time).

If the UE successfully receives the RACH response (RAR) from the eNB, the UE transmits an RRC connection request which is RACH MSG3.

A method of determining transmission through SUL or NR UL during a RACH preamble retransmission process includes 1) a method of, when an uplink transmission path according to a threshold configured through RMSI is determined in initial RACH preamble transmission, fixing the uplink transmission path and transmitting the RACH preamble through the corresponding uplink path (SUL or NR UL) until successful reception of an RACH response (RAR) from the eNB;

1-1) a method of, if the uplink path determined in the initial RACH preamble transmission is SUL, continuously attempting (power ramping up) RACH preamble retransmission through SUL until successful repletion of the RACH response (RAR)

1-2) a method of, if the uplink path determined in the initial RACH preamble transmission is UL NR, continuously attempting (power ramping up) RACH preamble retransmission through UL NR until successful repletion of the RACH response (RAR)

2) a method of newly determining and applying an uplink transmission path (SUL or NR UL) according to a threshold configured through RMSI whenever (power ramping up) RACH preamble retransmission successively performed after the initial RACH preamble transmission is attempted 2-1) a method of newly determining and applying an uplink transmission path (SUL or NR UL) according to a threshold configured through RMSI until successful reception of the RACH response (RAR) from the eNB whenever (power ramping up) RACH preamble retransmission is attempted if the uplink path determined in initial RACH preamble transmission is NR UL.

2-2) a method of newly determining and applying an uplink transmission path (SUL or NR UL) according to a threshold configured through RMSI until successful reception of the RACH response (RAR) from the eNB whenever (power ramping up) RACH preamble retransmission is attempted if the uplink path determined in initial RACH preamble transmission is SUL.

preamble transmitted through RACH message 1 when the RACH response (RAR) is successfully received from the eNB;

3) a method of transmitting RACH message 3 through the same uplink transmission path of the RACH preamble transmitted through RACH message 1 when the RACH response (RAR) is successfully received from the eNB and then transmitting RACH message 5 (RRC connection complete) through an uplink transmission path (SUL or NR UL) configured through RRC configuration based on RACH message 4 (RRC connection response);

4) a method of changing the previous uplink transmission path (for example, SUL) to another uplink transmission path (for example, NR UL) through RACH message 4 and applying the changed uplink transmission path to transmit RACH message 5 (RRC connection complete) when channel collision is generated by congestion of the uplink transmission path (for example, SUL) in which the RACH preamble is transmitted through RACH message 1 when the RACH response (RAR) is successfully received from the eNB;

At this time, in the case of SUL, only the uplink is supported and there are no downlink and downlink reference signaling, so that the pathloss of SUL should be compensated for on the basis of reference signaling transmitted through NR downlink. To this end, a method by which the eNB broadcasts the pathloss difference between the SUL frequency band and the NR frequency band is included.

```
                          SystemInformationBlockType2 information element
-- ASN1START
SystemInformationBlockType2 ::=        SEQUENCE {
     ac-BarringInfo                       SEQUENCE {
          ac-BarringForEmergency                BOOLEAN,
          ac-BarringForMO-Signalling            AC-BarringConfig            OPTIONAL,    -- Need
OP
          ac-BarringForMO-Data                  AC-BarringConfig            OPTIONAL     -- Need
OP
     }                                                                      OPTIONAL,    -- Need
OP
     radioResourceConfigCommon           RadioResourceConfigCommonSIB,
     ue-TimersAndConstants               UE-TimersAndConstants,
     freqInfo                            SEQUENCE {
          ul-CarrierFreq                       ARFCN-ValueEUTRA             OPTIONAL,    -- Need
OP
          ul-Bandwidth                         ENUMERATED {n6, n15, n25, n50, n75, n100}
                                                                            OPTIONAL,    -- Need
OP
          additionalSpectrumEmission           AdditionalSpectrumEmission
     },
SUL NR Pathloss difference              ENUMERATED {
          reference type =(SS, CSI-RS,DMRS, TRS)
          pathloss diff value = {v0, v1, v2, v3, v4, v5, v6, v7}
     }
```

A method of determining transmission through SUL or NR UL during the RACH procedure for initial access according to another embodiment includes 1) a method of transmitting an RRC connection request, an RRC connection resume request, or an RRC resume request transmitted through RACH message 3 through the same uplink transmission path (SUL or NR UL) of the RACH preamble transmitted through RACH message 1 when the RACH response (RAR) is successfully received from the eNB;

2) a method of transmitting RACH message 3 and RACH message 5 (RRC connection complete) through the same uplink transmission path (SUL or NR UL) of the RACH Here, reference signaling which is the criterion includes a sync signal (SS), a channel state information reference signal (CSI-RS), a demodulation RS (DMRS), and a tracking RS (TRS).

The method by which the eNB broadcasts the pathloss difference between the SUL frequency band and the NR frequency band to the UE includes a method of broadcasting different values according to the type of reference signaling which is the criterion and a method of transmitting a pathloss difference value of a single RS or a limited number of pathloss difference values for some RSs (between the SUL frequency band and the NR frequency band).

The UE includes an operation for controlling transmission power of the RACH preamble on the basis of the received number of path loss difference values (between the SUL frequency band and the NR frequency band).

Alternatively, the UE includes an operation for calculating a power headroom (PH) value of SUL on the basis of a compensation value for the pathloss corresponding to the RS in NR DL and transmitting a power headroom report (PHR) when calculating the PH for uplink data transmission in the RRC_CONNECTED state.

Figure 43:
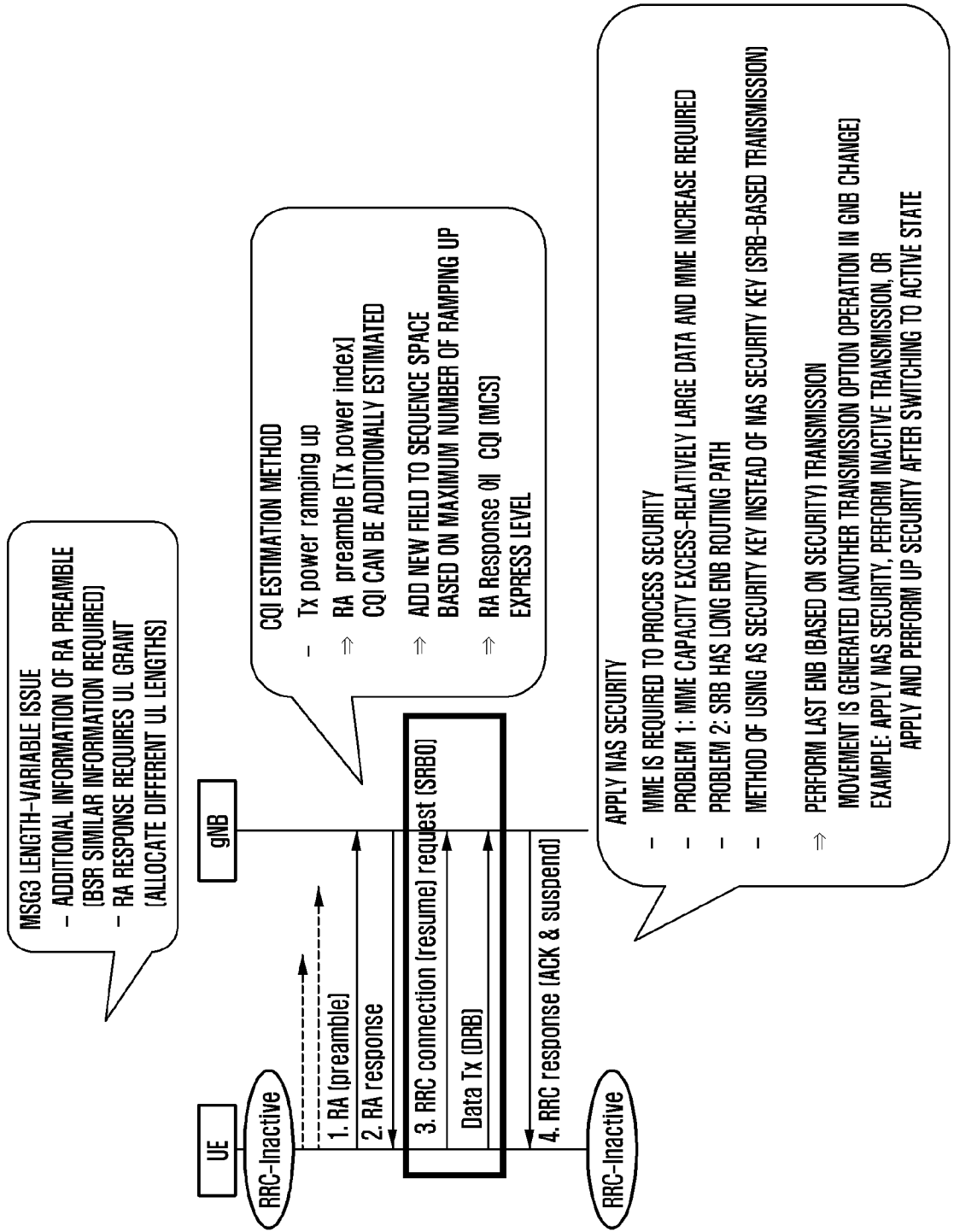
FIG. 43 illustrates an example of an information acquisition method for improving spectral efficiency in the case in which efficient transmission is performed in the NR RRC inactive state according to the second embodiment of the disclosure.
Figure 44:
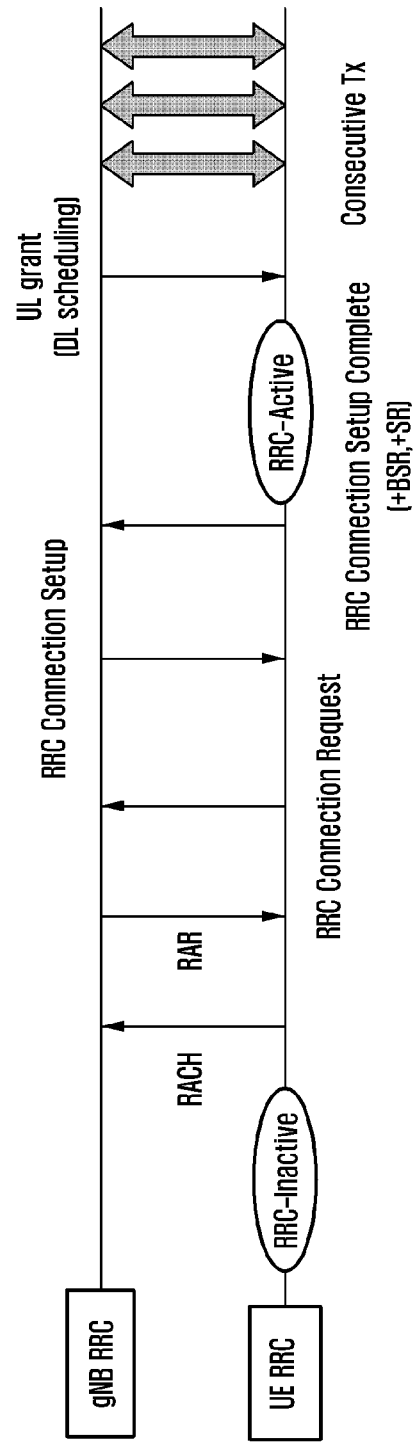
FIG. 44 illustrates an example of an information acquisition method for improving channel access in the case in which efficient transmission is performed in the NR RRC inactive state according to the second embodiment of the disclosure.
Figure 45:
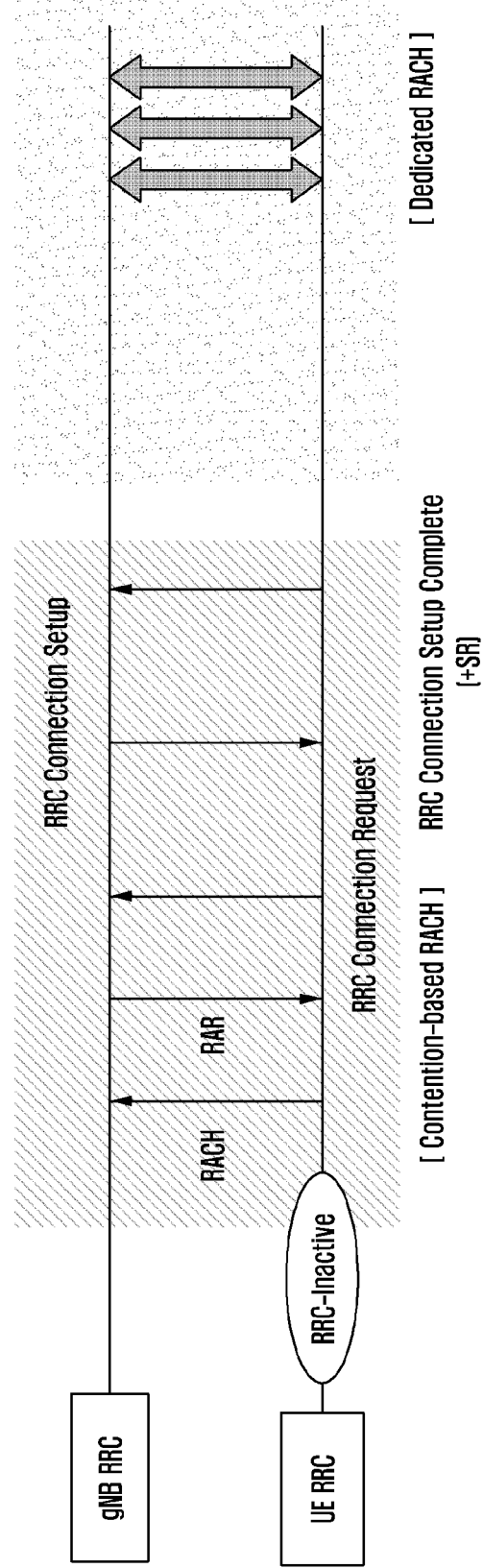
FIG. 45 illustrates an example of a method of improving channel access in the case in which efficient transmission is performed in the NR RRC inactive state according to the second embodiment of the disclosure.

FIGS. 43 to 45 additionally propose the method of improving spectral efficiency and channel accesses when the inactive state UE transmits traffic.

After data transmission, both RACH Message 3 of FIG. 24 and RACH Message 5 of FIG. 26 transmit ACK of the corresponding data and information on whether to perform RRC state transition as an RRC response. At this time, if the RRC response is suspend, the inactive state is maintained. If the RRC response is resume, the UE transitions to the active state and transmit data.

Figure 28:
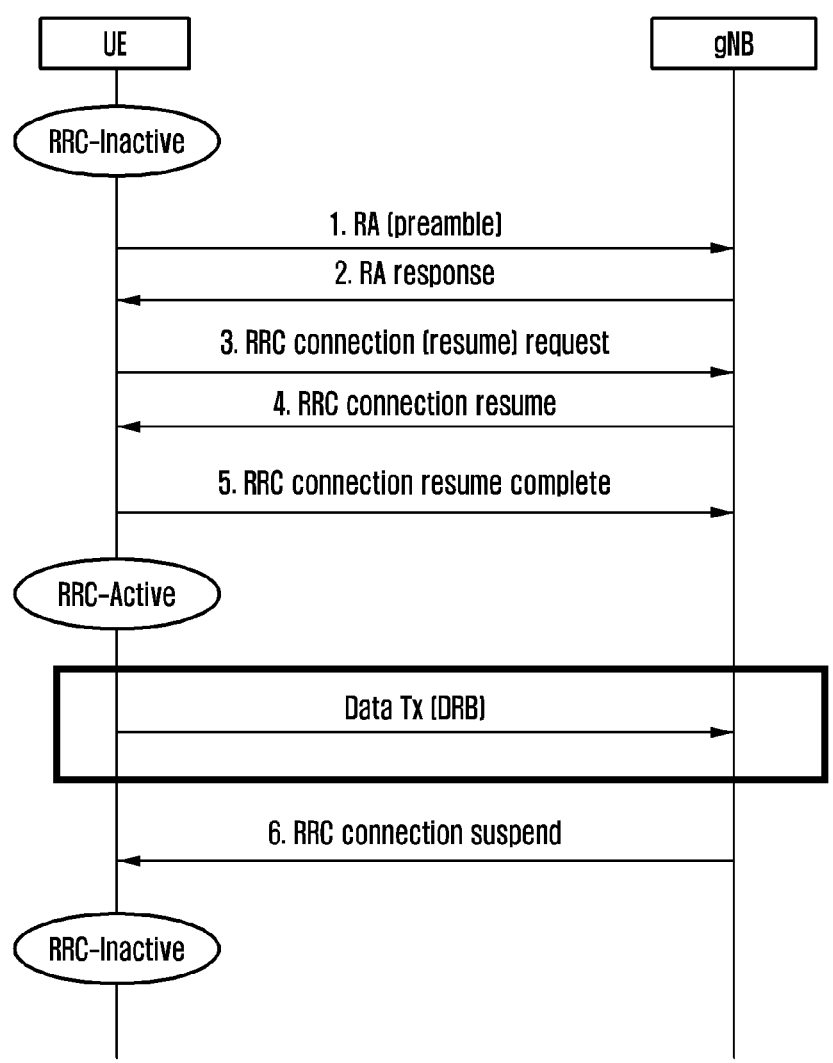
FIG. 28 schematically illustrates a data transmission operation after state transition from the inactive state to the active state in the NR system according to the second embodiment of the disclosure.

FIG. 28 schematically illustrates a data transmission operation after state transition from the inactive sate to the active state corresponding to "mode 2) in the NR system according to the second embodiment of the disclosure.

An operation of starting data transmission after transition to the active state has a delay due to transition of the UE from the inactive state to the RRC active (RRC CONNECTED) state and has control signaling burden and also has UE power consumption due to a standby time in the active (RRC CONNECTED) state.

However, the operation of starting data transmission after transition to the active state (RRC CONNECTED state) may increase channel access efficiency by granted transmission in the active (RRC CONNECTED) state and improve transmission spectral efficiency through the use of information such as CAI and BSR.

The data transmission operation after the state transition from the inactive (RRC INACTIVE) state to the active (RRC CONNECTED) state corresponding to "mode 2)" of FIG. 28 is similar to the conventional LTE operation in that data is transmitted after transition to the active state but has an effect of reducing a signaling device between core (gNB-MME) networks and the number of signaling through UE text stored in the RRC configuration process in which the control signal transmitted through the RACH is the RRC connection (resume) request. Further, after data transmission, the UE may rapidly transition to the inactive state which is a low power mode through 6. RRC connection suspend message.

FIGS. 27, 29, 31, and 32 schematically illustrate the operation for starting data transmission in the active state and then transmitting data after transition to the active state corresponding to "mode 3)" in the NR system according to an embodiment of the disclosure.

The operation is a scheme for transmitting data in the hybrid form of "mode 1)" and "mode 2)" in which it is possible to reduce an initial transmission delay of data by removing the delay due to the transition of the UE from the inactive state to the RRC active state and control signal burden and also to increase channel access efficiency by future granted data transmission and improve transmission spectral efficiency through the use of information such as CQI and BSR.

Figure 29:
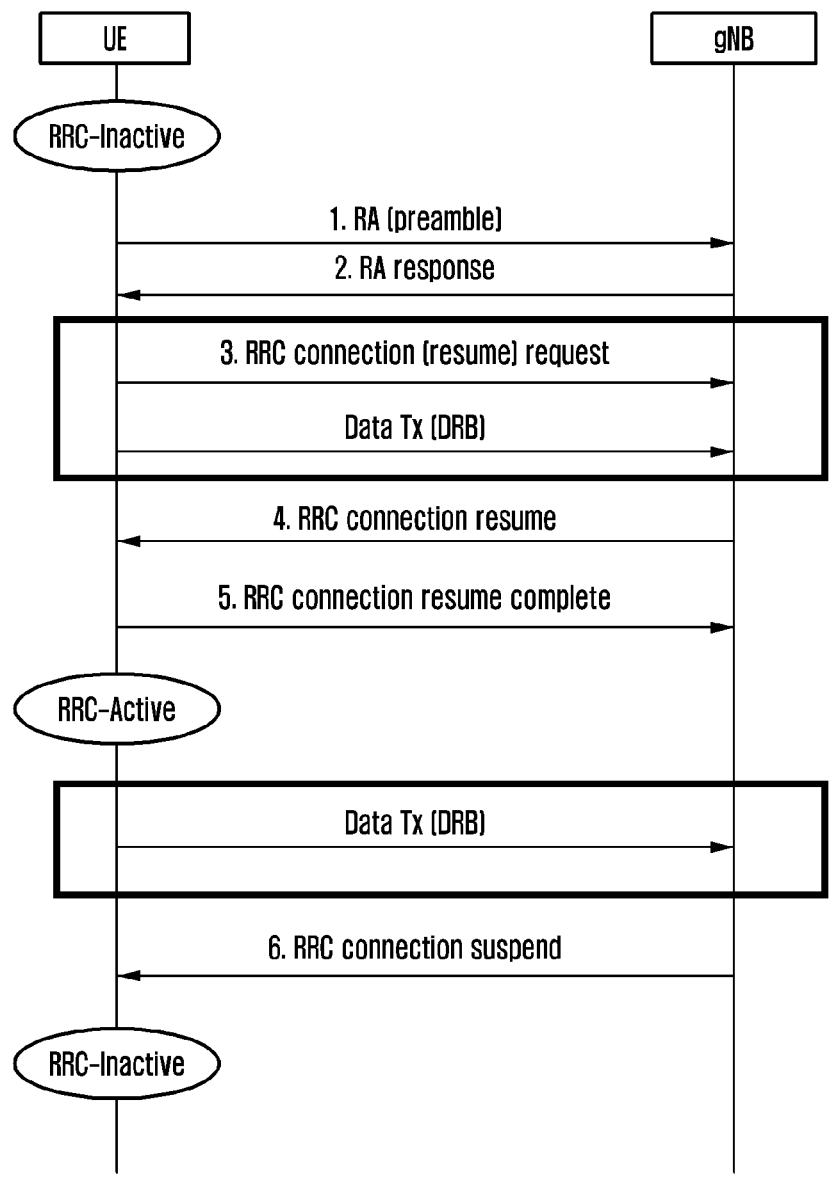
FIG. 29 schematically illustrates an operation for starting data transmission in the inactive state and transmitting data after transition to the active state in the NR system according to the second embodiment of the disclosure.
Figure 31:
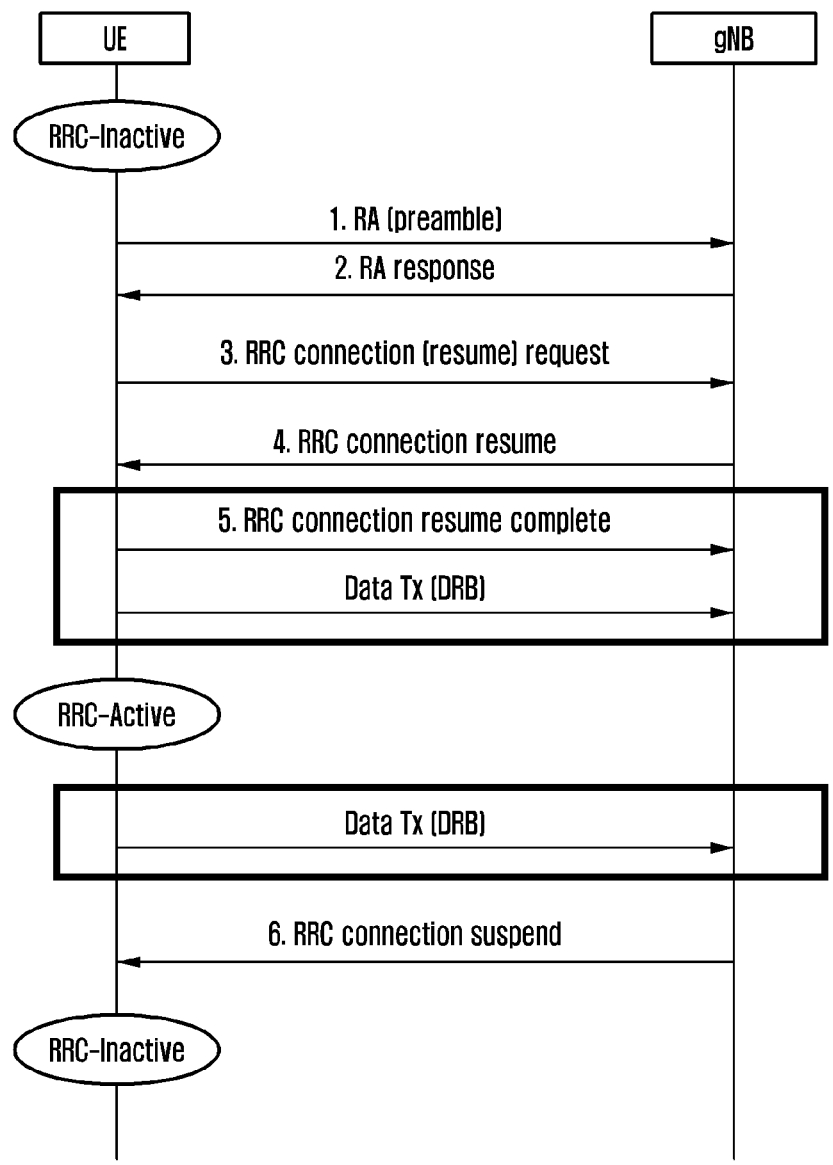
FIG. 31 schematically illustrates an operation for starting data transmission in the inactive state and transmitting data after transition to the active state in the NR system according to the second embodiment of the disclosure.

At this time, after data transmission, both RACH Message 3 of FIG. 29 and RACH Message 5 of FIG. 31 transmit ACK of the corresponding data and information on whether to perform RRC state transition as an RRC response. At this time, if the RRC response is suspend, the inactive state is maintained. If the RRC response is resume, the UE transitions to the active state and transmit data.

An operation of, when transmitting RRC connection complement, RRC connection resume complete, or RRC resume complete signal of MSG5, inserting corresponding information below into the signal to transmit the information is included.

NAS PDU
5CN node selection information (e.g. selected PLMN identity or NSSAI
selectedPLMN-Identity,
registeredMME,
gummei-Type,
s-TMSI,
attachWithoutPDN-Connectivity,
up-CIoT-EPS-Optimisation,
cp-CIoT-EPS-Optimisation,
den-ID.

In order to transmit information of the embodiment through MSG5, an operation in which the UE successfully retrieves previously stored UE context from an anchor eNB, and when new security key information (K_gNB_target) can be generated by a target eNB, the UE transmits the corresponding information through SRB1 and applies the new security key to safely transmits the corresponding information to the eNB is included.

A method of inserting some or all of the corresponding information into the connection request, the RRC_Connection resume request, or the RRC resume request to transmit the information (through SRB0 or DRB) is included.

In other words, the following information may be transmitted while being inserted into the RRC_Connection request message transmitted through MSG3.

NAS message
5G CN node selection,
UE capability of supporting high frequency,
A method of transmitting, through MSG3, some or all of information which can be transmitted through MSG5 as information including the access category indicating a type of services is described.

Another embodiment describes a procedure and an operation in the case in which the UE transitions from the RRC_CONNECTED state to the RRC_INACTIVE state when dual connectivity (DC) (or carrier aggregation (CA)) is applied.

A first method is a method of storing radio bearer configuration of corresponding DC or CA in UE context which is stored in the inactive state UE in and the anchor eNB and suspending the radio bearer configuration, and then resuming the same after transition to RRC_Connected state A second method is a method of deleting second node (SN) configuration (SCG bearer configuration) except for only master node (MN) configuration (MCG bearer) among radio bearer configuration to which corresponding DC applied, partially storing the MN configuration in UE context which is stored in inactive state UE in the and the anchor eNB and suspending the MN configuration, and then resuming the same after transition to the RRC_Connected state.

Alternatively, the second method is a method of deleting Scell configuration (radio bearer configuration) except for only PCell configuration (radio bearer) among radio bearer configuration to which corresponding CA is applied, partially storing the PCell configuration in UE context which is stored in the inactive state UE and the anchor eNB and suspending the PCell configuration, and then resuming the same after transition to the RRC_Connected state.

In the case of DC, the method of deleting second node (SN) configuration (SCG bearer configuration) except for only master node (MN) configuration (MCG bearer) among radio bearer configuration to which the corresponding DC applied, partially storing the MN configuration in UE context which is stored in the UE in the inactive state and the anchor eNB and suspending the MN configuration, and then resuming the same after transition to the RRC_Connected state according to an embodiment includes 1) a method of releasing all radio bearers of the second node (SN) configuration (SCG bearer configuration)

2) a method of changing the second node (SN) configuration (SCG bearer configuration) into MCG bearers 3) a method of changing some of the second node (SN) configuration (SCG bearer configuration) to MCG bearers and releasing some radio bearers.

This can be extended and applied to the SN operation of the Scell in the case of CA.

That is, the method of deleting Scell configuration (radio bearer configuration) except for only PCell configuration (radio bearer) among radio bearer configuration to which corresponding CA is applied, partially storing the PCell configuration in UE context which is stored in the inactive state UE and the anchor eNB and suspending the PCell configuration, and then resuming the same after transition to the RRC_Connected state according to an embodiment includes 1) a method of releasing all radio bearers of Scell configuration (radio bearer configuration)

2) a method of releasing all radio bearers of Scell configuration (radio bearer configuration) to Pcell radio bearers 3) a method of changing some of Scell configuration (radio bearer configuration) to Pcell radio bearers and releasing some radio bearers.

At this time, a process of selecting a method of changing the corresponding radio bearer to the MN (MCG bearer or PCell bearer), storing the same in UE context, and then directly transmitting the same to the corresponding radio bearer via a suspend and resume procedure; or a method of reducing capacity of the UE and the anchor eNB storing the UE context containing corresponding radio bearer information by releasing the radio bearer or reducing control burden of the core network for managing and controlling the corresponding radio bearer in a process of updating a RAN-based paging area when the UE moves includes the following.

1) If the radio bearer configured in the corresponding SN (SCG or Scell in the case of CA) overlaps a PDU session in which the MN radio bearer (MCG bearer or PCell radio bearer in the case of CA) is configured in the case of DC, the SN radio bearer is changed to the MN radio bearer (MCG bearer or PCell radio bearer in the case of CA) in the case of DC. If they do not overlap, a cost for maintaining the PDU session is generated, and thus the corresponding radio bearer is released.

2) If a QoS level of flow or service supported by the radio bearer configured in the corresponding SN (SCG or Scell in the case of CA) in the case of DC is larger than or equal to a particular threshold, the SN radio bearer is changed to the MN radio bearer (MCG bearer or PCell in the case of CA) in the case of DC. If the QoS level is smaller than the threshold, the corresponding radio bearer is released.

3) If a required latency limit of flow or service supported by the radio bearer configured in the corresponding SN (SCG or Scell in the case of CA) in the case of DC is shorter than a particular threshold, the SN radio bearer is changed to the MN radio bearer (MCG bearer or PCell in the case of CA) in the case of DC. If latency due to the required latency limit longer than the particular threshold is not problem, the operation of releasing the corresponding radio bearer is included.

For the operation, the core network may make a decision and provide configuration to the eNB on the basis of the PDU session information, QoS supported by the bearer or corresponding flow, and the required latency. This includes an operation of whether to release the corresponding radio bearer or perform the change (bearer type change) and an operation of applying the same to switch the RRC state to the inactive state.

The method of determining whether to release the corresponding radio bearer or perform the change (bearer type change) includes 1) a method by which the core network provides configuration to the eNB on the basis of additional information including the PDU session information, QoS supported by the bearer or corresponding flow, and the required latency for the corresponding decision, 2) a method by which the core network provides a measure/criterion (PDU session information, QoS supported by the bearer or corresponding flow, and the required latency) and a rule for the corresponding decision to the eNB, 3) a method by which the eNB determines whether to release the radio bearer or perform the change (bearer type change) on the basis of information possessed by the eNB within the master cell of the corresponding eNB (including the MN in the case of DC and the PCell in the case of CA) and UE feedback information.

4) a method by which the eNB determines whether to release the radio bearer or perform the change (bearer type change) on the basis of information possessed by the eNB within the corresponding eNB (including the MN in the case of DC and both the Pcell and the Scell in the case of CA) and UE feedback information.

The process includes an operation in which the UE provide the eNB with feedback of each or a combination of pieces of information including the required QoS of flow or service supported by the radio bearer configured in the corresponding SN (SCG), latency requirements, or a service category in the case of DC.

The operation includes an operation in which the UE provides the eNB with feedback of each r a combination of pieces of information including the required QoS of flow or service supported by the radio bearer configured in the corresponding Scell, latency requirements, or a service category in the case of CA.

FIG. 29 illustrates the case in which data is transmitted in the inactive state and then data is transmitted after transition to the RRC active state based on RACH Message3, and FIG. 31 illustrates the case in which data is transmitted in the inactive state and data is additionally transmitted after transition to the RRC active state based on RACH Message5. After the UE transmits data in the active state, the eNB may rapidly switch the UE to the inactive state which is a low power mode through 6. RRC connection suspend message. FIG. 30 illustrates an operation of starting data transmission through MSG3 in the inactive state, additionally transmitting data through Message5 RRC connection (resume) complete, and when data transmission is completed, transmitting an RRC response (ACK and suspend) to maintain the inactive state.

FIG. 31 schematically illustrates an operation of starting data transmission in the inactive state and then transmitting data after transition to the active state.

FIG. 32 illustrates an operation of starting data transmission through MSG3 in the inactive state, additionally transmitting data through Message5 RRC connection (resume) complete, transmitting an RRC connection response (ACK and resume) to perform transition to the active state if data transmission is further required, and when data transmission is completed, transmitting an RRC connection suspend message to perform transition to the inactive state.

Figure 33:
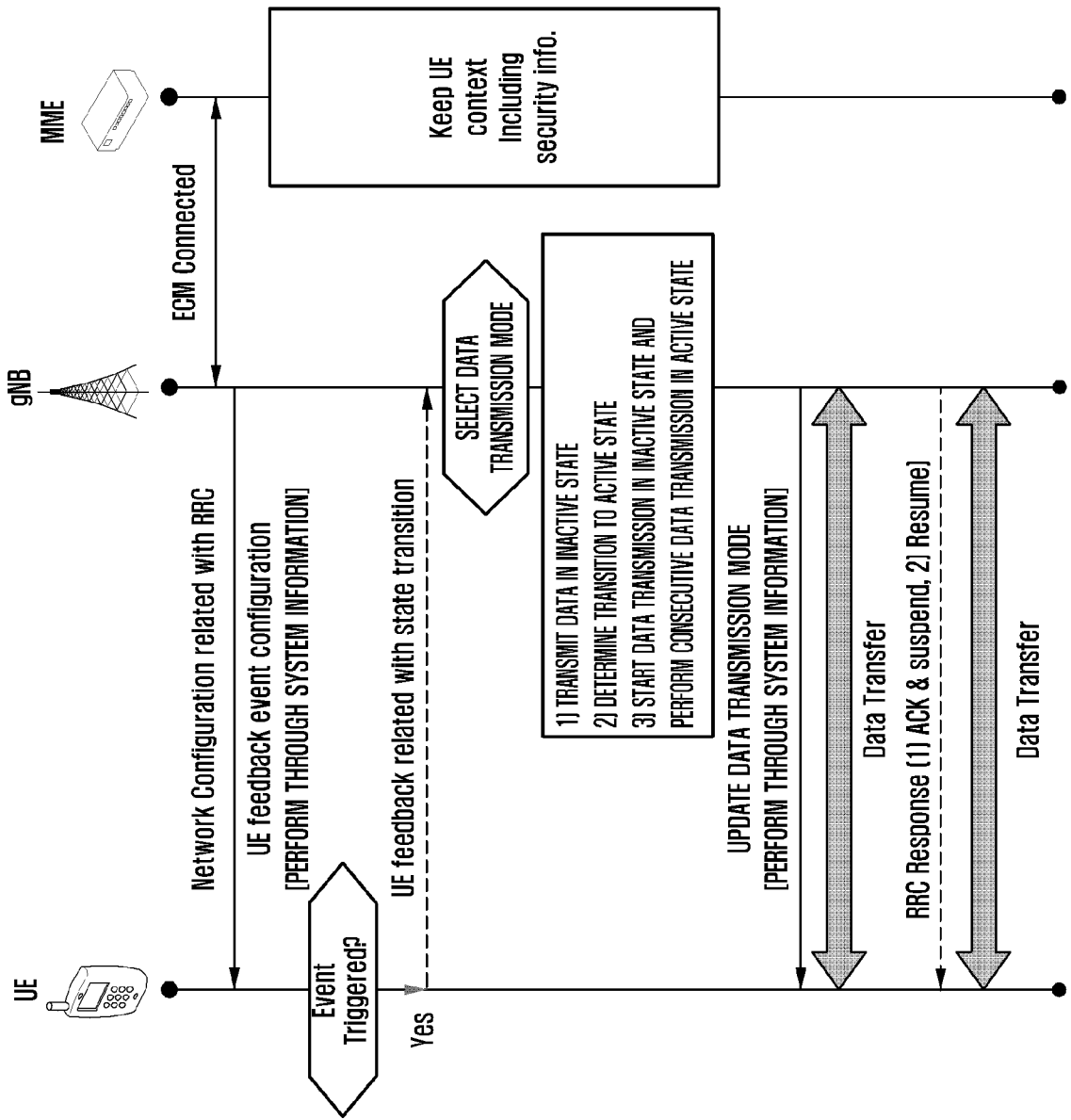
FIG. 33 illustrates an example of a signal operation between the UE and the eNB to determine and control the RRC state (inactive and/or active) for transmitting data in the NR system according to the second embodiment of the disclosure.
Figure 34:
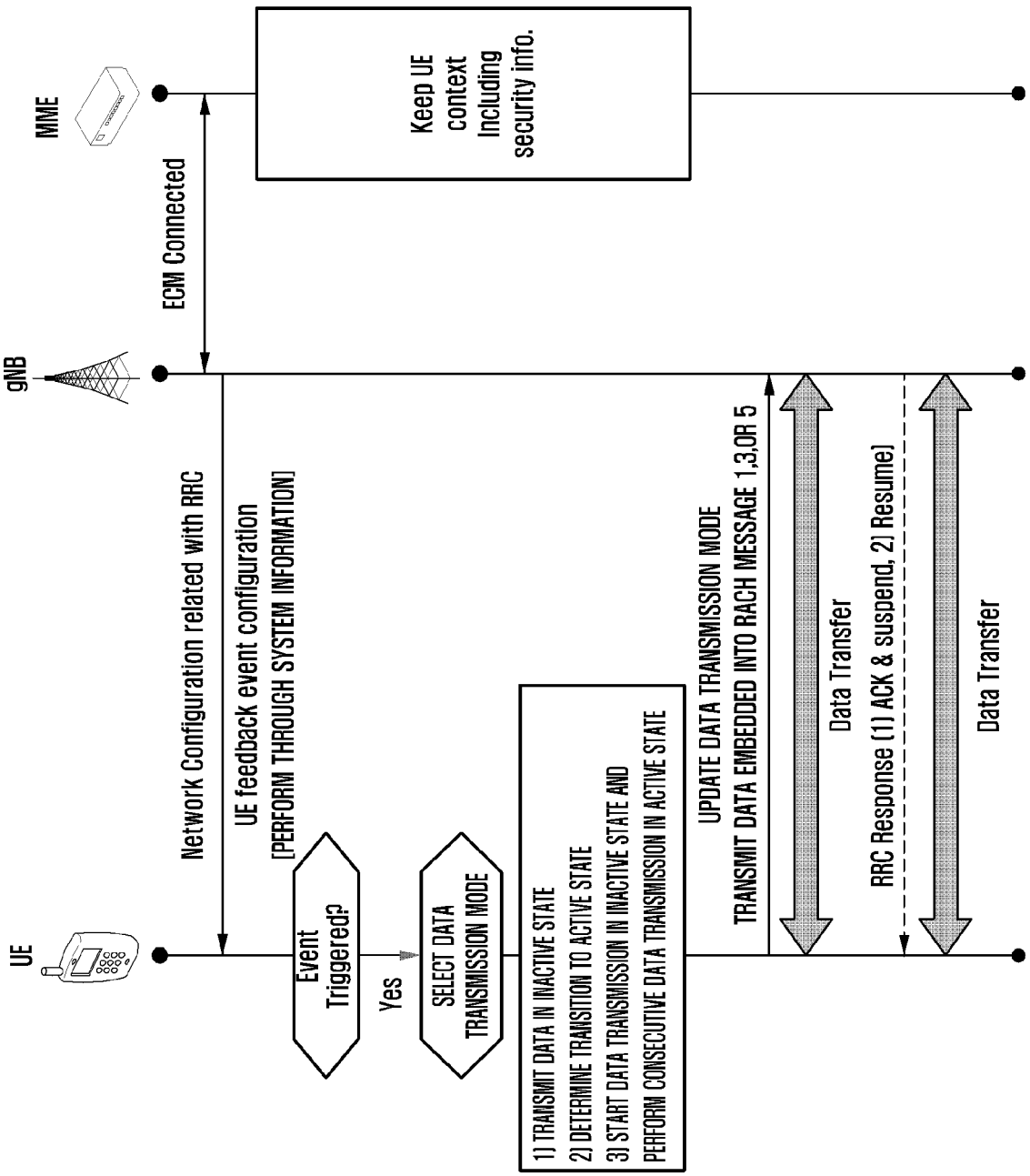
FIG. 34 illustrates an example of a signal operation between the UE and the eNB to determine and control the RRC state (inactive and/or active) for transmitting data in the NR system according to the second embodiment of the disclosure.
Figure 35:
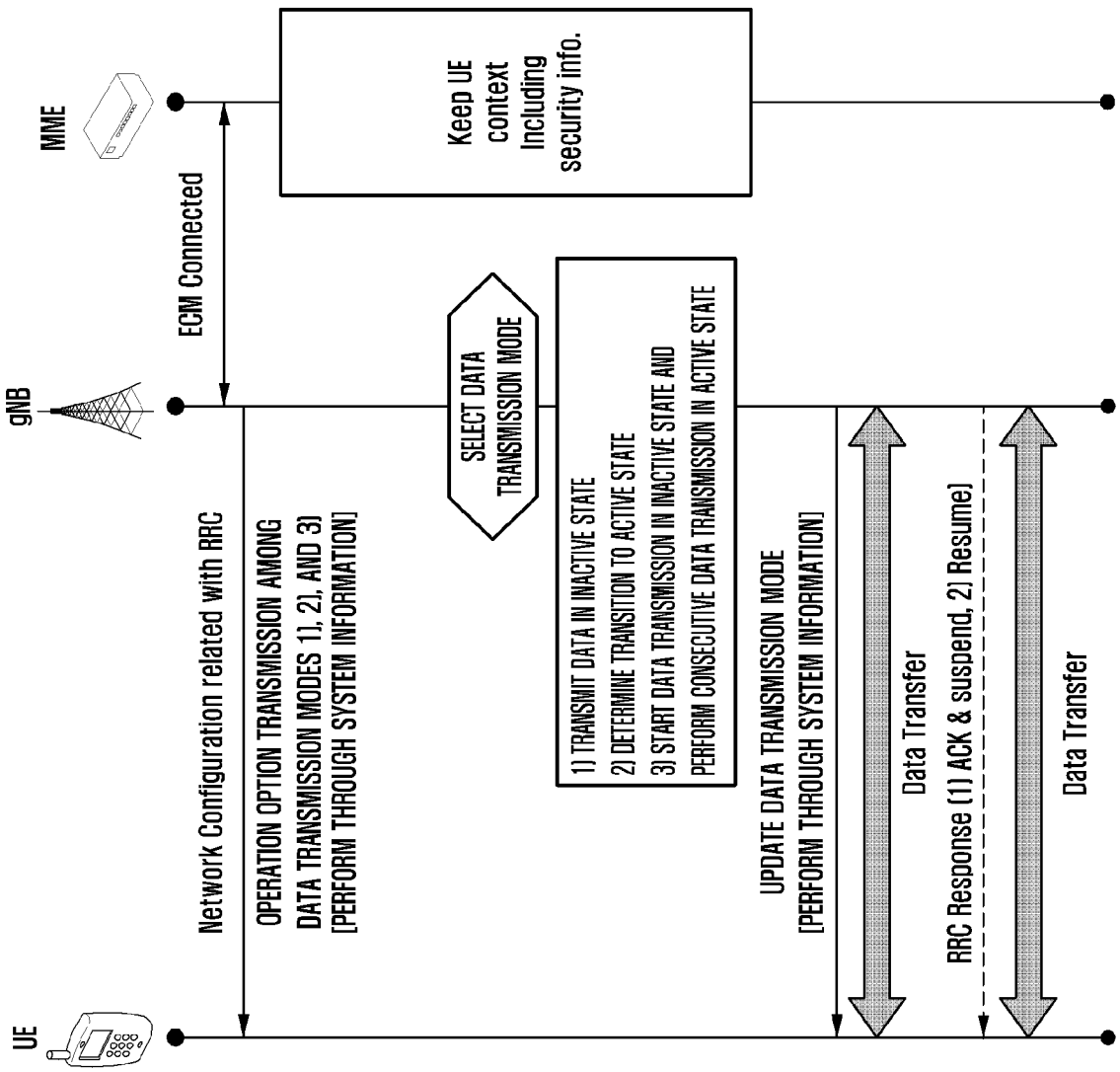
FIG. 35 illustrates an example of a signal operation between the UE and the eNB to determine and control the RRC state (inactive and/or active) for transmitting data in the NR system according to the second embodiment of the disclosure.

FIGS. 33 to 35 illustrate examples of the signaling operation between the UE and the eNB to determine and control RRC states (inactive and/or active) in which data is transmitted in the NR system according to the second embodiment of the disclosure.

FIG. 33 illustrates a method by which, in order to determine an RRC state-related operation mode for transmitting data, the UE triggers an event on the basis of eNB configuration and provides feedback and the eNB determines the operation mode.

Step 1) The UE may receive configuration information of a method of determining the RRC state (inactive and/or active) for transmitting data from the eNB. When the UE initially accesses the corresponding communication system, is turned on, or receives system information (SI) from the corresponding eNB, the eNB may transmit configuration information related to determination of RRC state type to be applied to each UE and a transition method.

Step 2) The UE may trigger an event on the basis of configuration information related to the RRC state type and the transition method determination which the eNB transmits and transmit feedback to the eNB. Thereafter, the eNB may select one of data transmission mode (1) for transmitting data in the inactive state, data transmission mode (2) for determining transition to the active state, and data transmission mode (3) for starting data transmission in the inactive state and successively transmitting data in the active state. Among the three modes, mode (1) and mode (3) have the same operation before the RRC response, so that the eNB may separate only mode (2) from modes (1) and (3). Thereafter, mode (1) and mode (3) may be separated on the basis of RRC response 1) ACK & suspend and 2) resume.

Step 3) The eNB may determine (or switch) the data transmission mode and then inform the UE of the data transmission mode through system information or dedicated signaling (paging).

Step 4) If data transmission in the active is required after data transmission in the initial inactive state, the eNB may transmit information in the RRC response through 1) ACK & suspend and 2) Resume, and the UE may maintain the RRC state for future data transmission as the inactive state or transition to the active state on the basis thereof.

FIG. 34 illustrates a method by which the UE triggers an even on the basis of eNB configuration, determines switching of the data transmission mode, and then informs the eNB of the data transmission mode during a data transmission process (for example, by embedding the data transmission mode into an RACH UL message).

While the eNB selects the data transmission mode on the basis of the feedback of the UE in FIG. 33, the UE may directly select the data transmission mode on the basis of eNB configuration and inform the eNB of the selection result in FIG. 34.

Step 1) The UE may receive configuration of a method of determining the RRC state (inactive and/or active) for transmitting data from the eNB. When the UE initially accesses the corresponding communication system, is turned on, or receives system information (SI) from the corresponding eNB, the eNB may transmit configuration information related to determination of RRC state type to be applied to each UE and a transition method.

Step 2) The UE may trigger an event on the basis of configuration information related to the RRC state type and the transition method determination which the eNB transmits and determine the data transmission mode on the basis thereof. The UE may select the data transmission mode from three transmission modes (1) for transmitting data in the inactive state, (2) determining transition to the active state, and (3) starting data transmission in the inactive state and successively transmitting data in the active state. Among the three modes, mode (1) and mode (3) have the same operation before the RRC response, so that the UE may separate only mode (2) from modes (1) and (3) and inform the eNB thereof. Thereafter, mode (1) and mode (3) may be separated on the basis of RRC response 1) ACK & suspend and 2) resume.

Step 3) In order to transmit the selected data transmission mode to the eNB, the UE may transmit a data transmission mode update to the eNB in the data transmission process (for example, by embedding the selected data transmission mode into an RACH UL message).

At this time, among the three data transmission modes, mode (1) and mode (3) have the same operation before the RRC response, but the UE may separate all modes (1), (2), and (3) and informs the UE of it and thus the eNB may transmit proper RRC response 1) ACK & suspend and 2) Resume.

Step 4) If data transmission in the active is required after data transmission in the initial inactive state, the eNB may transmit information in the RRC response through 1) ACK & suspend and 2) Resume, and the UE may maintain the RRC state for future data transmission as the inactive state or transition to the active state on the basis thereof.

FIG. 35 illustrates a method by which the UE triggers an event on the basis of eNB configuration and the eNB determines an RRC state-related operation mode for transmitting data. Compared to FIG. 33, the method illustrated in FIG. 35 has similarity in that the eNB determines the data transmission mode but has difference in that there is no event triggering and feedback by the UE.

Step 1) The UE may receive configuration information of a method of determining the RRC state (inactive and/or active) for transmitting data from the eNB. When the UE initially accesses the corresponding communication system, is turned on, or receives system information (SI) from the corresponding eNB, the eNB may transmit configuration information related to determination of RRC state type to be applied to each UE and a transition method.

Figure 36:
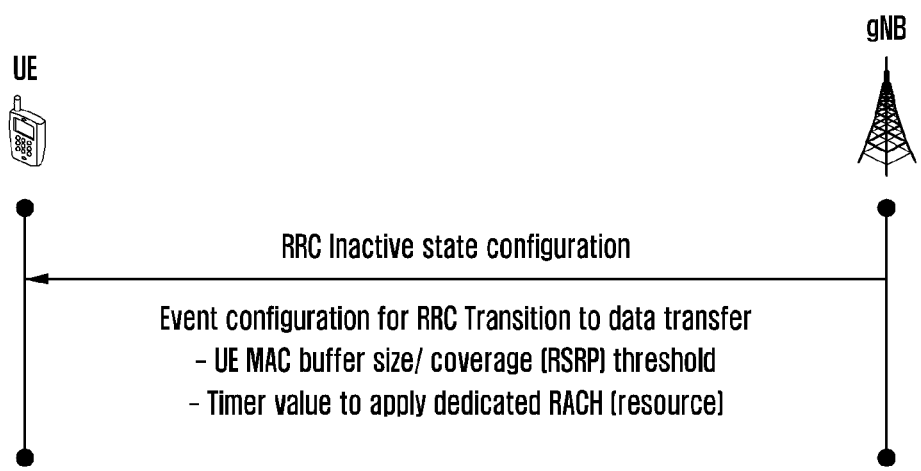
FIG. 36 illustrates an example of a signal operation between the UE and the eNB to determine and control the RRC state (inactive and/or active) for transmitting data in the NR system according to the second embodiment of the disclosure.

FIG. 36 illustrates an example of a signaling operation between the UE and the eNB to determine and control the RRC state (inactive and/or active) for transmitting data. In an inactive state configuration process, the eNB may configure a buffer size and an RSRP threshold for determining a data transmission mode in the UE.

Referring to FIG. 36, the corresponding configuration may be configured in the UE by the eNB in RRC inactive state start configuration and may include an operation for determining the RRC state (inactive and/or active) for transmitting data, defining an event for determining MSG3 or MSG5 transmission mode, and configuring a parameter therefor, and the corresponding parameter includes a buffer size and an RSRP threshold of the UE. The eNB may update the corresponding configuration through system information.

Step 2) The eNB may select one data transmission mode from data transmission mode (1) for transmitting data in the inactive state, data transmission mode (2) for determining transition to the active state, and data transmission mode (3) for starting data transmission in the inactive state and successively transmitting data in the active state without feedback of the UE. Among the three modes, mode (1) and mode (3) have the same operation before the RRC response, so that the eNB may separate only mode (2) from modes (1) and (3) and inform the UE of it. Thereafter, mode (1) and mode (3) may be separated on the basis of RRC response 1) ACK & suspend and 2) resume.

Step 3) The eNB may select (or switch) the data transmission mode and then transmit the data transmission mode to the UE through system information or dedicated signaling (paging).

Step 4) If data transmission in the active is required after data transmission in the initial inactive state, the eNB may transmit information in the RRC response through 1) ACK & suspend and 2) Resume, and the UE may maintain the RRC state for future data transmission as the inactive state or transition to the active state on the basis thereof.

Information for determining the RRC state-related operation mode for transmitting data may be determined on the basis of characteristics of data traffic and characteristics of the UE below.

1) An operation by which the UE provides feedback to the eNB and the eNB determines the RRC state for transmitting data and transmits the RRC response (RRC suspend or RRC resume)

2) An operation by the UE determines the RRC state for transmitting data and separates and makes a request for inactive_data transmission and active_data transmission by resume_cause through an RRC connection request (resume request) message An operation for selecting the RRC state-related operation mode for transmitting data on the basis of some or a combination of the following elements based on traffic characteristic-based determination reference, In the case of small data, it is advantageous to transmit the data packet size in the inactive state from a viewpoint of UE power efficiency or data transmission/reception delay. According to an embodiment of the operation, the data packet size may be defined as ⅔ SDU and a detailed value thereof may be configured and operated according to the system.

Data Packet Interval: it may be advantageous to transmit frequently arriving traffic after transition to the active state. An operation for determining the RRC state-related operation mode for transmitting data on the basis of the number of arriving traffic units per unit time In a method of determining the RRC state-related operation mode on the basis of a traffic pattern, the eNB determines the same on the basis of a ratio of the connected_active state, a ratio of the inactive state, and a ratio of the idle state reflecting a UE inactivity timer of the eNB (network), on the basis of the RRC state ratio of previous data transmission stored in the UE, when the UE is in an idle mobility state (the UE in the idle state or the inactive state moves without handover and thus the eNB in which the UE is currently located does not receive UE information/feedback) and the eNB does not know the information, the UE provides feedback to the eNB and the eNB determines the RRC state for transmitting data on the basis thereof, or UE information in previous data transmission stored in the UE is stored in UE context and updated, and an anchor eNB forwards the UE context to a camped eNB through X2.

Data packet sum in UE/gNB buffer: method of determining an RRC state-related operation mode for transmitting data on the basis of the traffic size of the buffer of the UE and/or the eNB, and at this time, the buster size may include buffers of an application end, an IP end, PDCP, RLC, MAC, and a PHY end.

Data packet delay requirement is determined on the basis of characteristics for each traffic service such as eNBB, ULRRC, and mMTC and Qos (CQI for each bearer) defined by NR, and the RRC state-related operation mode for transmitting data is selected on the basis of characteristics including the element.

Network loading (Contention probability): the RRC state for transmitting data is determined on the basis of a contention probability generated in channel access determined by the UE or the eNB.

According to an embodiment, if the number of UEs accessing the channel to transmit data is large, data is transmitted after transition to the RRC connected active state.

For the contention probability generated in channel access, the eNB may use information detected through Contention resolution, or When the UE determines an adjacent interference level on the basis of (for example) measured RSRQ and an event is generated on the basis of a threshold preconfigured by the eNB, the UE performs determination An operation for selecting the RRC state-related operation mode for transmitting data on the basis of some or a combination of the following elements based on UE characteristics, A distance between UE and the eNB (Short/Long Coverage) is determined on the basis of pathloss between the UE and the eNB, for example, RSRP/RSRQ Whether the UE is located in a cell center area from the eNB or in a boundary area is determined on the basis of a distance threshold between the UE and the ENB or a received signal value (for example, RSRP/RSRQ)

According to an embodiment, since the corresponding information can be detected in the RA preamble transmission and RAR reception process in the RACH operation, the RRC state-related operation mode for transmitting data is determined on the basis thereof Since the corresponding information is a reference for determining a payload length which can be transmitted in the inactive state, it is advantageous to transmit data in the inactive state as a distance is shorter (as a received signal quality is higher) when CQI and similar information are present it is relatively advantageous to transmit data in the active state as a distance is shorter (as a received signal quality is higher) when CQI and similar information are absent, so that an RRC state-related operation mode for transmitting data is determined on the basis thereof UE usage state: an example of an operation for selecting a data transmission scheme in the active state in order to improve network-wide (SE) efficiency since a low-latency elements is not important if the state is latency tolerance or traffic of the corresponding UE is not direct traffic directly input by the user or influencing QoS, or an example of an operation for selecting a data transmission mode in the active (RRC_CONNECTED) state for a low-power operation of the UE (in order to remove an unnecessary C-DRX interval) if the traffic is not direct traffic directly input by the user or influencing QoS, UE movement speed and the presence or absence of idle mobility from the recently RRC connected eNB:
an operation for determining an RRC state-related operation mode for transmitting data on the basis of whether the UE ID (cell ID or C-RNTI) can be reused in the inactive state data transmission
an operation for determining an RRC state-related operation mode for transmitting data on the basis of whether UP security information of the UE (security key) can be reused in the inactive state data transmission
an operation for performing determination in consideration of an element including idle mobility supporting overhead (paging S1, X2)

A method of determining RRC state transition for data transmission on the basis of UE mobility supporting overhead (paging S1, X2) according to a paging operation method or (CN-based paging or RAN-based paging) tracking area/paging area size When the UE is in an idle mobility state (the UE in the idle state or the inactive state moves without handover and thus the eNB in which the UE is currently located does not receive UE information/feedback) and the eNB does not know the information, an operation in which the UE provides feedback to the eNB and the eNB determines the RRC state for transmitting data on the basis thereof
a method storing UE information (traffic pattern and mobility information) in UE context and updating the UE information in previous data transmission stored in the UE and forwarding and transmitting the UE information to a camped eNB by the anchor eNB through X2
UE battery status: a method of providing feedback of a UE power consumption state to the eNB and determining an RRC state for transmitting data on the basis thereof.

Figure 37:
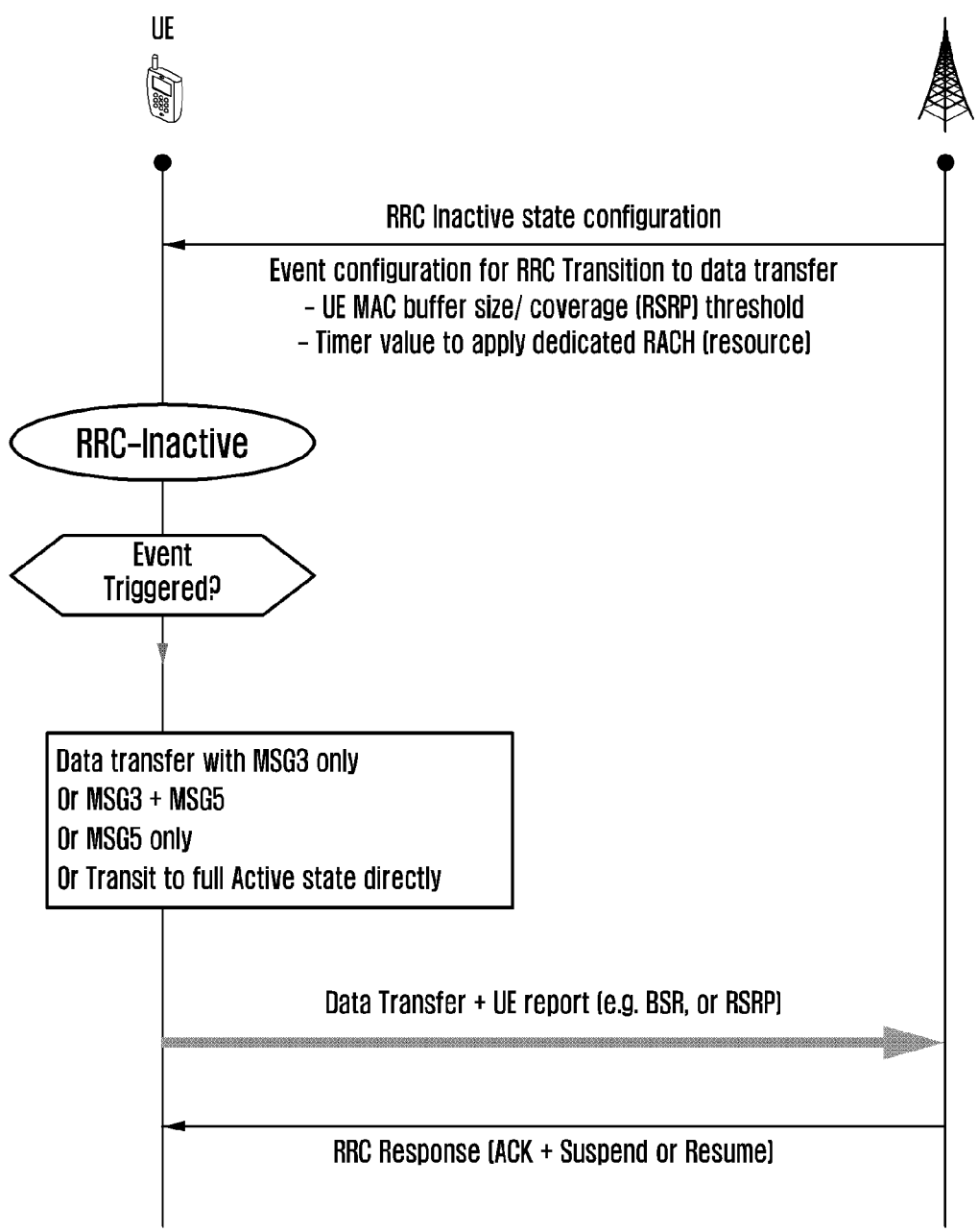
FIG. 37 illustrates an example of a signal operation between the UE and the eNB to determine and control the RRC state (inactive and/or active) for transmitting data in the NR system according to the second embodiment of the disclosure.

The feedback may be performed through data transmission after transition of the RRC state to the RRC connected active state or in the inactive state without any transition. An operation for performing determination by adding eNB information on the basis of UE event triggering and feedback by which the eNB configures an RRC state-related operation mode for transmitting data on the basis of characteristics including the elements or the UE performs determination by itself using only intra-eNB information or according to a rule configured to the eNB and an operation for transmitting the same to the UE/eNB and changes the RRC state-related operation mode for transmitting data in the future Elements including UE/data traffic characteristics for determining the RRC state-related operation mode for transmitting data may be reflected in the RRC state transition procedure through control message transmission or reflected in a procedure of configuring some DRBs as inactive state data transmission-dedicated DRBs and other DRBs as active state data transmission-dedicated DRBs and mapping corresponding transmission to different DRBs when data traffic is generated FIG. 37 illustrates an example of a signal operation between the UE and the eNB to determine and control the RRC state (inactive and/or active) for transmitting data in the NR system according to the second embodiment of the disclosure. The UE may determine an RRC state-related operation mode in which the eNB transmits data without feedback to the eNB on the basis of eNB configuration and UE event triggering.

In the corresponding operation, the eNB cannot know the corresponding information before BSR or BSRP information of MSG3 is transmitted, the allocation size of MSG3 may be determined by default without the corresponding information BSR or RSRP when MSG3 is allocated to the eNB.

Further, the UE may transmit BSR or RSRP information on the basis of MSG1 (RA preamble), for example, group information of RA sequence. However, the eNB may perform allocation of corresponding MSG3 according to an indication of resources (time, frequency, and beam) through which the UE accesses the RACH on the basis of an operation for transmitting information which designates the size of a few of, for example, 2 or 3 MSG3 with low-precision corresponding to small data since an amount of information which can be transmitted is limited and a pre-configured rule of a time domain, a frequency domain, and a beam domain (spatial domain) as well as a sequence domain of the PA preamble.

According to an embodiment, if the UE performs the RACH through sub-slot 2 among sub-slots 1 to 5, the eNB may grant the size of UL resources corresponding to the size of second MSG3 on the basis of a pre-configured look up table (LUT).

Figure 38:
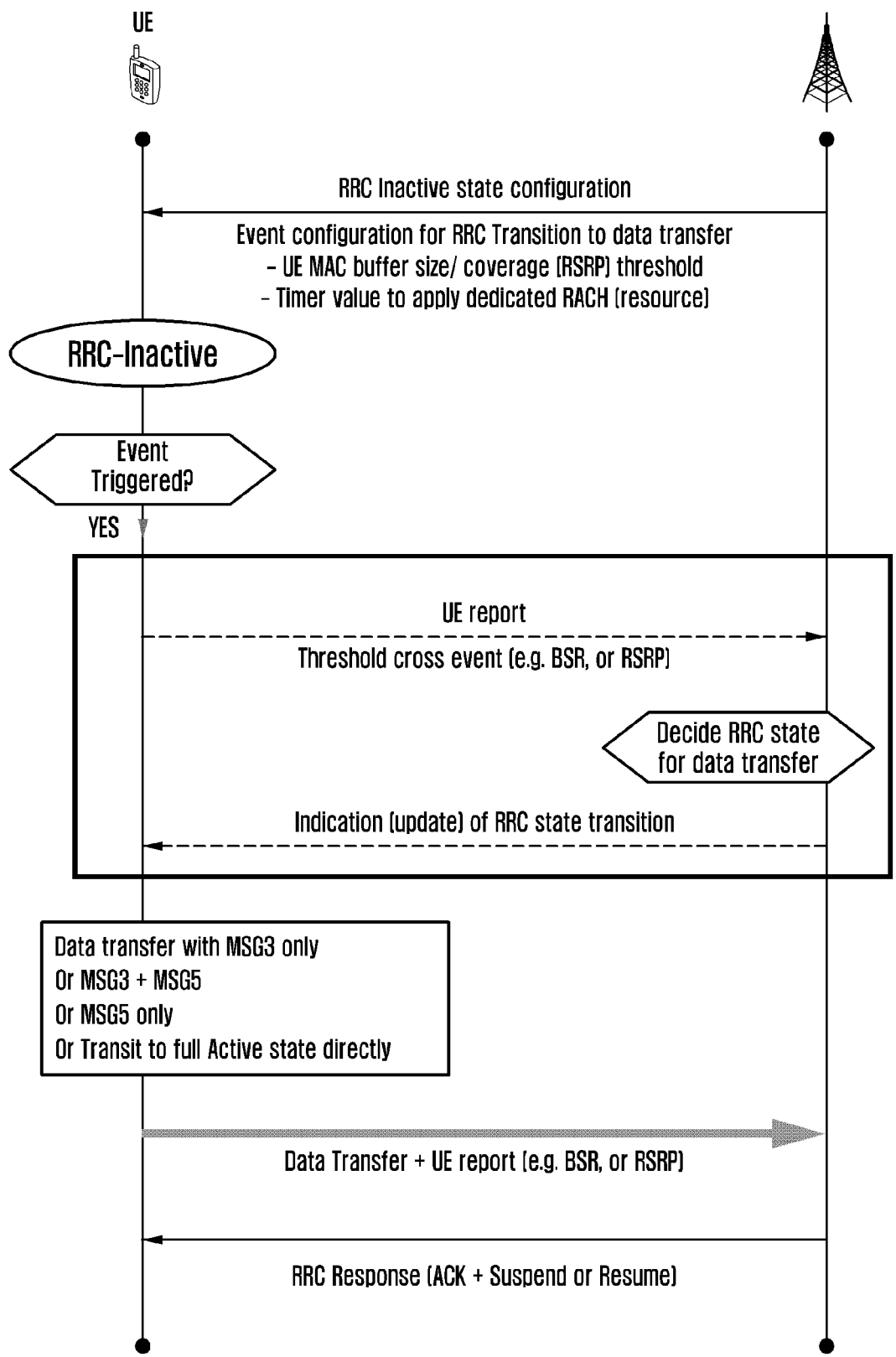
FIG. 38 illustrates an example of a signal operation between the UE and the eNB to determine and control the RRC state (inactive and/or active) for transmitting data in the NR system according to the second embodiment of the disclosure.

FIG. 38 illustrates an example of a signal operation between the UE and the eNB to determine and control the RRC state (inactive and/or active) for transmitting data in the NR system according to the second embodiment of the disclosure. The UE may transmit UE information (RSRP or BSR) to the eNB through additional feedback on the basis of eNB configuration and UE event triggering and the eNB may determine an RRC state-related operation mode for transmitting data.

In the corresponding operation, since BSR or RSRP information of MSG3 is transmitted before data transmission and thus the eNB knows the corresponding information, the allocation of MSG3 may be optimized (to be the minimum size required for data transmission or the maximum size allowed by a channel state) and allocated on the basis of the corresponding BSR or RSRP information when MSG3 is allocated to the eNB.

Figure 39:
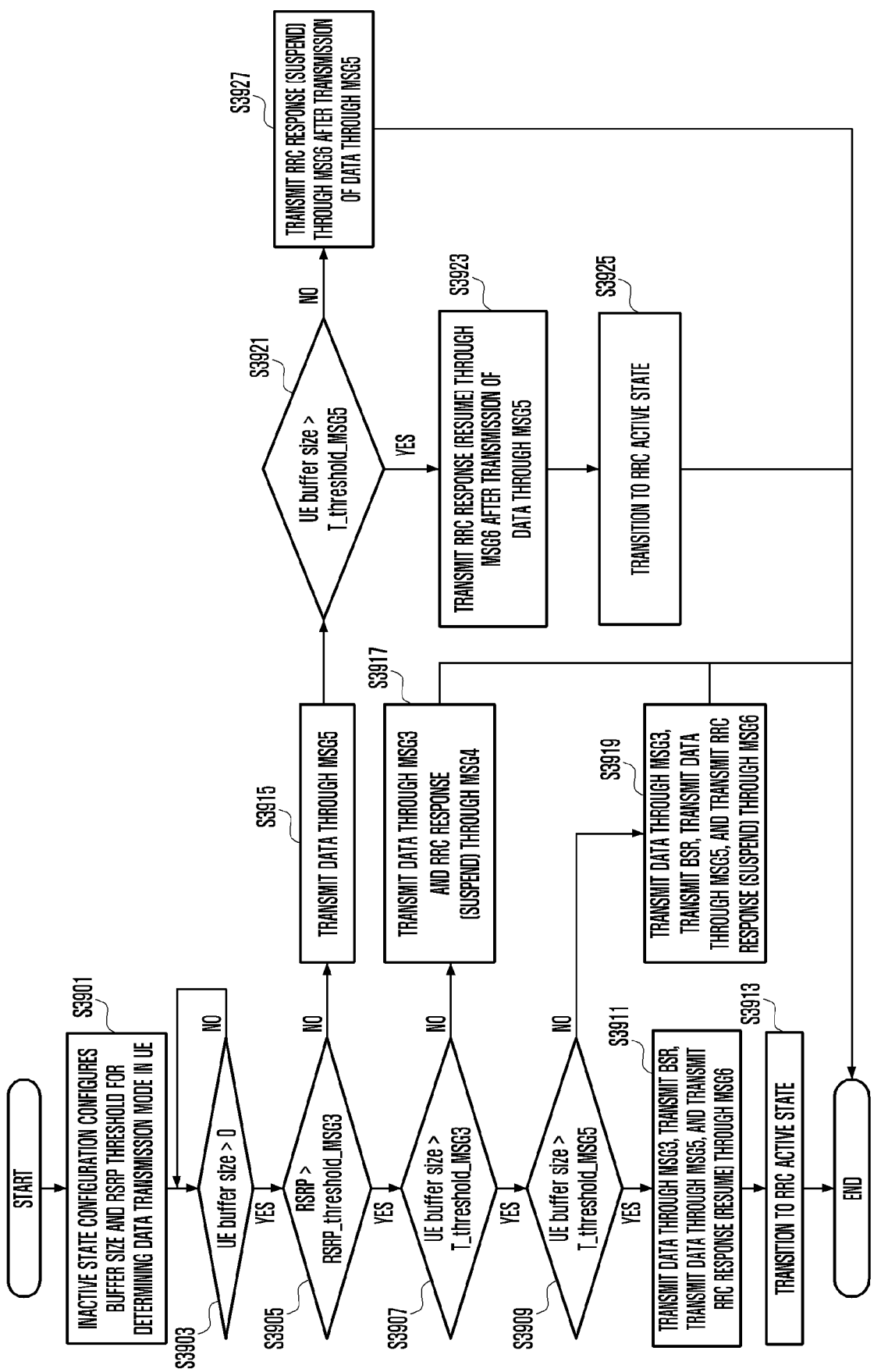
FIG. 39 illustrates a method by which the UE determines MSG3, MSG5, or an RRC state transition-related operation mode for transmitting data on the basis of event triggering configured by the eNB to transmit data in the NR system according to the second embodiment of the disclosure.

FIG. 39 illustrates a method by which the UE determines MSG3, MSG5, or an RRC state transition-related operation mode for transmitting data on the basis of event triggering configured by the eNB to transmit data in the NR system according to the second embodiment of the disclosure.

In step 3901, the eNB may configure the buffer size and an RSRP threshold to determine a data transmission mode of the UE.

It may be identified whether the UE buffer size is larger than 0 in step S3903, and if the UE buffer size is larger than 0, it may be identified whether the RSRP is larger than the RSRP threshold (RSRP_thresold_MSG3) in step S3905. If the RSRP is larger than the RSRP threshold for MSG3 (RSRP_thresold_MSG3), it may be identified whether the UE buffer size is larger than a buffer size threshold (T_thresold_MSG3) in step S3907. If the UE buffer size is larger than the buffer size threshold for MSG3 (T_thresold_MSG3), it may be identified whether the UE buffer size is larger than a buffer size threshold (T_thresold_MSG5) for MSG5 in step 3909. If the UE buffer size is larger than the buffer size threshold for MSG5 (T_thresold_MSG5), data and BSR may be transmitted through MSG3, data may be transmitted through MSG5, and an RRC response (resume) may be transmitted through MSG6 in step 3911. In step S3913, the UE may transition to the RRC active state.

If the RSRP is smaller than the RSRP threshold for MSG 3 (RSRP_thresold_MSG3) in step S3905, data may be transmitted through MSG5 in step S3915. Thereafter, it may be identified whether the UE buffer size is larger than the buffer size threshold (T_thresold_MSG5) in step S3921. If the UE buffer size is larger than the buffer size threshold for MSG5 (T_thresold_MSG5) in step S3921, the RRC response (resume) may be transmitted through MSG6 after data is transmitted through MSG5 in step S3923. In step S3925, the UE may transition to the RRC active state. If the UE buffer size is smaller than the buffer size threshold for MSG5 (T_thresold_MSG5) in step S3921, data may be transmitted through MSG5 and the RRC response (suspend) may be transmitted through MSG6 in step S3927.

If the UE buffer size is smaller than the buffer size threshold for MSG3 (T_thresold_MSG3) in step S3907, data may be transmitted through MSG3 and the RRC response (suspend) may be transmitted through MSG4 in step S3917.

The RRC message transmitted through corresponding RACH MSG4 (message4) may be transmitted through an RRC connection response, an RRC resume response, an RRC suspend response, an RRC connection resume response, or an RRC connection suspend response.

If the UE buffer size is smaller than the buffer size threshold for MSG5 (T_thresold_MSG5) in step S3909, data and BSR may be transmitted through MSG3, data may be transmitted through MSG5, and the RRC response (suspend) may be transmitted through MSG6 in step 3919.

At this time, the eNB may explicitly (target state=RRC_IDLE, RRC_INACTIVE, RRC_CONNECTED) indicate a target RRC state through an RRC connection response (suspend) or an RRC connection suspend message transmitted through MSG4. The UE switches the RRC state on the basis thereof.

Alternatively, when uplink data is transmitted through an RRC connection request transmitted by RACH MSG3, the eNB determines an RRC state of the UE and implicitly informs the UE of it through an RRC connection response. If the eNB controls transition of the RRC state of the UE to the RRC_CONNECTED (active) state, the eNB instructs the UE to transition through the RRC connection response (resume) or the RRC connection resume message transmitted by MSG4.

On the other hand, if it is determined that the UE remains in the RRC_Inactive state, the eNB instructs the UE to remain through the RRC connection response (suspend) or the RRC connection suspend message transmitted through MSG4.

If transition to the RRC_INACTIVE (or RRC_IDLE) state of the UE is instructed through MSG4, a relevant parameter operated in the corresponding RRC state is updated and transmitted through MSG4.

When the UE transitions to RRC IDLE, the corresponding information included in MSG4 is as follows
  cause information
  redirect carrier frequency
  mobility control information
  frequency/RAT deprioritisation information
  Wait timer According to another embodiment, when the UE transitions to RRC_INACTIVE, the corresponding information included in MSG4 is as follows
  cause information
  redirect carrier frequency
  mobility control information
  frequency/RAT deprioritisation information
  UE identity (or UE context identity
  RAN configured DRX cycle,
  RAN periodic notification timer,
  RAN notification area
  Wait timer However, if a fake UE or a fake eNB attempts DoS attack, information which can be transmitted may be changed through an update of the information in MSG4 because of security concerns.

In other words, according to whether MSG4 is transmitted through SRB0 (security is applied (ciphering) or transmitted through SRB1 (security is not applied (not ciphering), information which can be updated and transmitted through MSG4 varies.

In the case of MSG4 transmission, the corresponding information can be transmitted through SRB1 if UE context previously stored in the UE is successfully retrieved from an anchor eNB and new security key information (K_gNB_target) from a target eNB can be generated. In contrast, if retrieving of UE context from the anchor fails or an RRC connection request of the UE is rejected due to the generation of eNB congestion, new security key information (K_gNB_target) cannot be generated and thus MSG4 is transmitted through SRB0.

For example, a waiting timer is a timer which waits for a predetermined time after the UE receives an RRC connection response from the eNB, and if the timer expires, allows attempt of an RRC connection request. When the fake eNB configures a long wait timer, the corresponding UE cannot transmit an RRC connection request to start data transmission for a long time, thereby deteriorating QoS of the UE. However, if a range of the wait timer which can be configured by SRB0 is limited by the network, the fake eNB cannot succeed in attack to configure the wait timer as an excessively large value.

Accordingly, MSG4 transmitted through SRB1 includes an operation for configuring the range of the wait timer to be adjustable. Further, MSG4 transmitted through SRB0 includes an operation for configuring the wait timer only within a pre-configured limited range.

To this end, the range and the maximum value (limit value) of the wait timer may be configured by SRB1 to which security is applied (or ciphering applied) or by a previous RRC message to which integrity is applied. Further, the range and the maximum value (limit value) of the wait timer may be configured through system information transmitted by a genuine eNB which is distinguished from the fake UE and to which security is applied.

In other words, the waiting timer may be transmitted through MSG4 transmitted by SRB0 or SRB1. However, in MSG4 transmitted by SRB0, a relatively short waiting timer having the limited maximum value may be configured.

According to another embodiment, a fixed value is used for a relevant parameter without an update of the parameter if MSG4 is transmitted by SRB0, and the relevant parameter is updated if MSG4 is transmitted by SRB1. If the UE transitions to RRC_IDLE as described above, the corresponding parameter includes cause information, redirect carrier frequency, mobility control information, frequency/RAT deprioritisation information, and wait timer as corresponding information included in MSG4.

According to another embodiment, if the UE transitions to RRC_INACTIVE, the corresponding information included in MSG4 includes cause information, redirect carrier frequency, mobility control information, frequency/RAT deprioritisation information 을 포함하며 추가로 UE identity (or UE context identity, RAN configured DRX cycle, RAN periodic notification timer, RAN notification area, and wait timer.

That is, if the buffer state size of the UE is larger than or equal to 0 and data to be transmitted is generated, it may be determined whether to transmit data through MSG3 on the basis of maximum coverage within which the RRC connection request or the RRC resume request of MSG3 can be transmitted with RSRP of the corresponding UE. Thereafter, it may be sequentially determined whether to transmit data through MSG3 or whether to additionally transmit data through MSG5 or after transition.

At this time, the RRC suspend message is transmitted as the RRC response message if data transmission is completed, and the RRC resume message is transmitted in the case of additional transmission in the active state.

Figure 40:
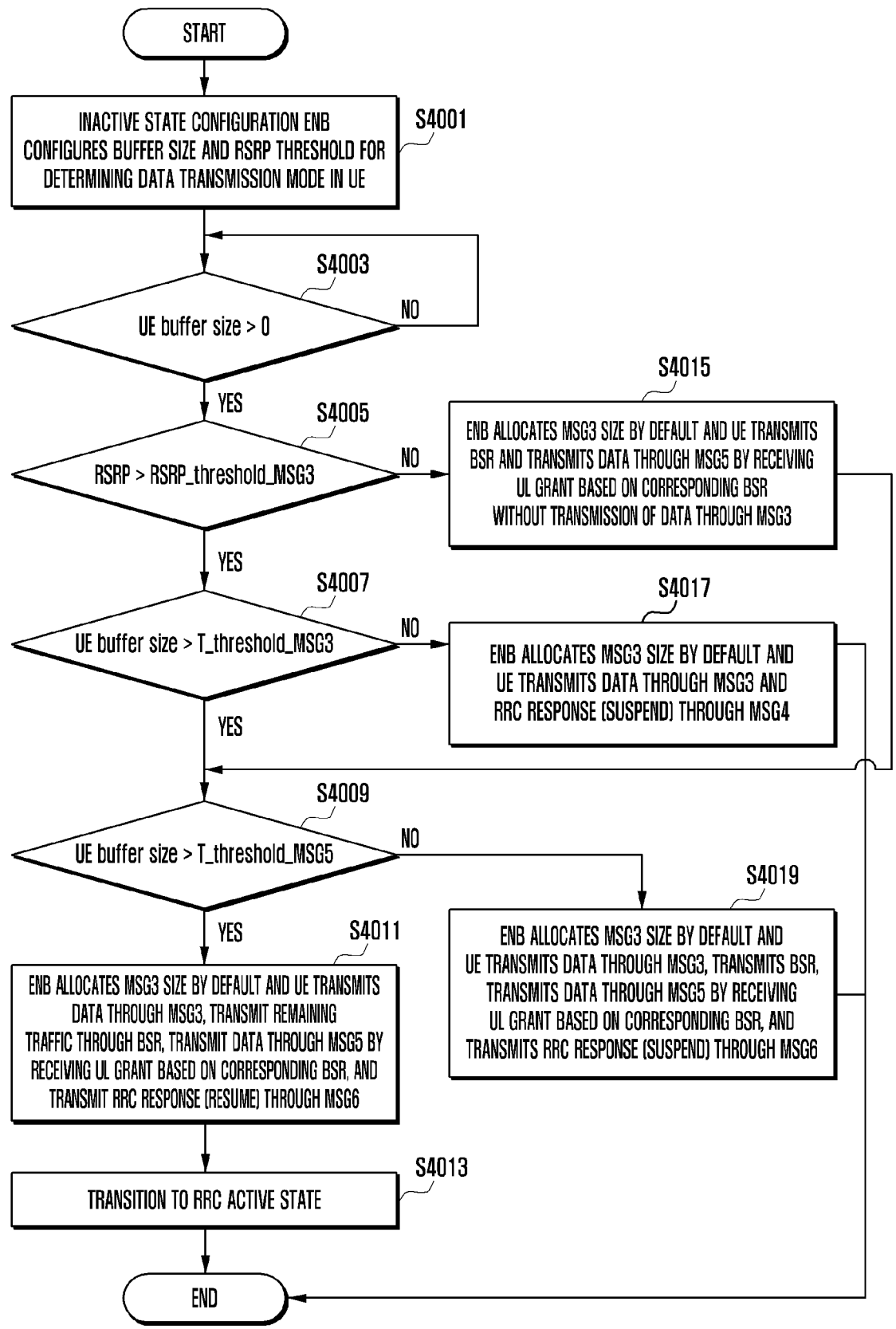
FIG. 40 illustrates an operation of a method by which, when the UE operates on the basis of event triggering configured by the eNB to transmit data without additional feedback for the corresponding event in the NR system according to the second embodiment of the disclosure, the UE determines MSG3, MSG5, or an RRC state transition-related operation mode for transmitting data.

FIG. 40 illustrates an operation of a method by which, when the UE operates on the basis of event triggering configured by the eNB to transmit data without additional feedback for the corresponding event in the NR system according to the second embodiment of the disclosure, the UE determines MSG3, MSG5, or an RRC state transition-related operation mode for transmitting data.

In the corresponding operation, the eNB cannot know the corresponding information before BSR or BSRP information of MSG3 is transmitted, the allocation size of MSG3 may be determined by default without the corresponding information BSR or RSRP when MSG3 is allocated to the eNB.

In step 4001, the eNB may configure the buffer size and an RSRP threshold to determine a data transmission mode of the UE.

It may be identified whether the UE buffer size is larger than 0 in step S4003, and if the UE buffer size is larger than 0, it may be identified whether the RSRP is larger than the RSRP threshold for MSG3 (RSRP_thresold_MSG3) in step S4005. If the RSRP is larger than the RSRP threshold for MSG3 (RSRP_thresold_MSG3), it may be identified whether the UE buffer size is larger than a buffer size threshold for MSG3 (T_thresold_MSG3) in step S4007. If the UE buffer size is larger than the buffer size threshold for MSG3 (T_thresold_MSG3), it may be identified whether the UE buffer size is larger than a buffer size threshold for MSG5 (T_thresold_MSG5) in step 4009. If the UE buffer size is larger than the buffer size threshold for MSG 5 (T_thresold_MSG5), the eNB allocates the default MSG3 size, and the UE transmits data through MSG3, transmits the remaining traffic through BSR, transmits data through MSG5 by receiving UL grant based on the corresponding BSR, and transmit an RRC response (resume) through MSG6 in step S4011. In step S4013, the UE may transition to the RRC active state.

If the RSRP is smaller than the RSRP threshold for MSG3 (RSRP_thresold_MSG3) in step S4005, the eNB allocates the default MSG3 size, and the UE may transmit the BSR and transmit data through MSG5 by receiving UL grant based on the corresponding BSR without transmitting data through MSG3 in step S4015. After step S0415, the operation after step S4009 may be performed.

If the UE buffer size is smaller than the buffer size threshold for MSG3 (T_thresold_MSG3) in step S4007, the eNB may allocate the default MSG3 size, and the UE may transmit data through MSG3 and transmit the RRC response (suspend) through MSG4 in step S4017.

If the UE buffer size is smaller than the buffer size threshold for MSG 5 (T_thresold_MSG5) in step S4009, the eNB may allocate the default MSG3 size, and the UE may transmit data through MSG3, transmit the remaining traffic through the BSR, transmit data through MSG5 by receiving UL grant based on the corresponding BSR, and transmit an RRC response (suspend) through MSG6 in step S4019.

Figure 41:
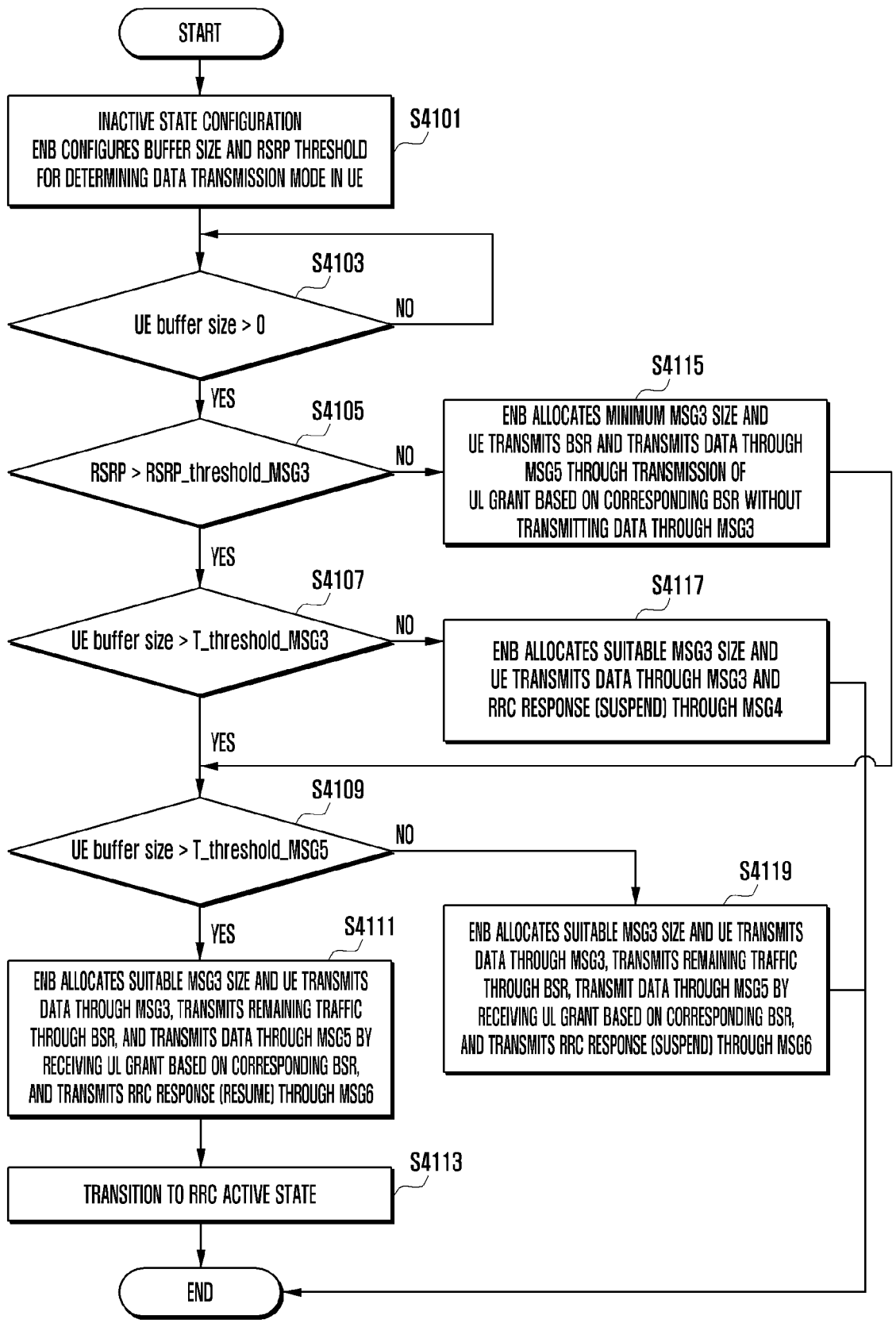
FIG. 41 illustrates an operation of a method by which, when the UE transmits additional feedback for an event to the eNB on the basis of event triggering configured by the eNB to transmit data in the NR system according to the second embodiment of the disclosure, the UE determines MSG3, MSG5, or an RRC state transition-related operation mode for transmitting data.

FIG. 41 illustrates an operation of a method by which, when the UE transmits additional feedback for an event to the eNB on the basis of event triggering configured by the eNB to transmit data in the NR system according to the second embodiment of the disclosure, the UE determines MSG3, MSG5, or an RRC state transition-related operation mode for transmitting data.

In the corresponding operation, since BSR or RSRP information of MSG3 is transmitted before data transmission and thus the eNB knows the corresponding information, the allocation of MSG3 may be optimized (to be the minimum size required for data transmission or the maximum size allowed by a channel state) and allocated on the basis of the corresponding BSR or RSRP information when MSG3 is allocated to the eNB.

In step 4101, the eNB may configure the buffer size and an RSRP threshold to determine a data transmission mode of the UE.

It may be identified whether the UE buffer size is larger than 0 in step S4103, and if the UE buffer size is larger than 0, it may be identified whether the RSRP is larger than the RSRP threshold for MSG3 (RSRP_thresold_MSG3) in step S4105. If the RSRP is larger than the RSRP threshold for MSG3 (RSRP_thresold_MSG3), it may be identified whether the UE buffer size is larger than a buffer size threshold for MSG3 (T_thresold_MSG3) in step S4107. If the UE buffer size is larger than the buffer size threshold for MSG3 (T_thresold_MSG3), it may be identified whether the UE buffer size is larger than a buffer size threshold for MSG5 (T_thresold_MSG5) in step 4109. If the UE buffer size is larger than the buffer size threshold for MSG 5 (T_thresold_MSG5), the eNB may allocate the default MSG3 size, and the UE may transmit data through MSG3, transmit the remaining traffic through the BSR, transmit data through MSG5 by receiving UL grant based on the corresponding BSR, and transmit an RRC response (resume) through MSG6 in step S4111. In step S4013, the UE may transition to the RRC active state.

If the RSRP is smaller than the RSRP threshold for MSG3 (RSRP_thresold_MSG3) in step S4105, the eNB may allocate the minimum MSG3 size, and the UE may transmit the BSR and transmit data through MSG5 by receiving UL grant based on the corresponding BSR without transmitting data through MSG3 in step S4115. After step S4115, the operation after step S4109 may be performed.

If the UE buffer size is smaller than the buffer size threshold for MSG3 (T_thresold_MSG3) in step S4107, the eNB may allocate the proper MSG3 size, and the UE may transmit data through MSG3 and transmit the RRC response (suspend) through MSG4 in step S4117.

If the UE buffer size is smaller than the buffer size threshold for MSG 5 (T_thresold_MSG5) in step S4109, the eNB may allocate the proper MSG3 size, and the UE may transmit data through MSG3, transmit the remaining traffic through the BSR, transmit data through MSG5 by receiving UL grant based on the corresponding BSR, and transmit an RRC response (suspend) through MSG6 in step S4119.

Figure 42:
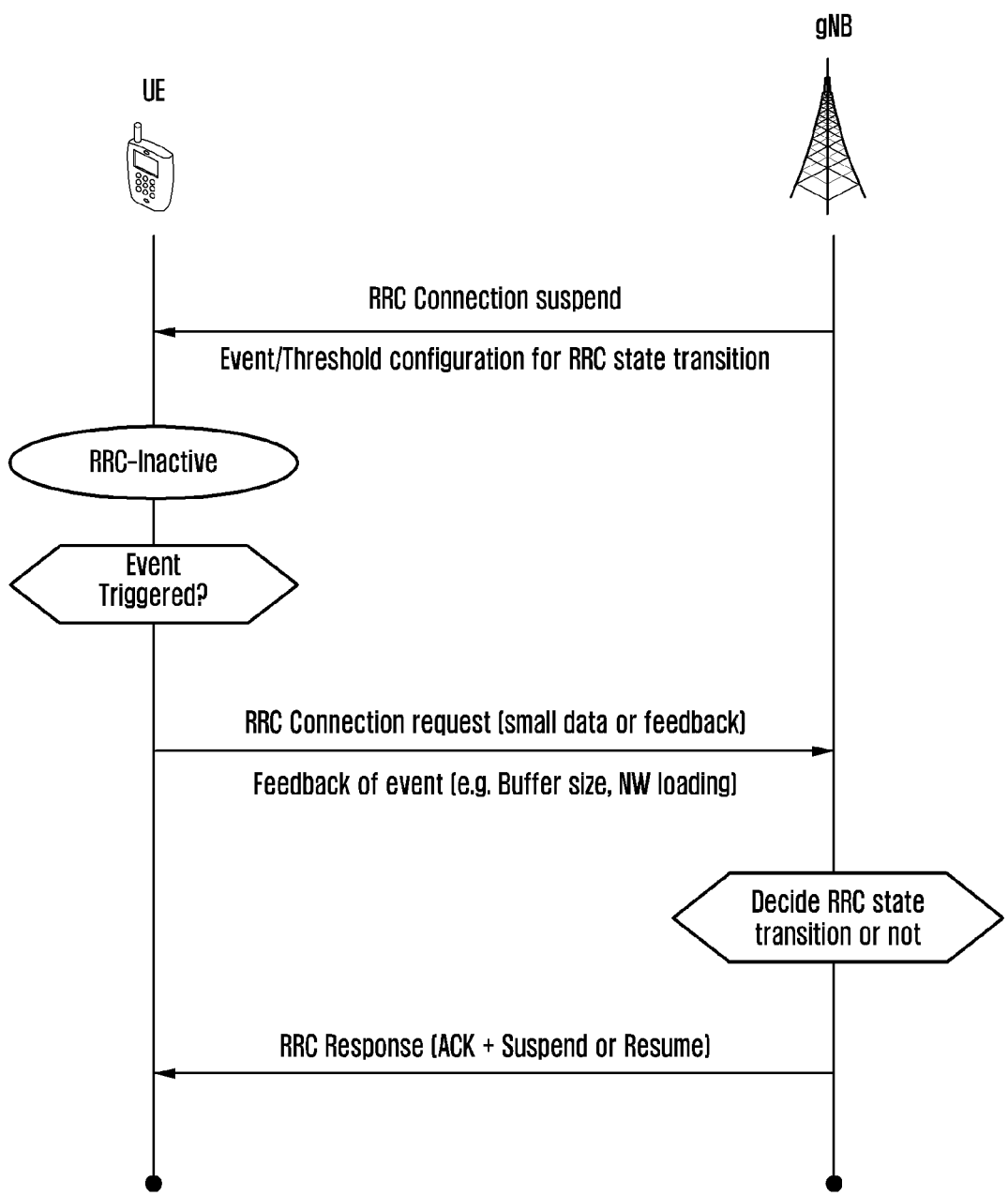
FIG. 42 illustrates a method by which the UE transmits data on the basis of event triggering configured by the eNB to transmit data and the eNB determines an RRC state transition-related operation mode according to the second embodiment of the disclosure.

FIG. 42 illustrates an operation for determining an RRC state in which data is transmitted according to the second embodiment of the disclosure. If there is data to be transmitted by the UE on the basis of event triggering configured by the eNB and additional feedback for the corresponding event is required, the UE transmits the same. Based thereon, the eNB may determine an RRC state transition-related operation mode.

At this time, a criterion of the event triggering configured by the eNB may be one or a combination of network loading, UE mobility, UE battery status, and UE location (cell center or boundary.

The conventional data transmission in the idle state has disadvantages in that channel access efficiency decreases due to grant-free transmission and transmission spectral efficiency decreases due to absence of information such as CQI and BSR, but a method of designing the UE operation in the inactive state newly defined additionally proposes a method of improving spectral efficiency and channel access to allow the UE to efficiently transmit traffic in the RRC inactive (RRC_INACTIVE) state with reference to FIGS. 43 to 45.

FIG. 43 illustrates an example of a method of acquiring information for improving spectral efficiency in the case in which data is transmitted in the NR RRC inactive state according to the second embodiment of the disclosure.

A distance between UE and the eNB (Short/Long Coverage) may be determined on the basis of pathloss between the UE and the eNB, for example, RSRP/RSRQ. According to an embodiment, since the corresponding information can be detected in the RA preamble transmission and RAR reception process in the RACH operation, the RRC state-related operation mode for transmitting data may be determined on the basis thereof.

Since the corresponding information is a reference for determining a payload length which can be transmitted in the inactive state, it is advantageous to transmit data in the inactive state as a distance is shorter (as a received signal quality is higher) when CQI and similar information are possessed it is relatively advantageous to transmit data in the active state as a distance is shorter (as a received signal quality is higher) when CQI and similar information are present, so that the RRC state-related operation mode for transmitting data is determined on the basis thereof.

According to an embodiment, if the RACH is used as an example of grant-free transmission, RACH Message 1/2-based CQI (MCS) is determined to acquire CQI information based on previous transmission DL/UL, More specifically, by performing Tx power ramping up on the conventional RACH preamble, if the RACH preamble reaches Tx power arriving at the eNB, an RAR is received, and as a result, the eNB cannot know Tx power information of the UE. This is because the conventional RACH preamble UL Tx power is not fixed.

In order to solve the problem, by adding a Tx power index to an RACH preamble sequence to inform the eNB of a UL tx power level, the eNB may detect Tx power of a successfully received RACH preamble and use an MCS mapped to corresponding CQI for future transmission, and allocates radio resources (frequency and time) based on the corresponding MCS when applying UL grant.

By transmitting the conventional RACH preamble sequence and performing Tx power ramping up, if the RACH preamble reaches Tx power arriving at the eNB, an RAR is received, and as a result, the UE detects UL CQI on the basis of Tx power of the RACH preamble successfully receiving the RAR and applies the UL CQI to Message3/or Message5 and transmit the message. At this time, the eNB cannot know an applied MCS, so that UL grant is inaccurately performed in units and a header is transmitted through a fixed in UL payload and payload MCS information is indicated within the header.

According to an embodiment, if grant-free transmission uses the RACH, the method of acquiring previous transmission DL/UL-based CQI information may include a method of transmitting an indication indicating whether CQI is valid in previous RACH data transmission and a method of adjusting a CQI change within a predetermined time, for example, 1 second (+alpha, −beta) and transmitting feedback to the eNB or adjusting the CQI change on the basis of determination of the UE.

In a method of applying security key to data piggybacked on RACH message 3/5 if grant-free transmission uses the RACH, a NAS security key which can be used in the conventional inactive mode is required to be security-processed by the MME and thus has problems.

Problem 1: MME capacity excess—need relatively large data and MME increase

Problem 2: delay generation—SRB has a long eNB routing path and thus is a case of the delay Accordingly, in the method of using an AS (DRB) security key instead of the NAS security key (SRB-based transmission), An operation of performing eNB (AS security key-based) inactive state data transmission, wherein, in the inactive state, the UE and the network possess UE context including the security key and thus transmit data using the conventional security key within a predefined valid time (security timer)

If a predetermined valid time (security timer) passes

If the eNB is changed due to movement of the UE after RRC release (suspend) (another transmission option operation in gNB change)

NAS security-applied inactive transmission, or data transmission after AS security update and application after transition to active state An operation and a method by which the UE provide feedback of configuration information for the security operation to be applied to data transmission in the inactive state and the eNB performs configuration and transmission are included.

FIG. 44 illustrates an example of an information acquisition method for improving channel access in the case in which efficient transmission is performed in the NR RRC inactive state according to the second embodiment of the disclosure. FIG. 44 illustrates an example of a method of acquiring required additional information before transition to the active state when the RACH is performed in the inactive state.

A method of reducing a data transmission delay time by transmitting in advance active transmission-related information such as the SR, the BSR, and UL grant required for conventional UL data transmission in an inactive (small) data transmission interval is described below.

SR allocation

Buffer size information (BSR and similar information)

Pre-allocation of resources such as UL grant and DL scheduling

UE ID (C-RNTI) allocation

The operation including the dedicated RACH allocation is included in the sequence and payload including RACH messages 1/2/3/4/5 as information, which is not limited to messages included in the RACH operation and may include inactive state data transmission which is a previous step of transition to the active state.

FIG. 45 illustrates an example of a method of improving channel access in the case in which efficient transmission is performed in the NR RRC inactive state according to the second embodiment of the disclosure. Particularly, FIG. 45 illustrates an example of an information acquisition method for improving channel access in the case in which the UE transmits data while maintaining the inactive state of UE and corresponds to an example of a method of acquiring required additional information before transition to the active state when the RACH is performed in the inactive state.

A method of separating the conventional RACH and the RACH for data transfer may include an operation for separation into a preamble sequence domain, time and frequency, and beam resources and an operation for determining a priority of corresponding transmission by separating the conventional RACH (RRC state transition and TA update) and the RACH for inactive state data transmission on the basis thereon.

A method of applying different barring statistics in barring application under network congestion includes, for example, an operation for operating, with a low priority, or barring the RACH for inactive state data transmission compared to RRC state transition (transition from inactive to active) under the network congestion.

Further, the corresponding RACH separation method of classifying QoS levels and supporting the same when data transmission is performed in the RRC inactive state may include an operation for separation into the preamble sequence domain, the time and frequency, and the beam resources and an operation for determining the priority of the corresponding transmission by separating the RACH for each QoS of generated traffic on the basis thereof.

A method of applying different barring statistics in barring application under network congestion includes, for example, an operation for operating, with a low priority, or barring the RACH for inactive state data transmission compared to RRC state transition (transition from inactive to active) under the network congestion.

Figure 46:
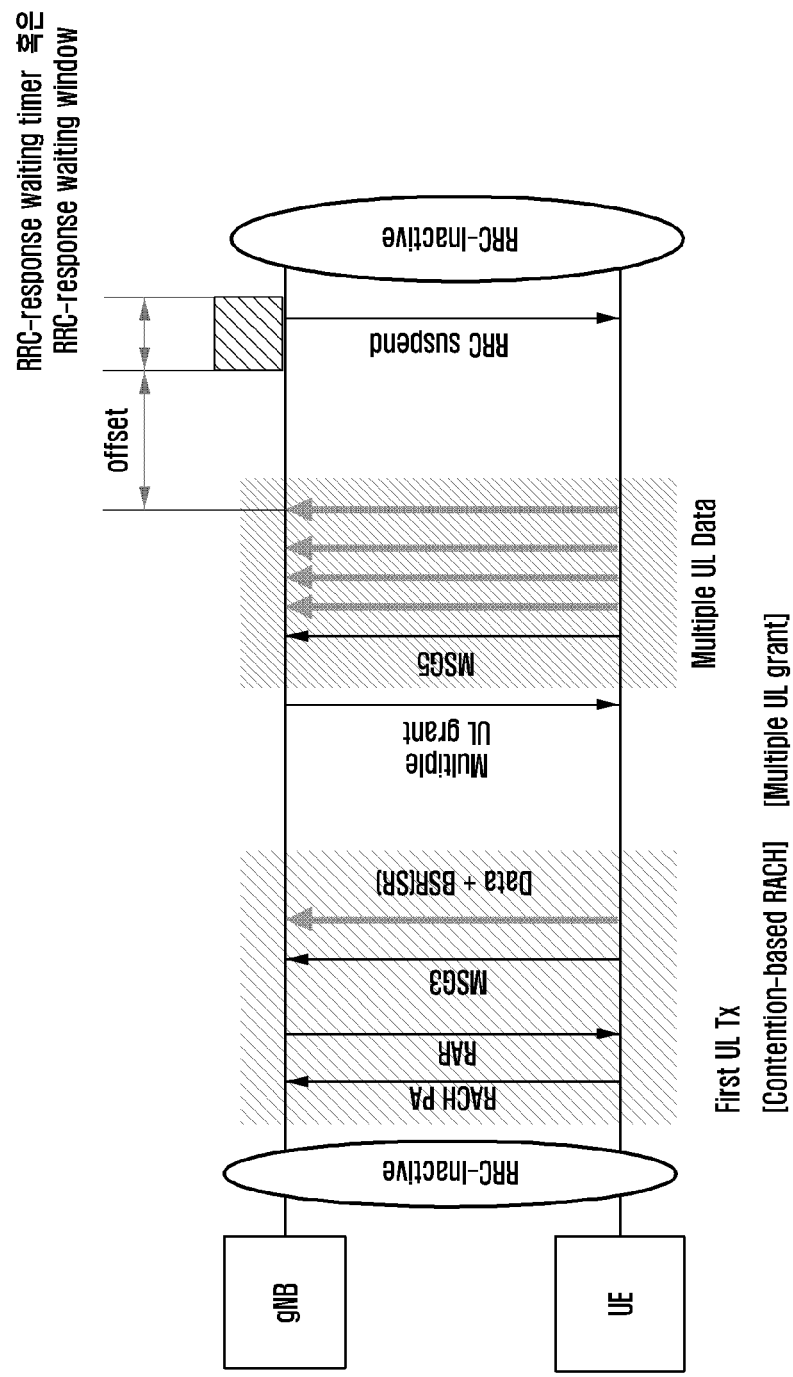
FIG. 46 illustrates a procedure of allocating multiple UL grants and transmitting corresponding UL on the basis of UE buffer state information when data is transmitted in the NR RRC inactive state according to the second embodiment of the disclosure.

FIG. 46 illustrates a procedure of allocating multiple UL grants and transmitting corresponding UL on the basis of UE buffer state information when data is transmitted in the NR RRC inactive state according to the second embodiment of the disclosure.

IF the UE knows transmission data capacity, the UE piggyback and transmit buffer state information required to be additionally transmitted on MSG3 through the BSR and then transmit, through MSG5, UL grant for transmitting data through MSG5. At this time, multiple UL grants for a plurality of transmissions through MSG5 may be used.

The corresponding multiple UL grants correspond to allocation of a plurality of UL transmission resources and an operation of allocating UL resources within one subframe or UL grants over a plurality of subframes When receiving data through MSG5, the UE may perform an operation of turning on only resources corresponding to slots/subframes corresponding to the UL grant and perform UL transmission and perform additional update (identify whether DL transmission is added) as well as a baseline operation for performing PDCCH decoding. The UE may perform selective and non-successive turn on operation up to resources corresponding to the last UL grant in the multiple UL grants, and in an operation for receiving an RRA response (suspend or resume), configure an offset (in consideration of the time during which the eNB receives UL data, decodes the same, and generates ACK/NACK) for receiving an RRC response (suspend or resume) and an RRC response (suspend or resume+ACK/NACK) reception window and perform selective reception. An operation in which the UE configures a new timer (RRC-response waiting timer or RRC-response waiting window) for receiving the RRC response for a waiting window which waits for receiving the RRC response (suspend or resume+ACK/NACK) of the corresponding operation.

Figure 47:
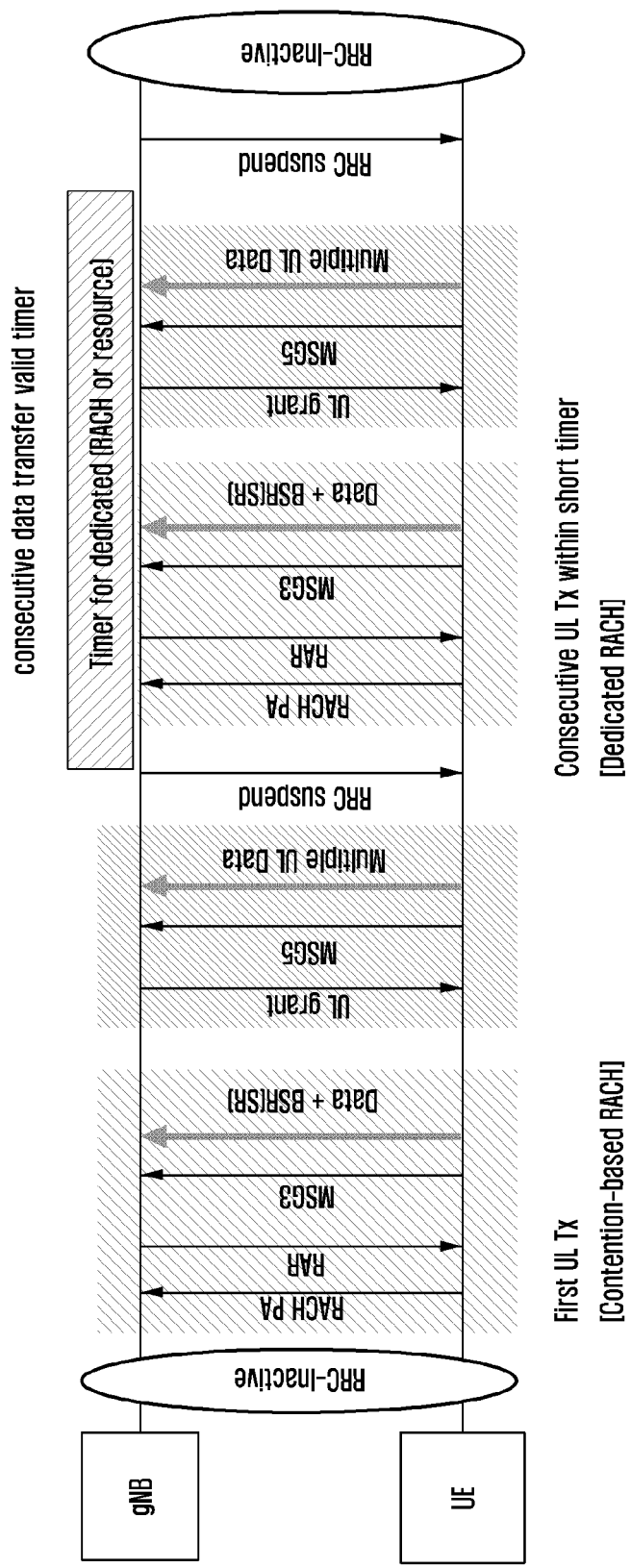
FIG. 47 illustrates an operation for allocating preamble sequences and resources for the dedicated RACH and grant-free transmission in data transmission in the NR RRC inactive state according to the second embodiment of the disclosure and configuring a resource valid time (valid timer)

FIG. 47 illustrates an operation for allocating preamble sequences and resources for the dedicated RACH and grant-free transmission in data transmission in the NR RRC inactive state according to the second embodiment of the disclosure and configuring a resource valid time (valid timer).

In an embodiment of the operation in which the UE transmits data in the inactive state, the UE may perform a resource allocation operation for contention-based RACH in initial transmission and then perform consecutive data transmission for a predetermined time (consecutive data transfer timer).

The corresponding resource allocation may include an operation of performing the contention-based RACH in valid time initial transmission and allocating RACH preamble sequences for the dedicated RACH operation for inactive data transmission after second transmission.

The corresponding operation may include an operation for inserting the corresponding RACH sequences as allocation information into the RRC response message (suspend) which the eNB transmits when first data transmission in the inactive state or first data transmission generated after a valid time (consecutive data transfer valid timer) in previous data transmission is completed.

Figure 48:
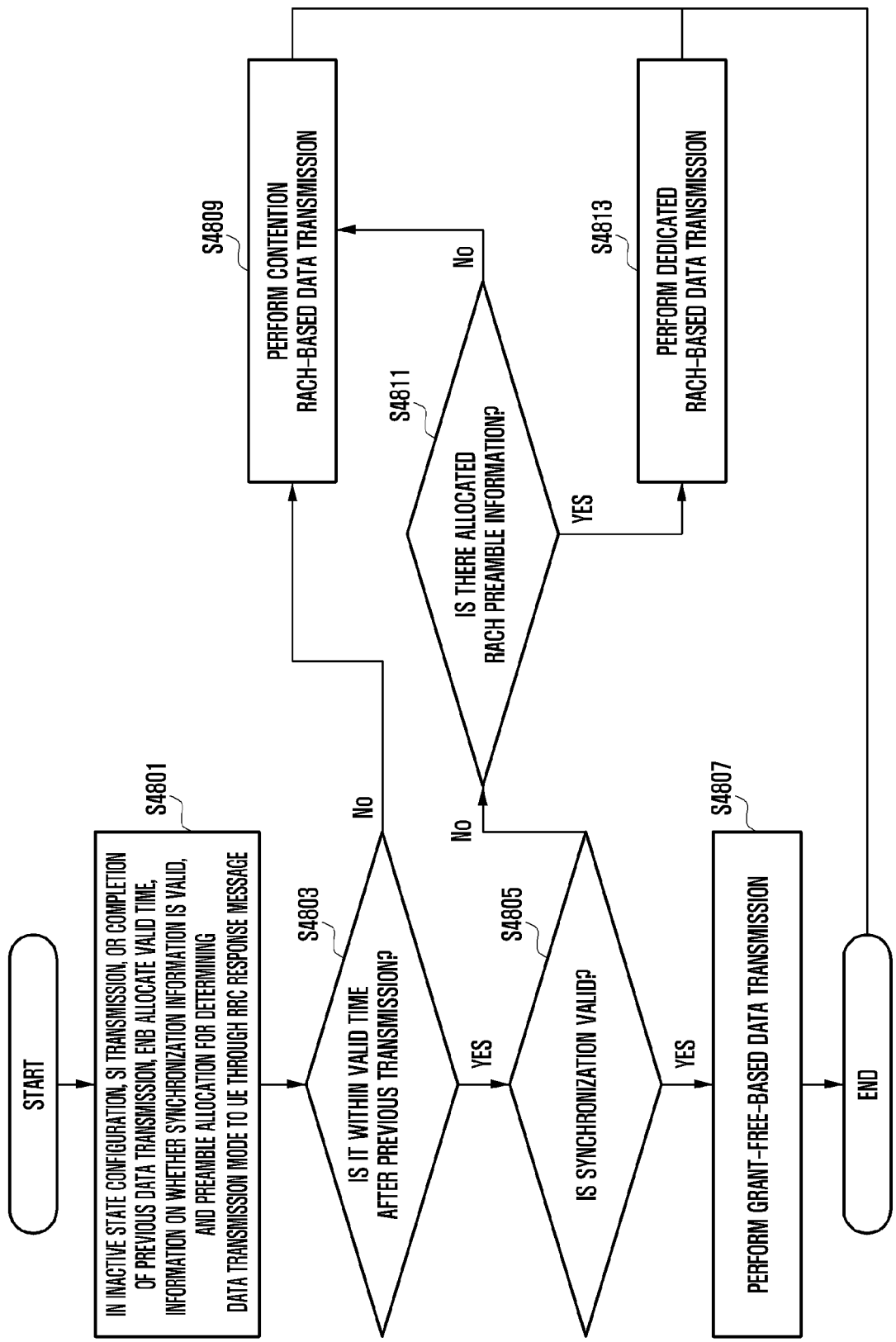
FIG. 48 illustrates a criterion for determining whether to transmit contention-based RACH-based data transmission, dedicated-based RACH-based data transmission, or grant-free-based data transmission in NR RRC inactive state data transmission according to the second embodiment of the disclosure.

The corresponding resource allocation may include an operation of performing the contention-based RACH in valid time initial transmission and An operation in which the eNB allocates and indicates radio resources through which the UE accesses the eNB in a grant-free manner to support a grant-free operation for inactive data transmission after second transmission may be included. In the corresponding operation, if first data transmission in the inactive state or first data transmission generated after a valid time (consecutive data transfer valid timer) in previous data transmission is completed, the corresponding RACH preamble sequence may be inserted into an RRC response message (suspend) transmitted by the eNB as allocation information. FIG. 48 illustrates a criterion for determining whether to transmit contention-based RACH-based data transmission, dedicated-based RACH-based data transmission, or grant-free-based data transmission in NR RRC inactive state data transmission according to the second embodiment of the disclosure.

As illustrated in FIG. 48, in the operation for transmitting MSG3 data and then transmitting consecutive data through MSG5, a criteria for determining whether to perform the contention-based RACH-based data transmission operation, the dedicated-based RACH-based data transmission operation, or the grant-free-based data transmission is described below.

According to an embodiment, if there are sufficient RACH preambles according to whether the RACH preambles can be allocated to UEs within a valid time (consecutive data transfer timer) after start of data transmission in the inactive state, the dedicated-based RACH-based data transmission operation may be performed.

According to another embodiment, if synchronization information should be acquired through an additional RACH operation according to whether synchronization information is valid on the basis of the RACH through data transmission in previous inactive state, the RACH-based data transmission may be performed, and if there is valid synchronization signal through previous transmission, the grant-free transmission may be performed.

Whether to perform 1) contention-based RACH, 2) dedicated-based RACH, and 3) grant-free-based data transmission may be determined by the eNB. The corresponding operation may include an operation in which the eNB provides an indication included in an RRC response message (suspend) which the eNB transmits when first data transmission in the inactive state or first data transmission generated after a value time (consecutive data transfer valid timer) in previous data transmission is completed and an operation in which the eNB provides the indication to the UE through system information (or on-demand SI).

Within an RRC configuration message by the eNB when the inactive state starts
   a valid time (consecutive data transfer valid timer) in previous data transmission
   a transmission mode in second transmission
   1) Contention-based RACH,
   2) Dedicated-based RACH,
   3) Grant-free-based data transmission is determined by the eNB and transmitted to the UE.

On the basis of the corresponding configuration the UE may determine whether a passed time to the previous transmission in the inactive state is within the valid time (consecutive data transfer valid timer).

If the passed time is within the valid time or even though the passed time is within the valid time, 3) grant-free transmission may be performed if synchronization signal is valid according to whether it is identified whether the synchronization information is valid through update of an RACH procedure in previous transmission.

If synchronization information is not valid since the valid time (consecutive data transfer valid timer) passes from the previous transmission or the synchronization information is not update through the RACH procedure, the RACH procedure may be performed.

At this time, 2) dedicated-based RACH may be performed if there is allocated RACH preamble information and 1) contention-based RACH may be performed if there is no allocated RACH preamble information.

Figure 49:
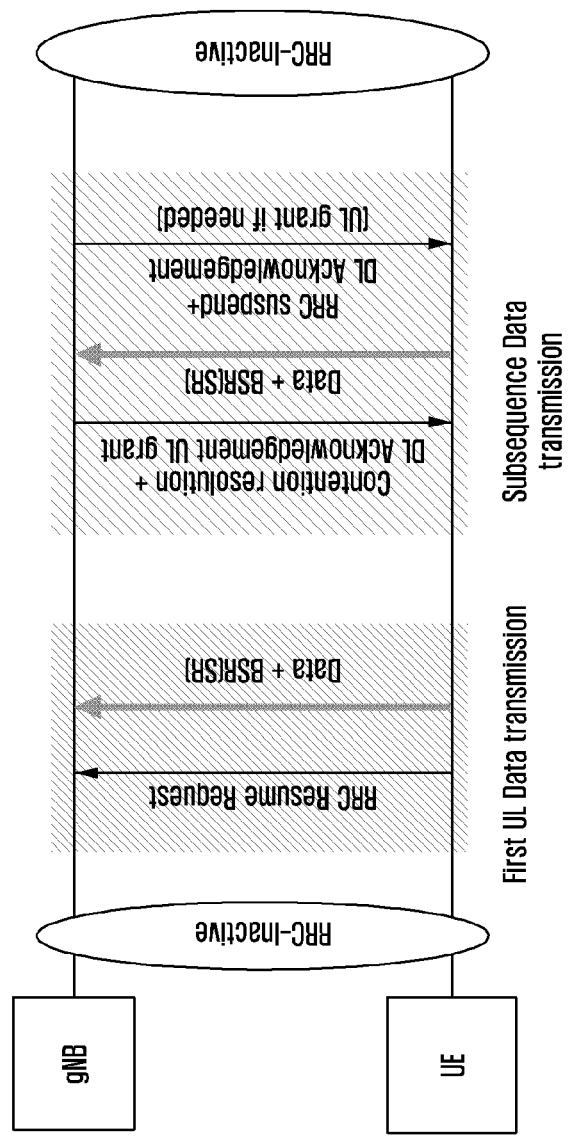
FIG. 49 illustrates an additional consecutive data transmission procedure after initial transmission in NR RRC inactive state data transmission according to the second embodiment of the disclosure.

FIG. 49 illustrates an example of an additional data transmission procedure after initial UL data transmission in data transmission of the NR RRC inactive state according to the second embodiment of the disclosure.

According to an embodiment for determining whether to perform transmission in the RRC_Inactive state or transition to the RRC connected (active) state in data transmission by the UE, the UE may transmit an indication indicating whether the UE is within an anchor eNB storing previous UE context including a security key or the eNB is changed along with an RRC connection request (RRC resume request), and if the UE is within the anchor eNB storing previous UE context including the security key, the eNB may perform data transmission in the RRC_INACTIVE state.

If the UE moves outside the anchor eNB, it is determined to transmit data after transition to the RRC_CONNECTED state and the indication is transmitted through an RRC connection response message. (RRC resume: data transmission after transition to the connected state and RRC suspend message: data transmission while the RRC_INACTIVE state is maintained)

The disclosure may include an operation in which the same anchor eNB performs a change within the same sector, the same PDCP entity, the same DU, and the same CU, and the UE and the eNB transmit and receive information indicating whether the change is within each unit and determines whether to perform transition to the RRC state or generate a new security key on the basis thereof.

The disclosure may include an operation in which the UE transmits information indicating whether the UE is within the anchor storing previous UE context including a security key or the eNB is changed when transmitting an RRC_connection request (RRC resume request), and the UE moves outside the anchor eNB, generates a new security key on the basis thereof.

The operation in which the same anchor eNB makes a change within the same sector, the same PDCP entity, the same DU, and the same CU and determines whether the change is within each unit may include an operation in which the UE receiver determines and indicates whether the eNB is changed on the basis of a physical cell ID broadcasted/unicasted through system information by the eNB or/and CU entity, DU entity, and PDCP entity information broadcasted/unicasted through system information and configured through RRC or the UE copies and transmits the physical cell ID, CU entity, DU entity, and PDCP entity information which the UE receives and the eNB compares the same with its own physical cell ID, CU entity, DU entity, and PDCP entity information to determine whether there is the change.

Another embodiment of determining whether to transmit data in the RRC_Inactive state or transition to the RRC connected (Active) state in data transmission by the UE may include an operation of performing data transmission in the RRC_INACTIVE state if the eNB receives the BSR equal to or smaller than a threshold on the basis of the buffer size of the UE, an amount of data to be transmitted, and the BSR which are transmitted when the UE transmits an RRC_connection request (RRC resume request) and transitions to the RRC_CONNECTED state and transmits data if the eNB receives the BSR larger than or equal to the threshold and an operation of indicating the result through an RRC connection response message (RRC resume: data transmission after transition to the connected state and RRC suspend message: data transmission while the RRC_INACTIVE state is maintained).

If the UE buffer size is larger than or equal to a threshold for determining RRC transition in initial transmission, the disclosure includes an operation for directly switching to the RRC_CONNECTED state (or RRC_ACTIVE state) through an RRC connection response (RRC resume message) without transmitting initial transmission UL data;

an operation for transmitting only UL data which can be initially transmitted in the inactive state, transmitting DL acknowledgement corresponding to the initially transmitted UL data through the RRC connection response (RRC resume message), and switching to the RRC_CONNECTED state (or RRC_ACTIVE state); and if the UE buffer size is equal to or smaller than the threshold for determining RRC transition in initial transmission, an operation for transmitting subsequent data after initial transmission while maintaining the RRC_INACTIVE state without switching to the RRC_CONNECTED state (or RRC_ACTIVE state), at this time, if not all the buffered data is transmitted in initial transmission, an operation for transmitting data and the BSR together and informing the eNB that transmission is required in the future;

an operation in which the eNB provides UL grant on the basis of the BSR included in data transmission in the inactive state of the UE, wherein the UL grant is multiplexed with DL acknowledgement for UL data transmission in an RACH contention resolution message;

an operation in which the UE transmits residual UL data in the inactive state, and if not all the buffered data is transmitted in this transmission, transmits data and the BSR together and informs the eNB that transmission is required in the future;

The buffered data to be transmitted by the UE including residual data of previous transmission and data newly arriving at (generated by) the UE after previous transmission, if the UE buffer size is equal to or smaller than the threshold for determining RRC transition, an operation for transmitting data while maintaining the RRC_INACTIVE state without switching to the RRC_CONNECTED state (or RRC_ACTIVE state), if the buffered data to be transmitted by the UE in subsequent UL data transmission is larger than previous UL grant, an operation in which the UE transmits data and the BSR together and informs the eNB that transmission is required in the future;

a method by which the eNB receiving the information performs transmission/reception by performing multiplexing/de-multiplexing together with DL acknowledgement (DRB) and RRC connection response (RRC suspend) (SRB1) corresponding to subsequent UL data through which BRS-based UL grant is received at a MAC PDU level;

a method by which the UE repeatedly performs a subsequent UL data transmission procedure based on the received UL grant like according to the embodiment; an operation in which, if the buffered data to be transmitted by the UE in subsequent UL data transmission is smaller than previous UL grant, the UE transmits only data or also transmits the BSR (=0) and informs the eNB that additional transmission is not required in future;

a method by which the eNB receiving the information performs transmission/reception by performing multiplexing/de-multiplexing together with DL acknowledgement (DRB) and RRC connection response (RRC suspend) (SRB1) corresponding to received subsequent UL data at a MAC PDU level without transmitting UL grant based on the BSR;

a method by which the UE maintains the inactive state and starts again the initial UL data transmission procedure when UL data is additionally generated.

If the UE buffer size is larger than or equal to the threshold after initial transmission within the RRC_INACTIVE state, the disclosure includes an operation of directly switching to the RRC_CONNECTED state (or RRC_ACTIVE state) through an RRC connection response (RRC resume message) without transmitting initial transmission UL data;

an operation for transmitting only UL data which can be subsequently transmitted in the inactive state, transmitting DL acknowledgement corresponding to the initially transmitted UL data through the RRC connection response (RRC resume message), and switching to the RRC_CONNECTED state (or RRC_ACTIVE state).

Further, the disclosure includes an operation for determining an operation by which, if the UE is within the anchor eNB which stores previous UE context including a security key even in subsequent UL data transmission after initial transmission, the eNB performs data transmission in the RRC_INACTIVE state, and an operation by which, if the UE moves outside the anchor eNB, switching to the RRC_CONNECTED state and transmitting data and an operation for indicating the same through the RRC connection response message.

Figure 50:
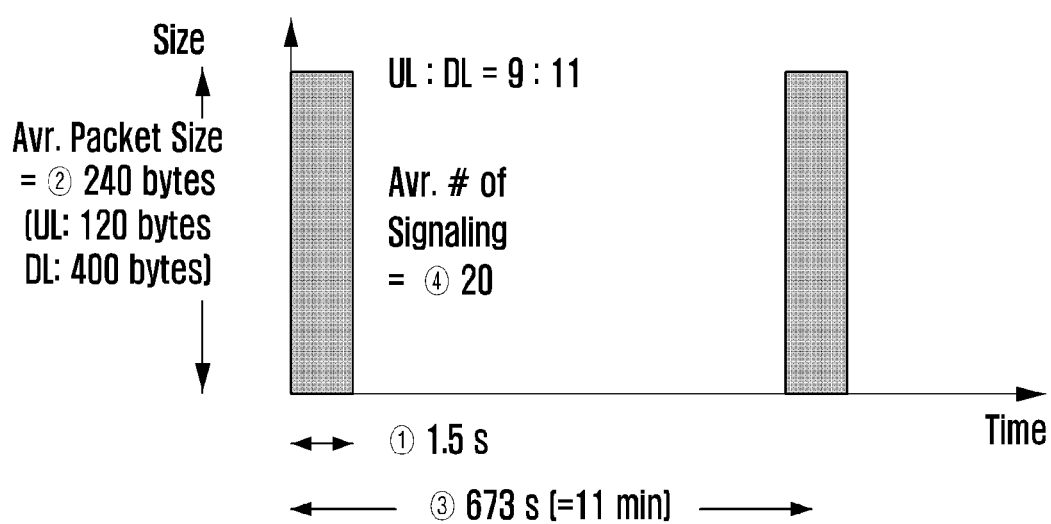
FIG. 50 illustrates an example of traffic characteristics of a keep alive message of a particular application according to the second embodiment of the disclosure.

FIG. 50 illustrates an example of traffic characteristics of a keep alive message of a particular application according to the second embodiment of the disclosure.

As illustrated I FIG. 50, in the case of keep alive traffic, in general, uplink/downlink traffic bursts are consecutively transmitted and received, no traffic is generated for a relatively long time after a short burst, and then uplink/downlink traffic bursts are consecutively transmitted and received again. Detailed information on the traffic payload size, an inter-packet arrival interval, and the number of uplink/downlink traffic packets within one burst varies depending on an application and a server.

A method of improving channel access efficiency in the case in which data is transmitted in the RRC inactive state may be applied to increase efficiency of initial data transmission and consecutive uplink transmission and also applied for transmission/reception of corresponding downlink traffic for supporting the uplink traffic, for example, ACK/NACK of a MAC/RAL level, that is, an ARQ/HARQ response.

1) a method of fixedly allocating radio resource grant (for example, dedicated RACH or SR resources) for the inactive UE to all UEs, 1-1) a method of fixedly allocating resources to a UE in mode 1) or mode 3) in which data transmission starts at the inactive state) among inactive state UEs since the resources are highly likely to lack to be allocated to all inactive UEs.

2) a method of periodically allocating radio resource grant (for example, dedicated RACH or SR resources) for the inactive UE to all UEs, 2-1) a method of periodically allocating resources to a UE in mode 1) or mode 3) in which data transmission starts at the inactive state) among inactive state UEs since the resources are highly likely to lack to be allocated to all inactive UEs.

the corresponding period is determined on the basis of UE application information, previous activation history, BS determination, or UE request (feedback)

3) a method of transmitting data through contention (non-orthogonal channel access) whenever data is generated in the grant-free-based inactive state 4) an operation including a method of performing grant-free transmission only in initial transmission and performing grant-based transmission for consecutive packets, As a detailed operation for method 4), a two-step grant-free/grant consecutive transmission method is a method of performing contention-based, for example, contention-based RACH-based transmission for grant free transmission of initial packets and then performing dedicated-based RACH or scheduled-based data transmission for consecutive packets.

A detailed embodiments includes a method of allocating a valid preamble for a limited time (short duration) to a UE designated in mode 1) or mode 3) in which data transmission starts at the inactive state) among inactive state UEs since the dedicated RACH preamble is highly likely to be resources lacking to be allocated to all inactive UEs.

The dedicated RACH preamble allocation for the limited time or a UL grant/DL scheduling (paging period PF/PO control) method includes an operation in which the limited time based on data traffic characteristics is explicitly configured by a time tag on the basis of average duration time of uplink/downlink traffic packets within one burst according to traffic characteristics of the keep alive message illustrated in FIG. 21, or an operation of updating validity of resources valid for the corresponding limited time if packets arrive within the timer based on the timer having the fixed uplink/downlink traffic packet arrival time within the burst.

In a method of determining the valid time, a method of determining, for example, RACH message3/5 length on the basis of the UE/eNB buffer state, the BSR, and similar information includes a method of transmitting BSR similar information to the RA preamble, a method of transmitting UE buffer state information to the eNB by adding a new field to the RA preamble, for example, through Inactive-BSR or an RA preamble group, an operation of transmitting UL grant through an RA response on the basis thereof, and allocation of different UL resource lengths of message3/5 compared to the conventional RACH.

The data transmission method in the inactive state includes cases in which data to be transmitted in data transmission is larger than or equal to a packet length and is smaller than a packet length.

eNB configuration for supporting or not supporting fragmentation/reassemble for corresponding traffic (RRC configuration-based last connected RRC configuration-based operation or configuration operation through SI broadcast-based update)

According to an embodiment, a method of, if a plurality of transmissions of RACH message3 having consecutive sizes of traffic is required, receiving additional UL grant by adding a next bit to a new field through message3 and consecutively transmitting next data through RACH message3 without RACH message1/2, At this time, a method in which a header field for supporting the reassemble is needed in which case a initial transmission packet is expressed as 10, an intermediate packet is expressed as 00, and the last packet is expressed as 01 through application of 2 bits.

eNB configuration for supporting or not supporting multiplexing (RRC configuration-based last connected RRC configuration-based operation or configuration operation through SI broadcast-based update)

According to an embodiment, an operation for, when multiplexing is supported, separating a zero padding area if a field is needed and valid in a header but data length information, other multiplexed packets, and multiplexing are not supported.

The data transmission method in the inactive state can be applied to both the uplink and the downlink, and particularly the method of transmitting downlink data in the inactive state includes 1) for improving paging
an operation method of concatenating UE IDs to be paged on the PDSCH to which conventional paging maps the PDCCH, wherein DL data is piggybacked on the corresponding PDSCH, 2) an operation including grant-free transmission (for example, data piggyback transmission through RACH message 4) after conventional paging reception.

An operation in which the eNB configures a downlink transmission mode to be used when the inactive state UE transmits downlink data through system information or RRC configuration is included.

A procedure required for RACH contention resolution of data transmission in the inactive state includes an operation of performing content resolution based on the C-RNTI in the conventional way if data is transmitted through RACH message 5, an operation of performing contention resolution based on the RA-RANTI or the T-RATI if data is transmitted through RACH mesage3/message4, and an operation of performing contention resolution based on an ID of each or a combination of the P-RNTI, the S-TIMSI, and the IMSI which are IDs available by the UE in the inactive state.

The UE ID required for corresponding uplink/downlink transmission of data in the active state 1) is transmitted on the basis of the P-RNTI within a paging area unit (PAU) based on RAN-based paging 2) is transmitted on the basis of the C-RNTI if the UE camping on the latest RRC-connected eNB (last cell) without any movement 3) or is transmitted on the basis of the P-RNTI 4) or includes a method of newly defining an ID required for RRC resume as the UE ID, for example, newly generating the ID with the whole CID or a combination of some upper/lower bits+C-RNTI within the maximum number of ID bits and using the same for data transmission 5) a method of generating a new ID on the basis of the ID with each or a combination of the P-RNTI, the S-TIMSI, and the IMSI which are IDs available by the UE in the inactive state and using the same for data transmission An operation in which the eNB configures the UE ID to be used when the inactive state UE transmits downlink data through system information or RRC configuration is included.

Third Embodiment

The disclosure proposes a method of transmitting/receiving and configuring numerology information in a 5G mobile communication system. In the 5G mobile communication system, it is expected that various services (or slices) such as enhanced Mobile BroadBand (eMBB), Ultra Reliable and Low Latency Communication (URLLC), enhanced Machine Type Communication (eMTC) are supported. It may be understood in the same vein that a Voice over Internet Protocol (VoIP) which is a voice-specialized service and a Best Effort (BE) service in LTE corresponding to a 4G mobile communication system are supported. Further, it is expected that various numerologies are supported in the 5G mobile communication system. This specifically means sub-carrier spacing and directly influences A Transmission Time Interval (TTI). Accordingly, it is expect that TTIs having various lengths are supported in the 5G mobile communication system. This is one of the characteristics of the 5G mobile communication system, which is very different from a characteristic that only one type TTI (1 ms) is supported in LTE standardized up to now. When a TTI (for example, 0.1 ms) which is significantly shorter than the TTI of LTE corresponding to 1 ms is supported in the 5G mobile communication system, it is expected that the shorter TTI really helps in supporting URLLC requiring a short delay time. In this document, the term "numerology" is used to mean subcarrier spacing, subframe length, symbol/sequence length, and the like. The eNB may represent various abbreviations such as gNB, eNB, NB, and BS. The UE may represent various abbreviations such as UE, MS, and STA.

The disclosure proposes a method of transmitting/receiving and configuring numerology considering characteristics of the 5G mobile communication system, that is, various services and various numerology (TTI) resources. The transmission and reception is performed according to fixed numerology in conventional LTE but the disclosure proposes a method of transmitting/receiving and configuring numerology for supporting a dynamic change in numerology, which is difference therebetween. Since there are advantages and disadvantages according to the type of numerology transmission/reception method based on UE density, the transmission/reception method should be dynamically changed.

First, the term for a system and numerology separation assumed in the disclosure will be defined. The UE should have one or more pieces of numerology information according to the standard. The UE should receive a synchronization signal from the eNB in the mobile communication system according to the information. If the definition is completed according to the standard, the eNB may operate a synchronization signal according to a plurality of numerologies. If the UE successfully receives a synchronization signal from the eNB by particular numerology, the UE operates according to numerology applied to the successfully received synchronization signal or additional numerologies which can be derived from the numerology unless there is separate configuration by the eNB. At set of one or more numerologies which can be detected by successful reception of the synchronization signal may be called a default numerology set.

Meanwhile, the network or the eNB should configure information on additionally required numerology for each service (or slice) in a camped UE or a connected UE according to a request from the UE or determination of a service (or slice) control server. A set of numerologies for operating a service/slice which is not basically provided by the network or eNB but additionally provided as necessary may be called a dedicated numerology set.

A fourth embodiment of the disclosure describes a procedure and a method for configuring the dedicated numerology set in the UE operating according to the default numerology set.

Figure 51:
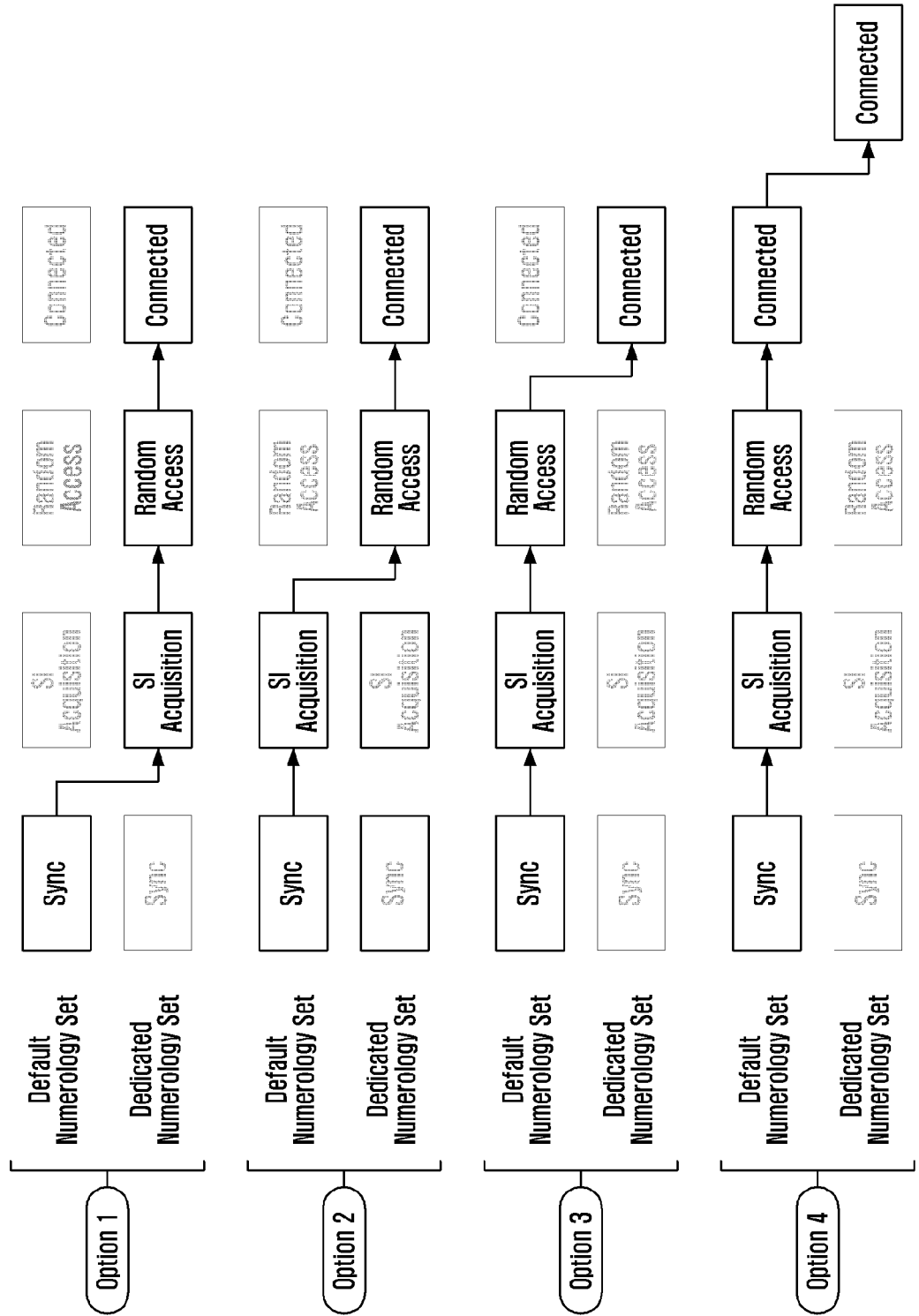
FIG. 51 illustrates various procedures for configuring a dedicated numerology set according to a third embodiment of the disclosure.

FIG. 51 illustrates various procedures for configuring the dedicated numerology set according to the third embodiment of the disclosure.

Referring to FIG. 51, according to four options, dedicated numerology set information or a corresponding ID (identification or identifier) is transmitted to the UE through a different signal at a different time point.

In option 1, the eNB carries and transmits dedicated numerology set information on a synchronization signal. However, in consideration of actual synchronization signal reception performance and UE reception complexity, carrying various pieces of numerology information on a sequence-based synchronization signal may be significant burden.

In option 2, the eNB carries and transmits dedicated numerology set information on a system information (SI) message. The conventional LTE eNB transmits most important SI content to a broadcast channel (BCH) through a master information block and additional SI content to a shared channel through a system information block on a different cycle according to importance. The UE should identify a control channel signal which can be identified by a system information-radio network temporary identifier (SI-RNTI) in order to receive the SIB through the shared channel. The UE performs a random access procedure according to the dedicated numerology set configured through the SI message and a control/data channel transmission/reception operation in the connected state. If access requirement performance of random access is different for each service, it is required to configure random access and provide needed numerology suitable for each service through the SI message.

In another method according to option 2, the network or the eNB may carry the dedicated numerology set information on a paging message and the UE may perform the random access procedure according to dedicated numerology set information included in the paging message, but such a method is limited to mobile terminated (MT) call. In option 3, a common random access procedure is performed regardless of the UE and service. Such a method has an advantage of allocating numerology required for a connected state operation only to the UE having passed through the random access process. Accordingly, by detecting UE type/service/requirement only when there is attempt of random access of the UE, the network or the eNB may allocate the dedicated numerology set only in the case of necessity, thereby contributing to the efficient use of radio resources.

Depending on the scenario, the dedicated numerology set may be allocated through a connection establishment process or a connection-less scheme. In option 4, after the UE operates according to the default numerology set and proceeds up to the connected state, the UE acquires the dedicated numerology set through a connection establishment procedure or a numerology/service/slice request procedure.

In a method of transmitting various pieces of dedicated numerology set information, a method by which the eNB informs the UE of the information may consider the options as follows.

Option 2)-a: carry minimum SI on BCH

Option 2)-b: carry additional SI on BCH

Option 2)-c: transmit additional SI through shared channel identified by SI-RNTI Option 2)-d: transmit paging message through shared channel identified by P-RNTI Option 3)-a: transmit random access response message (msg2) through shared channel identified by RA-RNTI during random access procedure Option 3)-b: transmit connection setup complete message (msg4) through shared channel identified by C-RNTI during random access procedure Option 4): transmit separate higher layer message through shared channel identified by C-RNTI after connection establishment Such transmission methods of the eNB may be largely divided into four schemes.

Scheme 1: broadcast signal transmitted through BHC. The UE can receive the BHC according to detection of a synchronization signal. The UE may receive the broadcast signal in the idle state.

Scheme 2: broadcast/multicast signal transmitted through DL-SCH (downlink shared channel). The UE can receive the broadcast/multicast signal only when completing reception and configuration of information on a physical layer/data channel from minimum SI according to the default numerology set. The UE may receive the broadcast/multicast signal in the idle state.

Scheme 3: unicast (UE-specific) signal for the UE having no connection, transmitted through DL-SCH (downlink shared channel). The UE can receive the unicast signal only when completing reception and configuration of information on a physical layer/data channel from minimum SI according to the default numerology set. The UE may receive the unicast signal in the idle state.

Scheme 4: unicast (UE-specific) signal for the UE having a connection, transmitted through DL-SCH (downlink shared channel). The UE can receive the unicast signal only when completing reception and configuration of information on a physical layer/data channel from minimum SI according to the default numerology set. The UE may receive the unicast signal only in the connected state.

Figure 63:
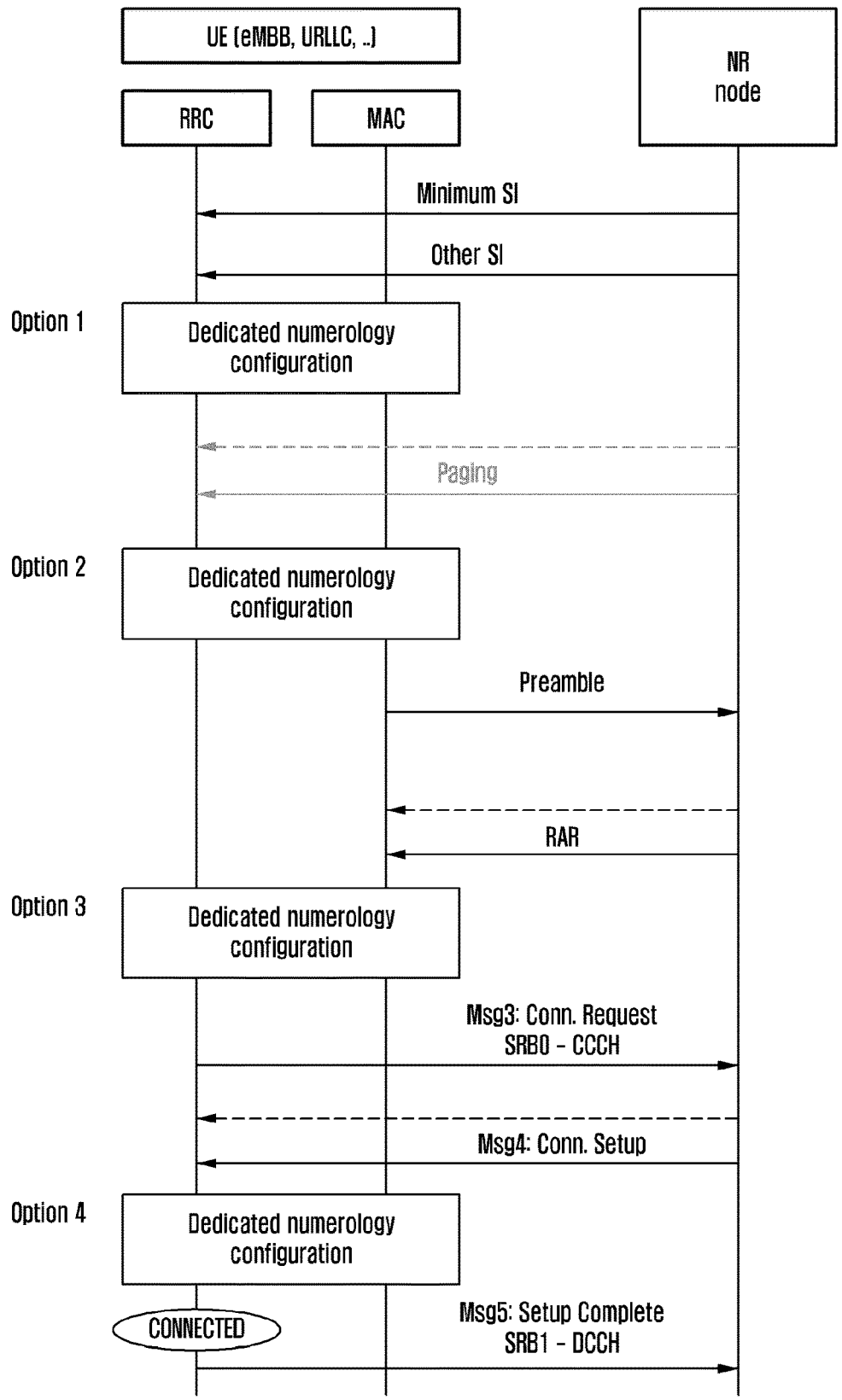
FIG. 63 illustrates options applied to the process in which the UE transitions from the idle state to the connected state according to the third embodiment of the disclosure.

FIG. 63 illustrates options of the above-described methods applied to a process in which the UE transitions from the idle state to the connected state.

FIG. 63 illustrates options applied to the process in which the UE transitions from the idle state to the connected state according to the third embodiment of the disclosure.

Option 1: dedicated numerology set may be transmitted through SI. At this time, the corresponding information may be inserted into minimum SI or other SI. The other SI may be configured and transmitted eNB-specifically or UE-specifically. By configuring dedicated numerology before the connection establishment procedure, the UE has an advantage of reducing processing overhead.

Option 2: connection establishment may be performed using both the default numerology and the dedicated numerology. The eNB may inform the UE of a service type corresponding to mobile-terminated (MT) data waiting to be transmitted in the network through a paging message. Thereafter, on the basis of the corresponding type information, the UE may transmit a random access preamble, detect an RAR, and select RACH resources and a dedicated numerology set to be used for data transmission and reception in the connected mode. Downlink and uplink RRC messages may be also configured as the corresponding dedicated numerology set and transmitted.

Option 3: transmittable through RAR. In option 3, SI acquisition, paging, and random access are performed using the default numerology set. If the eNB successfully senses and detects the random access preamble, the eNB may transmit a response to the corresponding message, and at this time may transmit dedicated numerology set information. However, since the UE performs default configuration even in random access, it is required to configure the default set for RAR transmission. Accordingly, the eNB may configure and transmit an indication for the preferred dedicated set to the corresponding UE or perform distribution between numerology resources available by the eNB itself.

Option 4: connection establishment may be performed using default numerology. Default numerology used for initial SI acquisition may be used for common control signaling (other SI transmission, paging indication with P-RNTI, and RAR) transmission and reception between the UE and the eNB and transmission of RRC message 3 (Msg3) and RRC message 4 (Msg4). In this option, the dedicated numerology may be transmitted while being inserted into message 4 for establishing the dedicated connection of the UE. The UE is required to inform the eNB in advance of preferred or implementable numerology information at the initial access time point.

The above options may be used for reestablishing the numerology set.

Meanwhile, suitability of the four schemes may vary depending on UE density and service/slice. For example, the BCH-based broadcast signal of scheme 1 is suitable for the case in which the number of UEs which are the same type within the eNB is large. The DL-SCH-based broadcast/multicast signal of scheme 2 is suitable for the case in which a considerable number of UEs or UE groups which are different types within the eNB are distributed at different ratios. The DL-SCH-based connection-less unicast signal of scheme 3 may be transmitted only to a UE requested the signal among UEs within the eNB and is suitable for the case in which rapid numerology switching is needed. The DL-SCH connection-based unicast signal of scheme 4 may be transmitted only to a UE requested the signal among UEs within the eNB and is suitable for the case in which the number of UE requested the signal within the eNB is small and the network desires to accurately identify UE subscription/service/security information.

However, schemes 1, 2, and 3 except for scheme 4 should be operated even when the UE is in the idle state, so if the eNB does not know an eNB in which the UE resides in the idle state, it is difficult to operate a suitable scheme according to UE density. Further, if the eNB does not know a UE ID or a service/slice which the UE desires, it is difficult to operate a suitable scheme for each service/slice. On the other hand, in the case of scheme 4 in which the UE is already in the connected state, the eNB may detect a user's intention of using the service/slice on the basis of a buffer status report (BSR) or information which can be additionally transmitted together with the BSR.

Accordingly, the disclosure provides a method and a procedure in which the eNB detects the location and characteristics/identity of the UE by an uplink signal of the idle mode UE, that is, detects presence information indicating that the UE resides in a particular eNB or is close to a particular eNB and information (UE/service/slice ID) for specifying a service/slice of the UE, and properly selects a method of configuring the dedicated numerology set according thereto.

In order to carry ID/service/slice information of the idle mode UE on a present signal (or a probing, discovery, or beacon signal) and transmit the same to one or more eNBs, the UE should first receive a synchronization signal of the eNB and synchronize a reference time. Fixing in advance the resource location for transmitting the presence signal according to the location of the synchronization signal deteriorates a free design of the system, so that a channel for transmitting and receiving the presence signal should be configured in minimum SI or additional SI. In the disclosure, such a channel is called a UL presence channel (UPCH).

If the UL presence channel is configured, transmitting the UL presence signal on a short cycle by the UE may be a burden to UE complexity and power consumption. In order to handle the problem, the eNB may configure a DL probing channel (DPCH) corresponding to the UL presence channel. The DL probing channel may be also configured in minimum SI or additional SI, and the DL probing signal transmits at least one piece of information among a UE, a UE group, a service, a slice, and numerology or an ID thereof.

The UL presence signal or the DL probing signal may be a contention-based signal which can be separated even though the sequence or part of the signal overlaps. Alternatively, in order to indicate as many UEs as possible and services/slices thereof, a tone-based signal maybe considered. Particularly, if an ID and information of the UE is mapped to multi-tone, a method by which every UE performs encoding with different hash codes and transmit multi-tone and the eNB receives multi-tone through a bloom filter may be considered.

In an example of using the contention-based signal as the UL presence signal, the conventional random access procedure may be directly used. That is, after the random access preamble of the UE and the random access response of the eNB, a service/slice-related request may be transmitted through msg 3 of UE.

In another example of using the contention-based signal as the UL presence signal, a signal modified from the conventional random access signal may be used. However, the conventional random access preamble transmits a sequence and thus cannot contain much information. Further, it is difficult to transmit information which can be dynamically changed through the sequence. Accordingly, the eNB should transmit mapping information between the sequence and the service/slice when configuring the UPCH through SI. The UE may select a sequence corresponding to the service/slice which the UE is using or to be used and transmit the same through the UPCH.

In another example of using the contention-based signal as the UL present signal, a new signal transmission method based on sparse coding may be used. According to sparse coding, the eNB may receive overlapping signals which a plurality of UEs transmits and separate signals for each UE. The UE may transmit a service/slice ID according to sparse coding or compress and transmit the ID through a method such as the hash code.

In another example of using the contention-based signal as the UL presence signal or the DL probing signal, a tone-based signal and the hash code may be used.

Such a method has an advantage in that any type of data representing the UE and UE information can be encoded through the hash code. Further, there is only an false positive (false alarm) error without false negative error, it is less likely to determine non-transmission of a particular ID even though the particular ID has been transmitted. Accordingly, if the eNB stores the information regardless of the information type, the eNB may identify a terminal from which the signal is transmitted. If the UL presence signal is not the sequence, the eNB needs to receive an RAP signal to calculate TA of the UE. Further, in the case of the same tone mapping, signals just overlap, so that there is no interference between signals from different transmitters. The DL probing signal may be also designed in the same structure as the UL presence signal. Accordingly, the DL probing signal may be configured on the basis of UE information stored by the MME or the service/slice control server. Such a characteristic is advantages when one or a plurality of eNBs uses the DL probing signal in order to replace a function of the paging signal.

Figure 52:
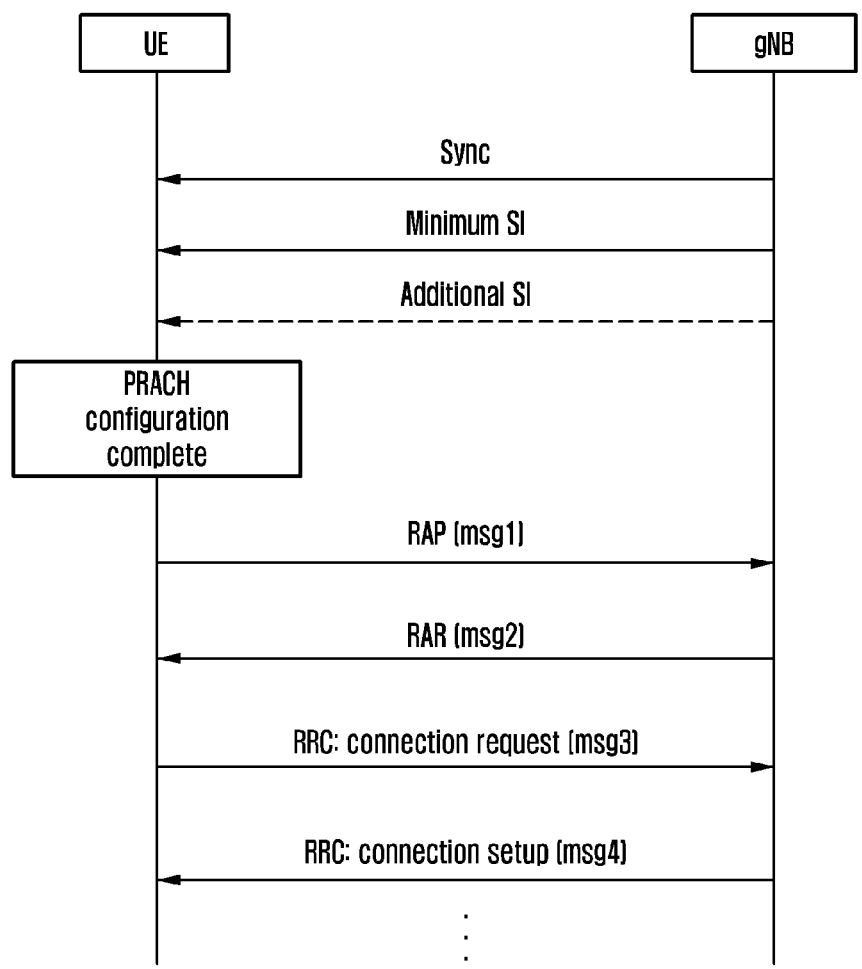
FIG. 52 illustrates an initial access procedure according to the third embodiment of the disclosure.
Figure 53:
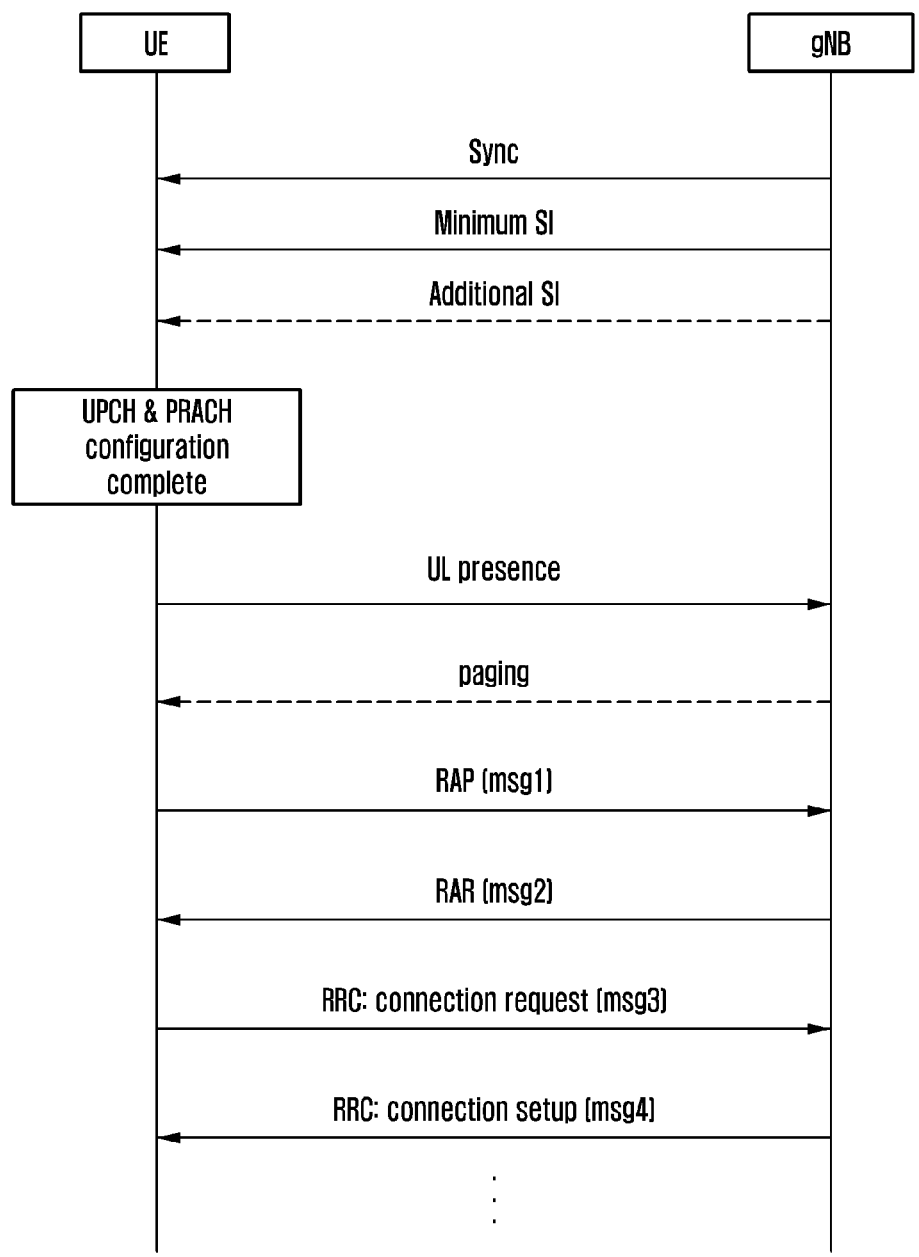
FIG. 53 illustrates initial access procedure example –I considering the UL presence signal according to the third embodiment of the disclosure.

FIG. 52 is a flowchart illustrating an initial access procedure which can be considered according to the third embodiment of the disclosure. If the UE completes configuration for a physical random access channel (PRACH) on the basis of information within SI after detecting the synchronization signal of the eNB and acquiring the SI message, the UE may receive the paging signal, or if data to be transmitted is generated in a UL buffer, transmit a random access preamble (RAP). The UE may select a random RA-RNTI from an RA preamble set for each UE distance defined in the PRACH configuration within the SI and transmit the selected RA-RANTI. In response to the received RAP, the eNB transmits information such as an RAP ID, a timing advance value, a temporary C-RNTI, and resource allocation information (RB or MCS) for transmitting msg3 of the UE through a random access response (RAR) message identified by the RA-RNTI. The UE transmits a UE ID (temporary mobile subscriber identity (TMSI or random value) and an establishment cause through msg3, that is, an RRC connection establishment message according to successful RAR reception. In order to inform of completion of the connection configuration through an RRC connection setup message in response to msg3, the eNB transmits the UE ID received through msg3 and the C-RNTI to be used in the connected state. FIG. 53 illustrates initial access procedure example –I considering the UL presence signal according to the third embodiment of the disclosure.

Referring to FIG. 53, the eNB may transmit UPCH and PRACH configuration information through minimum SI (or additional SI) and the UE may complete UPCH and PRACH configuration when receiving the minimum SI. The UE transmits the UL presence signal determined according to the UPCH configuration through particular UPCH resources. In the case of a mobile-terminated (MT) call, if the UE informs the eNB of the UL presence, the eNB transmits a paging message according to a matching result in response thereto. At this time, the eNB may insert numerology or a dedicated numerology set for the RACH into the paging message.

Figure 54:
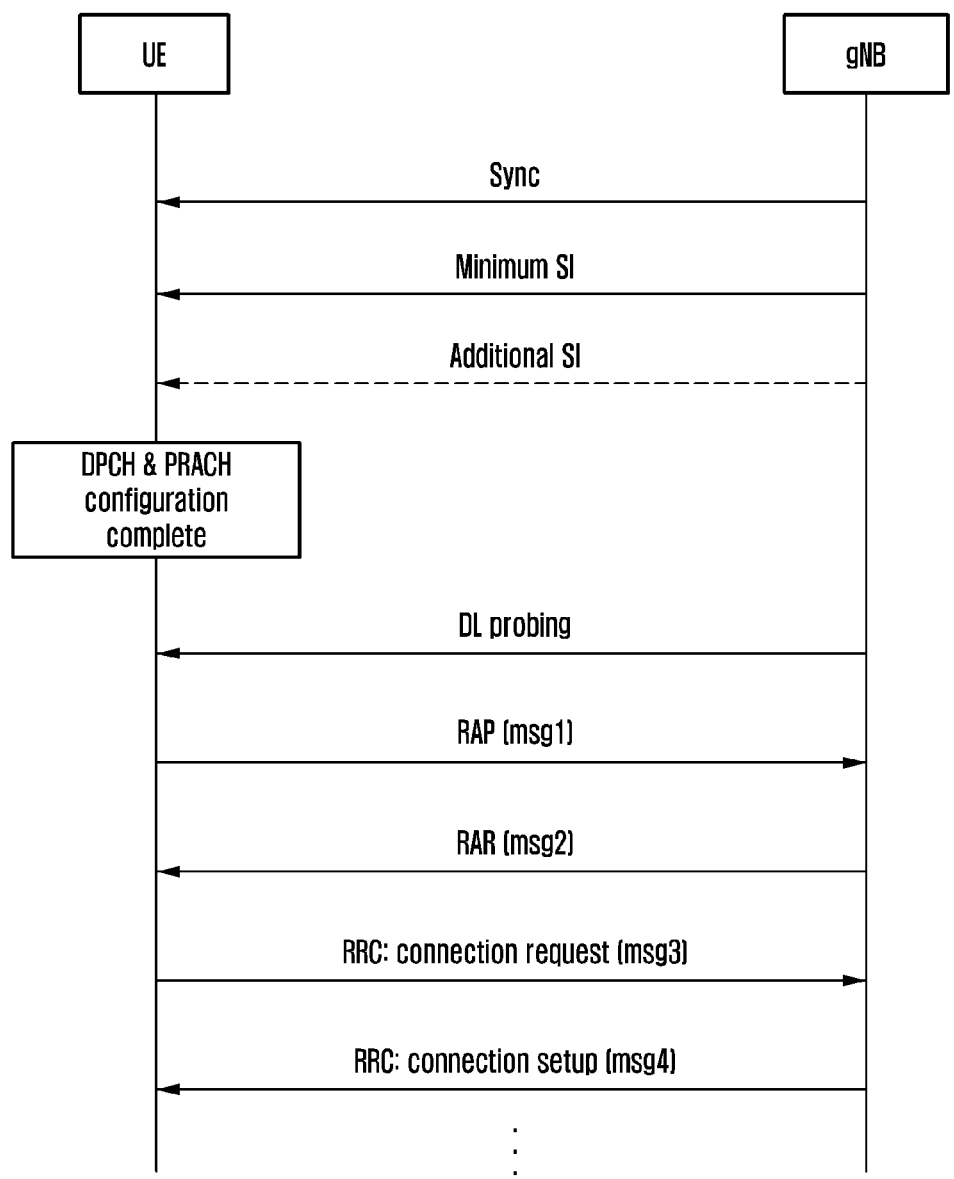
FIG. 54 illustrates initial access procedure example –I considering the DL probing signal according to the third embodiment of the disclosure.

In the case of a mobile-oriented (MO) call, after informing the eNB of the UL presence, the UE performs an RAP and RAR procedure according to the default numerology set. If the eNB configures a dedicated resource set through the RAR message, a transmission/reception operation is performed through resources corresponding to the dedicated numerology set from msg3 and msg4. If the eNB configures the dedicated numerology set through the RRC connection setup message (msg4), the UE transitions to the connected state and performs a connected mode operation in resources corresponding to the dedicated numerology set. FIG. 54 illustrates initial access procedure example –I considering the DL probing signal according to the third embodiment of the disclosure.

Figure 55:
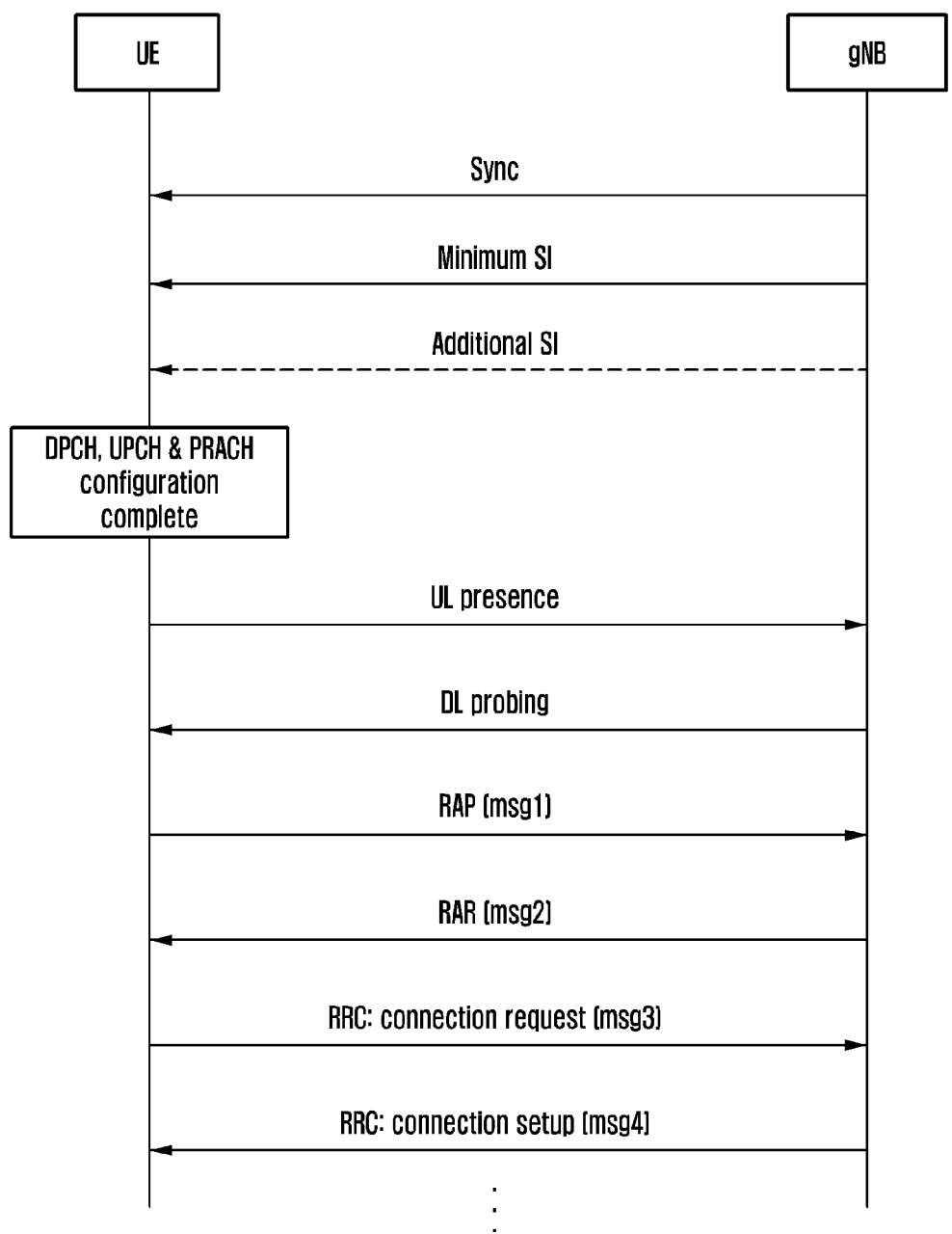
FIG. 55 illustrates initial access procedure example –I considering the UL presence signal and the DL probing signal according to the third embodiment of the disclosure.

FIG. 54 shows a procedure replacing a function of paging with the DL probing signal. In the case of a synchronous network, the same DL probing signals are composite and transmitted/received from one or a plurality of eNBs. Accordingly, even though the network does not know the accurate location of the UE, one or more eNBs in a predetermined area simultaneously transmit DL proving signals to the UE to wake up the UE. The UE performs a random access procedure according to a matching result of the received DL probing signals. FIG. 55 illustrates initial access procedure example –I considering the UL presence signal and the DL probing signal according to the third embodiment of the disclosure.

Figure 56:
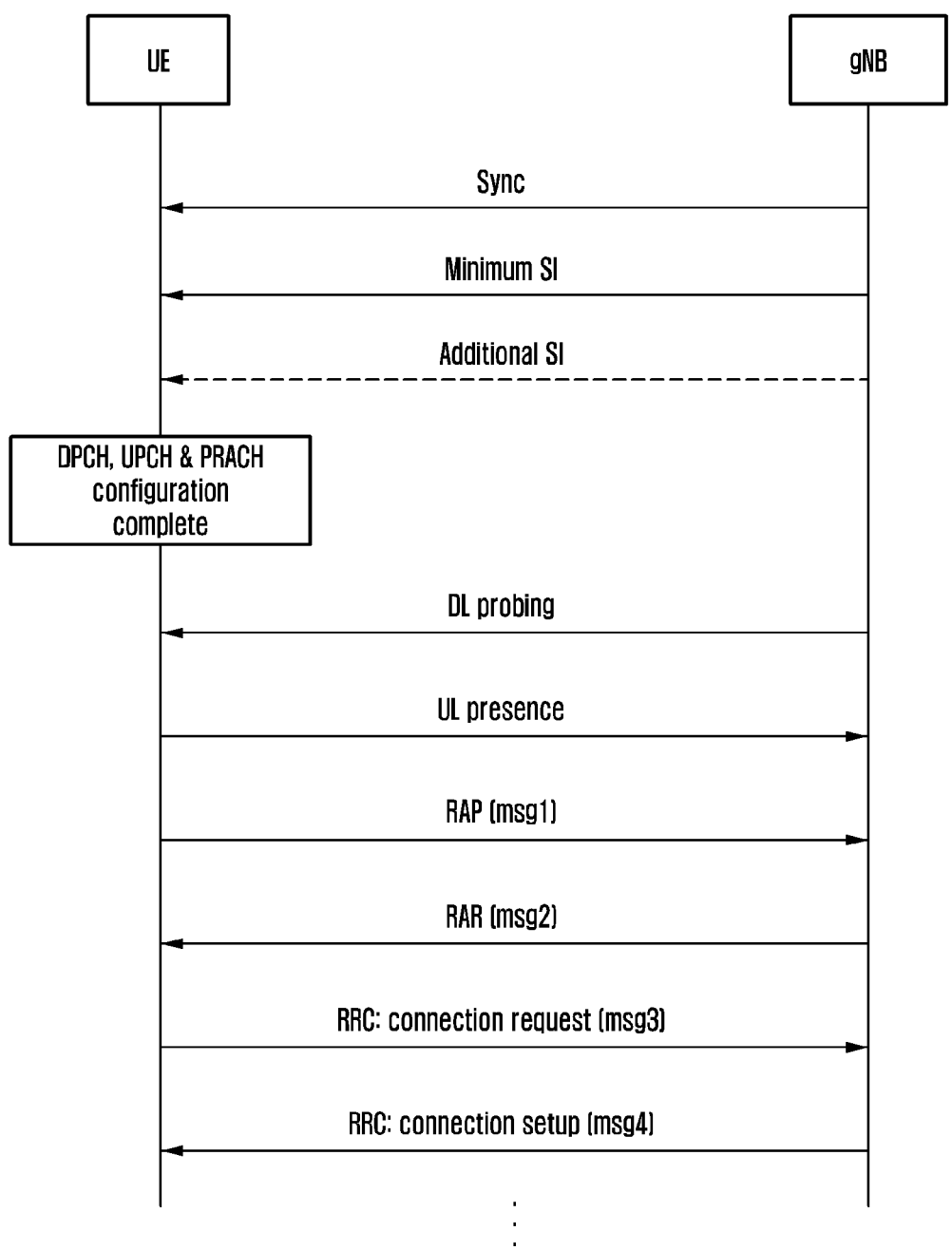
FIG. 56 illustrates initial access procedure example –II considering the UL presence signal and the DL probing signal according to the third embodiment of the disclosure.

FIG. 55 shows a procedure in which the paging signal is replaced with the DL probing signal when paging is transmitted and received in FIG. 53. If matching for the UL presence signal from a particular UE is successful, the eNB transmits the DL probing signal. The UE matches the DL probing signal according to information corresponding to the UL presence signal, and the result is successful, performs the random access procedure. If service/slice/numerology information which the UE requires can be matched through the UL presence signal, the eNB may perform the random access procedure according to the dedicated numerology set. It is assumed that the dedicated numerology set is transmitted through minimum SI or additional SI. FIG. 56 illustrates initial access procedure example –II considering the UL presence signal and the DL probing signal according to the third embodiment of the disclosure.

Figure 57:
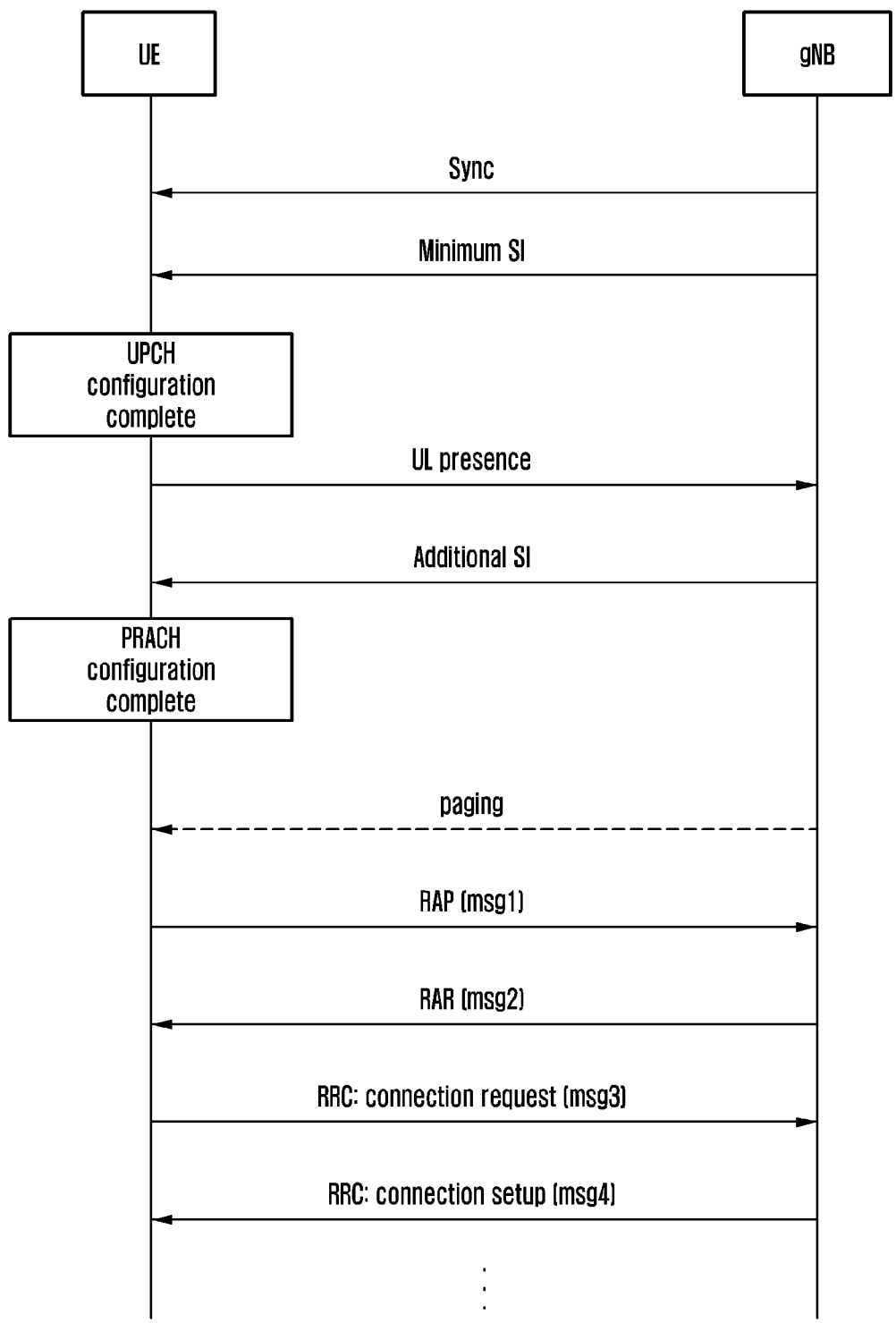
FIG. 57 illustrates initial access procedure example –II considering the UL presence signal according to the third embodiment of the disclosure.

In FIG. 56, the eNB first transmits the DL probing signal and the UE which succeeds in matching for the DL probing signal transmits the UL presence signal. Since the eNB does not transmit the paging signal, the UE may directly perform the random access procedure through the dedicated numerology set without a need to monitor the paging signal through the default numerology set. According to another example, since the intention of mutual access between the eNB and the UE is detected through the DL probing and UL presence process, the UE ID and C-RNTI information transmitted through msg4 may be transmitted through msg2 without transmission of msg3 and msg4. However, the RA-RANTI used for RAP transmission and reception should be exposed on the basis of information specifying the UE used in the DL probing and UL presence process. For example, the RA-RNTI may be determined on the basis of time/frequency location of resources for transmitting the DL probing signal or the UL presence signal. Alternatively, if status information in the connected state of the UE is stored in the network, a pre-allocated RNTI may be used for the shortened random access procedure. FIG. 57 illustrates initial access procedure example –II considering the UL presence signal according to the third embodiment of the disclosure.

Figure 64:
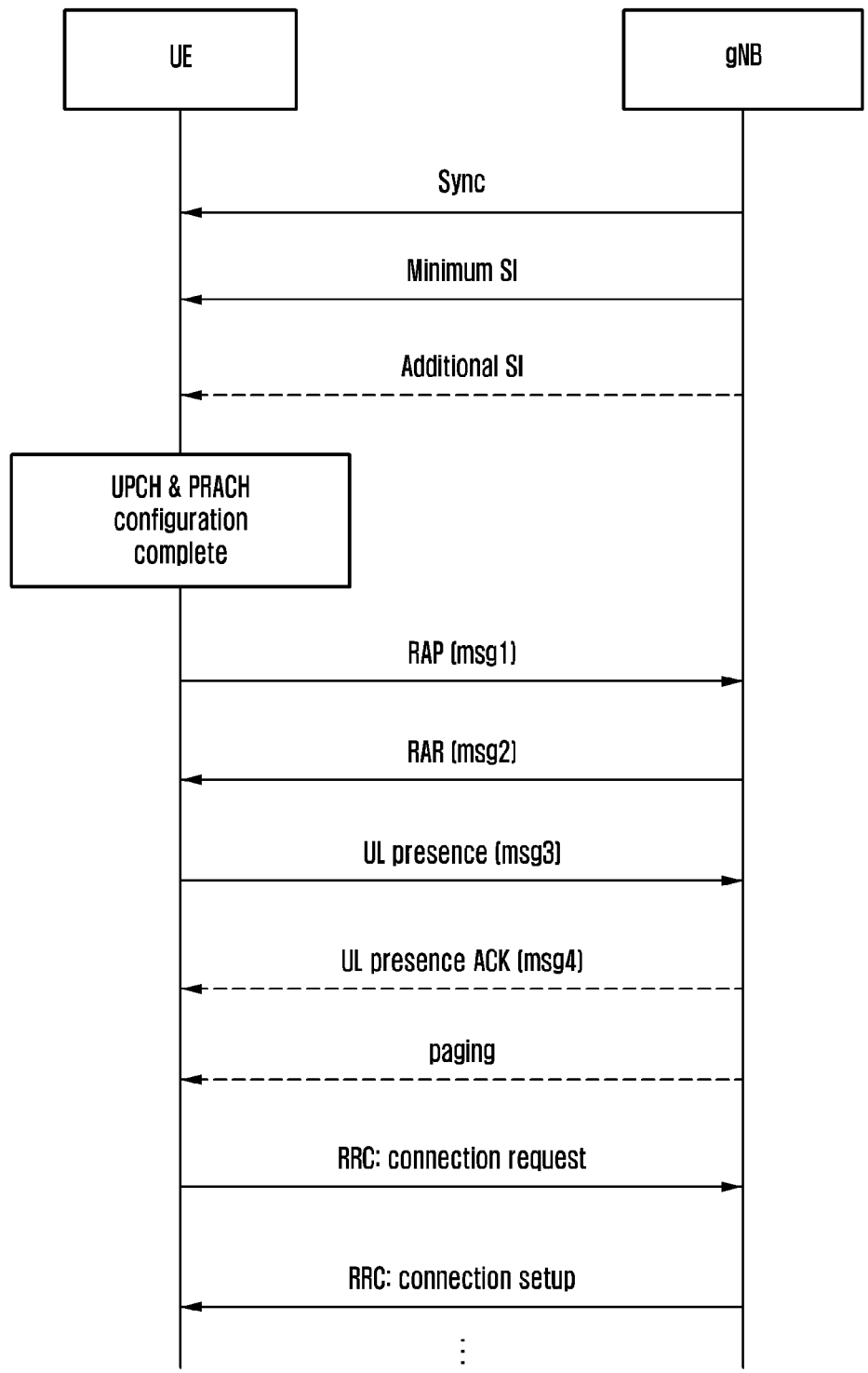
FIG. 64 illustrates an example in the case in which the UPCH reuses the conventional RA procedure according to the third embodiment of the disclosure.

FIG. 57 illustrates a modification of the procedure based on the UL presence signal of FIG. 53 and shows the case in which the eNB transmits additional SI in response to the UL presence signal rather transmitting the additional SI together with minimum SI. Accordingly, RACH configuration or dedicated numerology set configuration information is included only in the additional SI. FIG. 64 illustrates an example in the case in which the UPCH reuses the conventional RA procedure according to the third embodiment of the disclosure.

Figure 65:
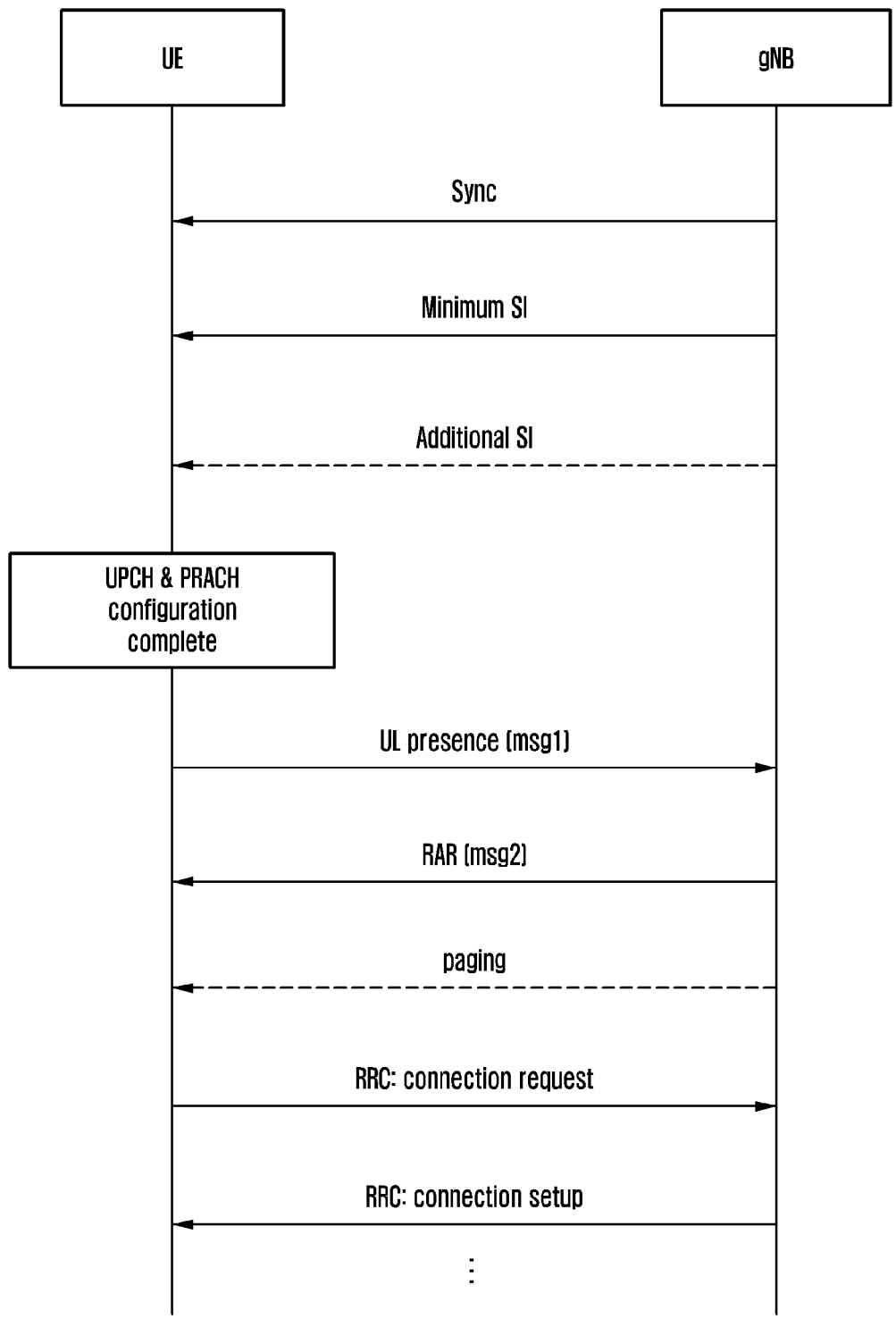
FIG. 65 is an example of using the RA procedure in which the UPCH is modified according to the third embodiment of the disclosure.

FIG. 64 illustrates an example in the case in which the UPCH reuses the conventional RA procedure. The UE acquires synchronization of the eNB and SI and operates according to UPCH and PRACH information configured through SI. When receiving the RAP signal of the UE through resources configured as the UPCH, the eNB operates a UPCH-related procedure different from the conventional RA procedure. That is, the eNB operates in an order of RAP(msg1)-RAR(msg2)-UL presence(msg3). UL presence ACK (msg4) which is a response of the eNB to Msg3 may be transmitted only if necessary. Since the eNB may receive the UL presence signal and identify service/slice information of the UE, the eNB may configure numerology information when transmitting the paging message to the UE in the case of an MT call. When receiving the paging signal, the UE immediately transmits the RRC connection request based on the configured numerology if UL synchronization is valid and the eNB responds thereto through the RRC connection setup. In the case of an MO call, if UL synchronization according to timing advanced information of previous msg2 is valid, the UE immediately transmits the RRC connection request through configured numerology and the eNB responds thereto through the RRC connection setup. In the procedure, after numerology configuration, the RRC messages exchanged between the eNB and the UE are based on the configured numerology. FIG. 65 illustrates an example of using the RA procedure in which the UPCH is modified according to the third embodiment of the disclosure.

FIG. 65 illustrates an example of using the RA procedure in which the UPCH is modified. The UE acquires synchronization of the eNB and SI and operates according to UPCH and PRACH information configured through SI. The UE selects suitable sequence or/and UPCH resources according to a service/slice ID which can be expressed by the sequence or a combination of the sequence and indexes of UPCH resources and transmits an RAP (msg1). When receiving the RAP signal of the UE through resources configured as the UPCH, the eNB operates a UPCH-related procedure different from the conventional RA procedure. That is, the eNB operates in an order of UL presence(msg1)-RAR(msg2). Since the eNB may receive the UL presence signal and identify service/slice information of the UE, the eNB may configure numerology information when transmitting the paging message to the UE in the case of an MT call. When receiving the paging signal, the UE immediately transmits the RRC connection request through configured numerology if UL synchronization according to timing advanced information of previous msg2 is valid and the eNB responds thereto through the RRC connection setup. In the case of the MO call, if UL synchronization is valid, the UE immediately transmits the RRC connection request through configured numerology and the eNB responds thereto through the RRC connection setup. In the procedure, after numerology configuration, the RRC messages exchanged between the eNB and the UE are based on the configured numerology.

The various procedures for configuring the dedicated numerology set in FIG. 51 and the initial access procedure in FIGS. 52, 57, 60, 61, 63, 64, and 65 may be combined. Accordingly, a combination of the various options in FIG. 51 and the various procedures in FIGS. 52, 57, 60, 61, 63, 64, and 65 may be included the content of the disclosure.

A detailed embodiment of configuring a physical layer of the UL presence signal or the DL probing signal and how to transmit a UE ID and a service/slice ID will be described. A main subject of the disclosure is to detect the presence of the UE and a required service/slice ID through transmission and reception by mapping the UE ID and service/slice ID information stored in a higher layer of the UE and a higher layer of the network, particularly, the MME or the service/slice control server on multi-tone and to provide dedicated numerology set information which can support the service/slice to the UE by the server of the network or the eNB. Accordingly, how to transmit and receive ID information of the higher layer through a tone-based signal and how to specify a UE to which the tone-based signal is transmitted to allow the UE to receive dedicated numerology set information by the eNB will be described in detail.

First, a UL presence signal which the UE transmits to the eNB and a DL proving signal which the eNB transmits to the UE is based on the same transmission and transmission method. FIG. 4H illustrates a process of mapping a tone on the basis of a UE ID and a service ID by a transmitter and a matching procedure between the possessed UI ID and service ID information on the basis of tone information detected by a receiver. If there is no need to specify the UE during the procedure, for example, if the network desires to know only service requirements, the UE may be pre-configured to transmit only a service/slice ID or configured by the network or the eNB. If the UE is configured by the network or the eNB, a format of ID information to be used as an input for tone mapping in minimum SI or additional SI may be configured. The transmitter (UE) receives an output value which is hashed code from has functions having the ID as an input value. The UE determines a tone o which a signal (energy) is carried on the basis of UPCH information configured by the minimum SI or the additional SI based on the hash code. UPCH configuration includes a structure of tone resources separated by the time/frequency and a method of assigning logical indexes to a plurality of tones. There are mainly a time-first scheme and a frequency-first scheme, and FIG. 4H is described on the basis of the frequency-first scheme. That is, indexes are assigned in a direction from a low frequency tone to a high frequency tone, and if all frequency tones are indexes in one time unit, indexes are also assigned from a low frequency tone to a higher frequency tone in the next time unit.

Figure 58:
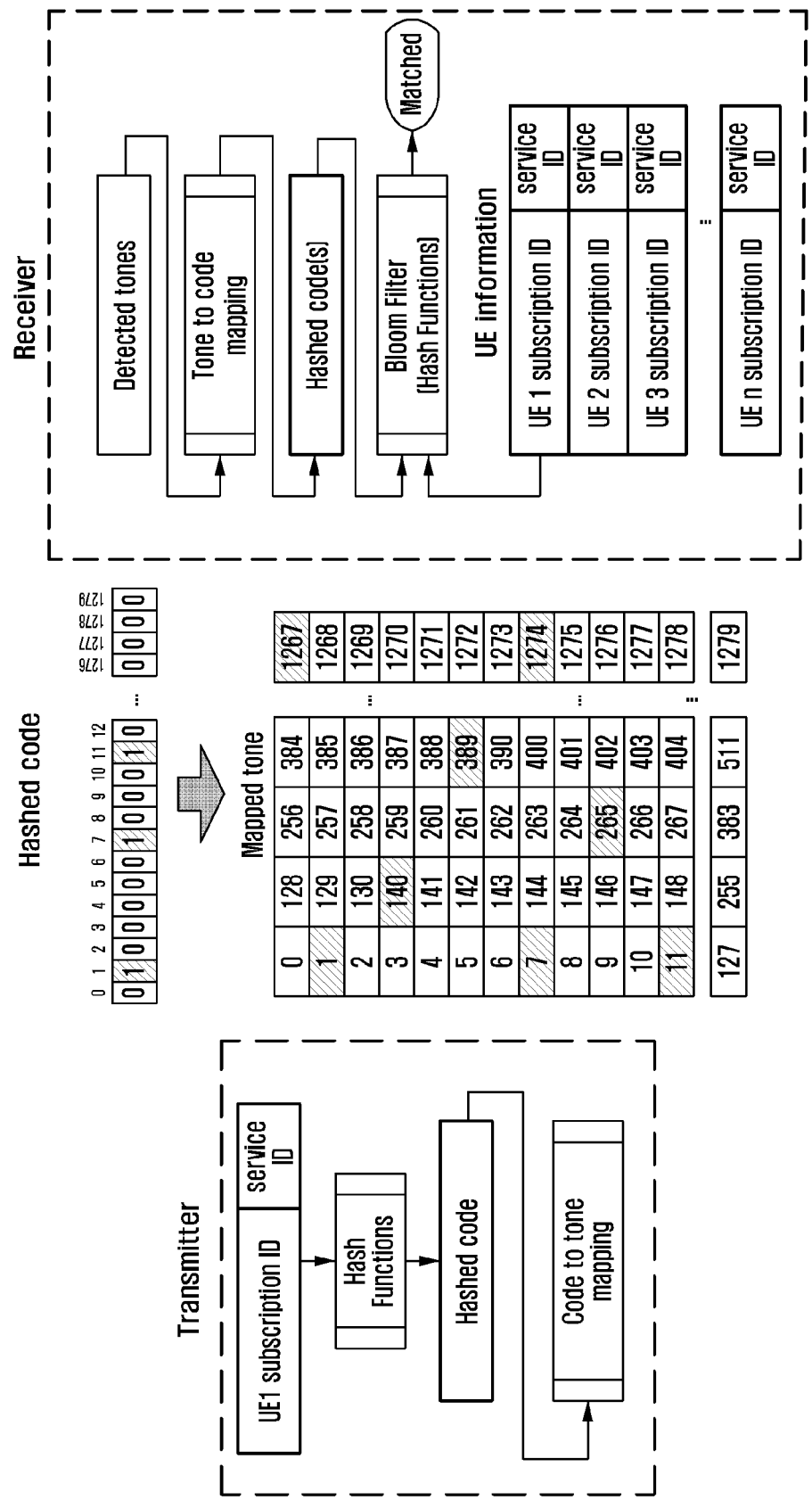
FIG. 58 illustrates an example of a method of transmitting and receiving a tone-based signal based on a UE ID and a service ID according to the third embodiment of the disclosure.
Figure 60:
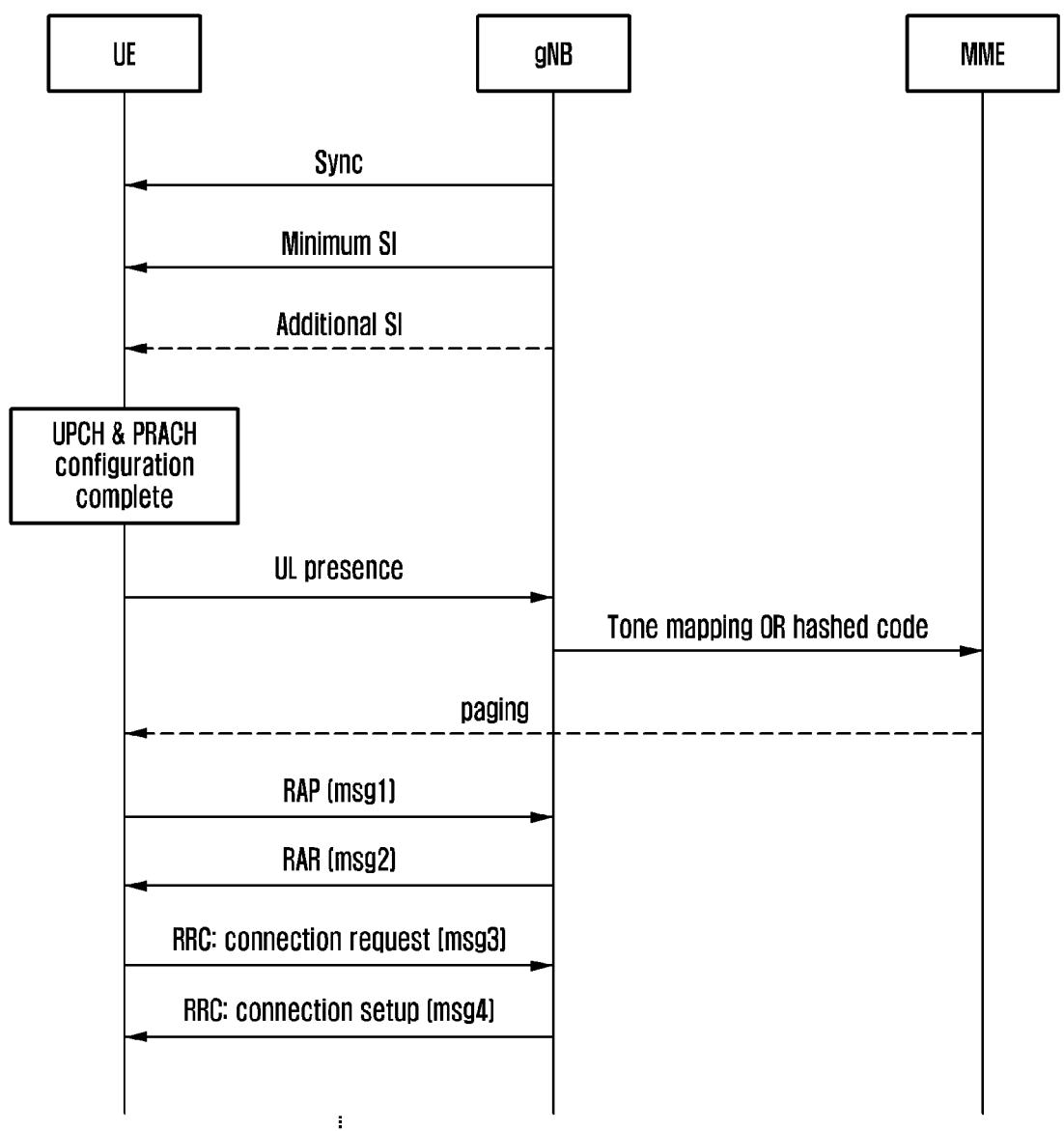
FIG. 60 illustrates an example in which the eNB asks the MME about one or hash code information according to the third embodiment of the disclosure.

FIG. 58 illustrates an example of a method of transmitting and receiving a tone-based signal based on a UE ID and a service ID according to the third embodiment of the disclosure.

FIG. 58 illustrates a structure in which a total of 1280 tones numbering from 0 to 1279 are indexed. A hash code acquired from a hash function may be recognized according to a normal sequence of most significant bit (MSB) or least significant bit (LSB). The UE may sequentially allocate tone indexes from tone index 0 of the UPCH which correspond to the MSB.

According to an embodiment, in order to improve reception performance, different scramble codes or interleaving rules may be applied to each eNB by changing sequences according to a scramble or interleaving scheme rather than sequential tone mapping. If such an additional sequence change for each eNB or each UE is possible in spite of complexity, it may be used when the eNB determines an eNB in which the UE currently resides.

In the example of applying sequential tone mapping, the eNB performs a procedure of mapping a tone to a code on the basis of detected tone information. At this time, tone information received by the eNB may be a signal which tone signals from one or a plurality of UEs overlaps.

Figure 59:
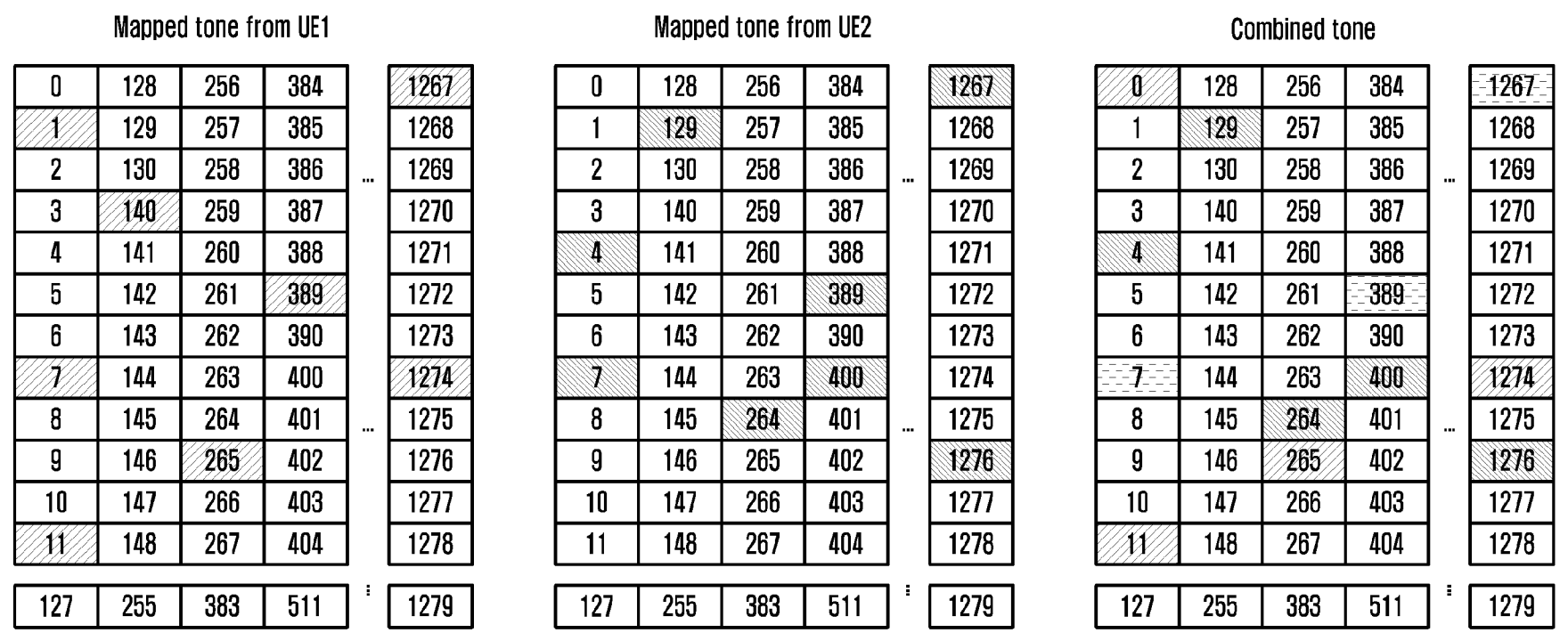

FIG. 59 illustrates an example of overlapping between tone-based signals from a plurality of UEs according to the third embodiment of the disclosure.

A tone transmitted by UE1 and a tone transmitted by UE2 may partially overlap each other as illustrate din FIG. 59. However, the eNB or the network server already has ID information of the UE and may match the ID on the basis of an output acquired by inputting the ID information into a hash function and identify the presence or absence of the UE or a service requirement condition of the UE. This is because the overlapping signal does not influence tone mapping of another UE. That is, this is because the receiver identifies the presence or absence of mapping by inspecting only a particular tone through the hash function. According to an embodiment, a scheme of minimizing a false alarm probability using a bloom filter including a plurality of hash functions may be used.

According to an embodiment, in access to the network, the eNB may allocate in advance tone mapping information for each of the UE ID and the service ID or tone mapping information for a combination of the UE ID and the service ID to the UE. If the UE transitions from the connected state to the idle state, the UE may transmit the UL presence signal as necessary according to tone mapping information configured by the eNB or detect and recognize the DL probing signal of the eNB.

Since the UE knows a period of the UPCH configured through minimum SI or additional SI and the resource location, if UL data for a particular service/slice is accumulated in the buffer, the UE may transmit the UL presence signal through the closet UPCH. According to an embodiment, the UE may transmit the UL presence signal on a cycle of different multiples of the UPCH cycle according to a priority of the service/slice or transmit the UL presence signal at the UPCH location separated for each service/slice (separated by an offset and a cycle). Alternatively, if a paging occasion is configured, the UE may be configured by the eNB or the network to transmit the UL presence signal through a $k^{th}$ UPCH before the next paging occasion.

Meanwhile, the eNB or the network receiving the UL presence signal and identifying the presence of the UE or demands of the UE should inform the UE of dedicated numerology set information suitable for the service/slice. Since the UL presence signal should be transmitted through a tone-based signal or the dedicated numerology set information of the eNB should be transmitted through a message, in order to specify a UE and transmit data through a control/data channel of a shared channel, DL control information (DCI) or a higher layer message should be transmitted with an RNTI which the UE knows. Further, the UE should know information on the RNTI which the eNB provides. Accordingly, the disclosure describes in detail whether the UE in the idle state may determine a new RNTI for receiving a message from the eNB. A new RNTI is used in the idle state and thus is called an I-RNTI.

The eNB and the UE should determine the same RNTI without any random access procedure in the state in which there is no connection therebetween. According to various embodiments of the disclosure, the UE may transmit the UL presence signal through a tone-based signal. The UE ID mapped to a plurality of tones within the UPCH is too large information to be directly converted into the I-RNTI. Accordingly, determining the I-RNTI of the UE on the basis of the hash code converted to be the small size or mapping information converted to the tone contributes to reduction in complexity of the UE.

For example, 1) a result value obtained by performing modular arithmetic using a sum of indexes of mapped tones and the total RNTI size may be determined as the I-RNTI, 2) a value obtained by dividing a tone space by N intervals, converting a bit-string of each interval into a partial value of the RNTI (for example, hexadecimal value), and then summing up them may be determined as the I-RNTI, 3) a value acquired by sequentially connecting indexes of mapped tones as the I-RNTI, or 4) a result value obtained by performing modular arithmetic using a sum of interval values of empty tones between mapped tones and the total RNTI size as the I-RNTI.

In addition, various conversion schemes based on the basis of a generally known algorithm may be considered. If the hash code space is smaller than the I-RNTI space, values may be mapped to the whole I-RNTI space by repeating the converted value. When the hash code space is larger than the I-RNTI space, the hash code space may fit to the I-RNTI space by omitting values of partial areas according to a rule.

The UE generates the I-RNTI based on tone information of the UL presence signal or the DL probing signal according to the same I-RNTI generation rule as that of the network server or the eNB. Meanwhile, according to an embodiment, the eNB may make a request for in advance the UE ID and service/slice ID information expected within the area and receive the same from the MME or the service/slice control server.

Alternatively, the eNB may generate the hash code on the basis of the received tone information and transmit the hash code to the MME or the service/slice control server to ask about matching. FIG. 4J illustrates an embodiment in which the eNB asks the MME or the service/slice server about hash code information acquired through received tone mapping information or tone-to-code mapping and the MME transmits paging to the UE according thereto.

Figure 61:
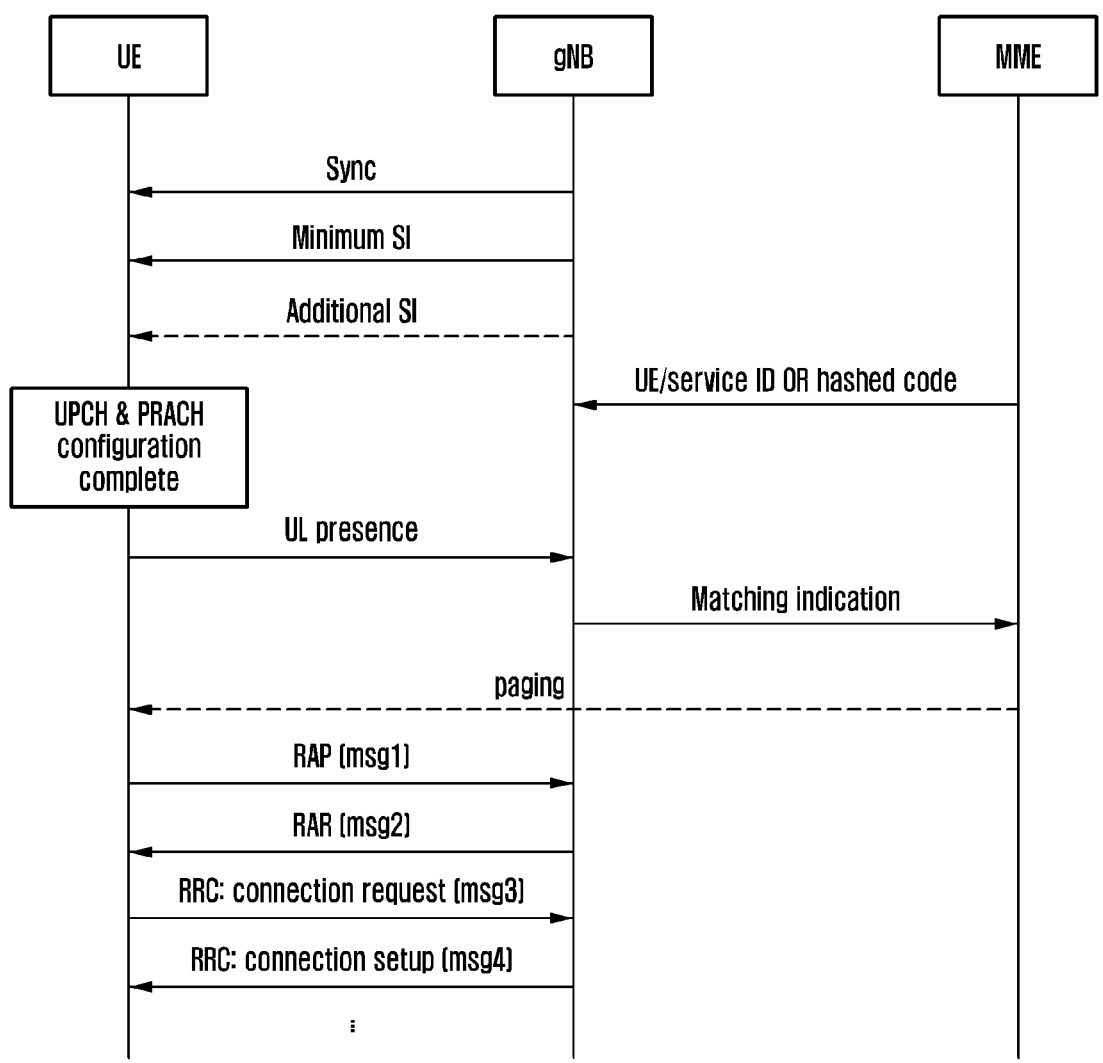
FIG. 61 illustrates an example in which the eNB transmits a matching indication to the MME according to the third embodiment of the disclosure.

FIG. 61 illustrates an example in which the eNB transmits a matching indication to the MME according to the third embodiment of the disclosure.

In FIG. 61, the MME provides in advance the UE/service/slice ID or the hash code for matching to the eNB within a tracking area and the eNB performs matching for the UP presence on the basis of the information provided for the matching. If the matching is successful, the eNB is required to inform the MME of the success. At this time, a matching indication may be transmitted while including the UE ID and service/slice ID information which are successfully matched.

The UE may perform the following operation on the basis of the I-RNTI determined by the tone-based signal. At this time, on the basis of the UL presence signal from a plurality of UEs, for example, if the number of UEs requiring a particular service is large, the eNB transmits corresponding dedicated numerology set information through BCH-based additional SI; if the number of UEs requiring a particular service is not large but services is large, corresponding dedicated numerology set information is transmitted through the SI-RNTI; or if the number of UEs requiring a particular service is too small, corresponding dedicated numerology set information is transmitted through the I-RNTI. Accordingly, after transmitting the UL presence signal, the UE searches for a signal of the eNB which can be identified by the I-RNTI while waiting within an I-RNTI reception window configured through minimum SI or additional SI.

In resources through which the eNB transmits the BCH, the UE should perform a BCH reception operation regardless of a reception window. This means that the UE may not perform an I-RNTI reception operation to receive the BCH according to implementation. Meanwhile, in resources (acquired by SI scheduling) through which the eNB transmits the SI-RNTI, the UE should perform in parallel both the SI-RNTI reception operation and the I-RNTI reception operation separately from the reception window. Any UE may have difficulty in simultaneously performing the SI-RNTI reception operation and the I-RNTI reception operation according to UE capability. Such a UE does not receive the SI-RNTI within the I-RNTI reception window but receives the SI-RNTI if the I-RNTI reception window expires.

Figure 62:
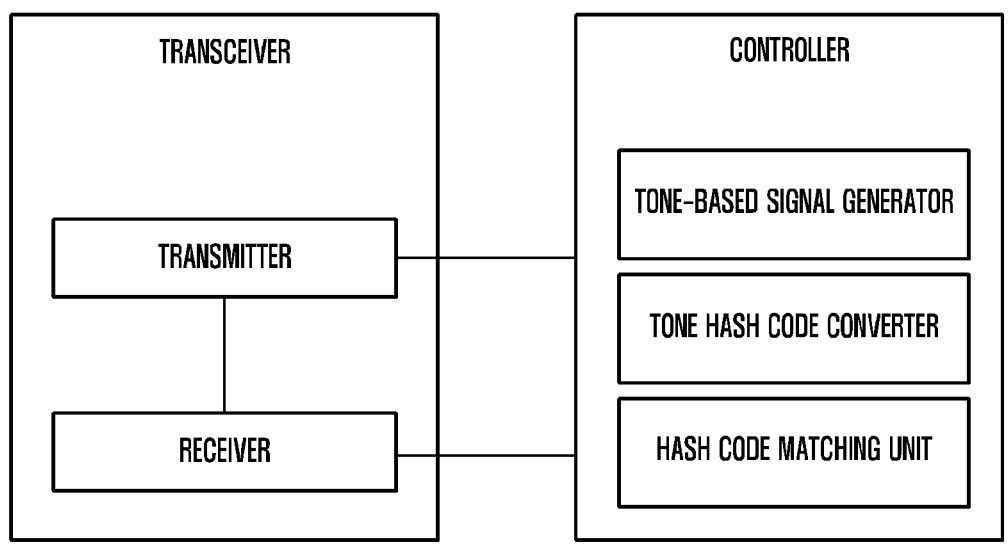
FIG. 62 illustrates the configuration of a UE apparatus according to the third embodiment of the disclosure.

The UE ID may be one of various IDs used by the network/eNB (IMSI, GUTI, S-TMSI, IP/PDN address UE S1AP ID, and UE X2AP ID) or may be a subscriber ID defined for each service/application/slice. FIG. 62 illustrates the configuration of a UE apparatus according to the third embodiment of the disclosure.

FIG. 62 illustrates an example of the configuration of the UE apparatus according to the third embodiment of the disclosure.

The UE apparatus may include a transceiver for transmitting and receiving a signal to and from another UE and a controller for controlling all operations of the UE apparatus. All operations for supporting the synchronization described in the disclosure may be understood as being performed by the controller. However, the controller and the transceiver do not need to be implemented as separate devices but may be implemented as one element such as a single chip.

It should be noted that the configuration of the UE, the example of the method of transmitting the control/data signal, the example of the operation procedure of the UE, and the configuration of the UE apparatus illustrated in FIGS. 51 to 57 have no intention to limit the scope of the disclosure. That is, all elements, entities, or operation steps illustrated in FIGS. 51 to 57 should not be construed as necessary elements for implementing the disclosure, and the disclosure may be implemented without departing from the scope of the disclosure with only some elements.

The operations of the eNB or the UE may be performed when a predetermined element within the eNB or the UE apparatus includes a memory device storing the corresponding program code. That is, the controller of the eNB or the UE apparatus may perform the operations by reading and executing the program code stored in the memory device through a processor or a central processing unit (CPU).

Various elements and modules of the entity, the eNB, or the UE used in the specification may operate by using a hardware circuit, for example, a combination of a complementary metal oxide semiconductor-based logical circuit, firmware, software and/or hardware, and a combination of firmware and/or software inserted into a machine-readable medium. For example, various electrical structures and methods may be performed using transistors, logic gates, and electrical circuits such as application specific integrated circuit.

The invention claimed is:

1. A method of transmitting uplink data by a user equipment (UE) in a wireless communication system, the method comprising:
    transmitting a random access (RA) preamble to a base station;
    receiving an RA response message as a response to the RA preamble from the base station;
    transmitting, to the base station, a radio resource control (RRC) resume request message including a UE identity, resume cause information and an authentication token; and
    receiving, from the base station, an RRC message for suspending an RRC connection including information on deprioritization information,
    wherein the RRC message for suspending the RRC connection further includes the UE identity, radio access network (RAN) discontinuous reception (DRX) cycle information, RAN notification area information, RAN periodic notification timer information, in case that a state of the UE is transited to an RRC inactive.

2. The method of claim 1, wherein the RRC message for suspending the RRC connection further includes wait timer information, in case that a state of the UE is transited to an RRC idle.

3. A method of receiving uplink data by a base station in a wireless communication system, the method comprising:
    receiving a random access (RA) preamble from a user equipment (UE);
    transmitting an RA response message in response to the RA preamble to the UE;
    receiving a radio resource control (RRC) resume request message including a UE identity, resume cause information and an authentication token from the UE; and
    transmitting an RRC message for suspending an RRC connection including information on deprioritization information,
    wherein the RRC message for suspending the RRC connection further includes the UE identity, radio access network (RAN) discontinuous reception (DRX) cycle information, RAN notification area information, RAN periodic notification timer information, in case that a state of the UE is transited to an RRC inactive.

4. The method of claim 3, wherein the RRC message for suspending the RRC connection further includes wait timer information, in case that a state of the UE is transited to an RRC idle.

5. A user equipment (UE) for transmitting uplink data in a wireless communication system, the UE comprising:
- a transceiver; and
- a controller configured to:
  - transmit a random access (RA) preamble to a base station,
  - receive an RA response message as a response to the RA preamble from the base station,
  - transmit, to the base station, a radio resource control (RRC) resume request message including a UE identity, resume cause information and an authentication token and
  - receive an RRC message for suspending an RRC connection including information on deprioritization information,
- wherein the RRC message for suspending the RRC connection further includes the UE identity, radio access network (RAN) discontinuous reception (DRX) cycle information, RAN notification area information, RAN periodic notification timer information, in case that a state of the UE is transited to an RRC inactive.

6. The UE of claim 5, wherein the RRC message for suspending the RRC connection further includes wait timer information, in case that a state of the UE is transited to an RRC idle.

7. A base station for receiving uplink data in a wireless communication system, the base station comprising:
- a transceiver; and
- a controller configured to:
  - receive a random access (RA) preamble from a user equipment (UE),
  - transmit an RA response message in response to the RA preamble to the UE,
  - receive a radio resource control (RRC) resume request message including a UE identity, resume cause information and an authentication token from the UE, and
  - transmit an RRC message for suspending an RRC connection including information on deprioritization information,
- wherein the RRC message for suspending the RRC connection further includes the UE identity, radio access network (RAN) discontinuous reception (DRX) cycle information, RAN notification area information, RAN periodic notification timer information, in case that a state of the UE is transited to an RRC inactive.

8. The base station of claim 7, wherein the RRC message for suspending the RRC connection further includes wait timer information, in case that a state of the UE is transited to an RRC idle.

* * * * *